United States Patent

Francini et al.

[15] 3,674,988

[45] July 4, 1972

[54] MACHINE TO READ INFORMATION FROM PUNCHED CARDS FOR THE PURPOSE OF DATA PROCESSING SAID INFORMATION AND FOR THE PURPOSE OF SORTING, COLLATING AND MERGING SAID PUNCHED CARDS IN ACCORDANCE WITH SAID PROCESSED INFORMATION

[72] Inventors: Joseph Pirra Francini, Norristown, Pa.; James Lopez Braxton, Jr., Morrestown, N.J.; Vera Gloria Lewis, Philadelphia, Pa.; Frank Henderson McPherson, Rosemont, Pa.; Daniel Rosenberg, Norristown, Pa.; Torkjell Sekse, Norristown, Pa.

[73] Assignee: Sperry Rand Corporation, New York, N.Y.

[22] Filed: Oct. 19, 1964

[21] Appl. No.: 404,758

[52] U.S. Cl. ..........235/61.7, 340/172.5

[51] Int. Cl. ..........G05b 1/00, G06k 15/00

[58] Field of Search ..........235/61.7, 61.6; 271/57; 209/110; 340/172.5

[56] References Cited

UNITED STATES PATENTS

| | | | |
|---|---|---|---|
| 2,968,792 | 1/1961 | Adams | 340/172.5 |
| 3,141,152 | 7/1964 | Greene et al. | 340/172.5 |
| 3,238,356 | 3/1966 | Dowds et al. | 235/61.7 |
| 3,386,654 | 6/1968 | Wallace | 235/61.1 |
| 1,872,945 | 8/1932 | Hebig | 226/88 |
| 2,990,957 | 7/1961 | Sarley et al. | 235/61.7 |
| 2,995,241 | 8/1961 | Klotz | 209/110 |
| 3,347,367 | 10/1967 | Smith | 271/57 |

*Primary Examiner*—Maynard R. Wilbur
*Assistant Examiner*—Thomas J. Sloyan
*Attorney*—Charles C. English, William E. Cleaver and Charles E. McTiernan

[57] ABSTRACT

The present apparatus provides two read stations which simultaneously read cards at a high rate of speed and two associated transport means which enable cards to be transported toward a common receiving station and which are capable of transporting punch cards of various sizes. In addition the high speed transport systems have means to readily remove card jams. Further each of the transport systems has a waiting station therein which holds two cards simultaneously, each of said cards having been previously read and each of said cards being compared with a third card being transported through the associated read station. In addition the system provides an arithmetic means as well as a comparison means in order to permit the information from the cards to be processed arithmetically, i.e., added or subtracted and to be compared with a standard value or with an answer arrived at by virtue of the arithmetic process. Yet further the present system provides an editing means for inserting or deleting information as well as a means for translating from one code to another to accommodate a prescribed checking sequence priority. Another feature is the read-in and read-out means by virtue of which the present system may be used as a peripheral device with another data processor.

33 Claims, 98 Drawing Figures

*INVENTORS*
JOSEPH P. FRANCINI
JAMES L. BRAXTON JR.
VERA G. LEWIS
FRANK H. MC PHERSON
DANIEL ROSENBERG
TORKJELL SEKSE

*BY* William E. Cleaver
*ATTORNEY*

| | | |
|---|---|---|
| $\bar{A}$ | $\bar{B}$ | SEL 1, UNL |
| A | B | SEL 2, E.S. |
| A | B | SEL 3 |
| A | $\bar{B}$ | SEL COMMON |

FIG. 19

| CHAR | PUN | ADDER IN 1 | IN 2 | SUM | LOGIC G | NO. | ZONE |
|---|---|---|---|---|---|---|---|
| BLANK | NO PUNS | 0000 | 0000 | 0000 | | | 00 |
| · | 3 8 12 | 0011 1000 | 0110 | 0001 | 9 | | 00 |
| □ | 4 8 12 | 0100 1000 | 0110 | 0010 | 9 | | 00 |
| ⊏ | 5 8 12 | 0101 1000 | 0110 | 0011 | 9 | | 00 |
| < | 6 8 12 | 0110 1000 | 0110 | 0100 | 9 | | 00 |
| = | 7 8 12 | 0111 1000 | 0110 | 0101 | 9 | | 00 |
| & | 12 | 0000 | 0110 | 0110 | 9 | | 00 |
| $ | 3 8 11 | 0011 1000 | 1100 | 0111 | 2 | | 00 |
| * | 4 8 11 | 0100 1000 | 1100 | 1000 | 2 | | 00 |
| ⊐ | 5 8 11 | 0101 1000 | 1100 | 1001 | 2 | | 00 |
| ; | 6 8 11 | 0110 1000 | 1100 | 1010 | 2 | | 00 |
| △ | 7 8 11 | 0111 1000 | 1100 | 1011 | 2 | | 00 |
| − | 11 | 0000 | 1100 | 1100 | 1 | | 00 |
| / | 1 0 | 0001 | 1100 | 1101 | 8 | | 00 |
| , | 3 8 0 | 0011 1000 | 0011 | 1110 | 4 | | 00 |
| % | 4 8 0 | 0100 1000 | 0011 | 1111 | 4 | | 00 |
| ( | 5 8 0 | 0101 1000 | 0011 | 0000 | 4 | B | 01 |
| [illegible] | 6 8 0 | 0110 1000 | 0011 | 0001 | 4 | B | 01 |

| CHAR | PUN | ADDER IN 1 | IN 2 | SUM | LOGIC G | NO. | ZONE |
|---|---|---|---|---|---|---|---|
| ) | 7 8 0 | 0111 1000 | 0011 | 0010 | 4 | B | 01 |
| + | 2 8 | 0010 1000 | 1001 | 0011 | 11 | C | 01 |
| # | 3 8 | 0011 1000 | 1001 | 0100 | 11 | C | 01 |
| @ | 4 8 | 0100 1000 | 1001 | 0101 | 11 | C | 01 |
| ? | 0 12 | 0000 | 0110 | 0110 | 9 | D | 01 |
| A | 1 12 | 0001 | 0110 | 0111 | 9 | D | 01 |
| B | 2 12 | 0010 | 0110 | 1000 | 9 | D | 01 |
| C | 3 12 | 0011 | 0110 | 1001 | 9 | D | 01 |
| D | 4 12 | 0100 | 0110 | 1010 | 9 | D | 01 |
| E | 5 12 | 0101 | 0110 | 1011 | 9 | D | 01 |
| F | 6 12 | 0110 | 0110 | 1100 | 9 | D | 01 |
| G | 7 12 | 0111 | 0110 | 1101 | 9 | D | 01 |
| H | 8 12 | 1000 | 0110 | 1110 | 9 | E | 01 |
| I | 9 12 | 1001 | 0110 | 1111 | 9 | D | 01 |
| ! | 0 11 | 0000 | 0000 | 0000 | | K F | 10 10 |
| J | 1 11 | 0001 | 0000 | 0001 | | F | 10 |
| K | 2 11 | 0010 | 0000 | 0010 | | F | 10 |
| L | 3 11 | 0011 | 0000 | 0011 | | F | 10 |

| CHAR | PUN | ADDER IN 1 | IN 2 | SUM | LOGIC G | NO. | ZONE |
|---|---|---|---|---|---|---|---|
| M | 4 11 | 0100 | 0000 | 0100 | | F | 10 |
| N | 5 11 | 0101 | 0000 | 0101 | | F | 10 |
| O | 6 11 | 0110 | 0000 | 0110 | | F | 10 |
| P | 7 11 | 0111 | 0000 | 0111 | | F | 10 |
| Q | 8 11 | 1000 | 0000 | 1000 | | G | 10 |
| R | 9 11 | 1001 | 0000 | 1001 | | F | 10 |
| ≠ | 2 8 0 | 0010 1000 | 0000 | 1010 | | J | 10 |
| S | 2 0 | 0010 | 1001 | 1011 | 3 | K | 10 |
| T | 3 0 | 0011 | 1001 | 1100 | 3 | K | 10 |
| U | 4 0 | 0100 | 1001 | 1101 | 3 | K | 10 |
| V | 5 0 | 0101 | 1001 | 1110 | 3 | K | 10 |
| W | 6 0 | 0110 | 1001 | 1111 | 3 | K | 10 |
| X | 7 0 | 0111 | 1001 | 0000 | 3 | K B | 10 01 |
| Y | 8 0 | 1000 | 1001 | 0001 | 10 | J B | 10 01 |
| Z | 9 0 | 1001 | 1001 | 0010 | 3 | K H | 10 11 |
| Ø | 0 ONLY | 0000 | 0011 | 0011 | 5 | 5 K | 11 10 |
| 1 | 1 ONLY | 0001 | 0011 | 0100 | 7 | 7 | 11 |
| 2 | 2 ONLY | 0010 | 0011 | 0101 | 7 | 7 | 11 |

| CHAR | PUN | ADDER IN 1 | IN 2 | SUM | LOGIC G | NO. | ZONE |
|---|---|---|---|---|---|---|---|
| 3 | 3 ONLY | 0011 | 0011 | 0110 | 7 | 7 | 11 |
| 4 | 4 ONLY | 0100 | 0011 | 0111 | 7 | 7 | 11 |
| 5 | 5 ONLY | 0101 | 0011 | 1000 | 7 | 7 | 11 |
| 6 | 6 ONLY | 0110 | 0011 | 1001 | 7 | 7 | 11 |
| 7 | 7 ONLY | 0111 | 0011 | 1010 | 7 | 7 | 11 |
| 8 | 8 ONLY | 1000 | 0011 | 1011 | 6 | 6 | 11 |
| 9 | 9 ONLY | 1001 | 0011 | 1100 | 7 | 7 | 11 |
| : | 5 8 | 0101 1000 | 0000 | 1101 | | A C | 11 01 |
| > | 6 8 | 0110 1000 | 0000 | 1110 | | A C | 11 01 |
| ∇ | 7 8 | 0111 1000 | 0000 | 1111 | | A C | 11 01 |

| 8 | 4 | 2 | 1 | |
|---|---|---|---|---|
| 0 | 0 | 0 | 0 | 1 |
| 0 | 0 | 0 | 1 | 2 |
| 0 | 0 | 1 | 1 | 3 |
| 0 | 0 | 1 | 0 | 4 |
| 0 | 1 | 0 | 0 | 5 |
| 0 | 1 | 0 | 1 | 6 |
| 0 | 1 | 1 | 1 | 7 |
| 0 | 1 | 1 | 0 | 8 |
| 1 | 1 | 0 | 0 | 9 |
| 1 | 1 | 0 | 1 | 10 |
| 1 | 1 | 1 | 1 | 11 |
| 1 | 1 | 1 | 0 | 12 |
| 1 | 0 | 0 | 0 | 13 |
| 1 | 0 | 0 | 1 | 14 |
| 1 | 0 | 1 | 1 | 15 |
| 1 | 0 | 1 | 0 | 16 |

| INPUTS | | | SUM | CAR |
|---|---|---|---|---|
| A | B | C | D | E |
| L | L | L | H | H |
| L | L | H | L | H |
| L | H | L | L | H |
| H | L | L | L | H |
| L | H | H | H | L |
| H | L | H | H | L |
| H | H | L | H | L |
| H | H | H | L | L |

| | MODE SELECTED | | | CHECK ACCOMPLISHED | | |
|---|---|---|---|---|---|---|
| | DP | BC | Z | DP | BC | Z |
| 1 | | | | | | |
| 2 | X | | | 0—9 | | |
| 3 | X | X | | 0—9 | 0—9 | |
| 4 | X | X | X | 0—9 | 0—9 | 11 OR 12 PUNCH |
| 5 | X | | X | 0—9 | | 11 OR 12 PUNCH |
| 6 | | X | | | 12—9 | |
| 7 | | X | X | 0—9 | 12—9 | 11 OR 12 PLUS A PUNCH IN |
| 8 | | | X | 0—9 | | 11 OR 12 ROWS 0 9 |

CHECKING CONDITIONS IN EFFECT DURING CHECK MODE

| | MOD SELECTED | | | CHECK ACCOMPLISHED | | |
|---|---|---|---|---|---|---|
| | DP | BC | Z | DP | BC | Z |
| 1 | | | | | | |
| 2 | X | | | 0—9 | | |
| 3 | X | X | | 0—9 | 0—9 | |
| 4 | X | X | X | 0—9 | 0—9 | 11 OR 12 PUNCH |
| 5 | X | | X | 0—9 | | 11 OR 12 PUNCH |
| 6 | | X | | | 12—9 | |
| 7 | | X | X | 0—9 | 12—9 | 11 OR 12 PLUS A PUNCH IN |
| 8 | | | X | 0—9 | | 11 OR 12 ROWS 0 9 |

CHECKING CONDITIONS IN EFFECT DURING CHECK MODE

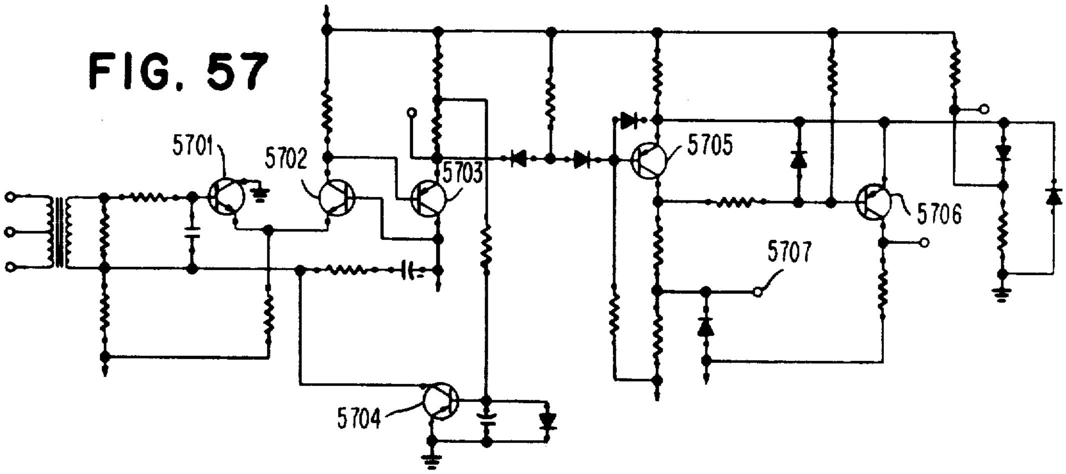
FIG. 57
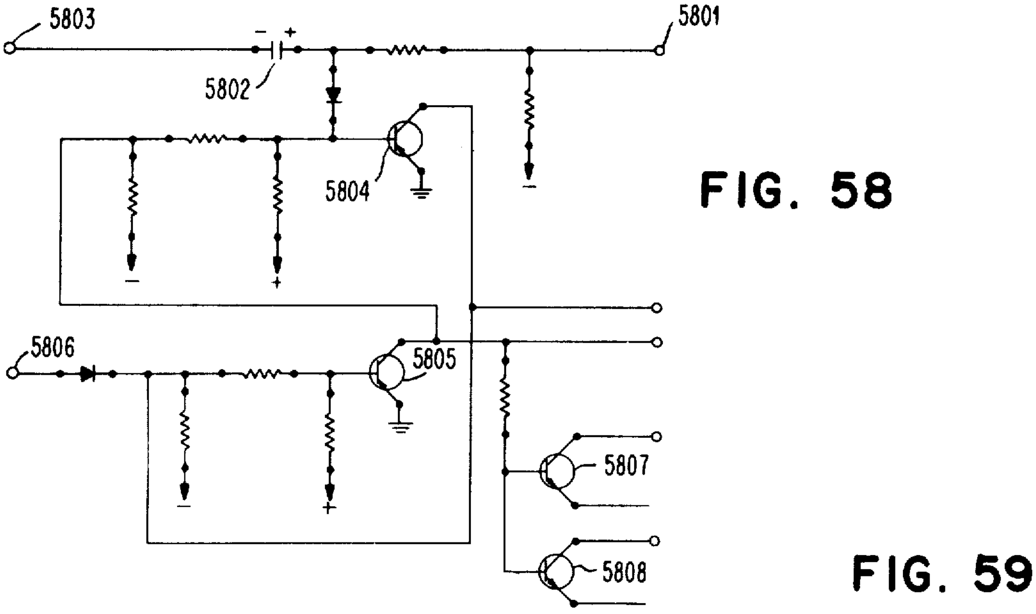
FIG. 58
FIG. 59
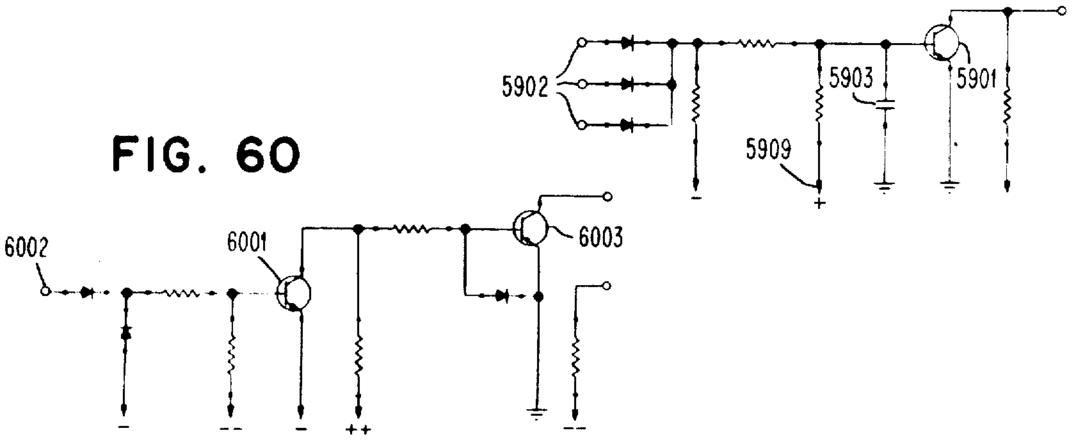
FIG. 59, FIG. 60

MACHINE TO READ INFORMATION FROM PUNCHED CARDS FOR THE PURPOSE OF DATA PROCESSING SAID INFORMATION AND FOR THE PURPOSE OF SORTING, COLLATING AND MERGING SAID PUNCHED CARDS IN ACCORDANCE WITH SAID PROCESSED INFORMATION

This invention relates to data processing systems, and, more particularly, to a device which can read information, to be processed, from punch cards and which can selectively transport the punch cards according to information read.

In data processing systems, information to be processed must be originally obtained from some source outside of the system itself. While there are numerous techniques for obtaining original information and routing it into a data processor, a large number of data processing systems employ information input device which read information from punch cards.

The use of punch cards as a source of information is traditionally well accepted and indeed offers worthwhile characteristics, such as the possibility of visual verification of data by an operator, simple removal of unwanted information, alteration of information on the cards, etc. However, handling punch cards in volume and at high speeds does present certain problems.

For instance, punch card systems require that the cards be arranged in a prescribed order before processing. The foregoing requirement necessitates that the cards be sorted and/or collated and hence there is the problem of arranging cards at relatively slow speeds before the information therefrom can be processed at high speeds. In card handling systems known to date, even after such a card arrangement has taken place, the electronic speeds of the data processing systems have not been fully utilized because of the relatively slow speeds of the card input and output devices coupled to the data processing systems. Consequently, there has been a continued effort to improve the speeds of the off line punch card handling devices as well as the on line input and output devices used with the data processors.

The problems of the punch card systems go beyond a consideration of how to arrange the cards for processing or how to accomplish high speed transportation thereof. For instance, in the present state of the punch card art, punch cards vary in size and the necessity of handling the various size punch cards presents serious problems. In addition, the high speed transport systems inherently have serious card jam possibilities, and therefore there must be some consideration given to the problems of card jams. For example, jam detection schemes become necessary to indicate a jam situation before it becomes acute, or actually before it happens. Further, means to enable an operator to readily clear jammed cards are quite necessary. The foregoing problems and others have made the introduction of the present invention highly desirable.

The present invention provides a punch card controlling system which enables information from various size cares to be read into a data processor at an extremely high speed while simultaneously being able to either collate or sort these cards in accordance with information read from the cards.

Accordingly, it is an object of the present invention to provide an improved card controlling device.

It is a further object of the present invention to provide a card controlling device which can read information from punch cards being fed at two reading stations, simultaneously, and at extremely high speeds.

It is yet another object of the present invention to provide a card controller device which can effect either a sorting operation, or a collating operation.

It is still another object of the present invention to provide a card controller device which can readily handle punch cards of different lengths.

In accordance with a feature of the present invention, there are provided two read stations, which simultaneously read cards at a high rate of speed, and two transport means which meet between said read stations, each respectively associated with a different one of the read stations of the last-described feature to transport cards therefrom into a set of stacker pockets.

In accordance with another feature of the present invention, within each transport means there is provided a waiting station at which two cards are simultaneously held waiting to be removed into the stacker pockets.

In accordance with another feature of the present invention, there is provided a memory device, and associated logic circuitry which enables the system to control at one time both of the two cards standing in a waiting station as well as a card being passed through a reading station, and make a decision as to whether or not the three cards are actually in some predetermined order.

In accordance with another feature of the present invention, there is provided a relatively frictionless stacker base for each stacker pocket which enables the cards to move forward in any stacker pocket, thereby forcing the stacker detent to move without any additional energy supplied other than the energy of the card moving into the stacker pocket.

In accordance with another feature of the present invention, there is provided along each transport an intermediate pinch roller located beyond the reading station in the transport means to accommodate cards of relatively short length.

In accordance with another feature of the present invention, there is provided kinetic energy absorbing means, both at the waiting station, and at the stacker locations which will absorb the kinetic energy of the cards, and thereby prevent the cards from being damaged while traveling into the waiting station, or into the stacker stations at a high rate of speed.

In accordance with another feature of the present invention, there is a means provided to adjust the kinetic energy absorbing means in the waiting station to accommodate a shortened card, and to simultaneously locate said card with respect to its future travel towards the stacker pockets.

In accordance with another feature of the present invention, there are jam detector means located along each of the transport means beyond the associated reading stations, which provide signals to associated logic to detect jams in both the primary and secondary transport means, and which act as a timing means to cause cards to be moved from the waiting station of the secondary feed in order that the cards from the primary and secondary transport do not approach the common stacker at exactly the same time.

In accordance with another feature of the present invention, there is time sharing logic which enables an overlap operation, i.e., enables the system memory to transmit information to a data processor as well as receive information from at least one read station concurrently.

In accordance with another feature of the present invention, there is provided arithmetic logic circuitry and comparison logic circuitry to enable the information read from the cards to be processed arithmetically and to be compared with a standard value, or with an answer arrived at by an arithmetic process, or with other raw data, etc.

In accordance with another feature of the present invention, there is provided logic circuitry for performing an editing function on the information being processed.

In accordance with another feature of the present invention, there is provided logic circuitry for translating from one code to another to accommodate a prescribed checking sequence priority, for the information on the cards, as used in a collating operation or in a high-low comparison function of a data processor.

In accordance with yet another feature of the present invention, there is provided a memory device into which the information from the cards can be read for the purpose of performing the many previously mentioned functions such as the arithmetic function and the comparison function, editing function, etc.

In accordance with another feature of the present invention, there is provided logic circuitry which enables a system to handle data words of variable length.

The above mentioned and other features and objects of the present invention will become more apparent by reference to the following description taken in conjunction with the accompanying drawings in which.

Figures 5, 6, 7, 7A:
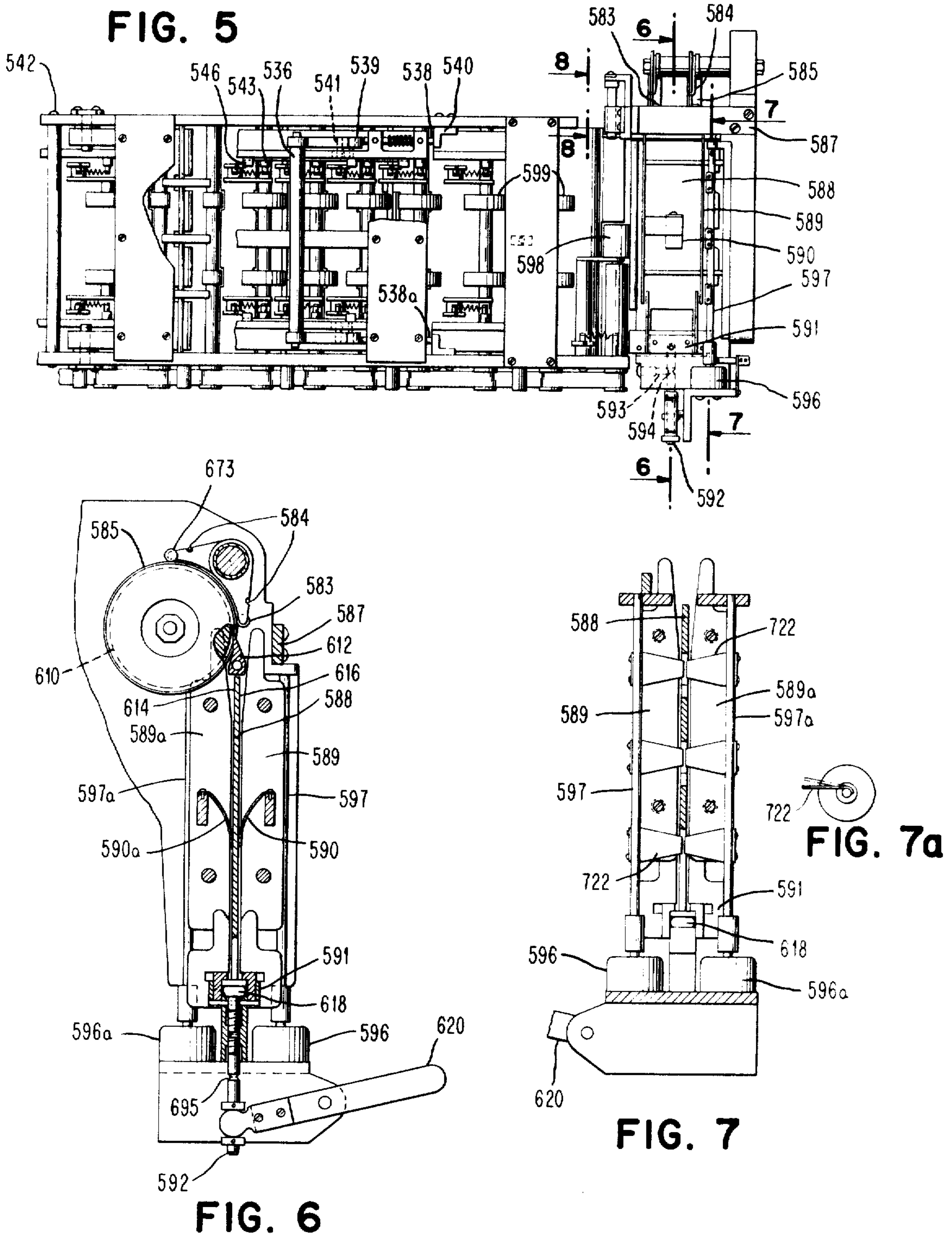
FIG. 5 is a pictorial of a portion of the rear view of the machine.
FIG. 6 is a sectional view cut along lines 6—6 of FIG. 5.
FIG. 7 is a sectional view cut along lines 7—7 of FIG. 5.
Figure 8:
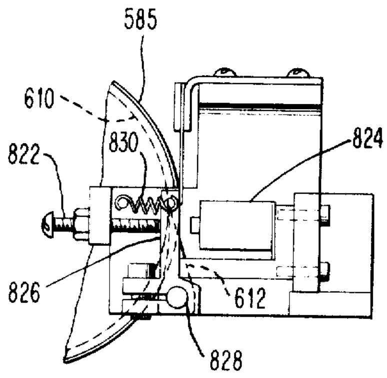

FIG. 7*a* is a top view of a shaft with picker fingers mounted thereon;

FIG. 8 is a sectional view cut along lines 8—8 of FIG. 5.

Figure 5A:
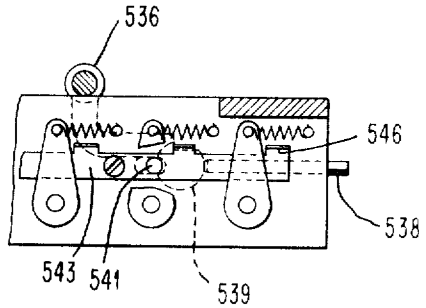

FIG. 5*a* is a detailed view of the jam release and locking mechanism which is also shown in FIG. 5.

Figure 9A:
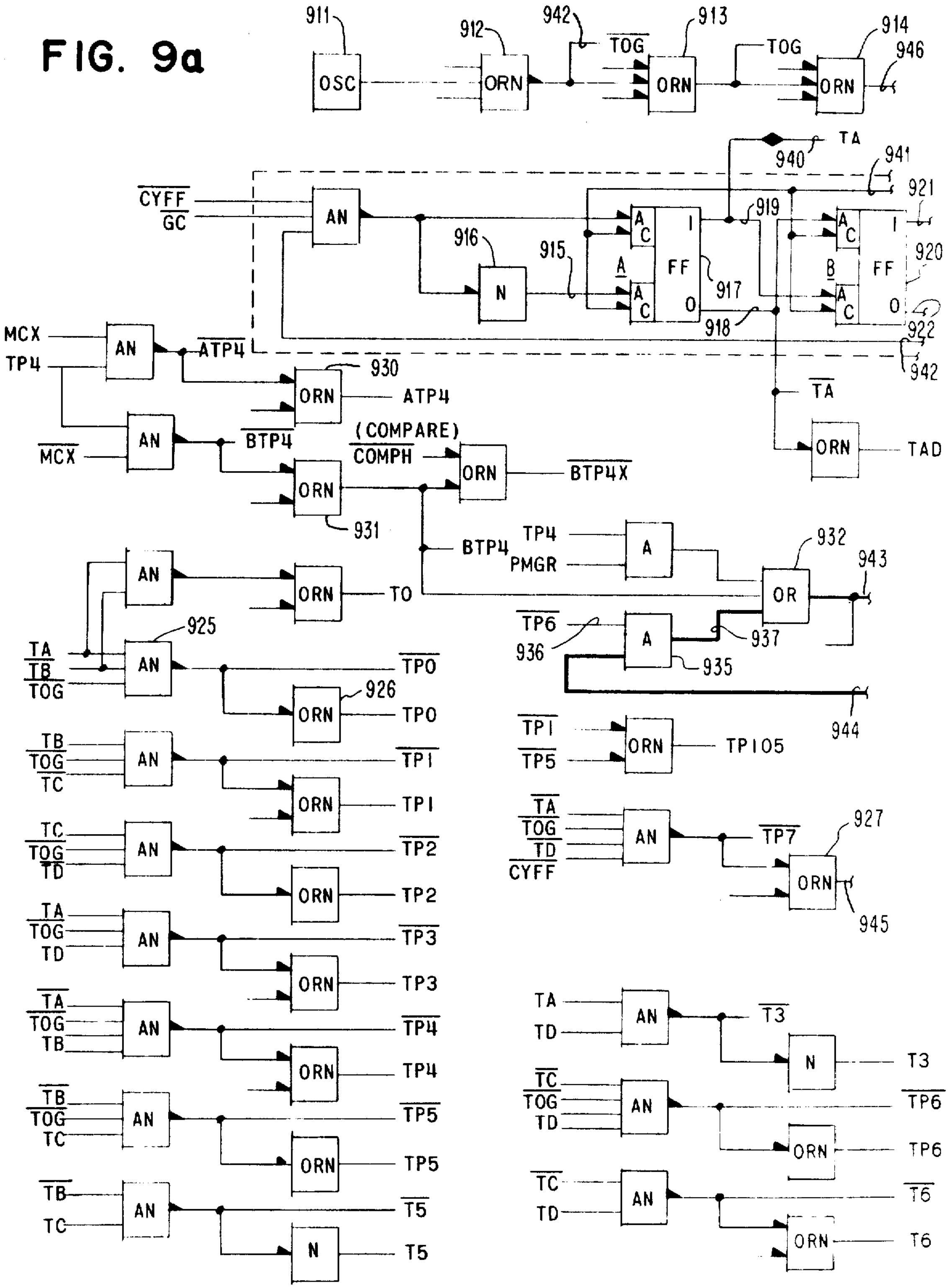
Figures 1, 9, 9B:
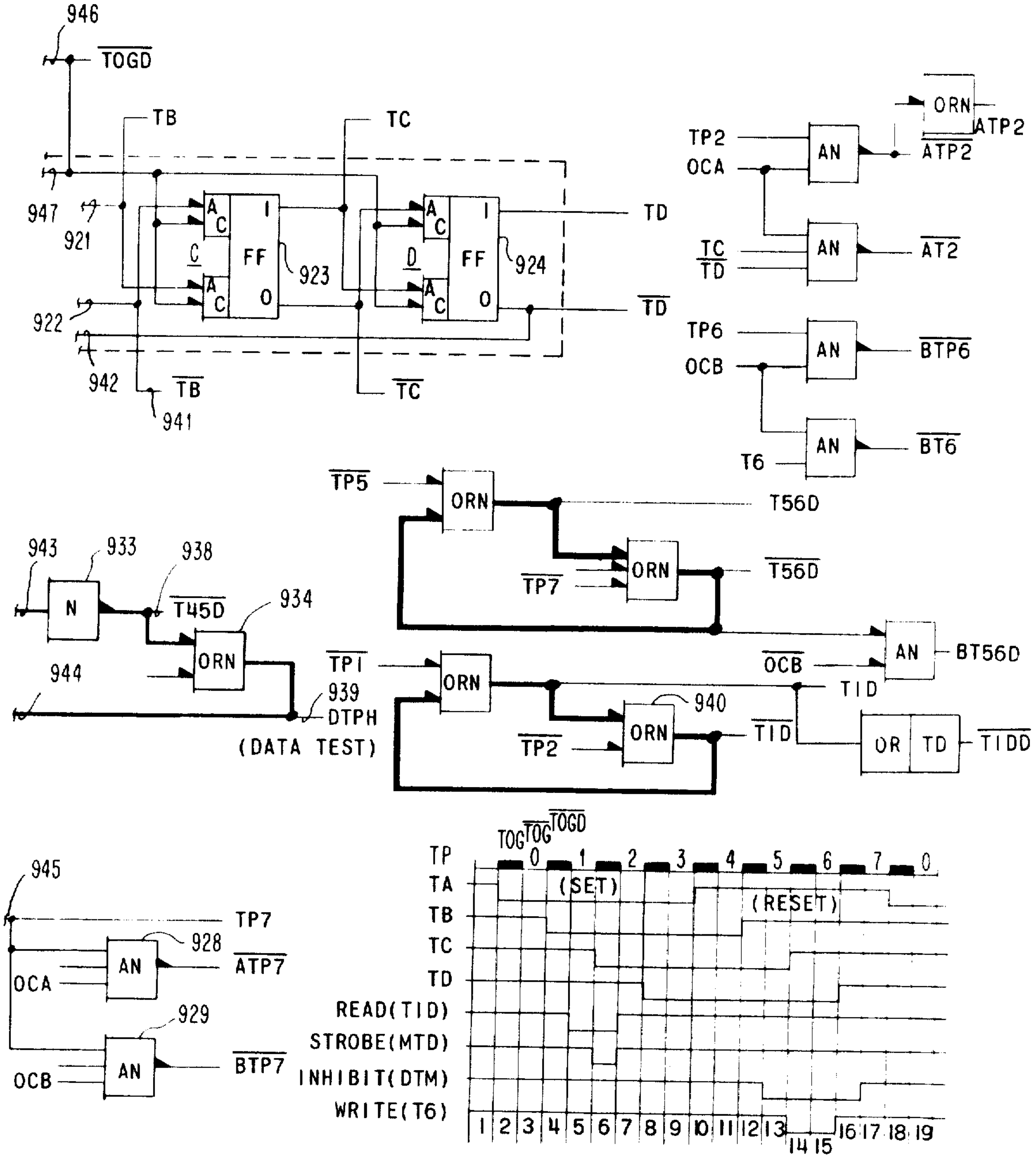

FIGS. 9*a* and 9*b* shows the logic circuits necessary to generate clock signals.

Figure 1:
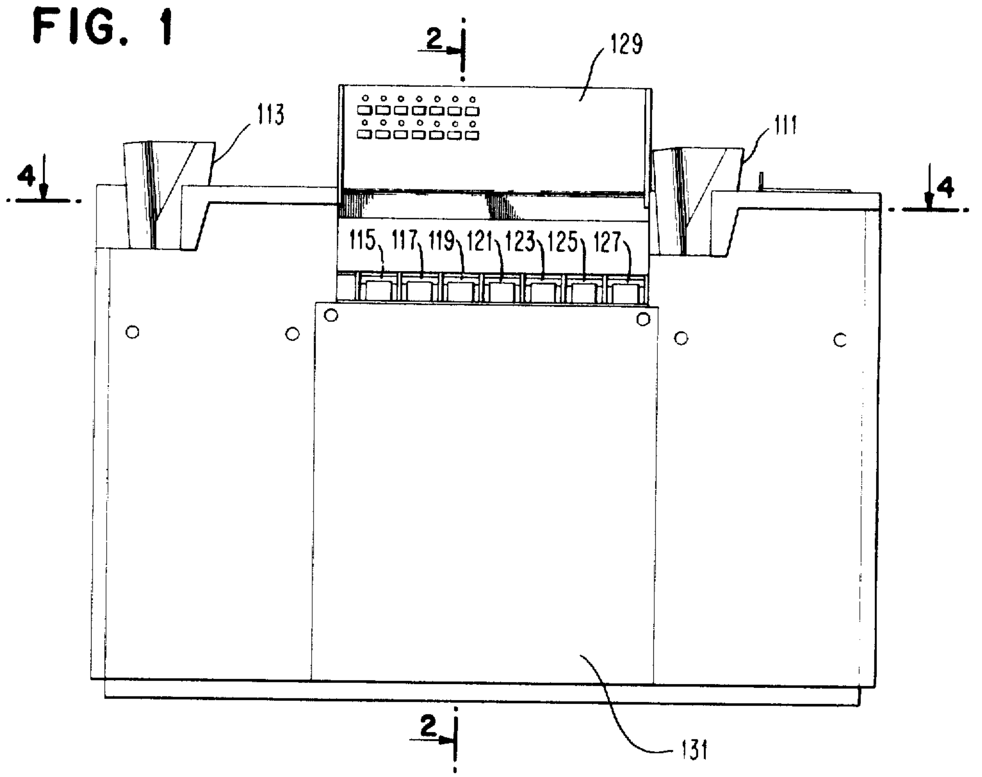
FIG. 1 is a pictorial of the present invention (card controller) shown from the front of the machine.

FIGS. 9-1 shows a graphic display of the eight fundamental timing pulses employed.

Figure 10A:
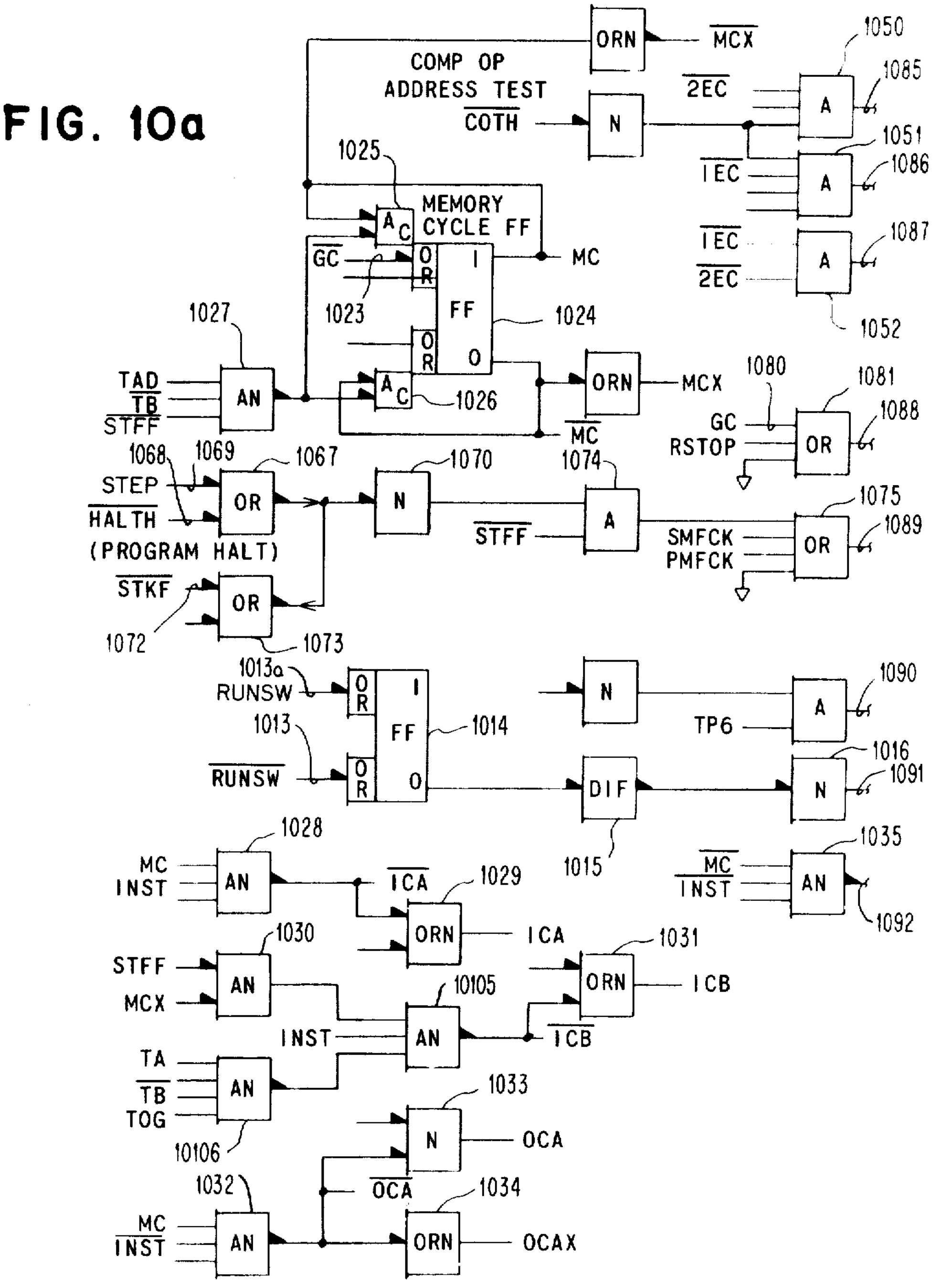
Figure 10B:
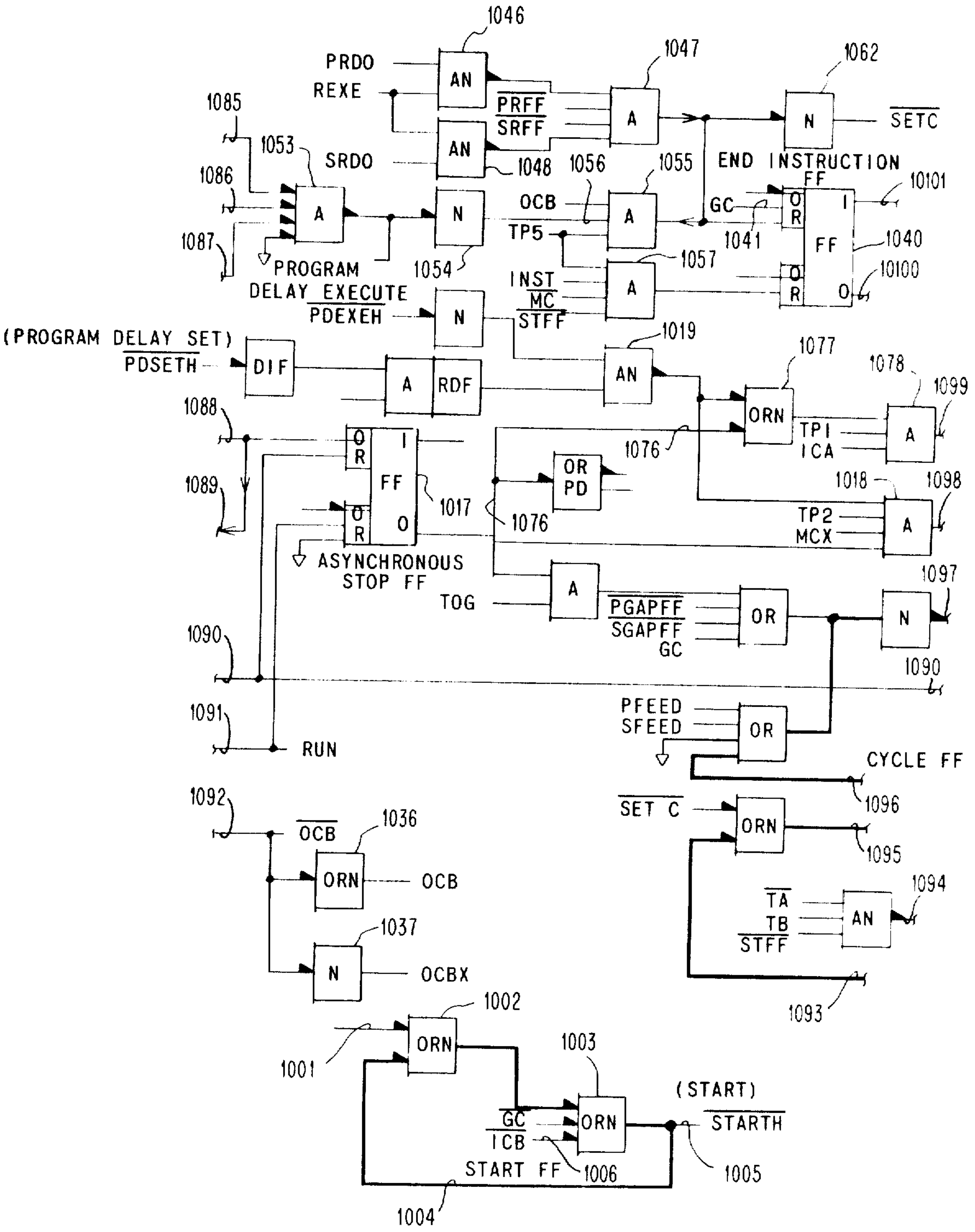
Figure 10C:
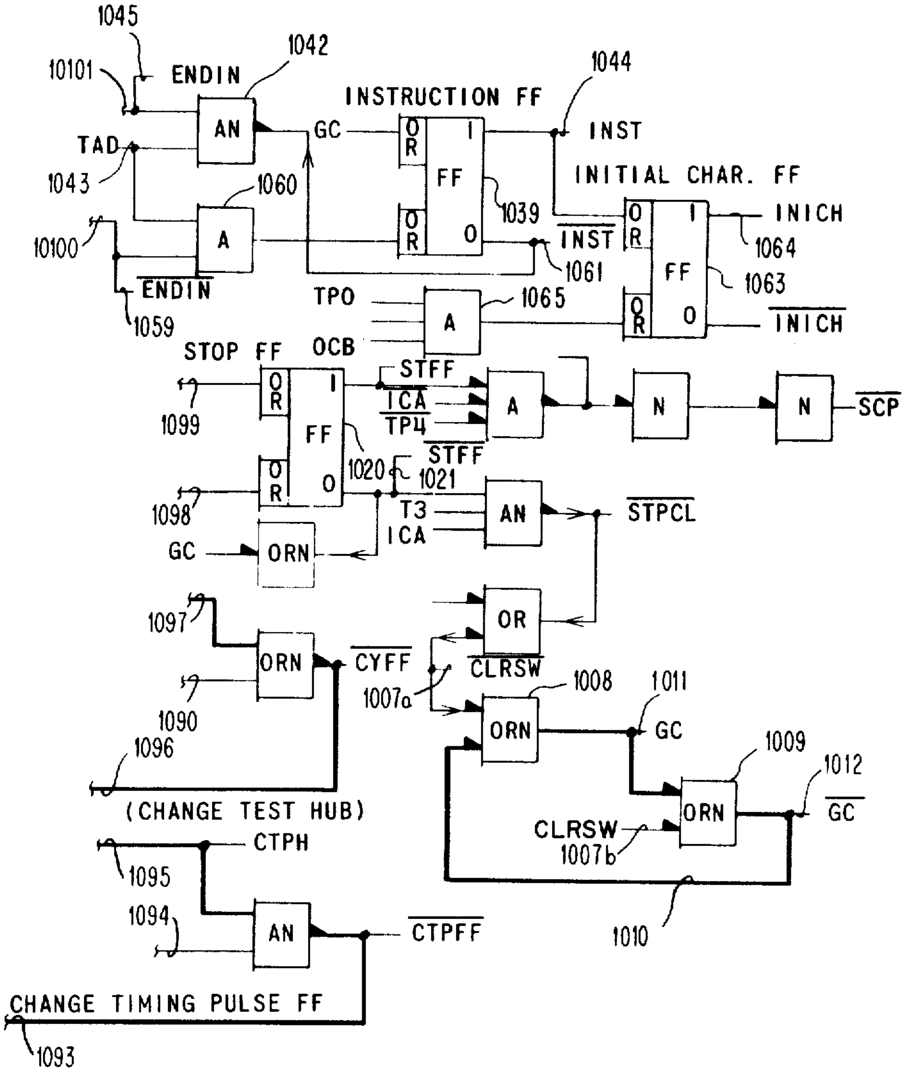

FIGS. 10*a*–10*c* shows the logic circuits necessary to generate timing control signals.

Figure 11A:
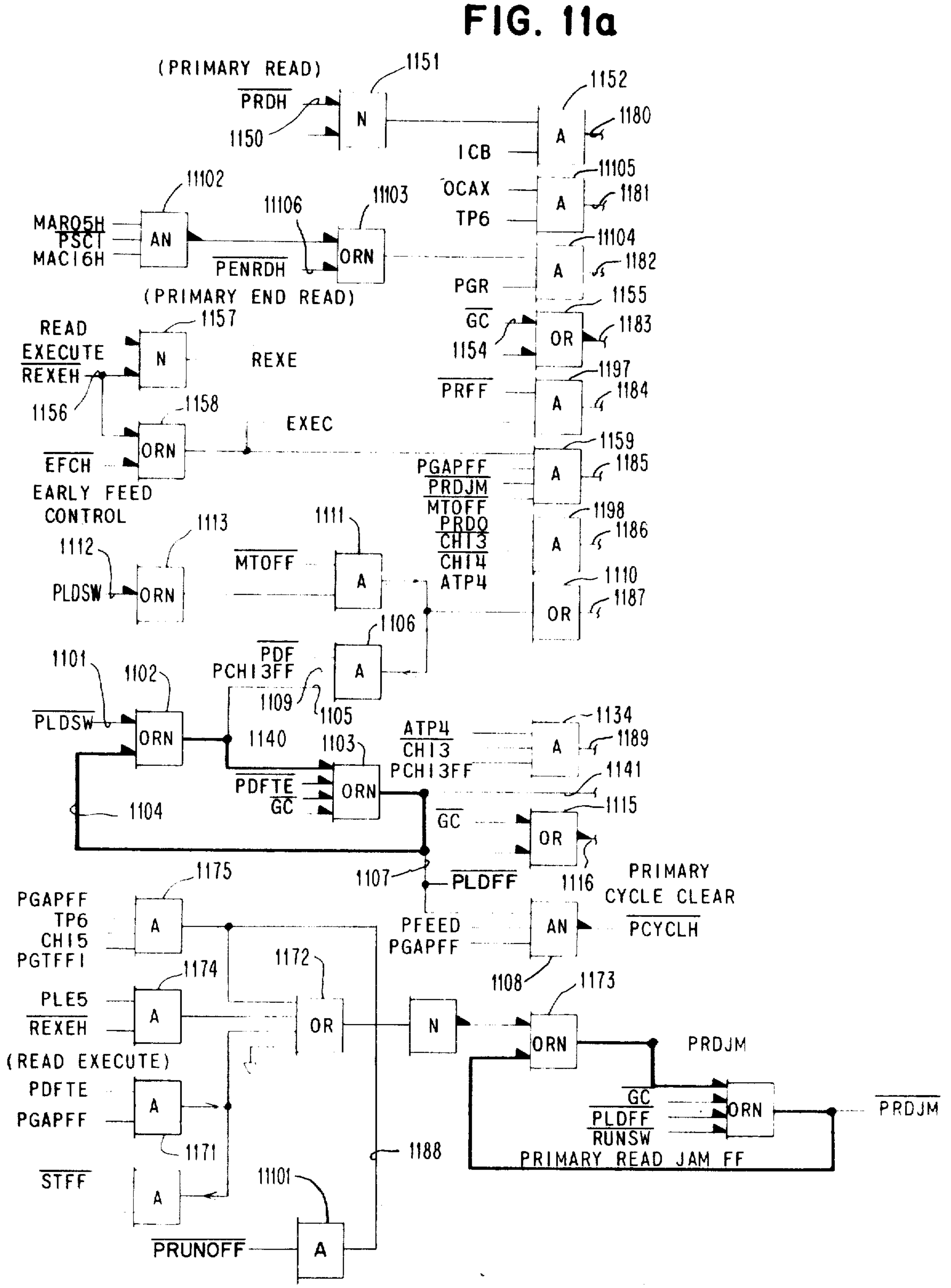
Figure 11B:
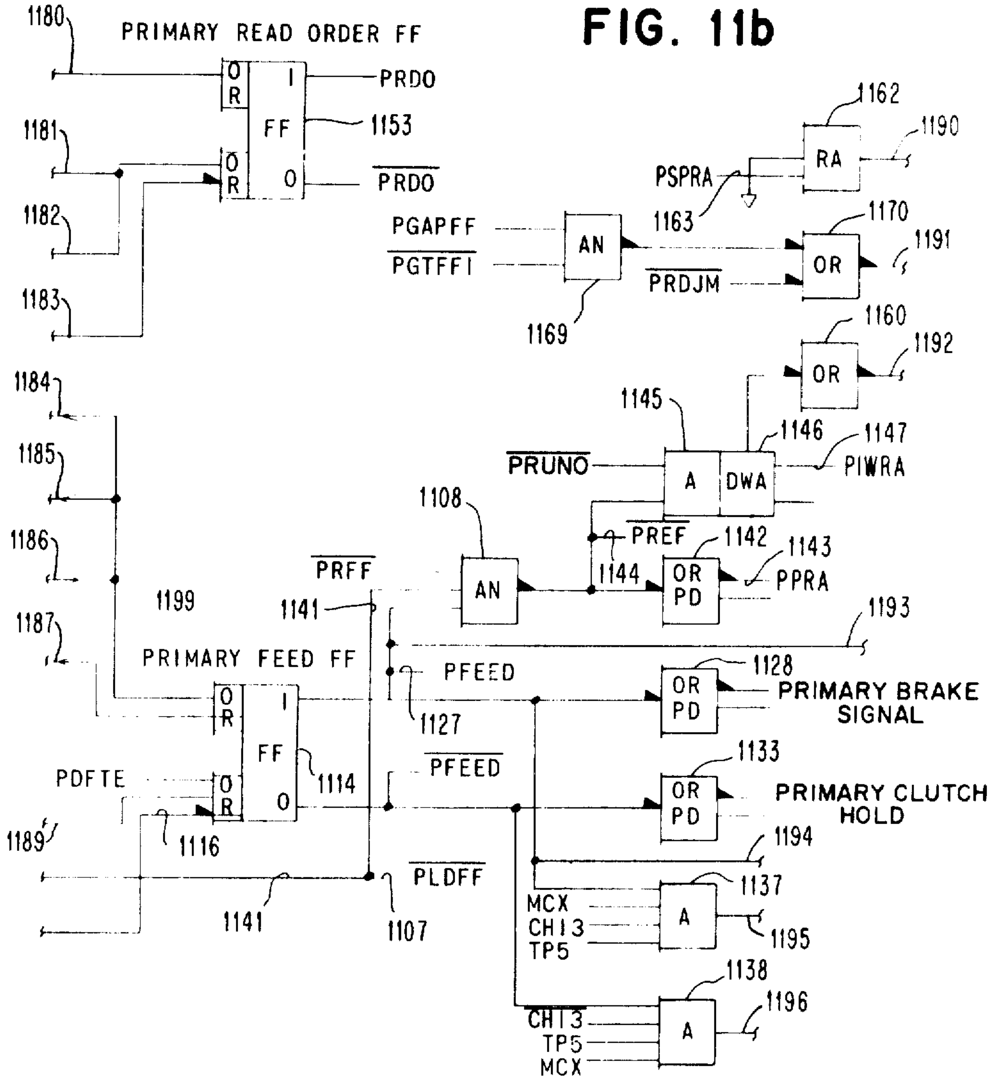
Figure 11C:
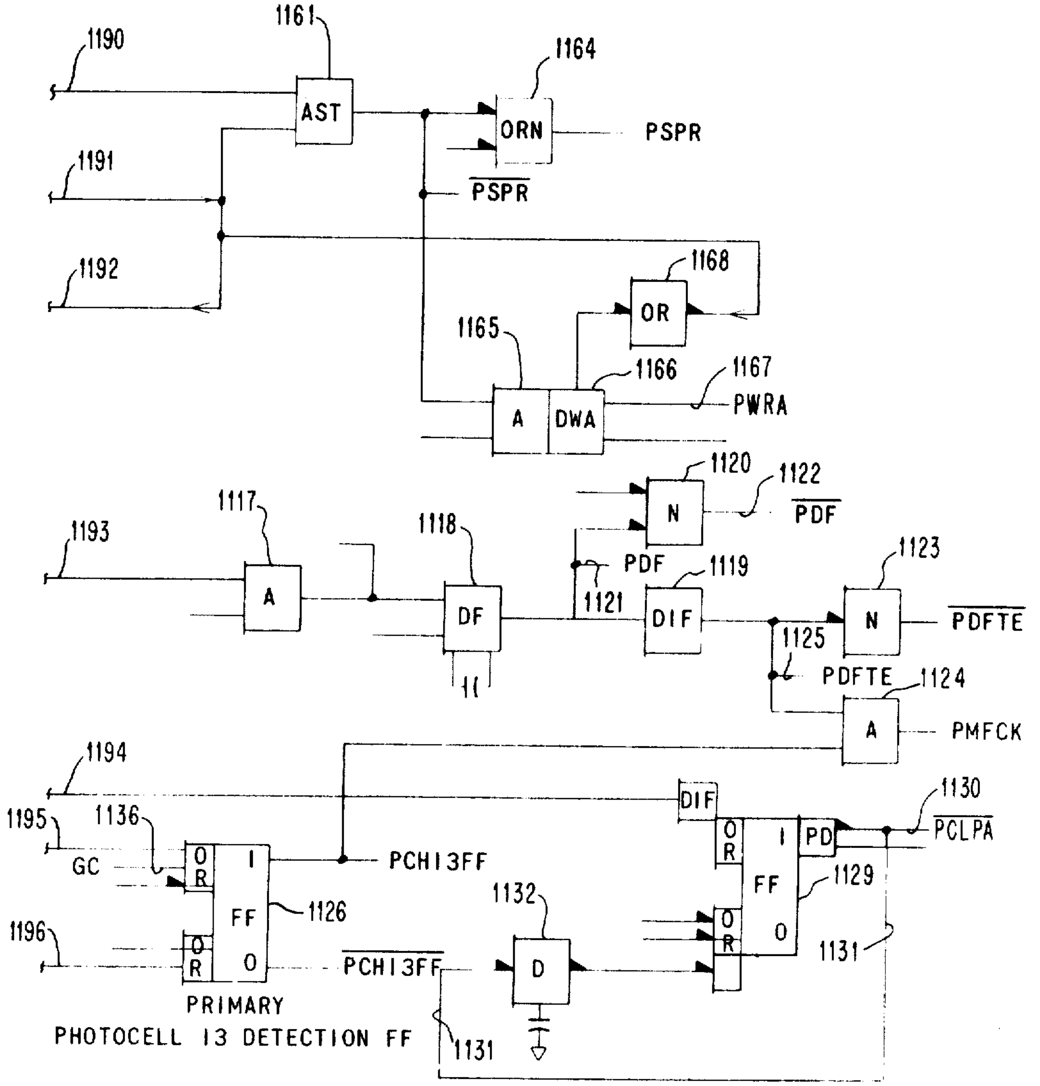

FIGS. 11*a*–11*c* shows the logic circuits necessary to generate primary reader control signals.

Figure 12A:
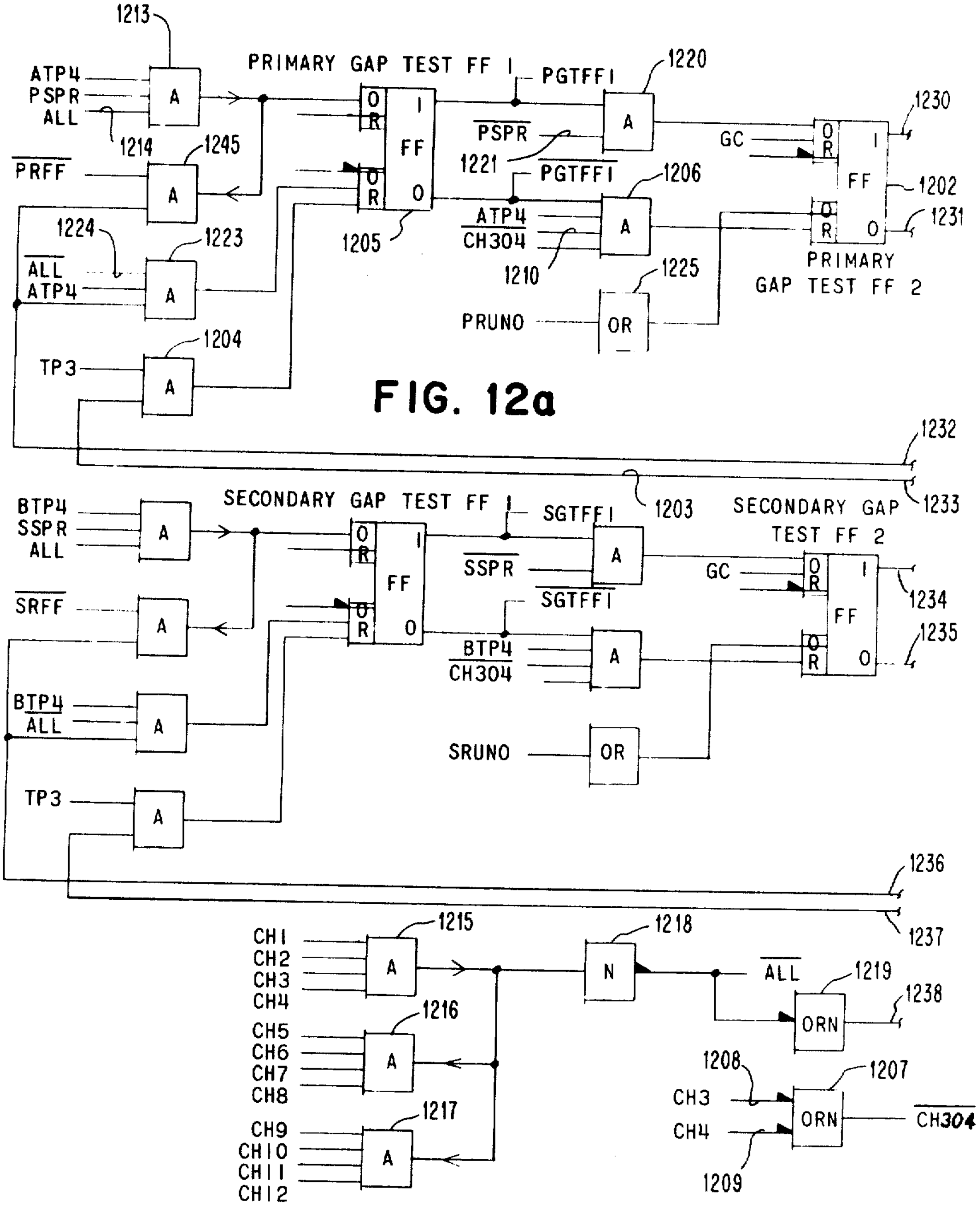
Figure 12B:
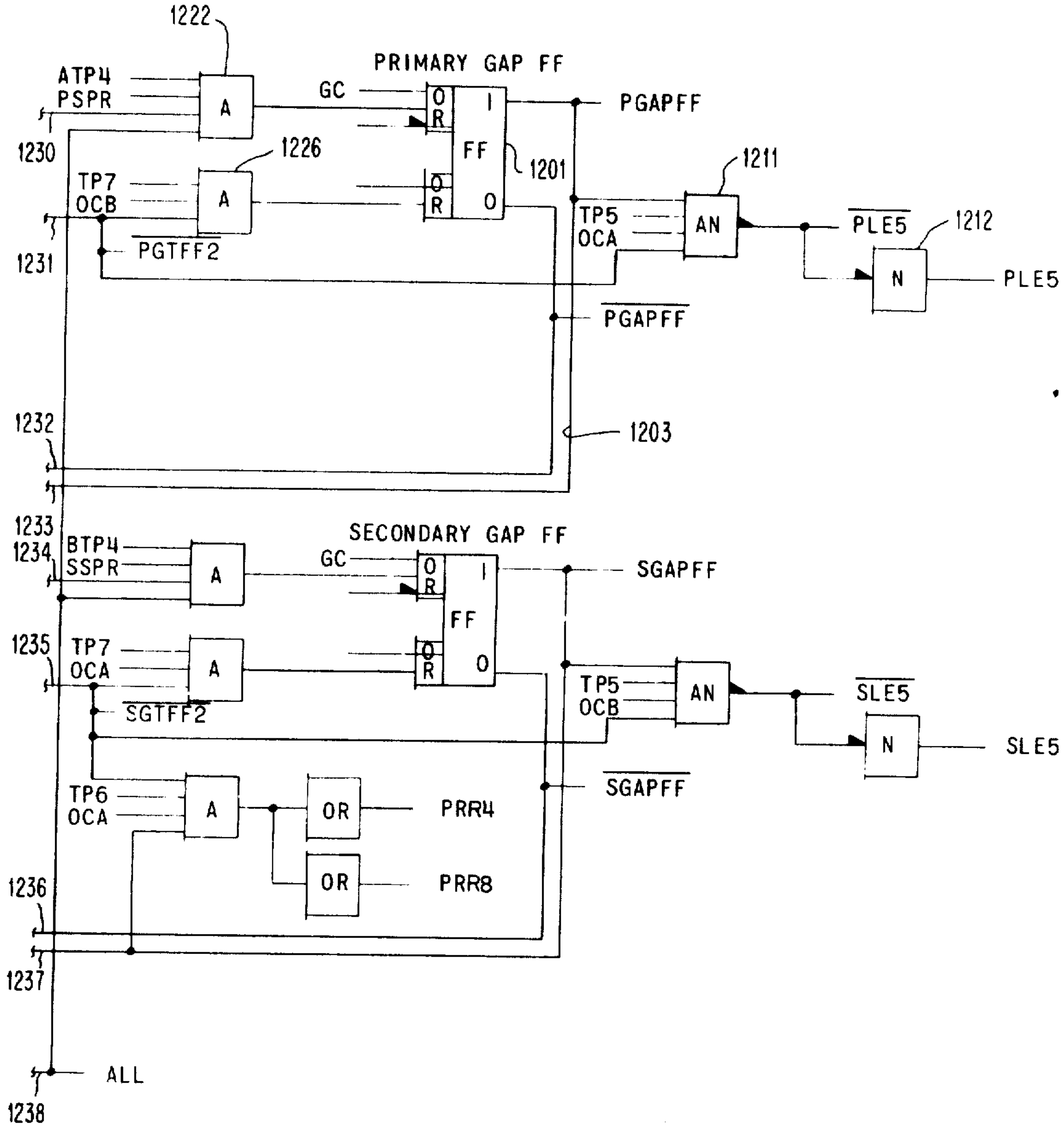

FIGS. 12*a* and 12*b* shows the logic circuits necessary to generate the trailing edge detection signals and the leading edge detection signals.

Figure 13A:
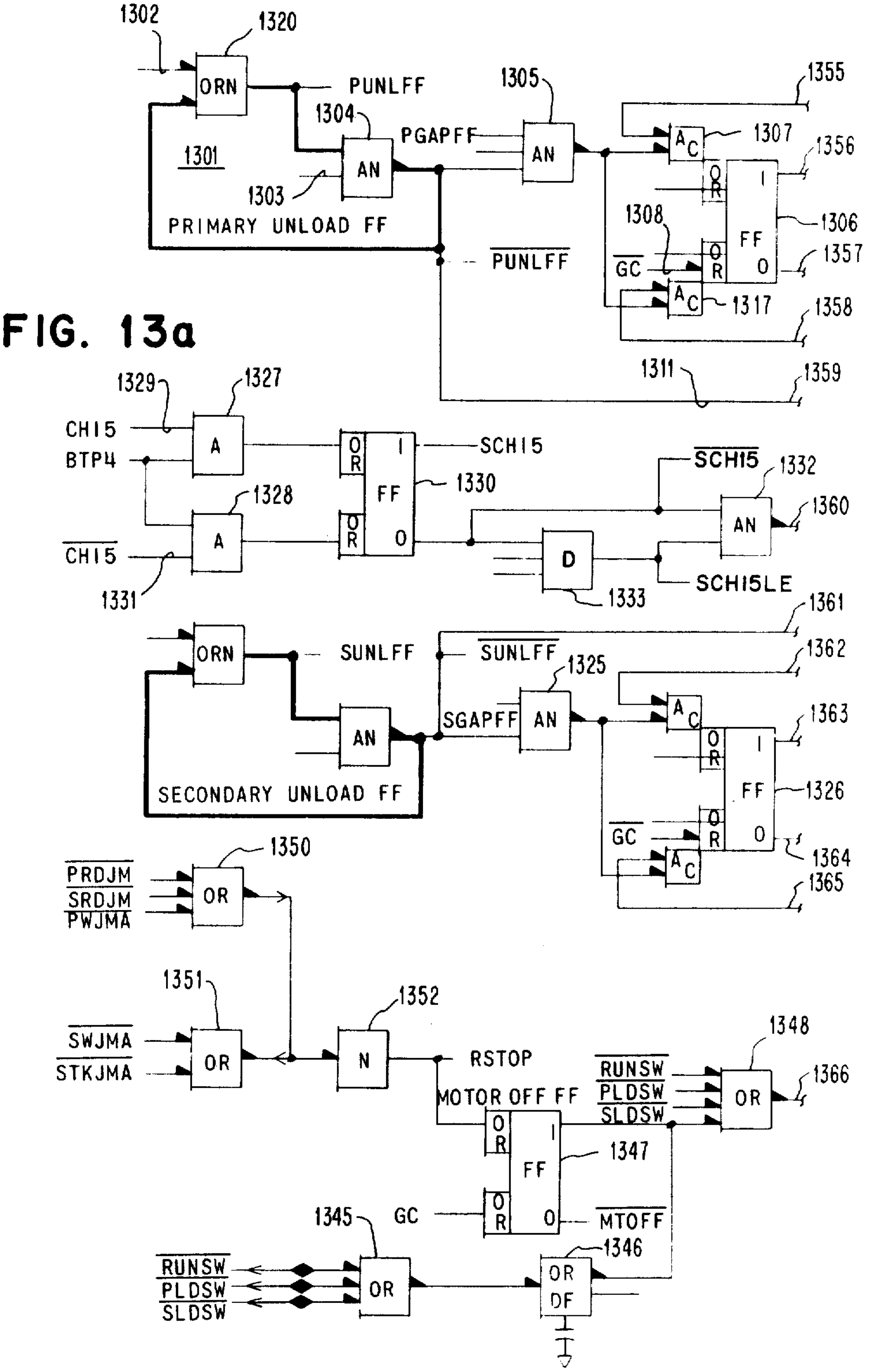
Figure 13B:
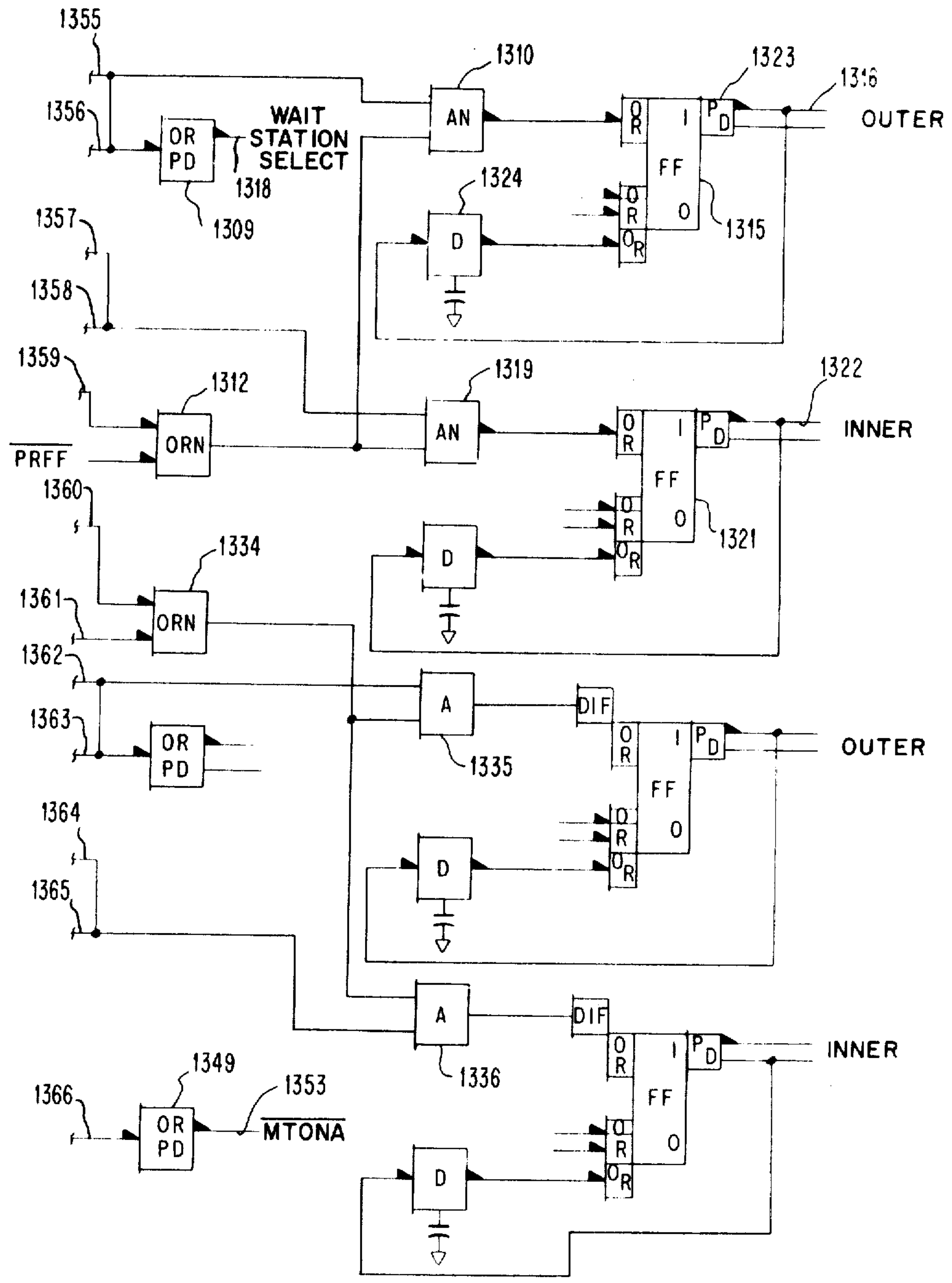

FIGS. 13*a* and 13*b* shows the logic circuits which generate signals necessary for the wait station operation.

Figures 1, 14:
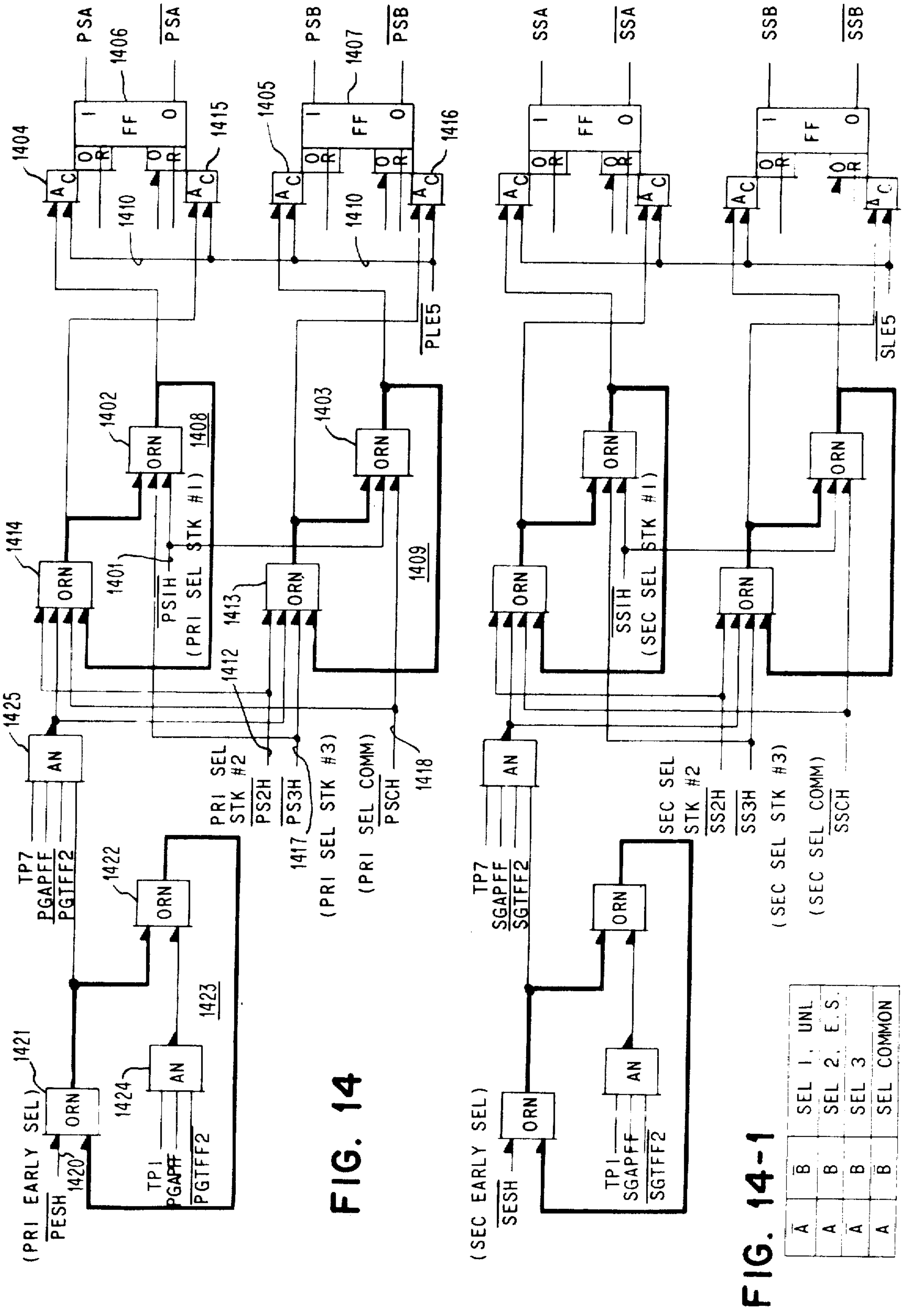

FIG. 14 shows the logic circuits which generate signals which are necessary to the stacker control operation.

FIGS. 14-1 shows a truth table for the primary selection logic.

Figure 15A:
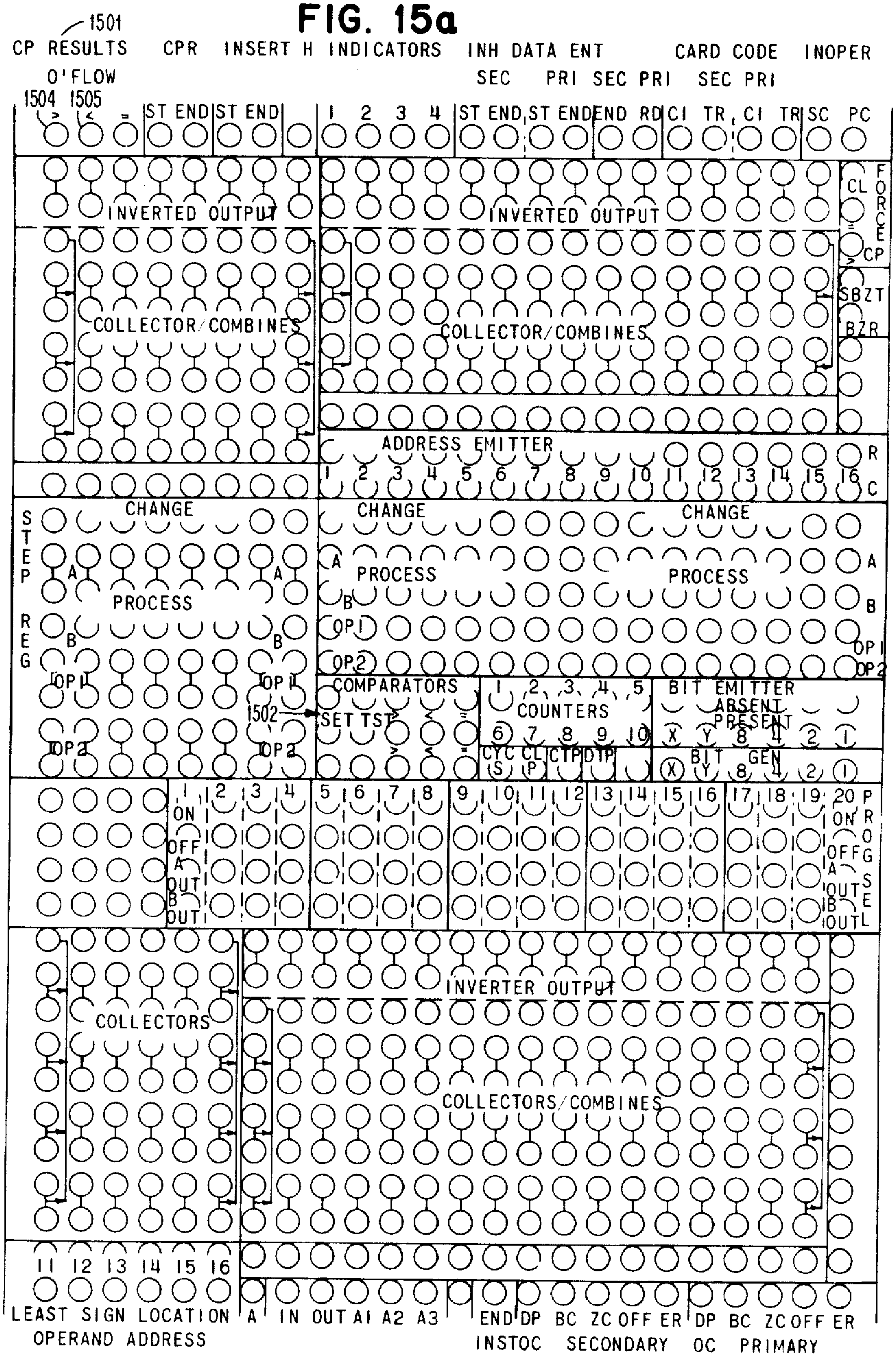
Figure 15B:
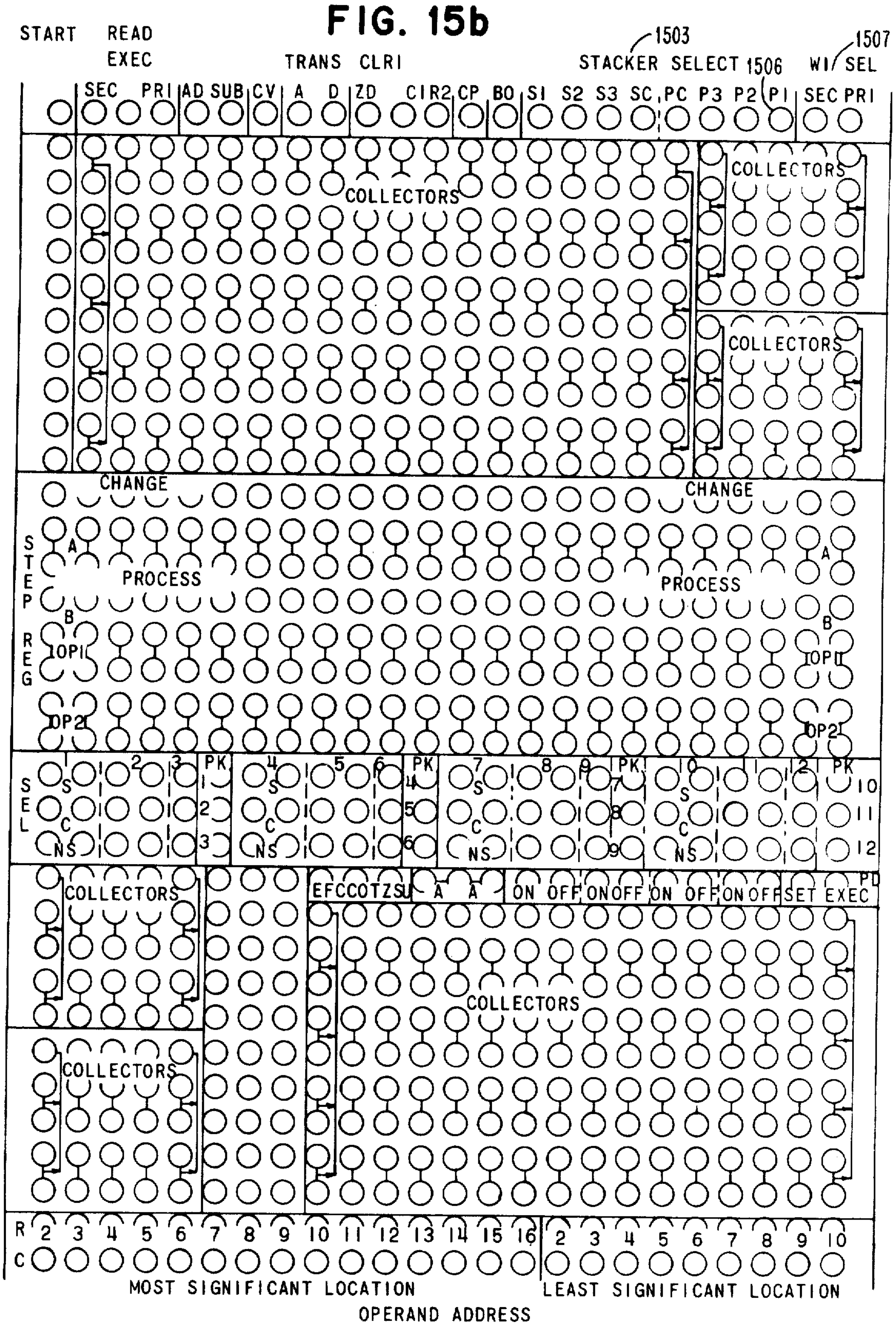

FIGS. 15*a* and 15*b* is a schematic of the plug board used with the present Card Controller.

Figure 16A:
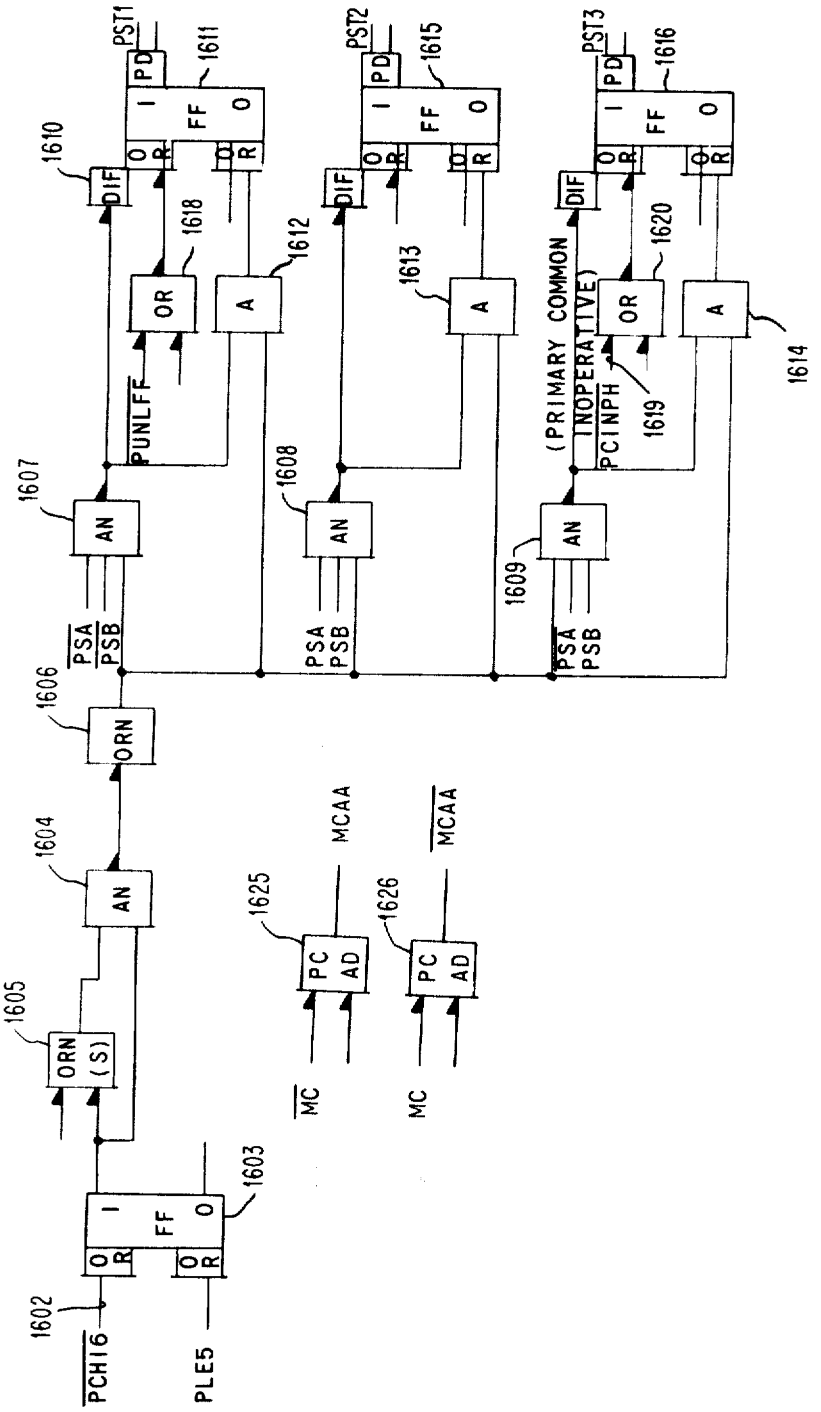
Figure 16B:
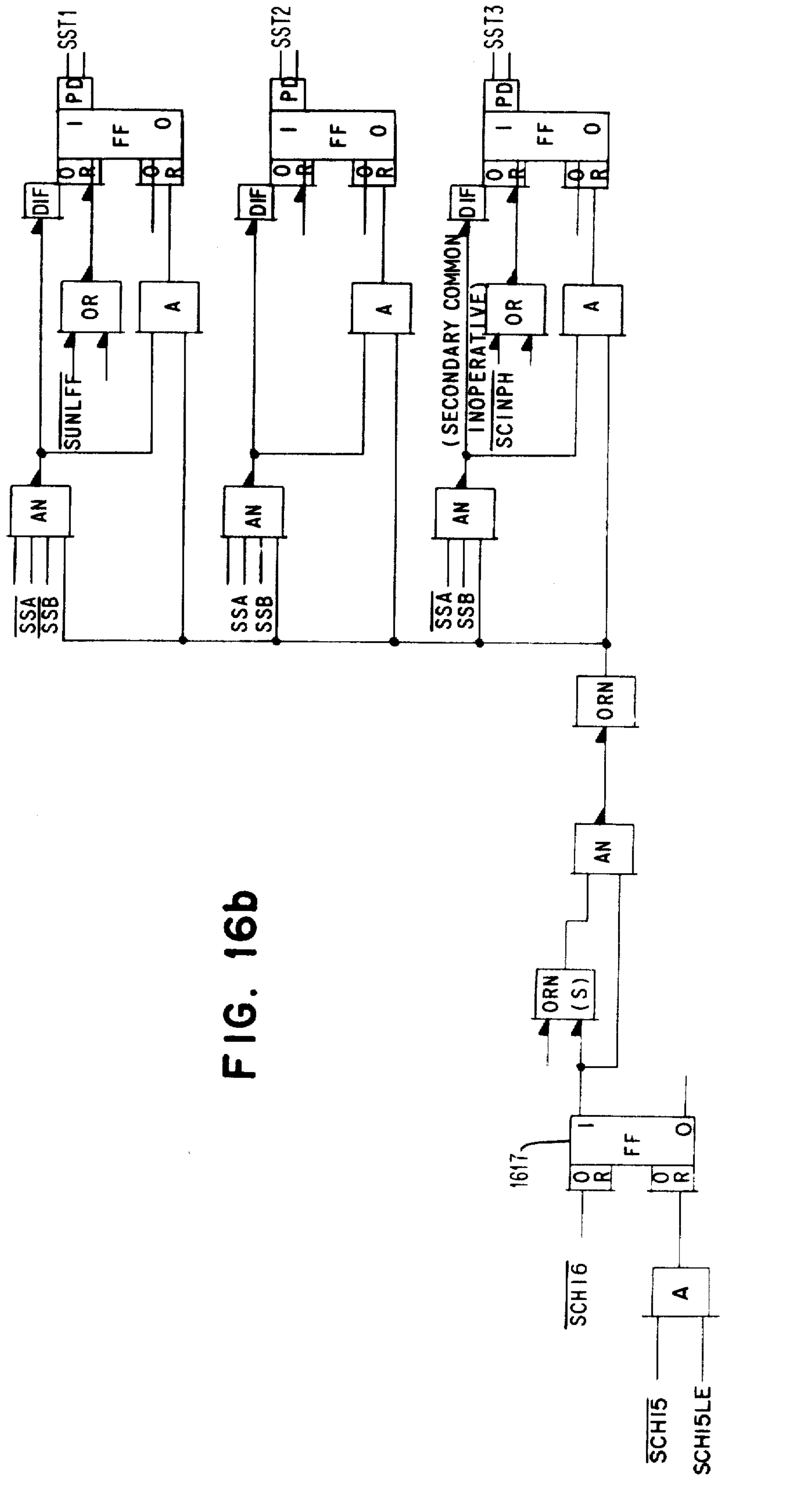

FIGS. 16*a* and 16*b* depicts a plurality of logic circuits necessary to generate signals for further control of the stacker operation.

Figure 17A:
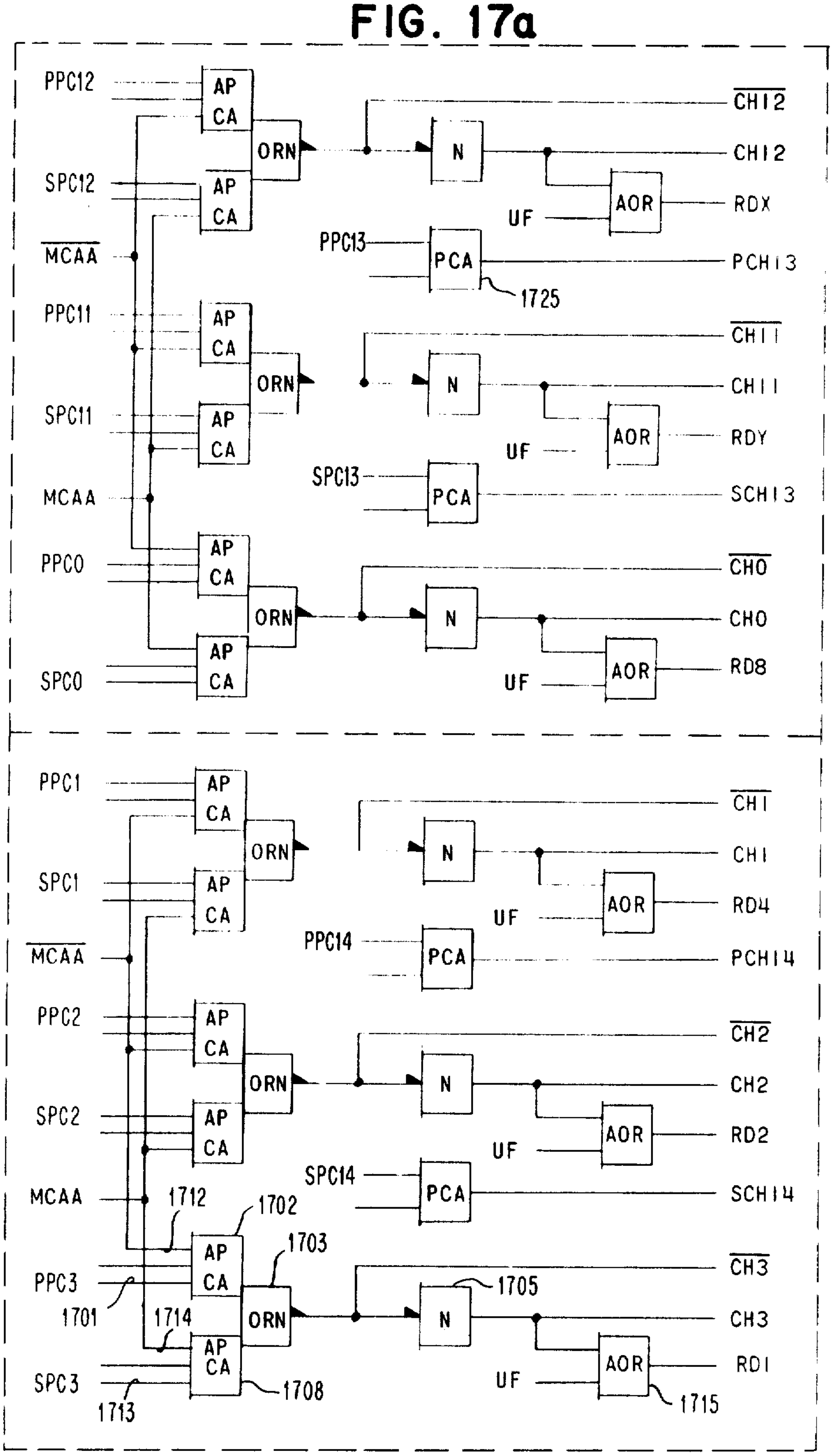
Figure 17B:
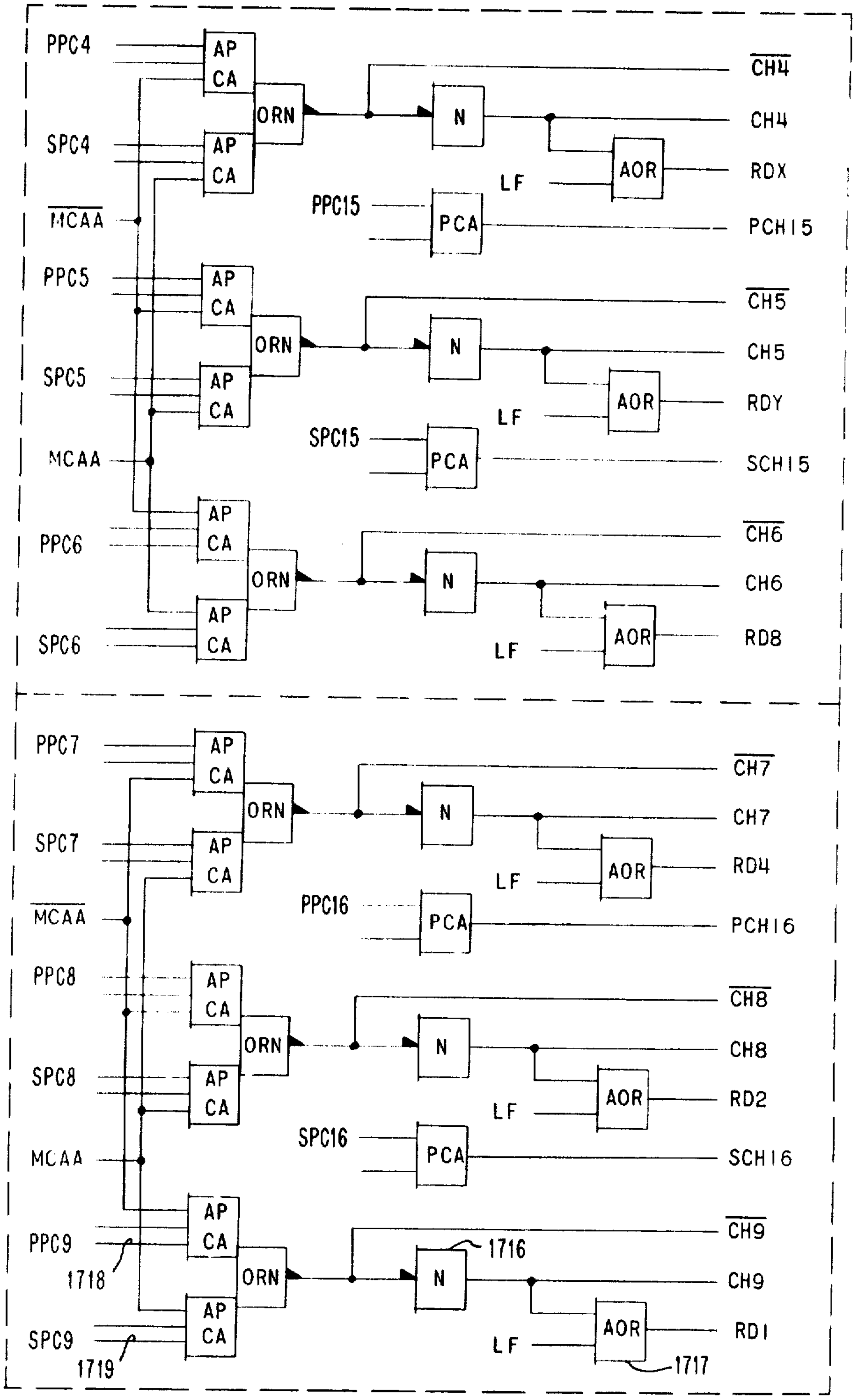

FIGS. 17*a* and 17*b* depicts a plurality of logic circuits which are necessary to generate the photocell amplifier signals.

Figure 18A:
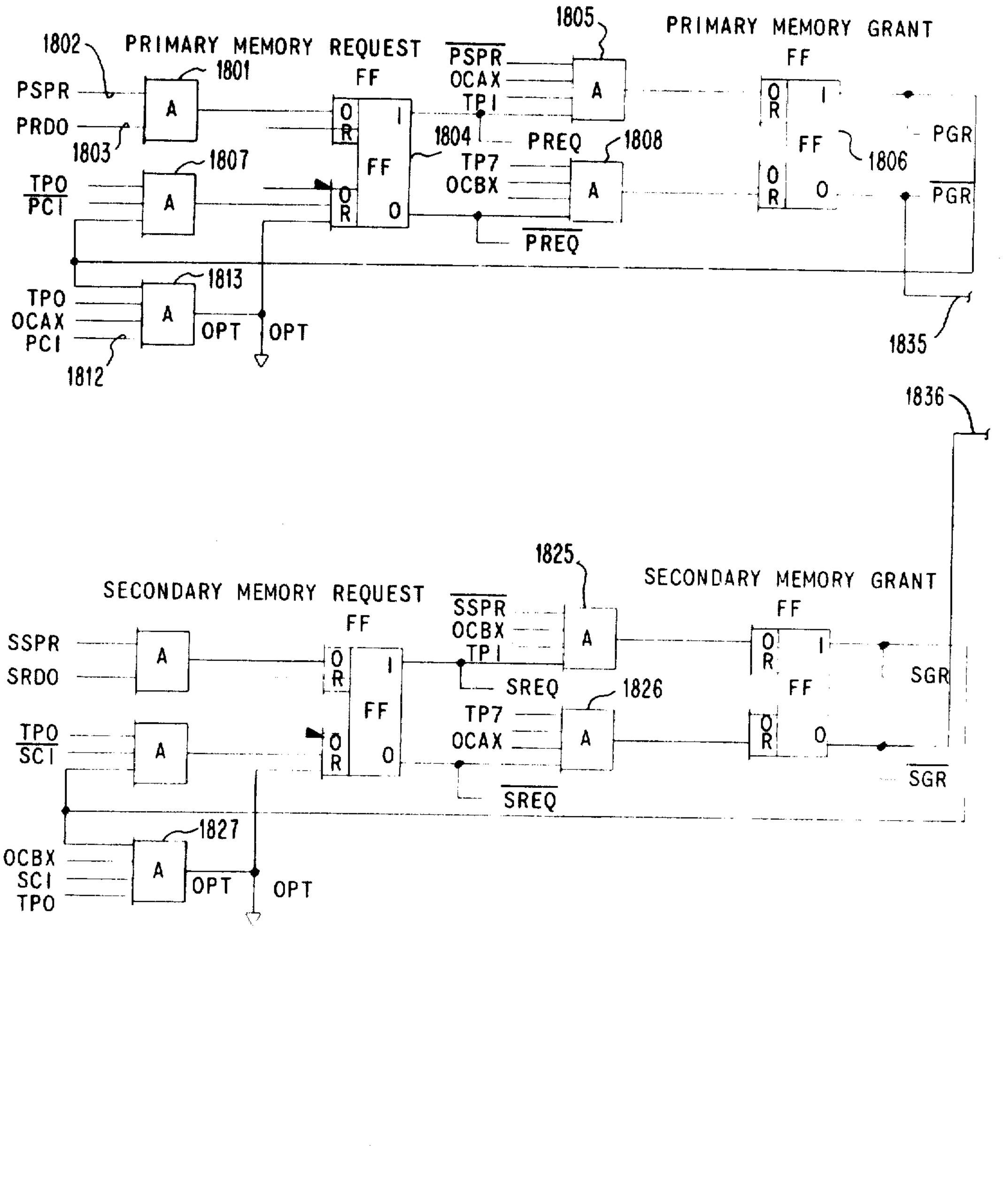
Figure 18B:
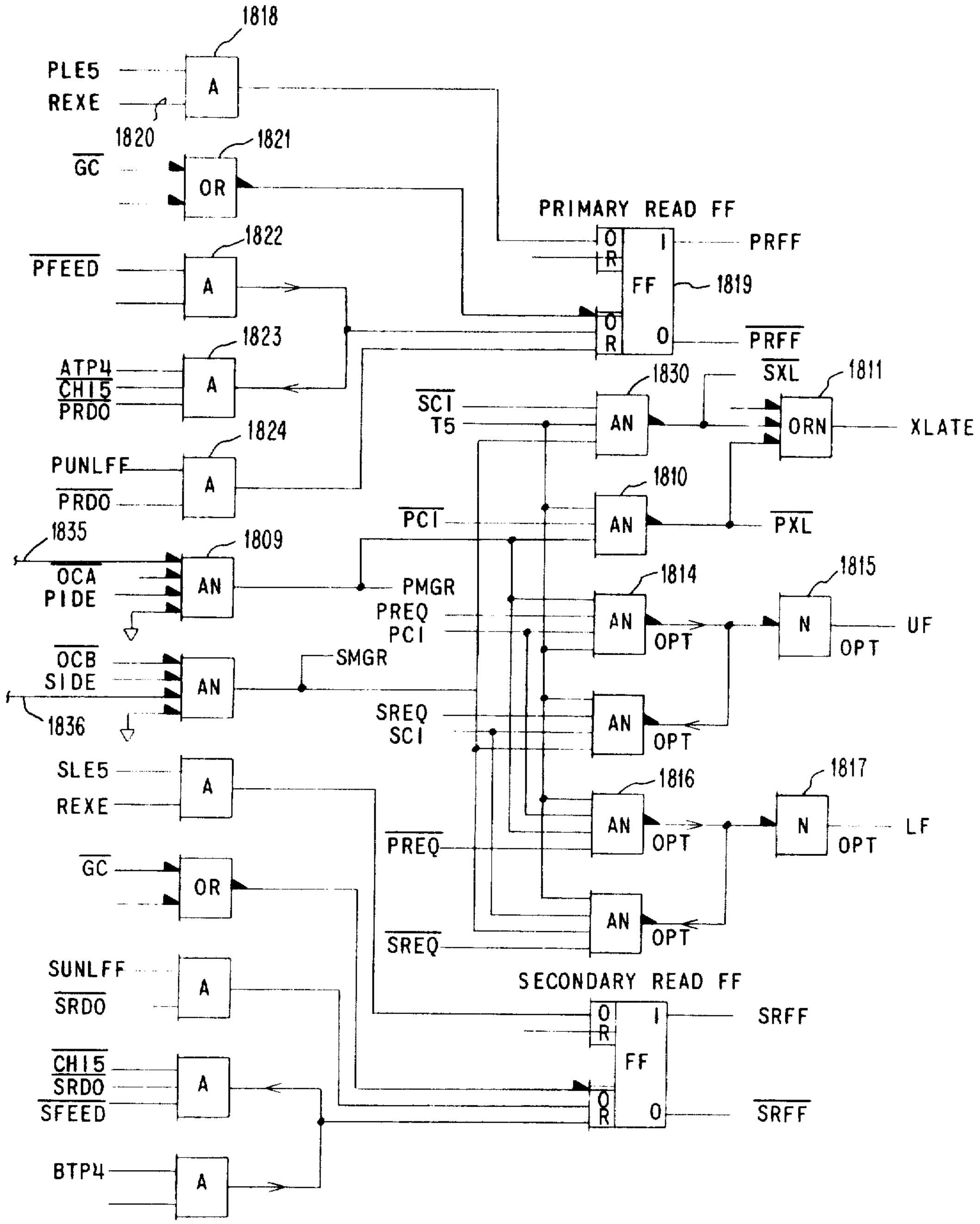

FIGS. 18*a* and 18*b* depicts a plurality of logic circuits which are necessary to generate signals associated with the primary and secondary reader memory request control.

FIG. 19 is a chart to show the relationship between the character to be represented by a code number and the handling of the various code numbers within the adder.

FIGS. 20, 21, 22*a*, and 22*b* depict a plurality of logic circuits which are related to generating signals necessary in the 80 column translation operation.

FIGS. 23*a*, 23*b* and 24*a* and 24*b* depict a plurality of logic circuits which are necessary for the generation of signals used with the D and C data registers.

Figure 25A:
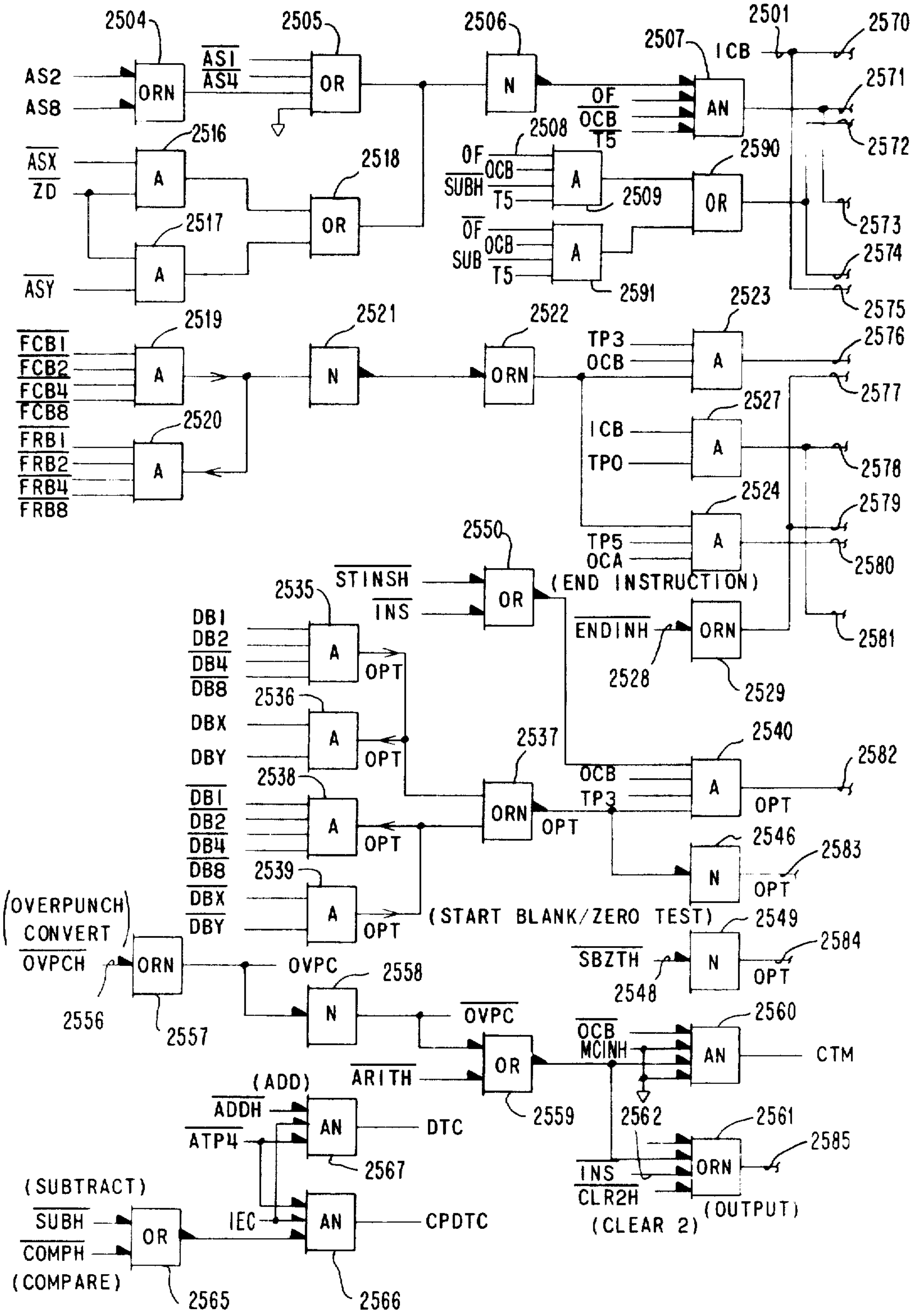
Figure 25B:
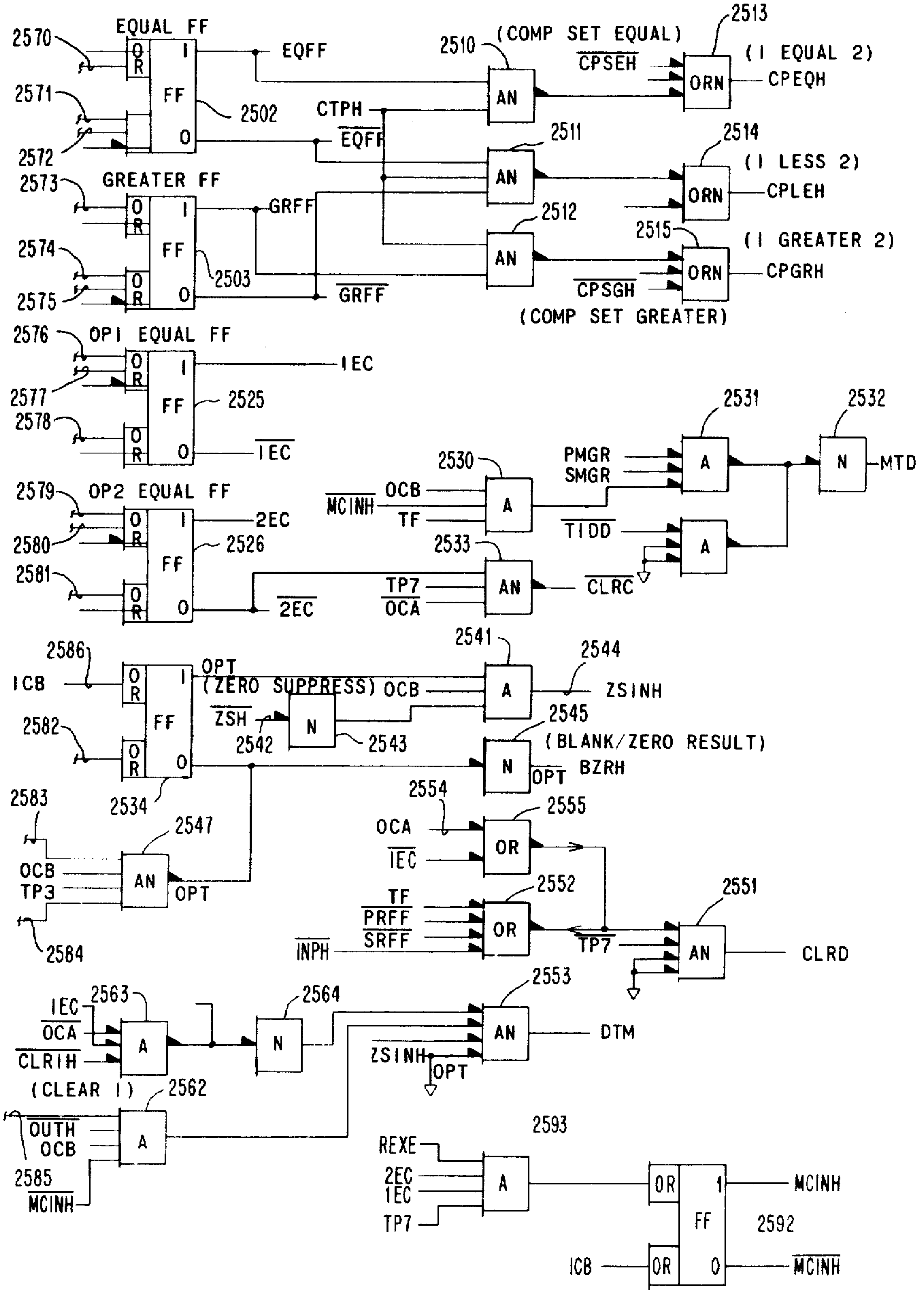

FIGS. 25*a* and 25*b* depicts a number of logic circuits which are necessary to generate signals for data control.

Figure 26A:
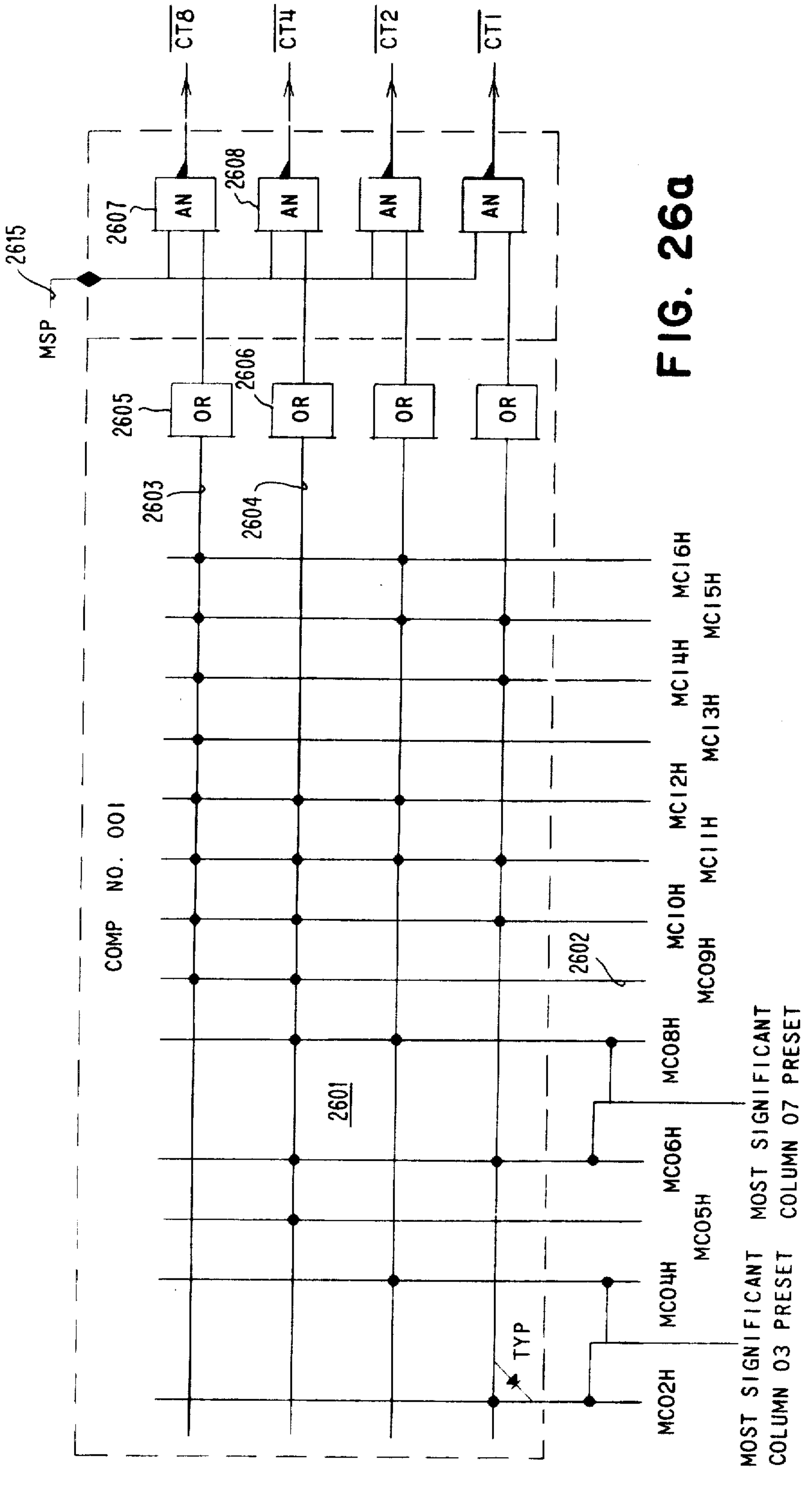
Figures 1, 26, 26B:
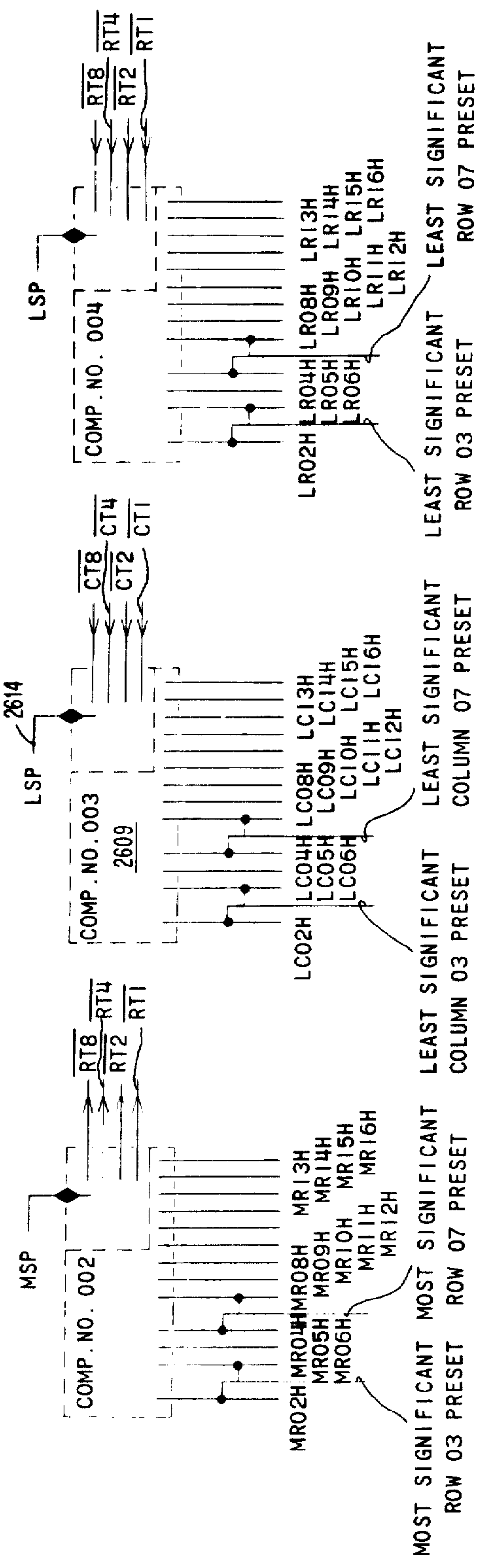

FIGS. 26*a* and 26*b* depicts logic circuitry which is necessary to generate the memory preset signals.

FIG. 26-1 shows the address code for the system.

Figure 27A:
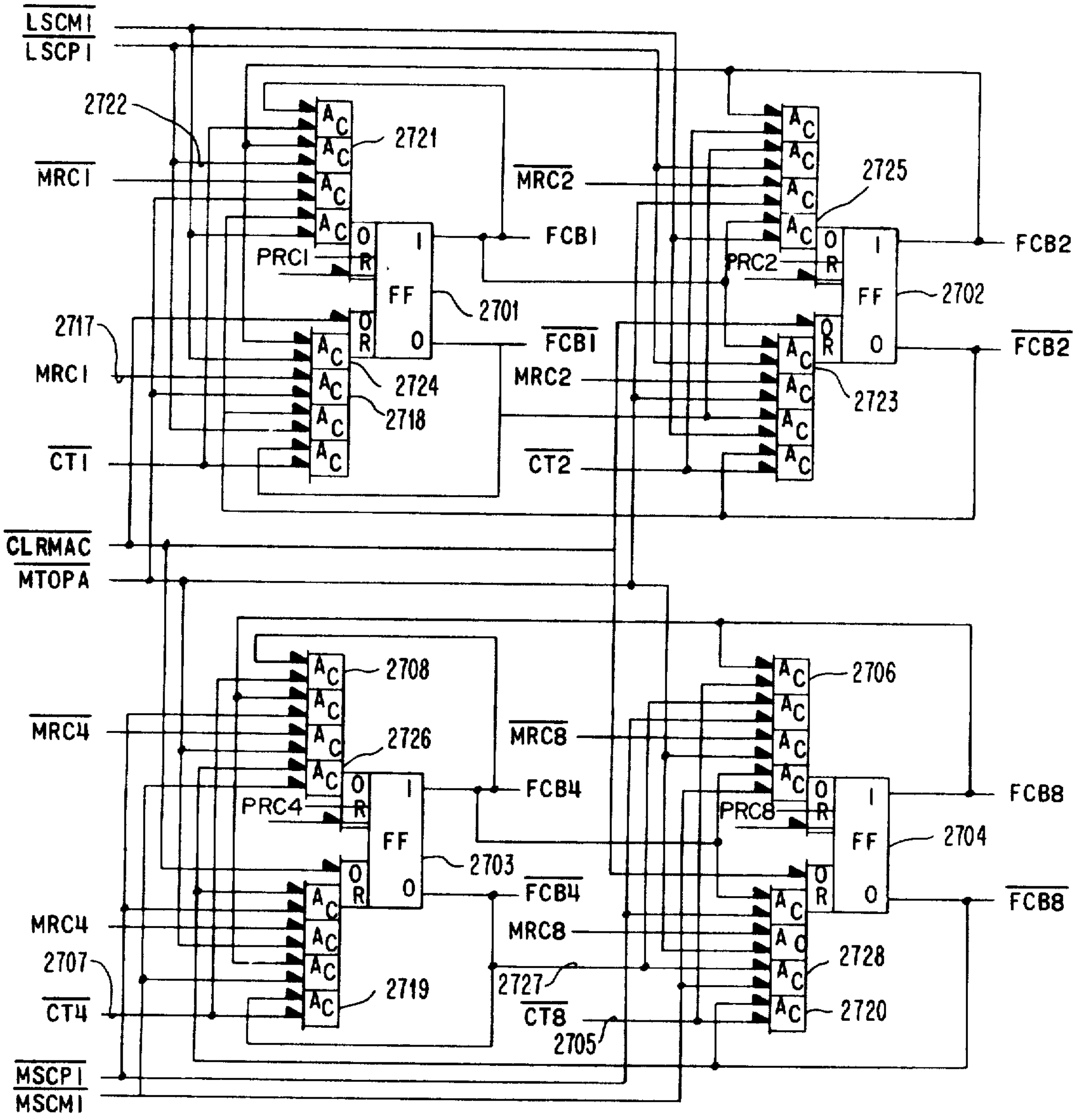
Figures 1, 27:
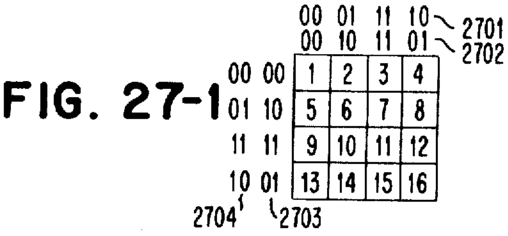
Figure 27B:
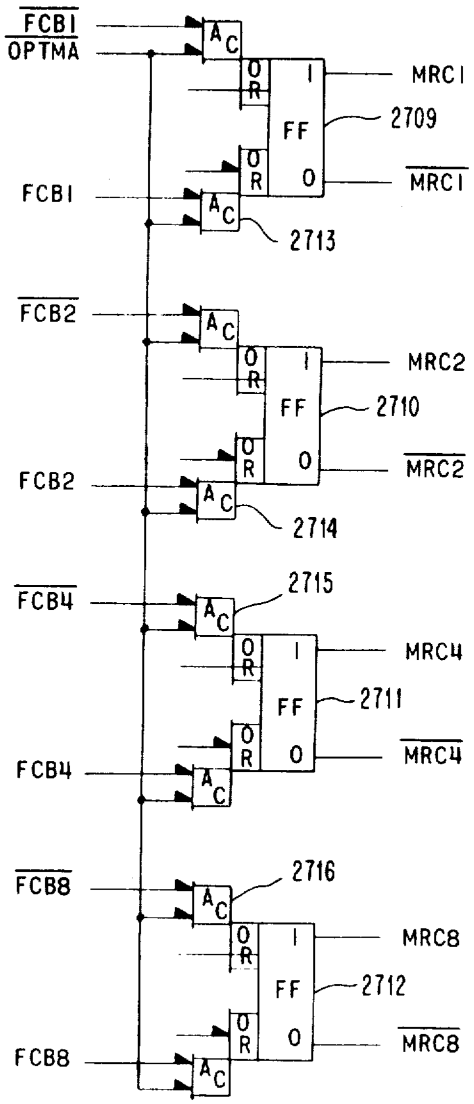

FIGS. 27*a* and 27*b* shows the circuitry employed for the column field counter and the column address register.

FIG. 27-1 shows a lay-out for the counting of numbers by the field counter;

FIGS. 18*a*-28*c* shows a number of logic circuits which are employed to effect the address modification control.

Figure 29:
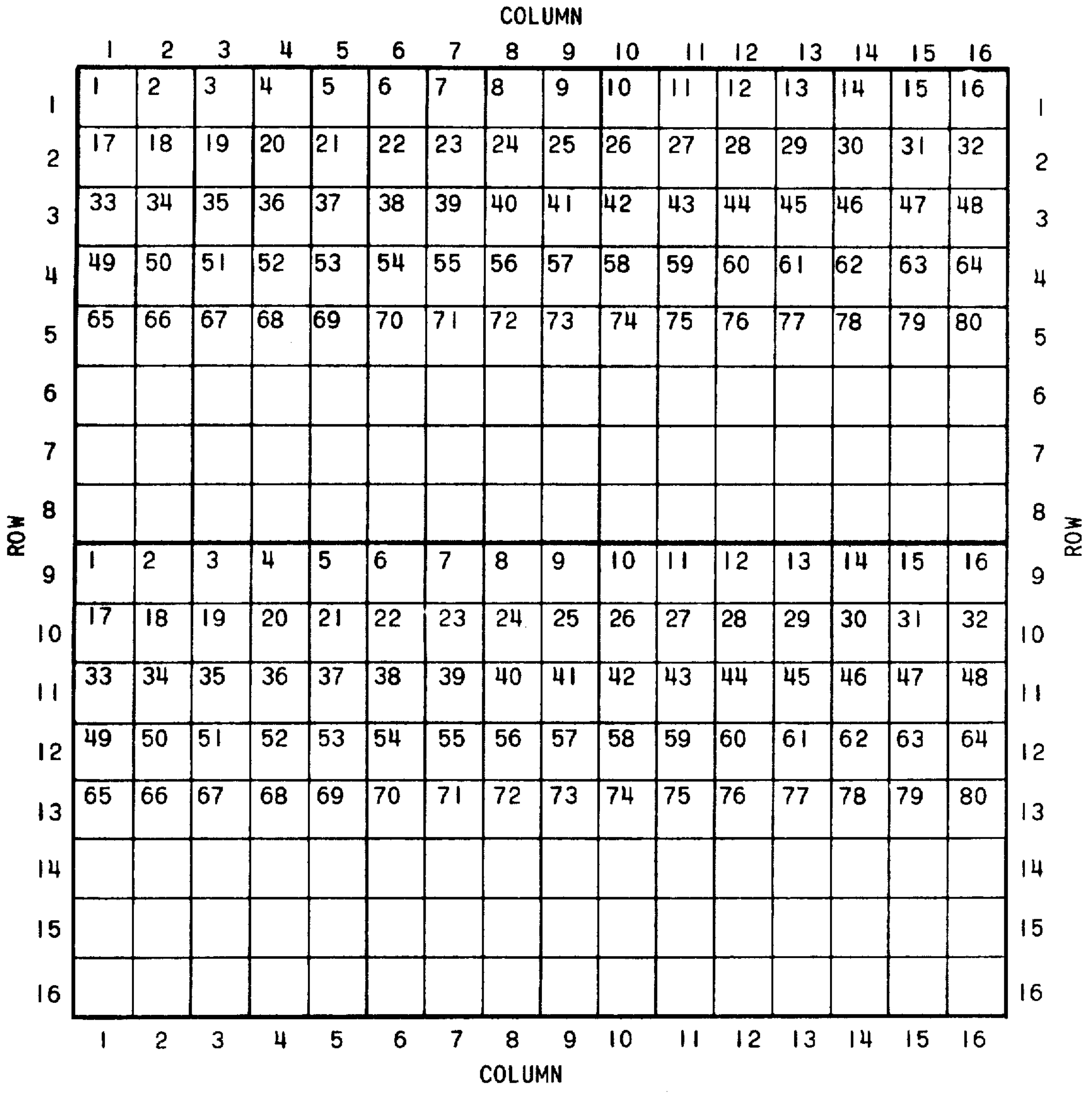

FIG. 29 shows a lay-out of the address memory locations not pertaining to the physical location in the memory, but for their locations insofar as the locations are considered in programming.

Figure 30A:
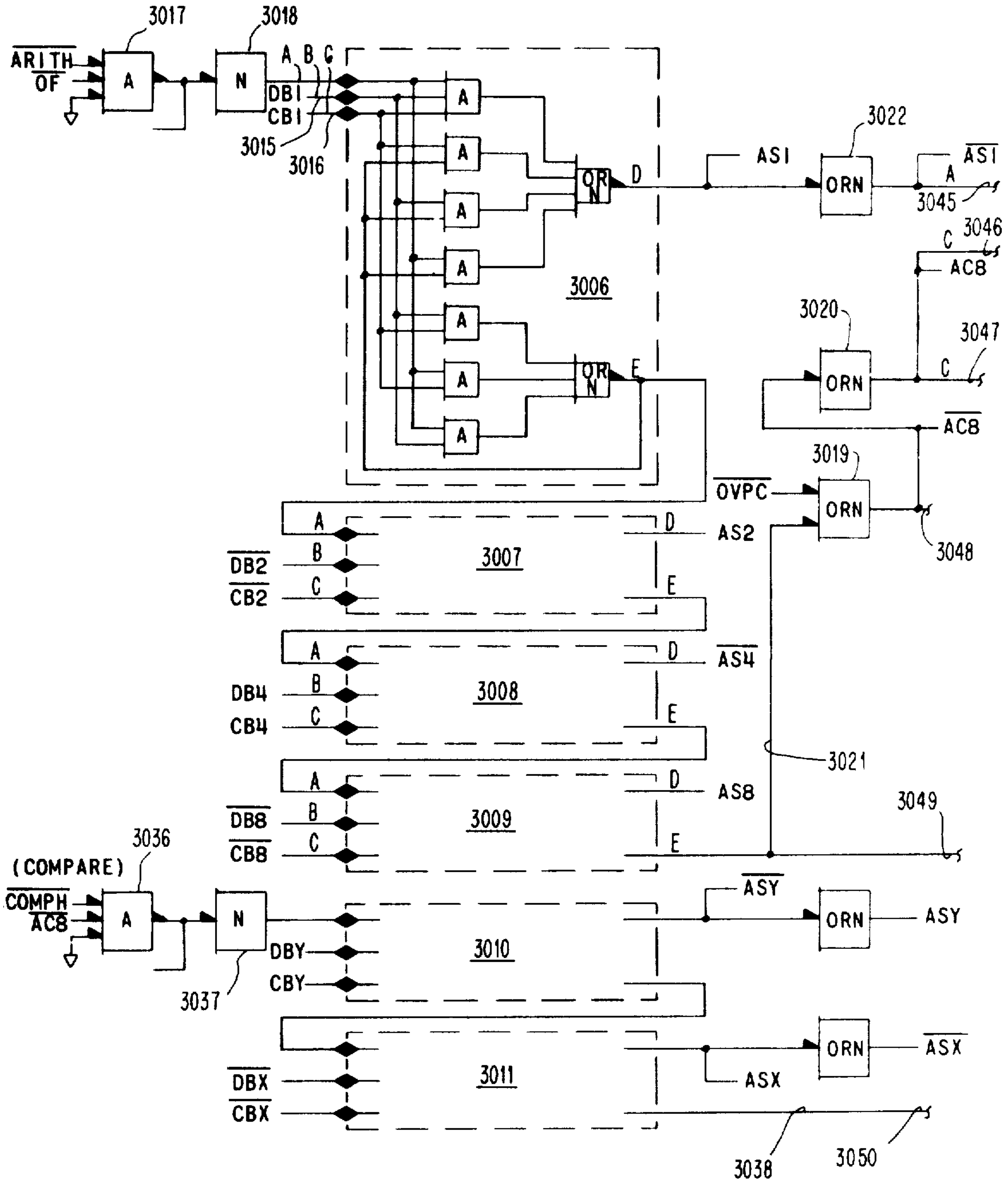
Figures 1, 30, 30B:
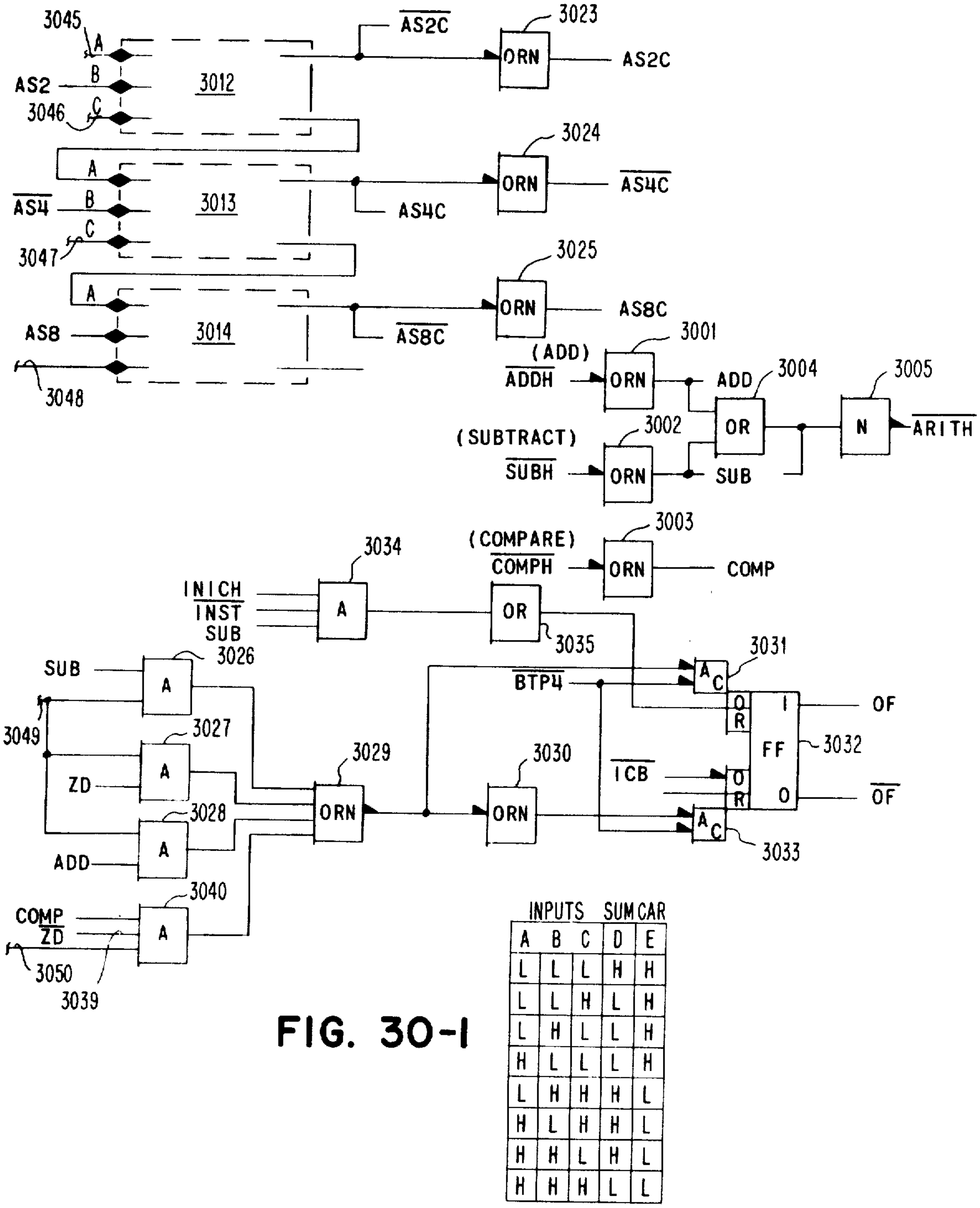

FIGS. 30*a* and 30*b* shows logic circuits of the arithmetic unit.

FIG. 30-1 is a table related to FIGS. 30*a* and 30*b*.

Figure 31A:
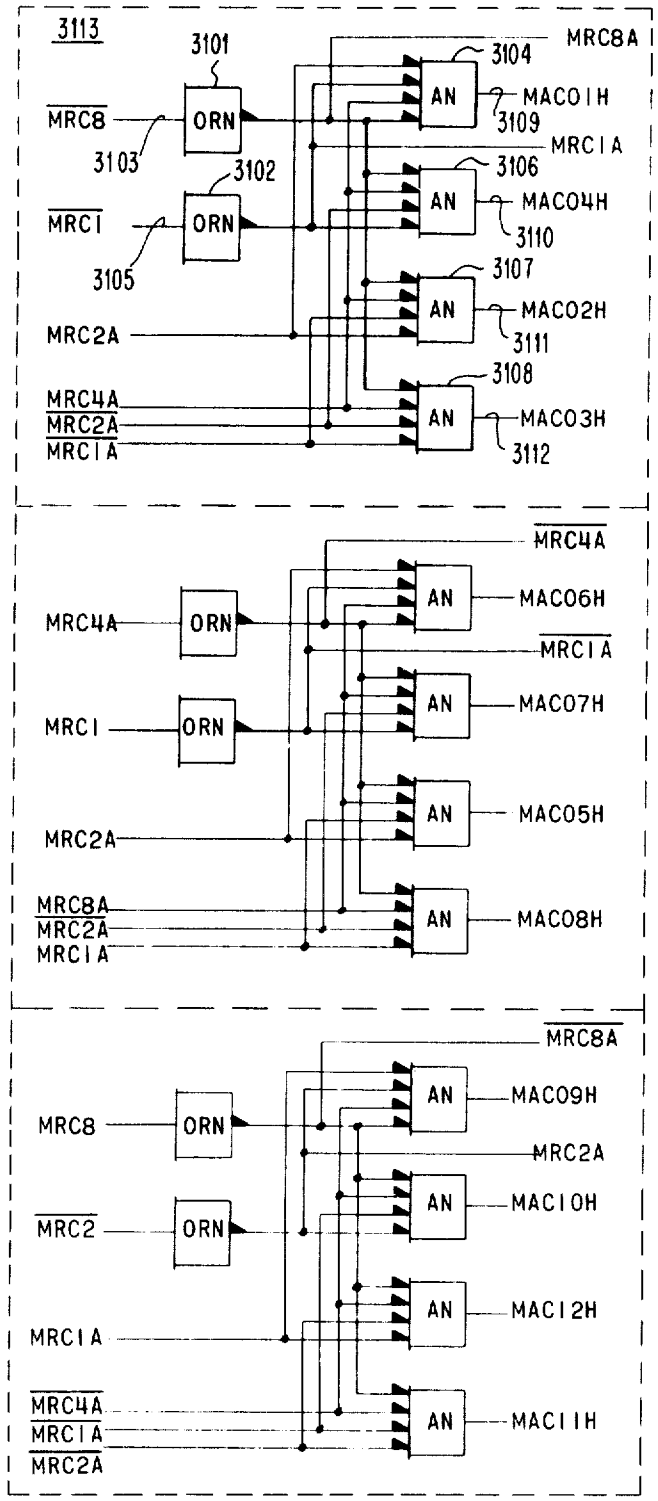
Figure 31B:
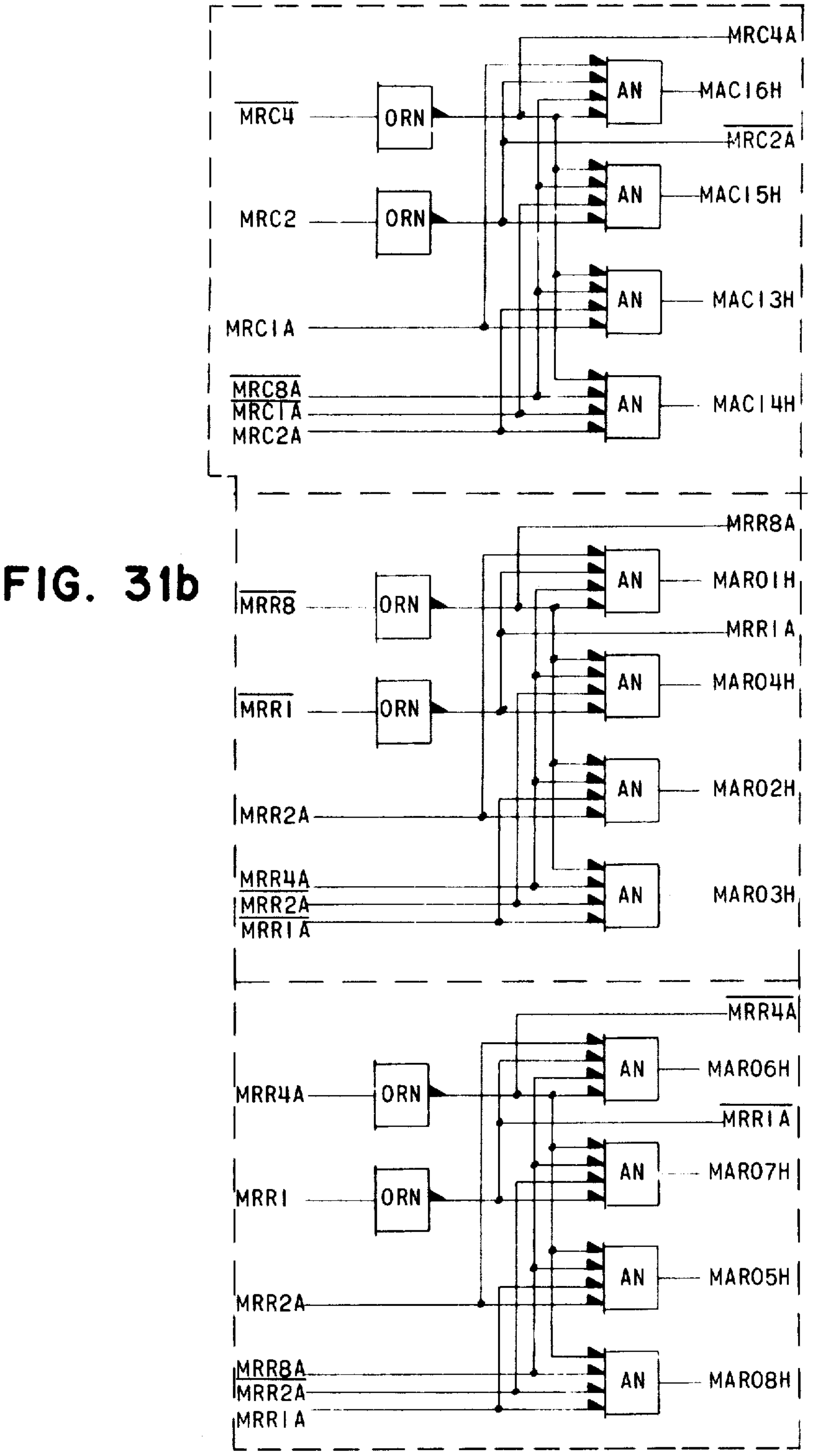
Figure 31C:
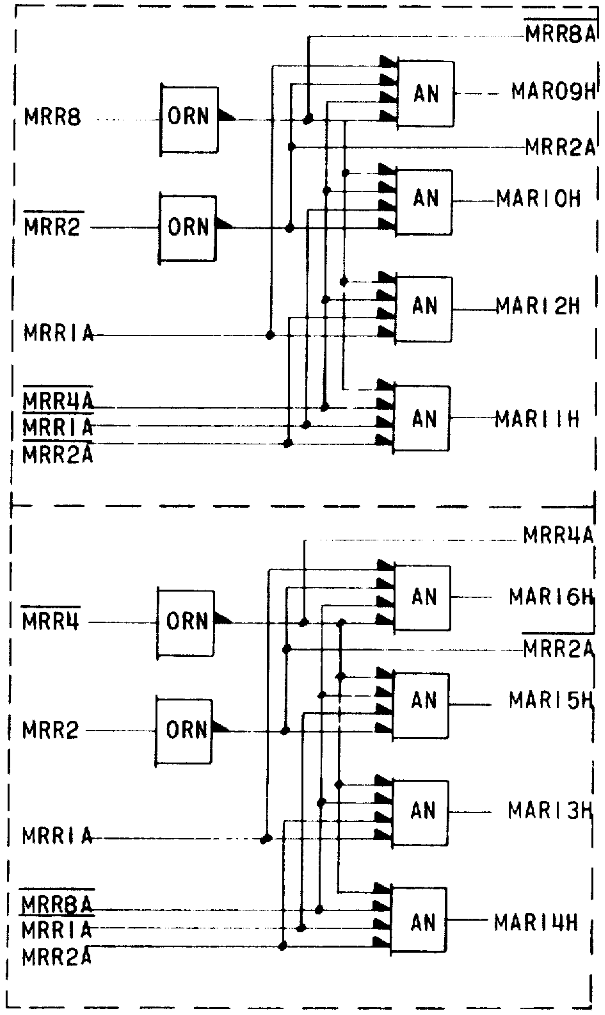
Figure 32A:
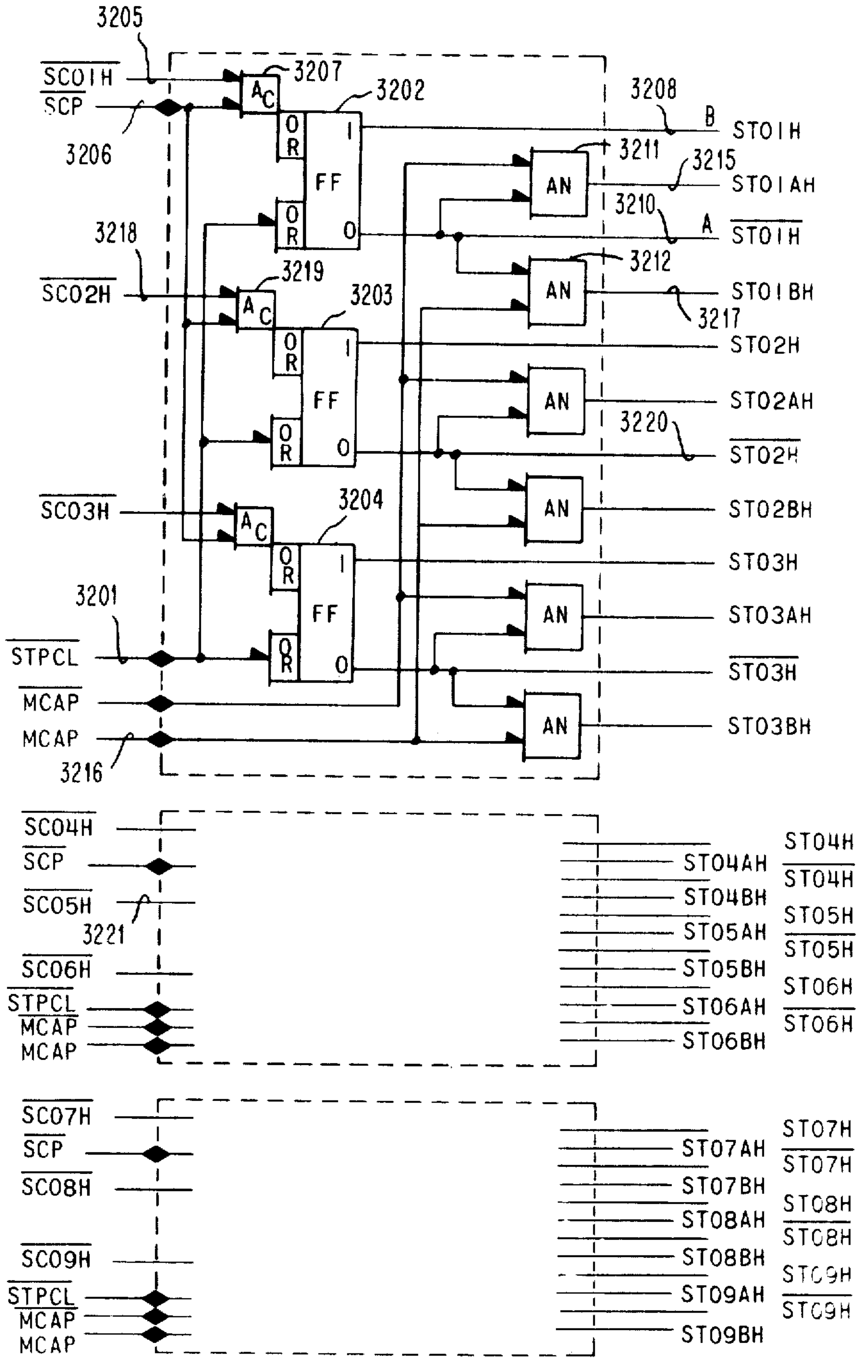
Figure 32B:
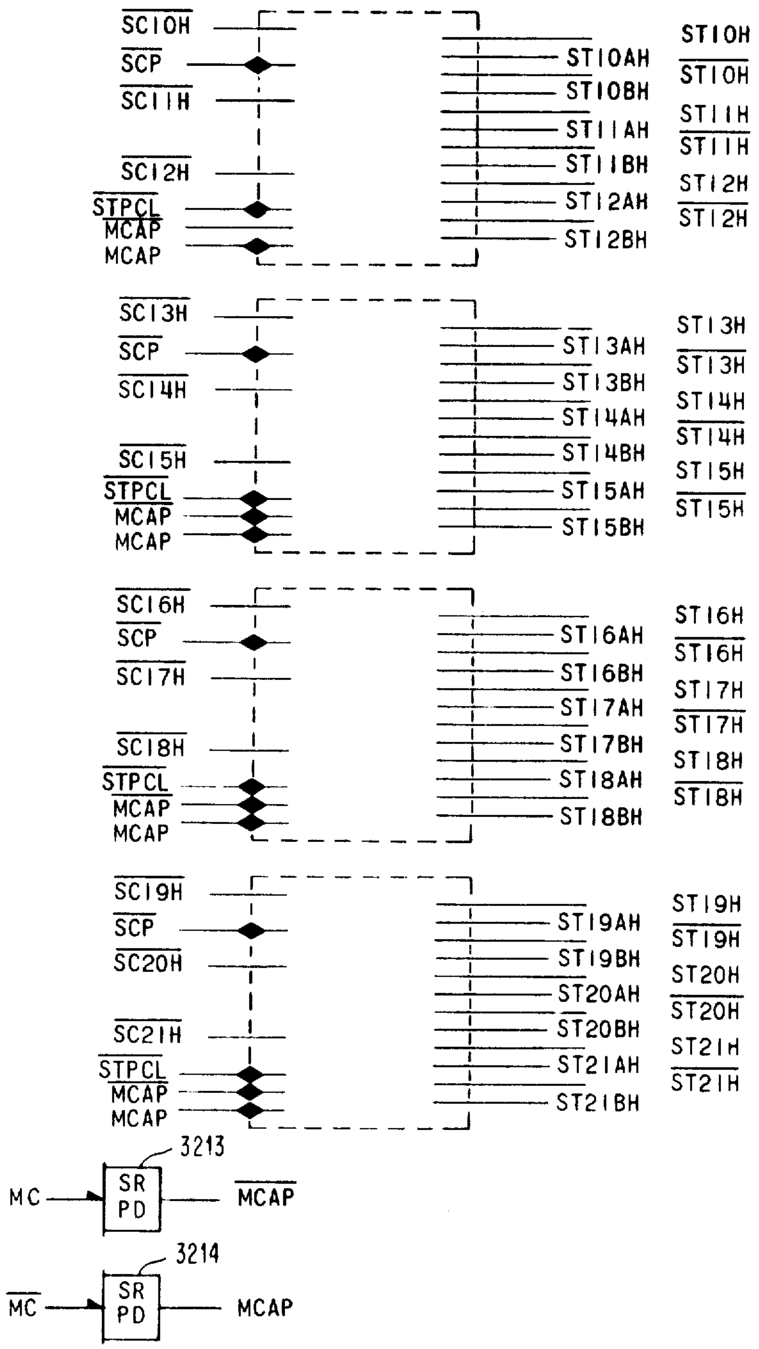
Figure 32C:
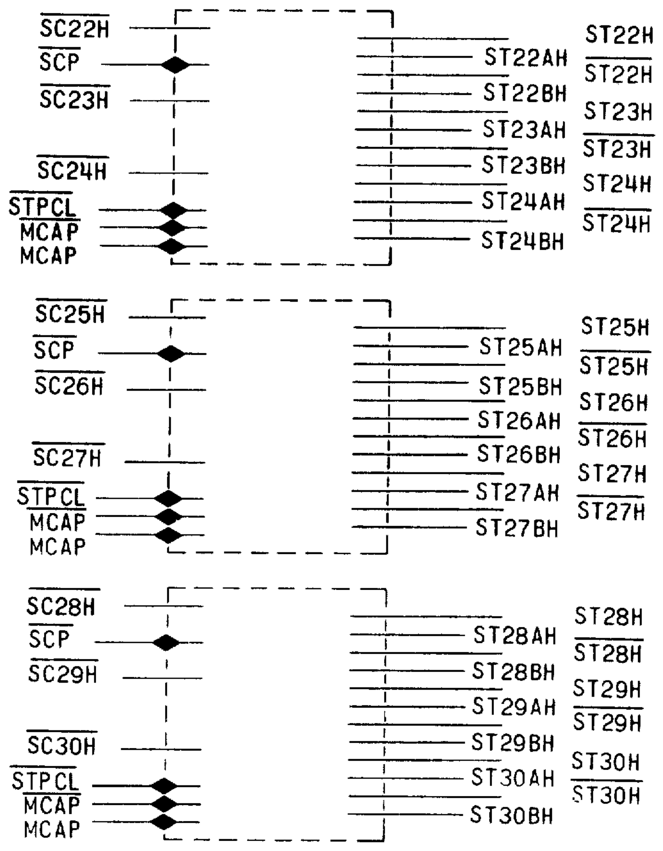
Figure 33A:
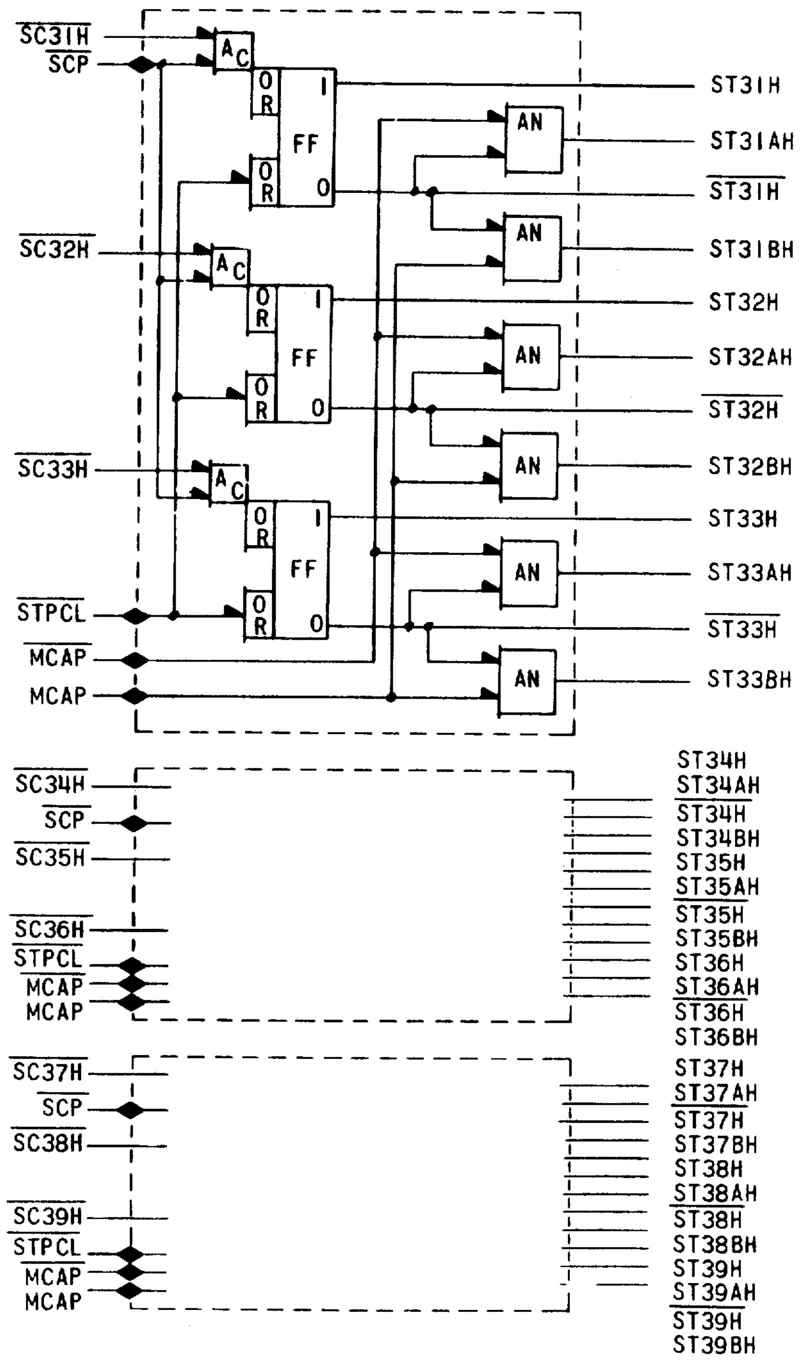
Figure 33B:
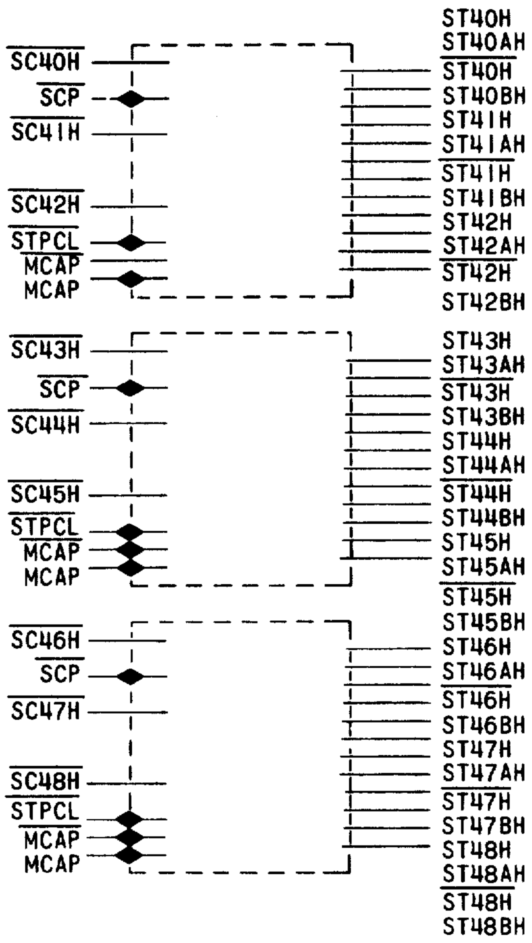

FIGS. 31*a*–31*c* shows the logic circuits of the memory address emitter.

FIGS. 32*a*–32*c*, 33*a* and 33*b* show the logic circuits necessary to provide the step register.

Figure 34A:
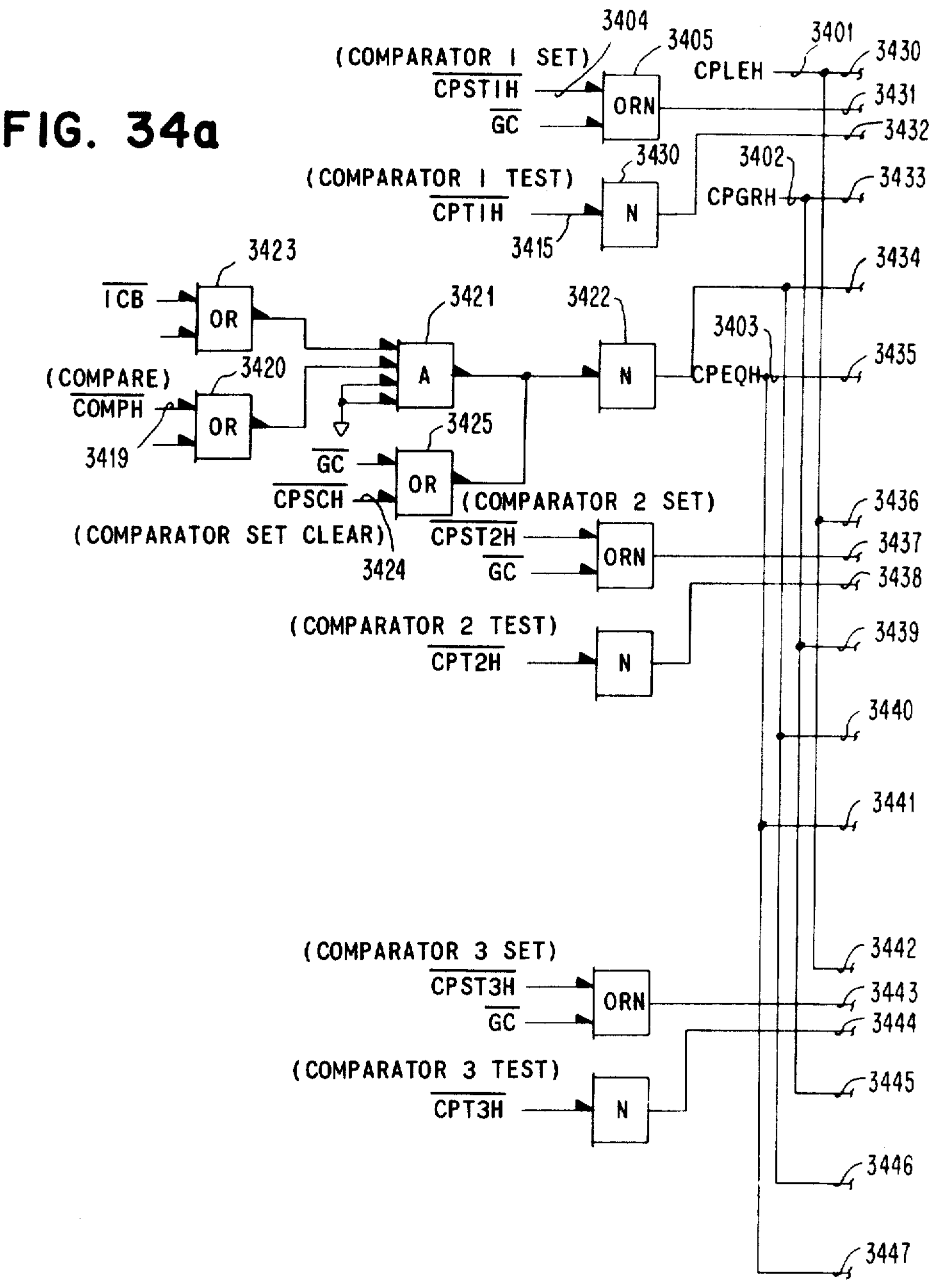
Figure 34B:
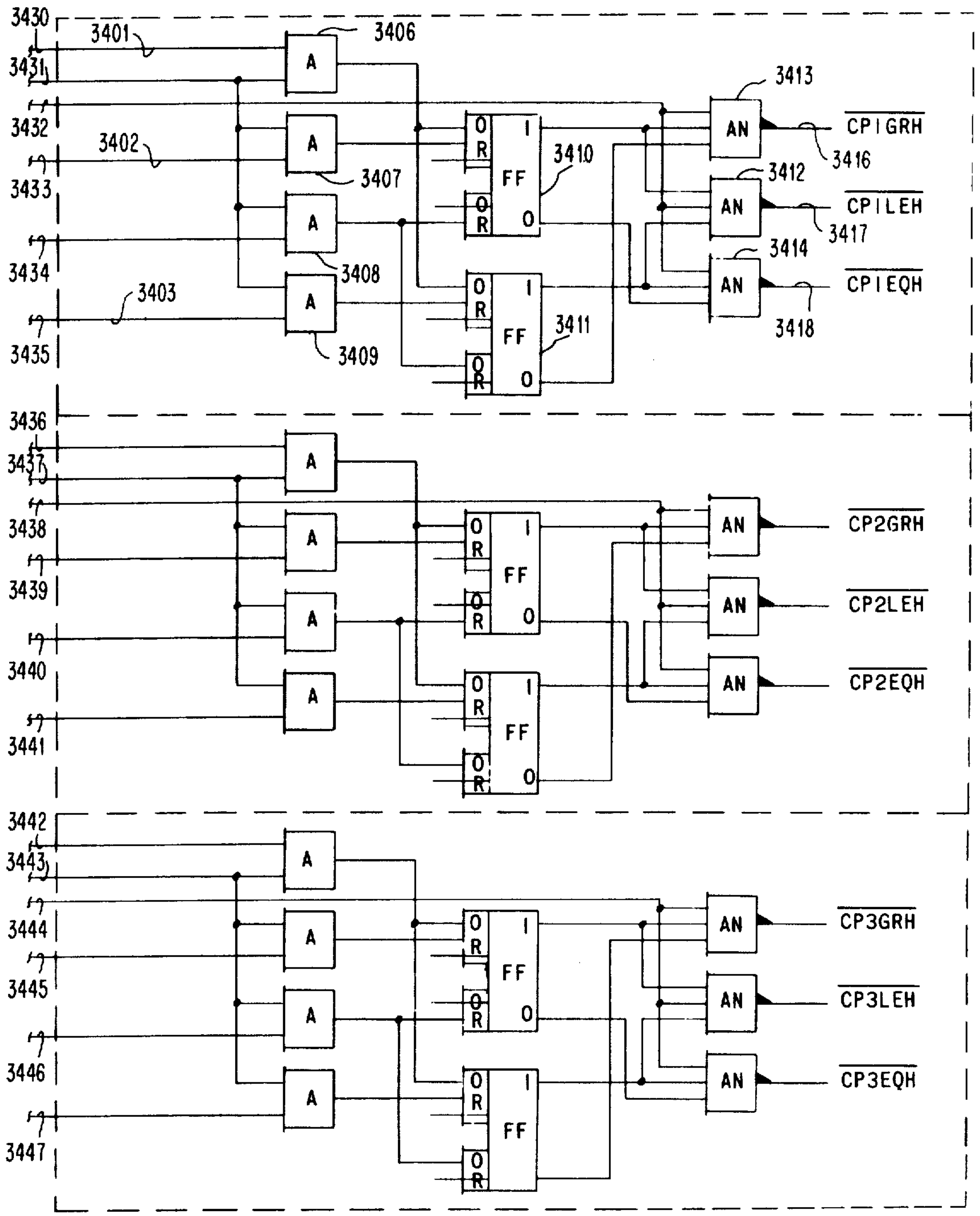

FIGS. 34*a* and 34*b* shows the logic circuits which are used for the comparators.

Figure 35A:
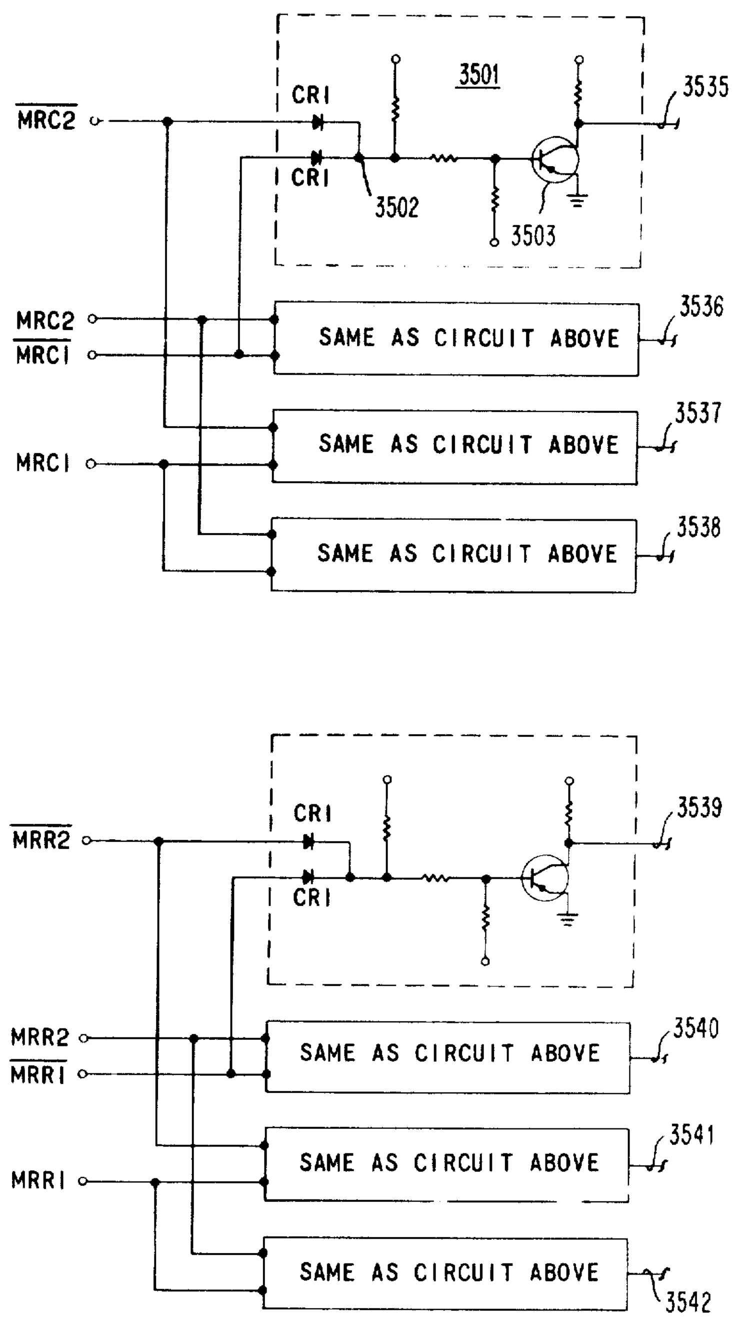
Figure 35B:
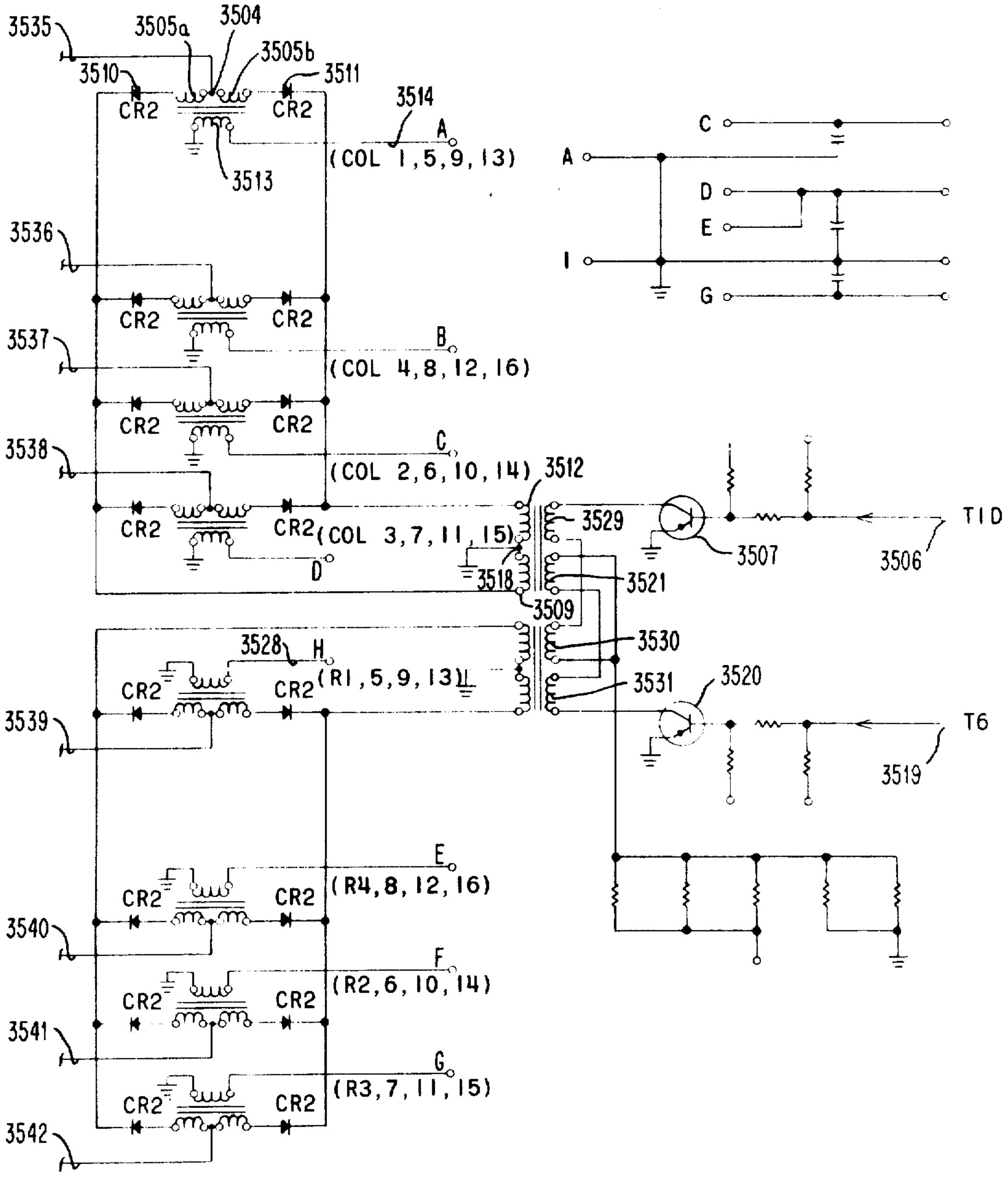
Figure 35C:
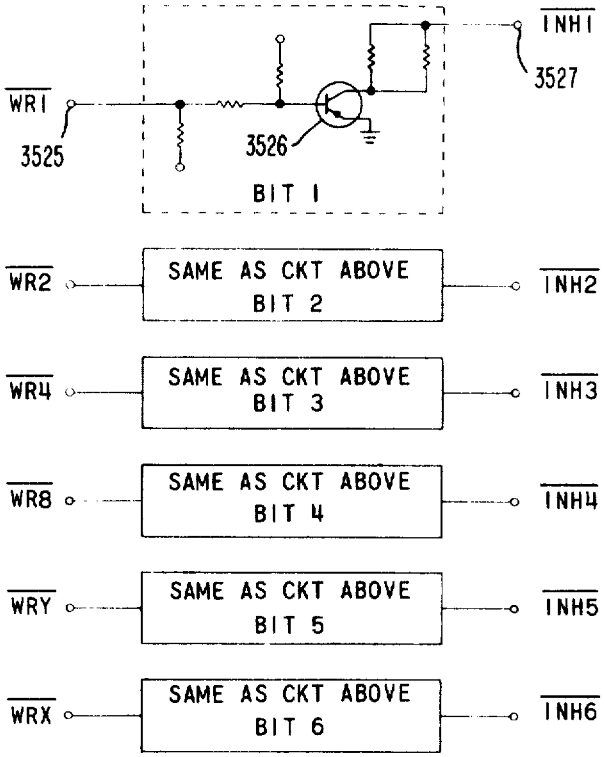

FIGS. 35*a*-35*c* shows the detailed circuitry schematic for a portion of the memory drive circuits as well as for the inhibit circuits.

Figure 36A:
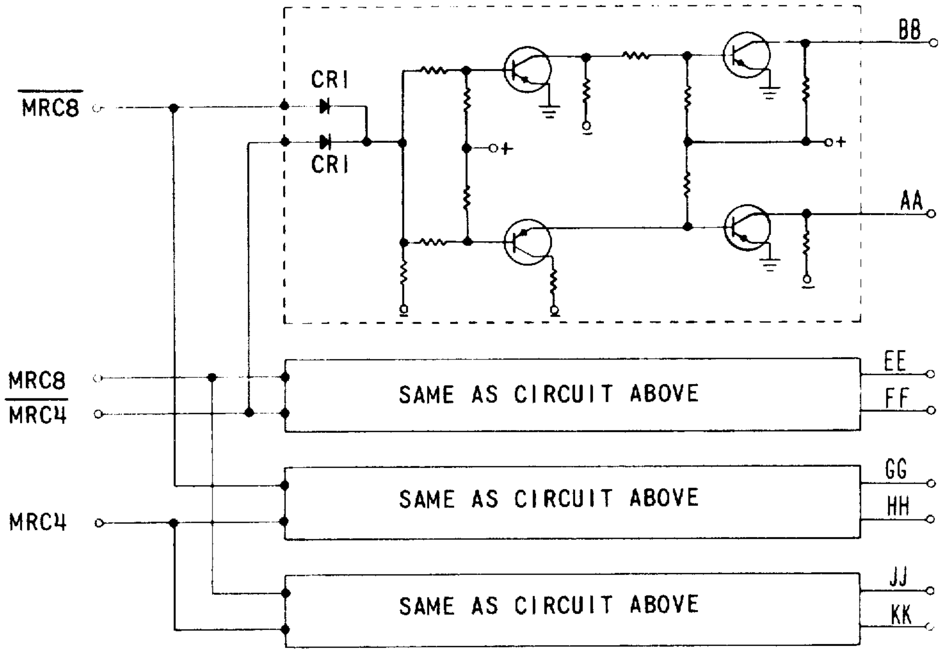
Figure 36B:
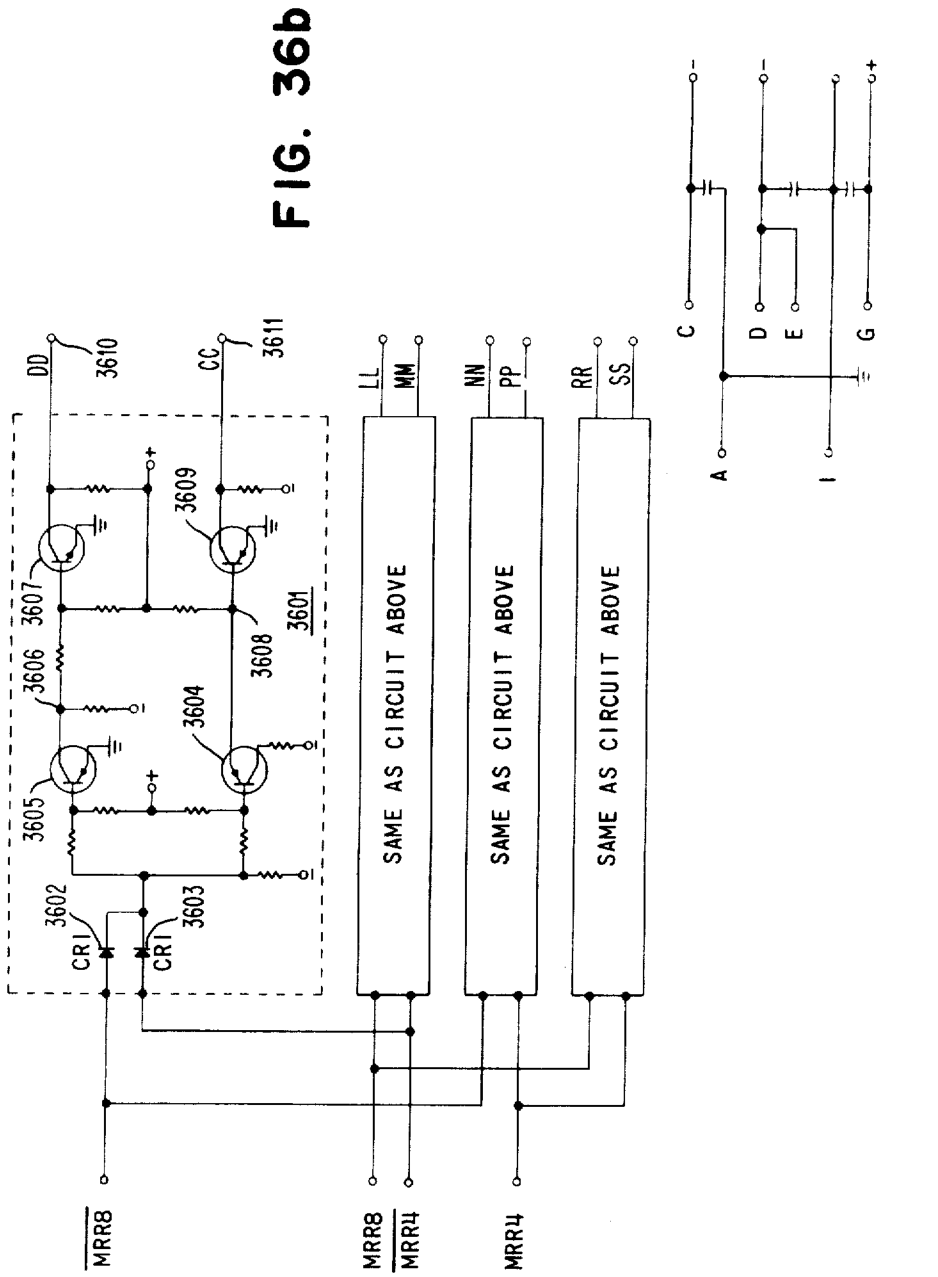

FIGS. 36*a* and 36*b* shows additional detailed circuitry for the memory drive circuits.

Figure 37A:
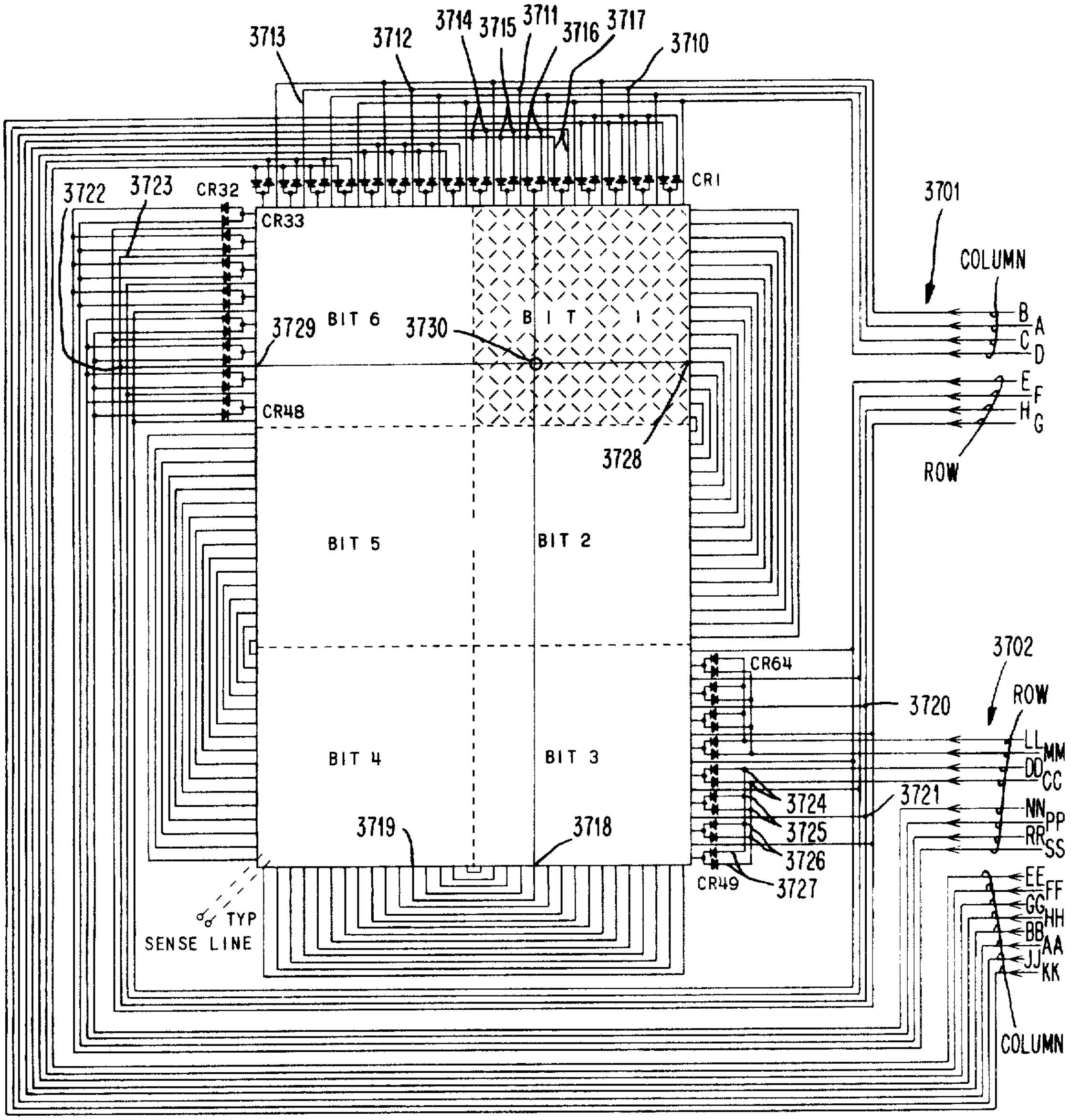
Figure 37B:
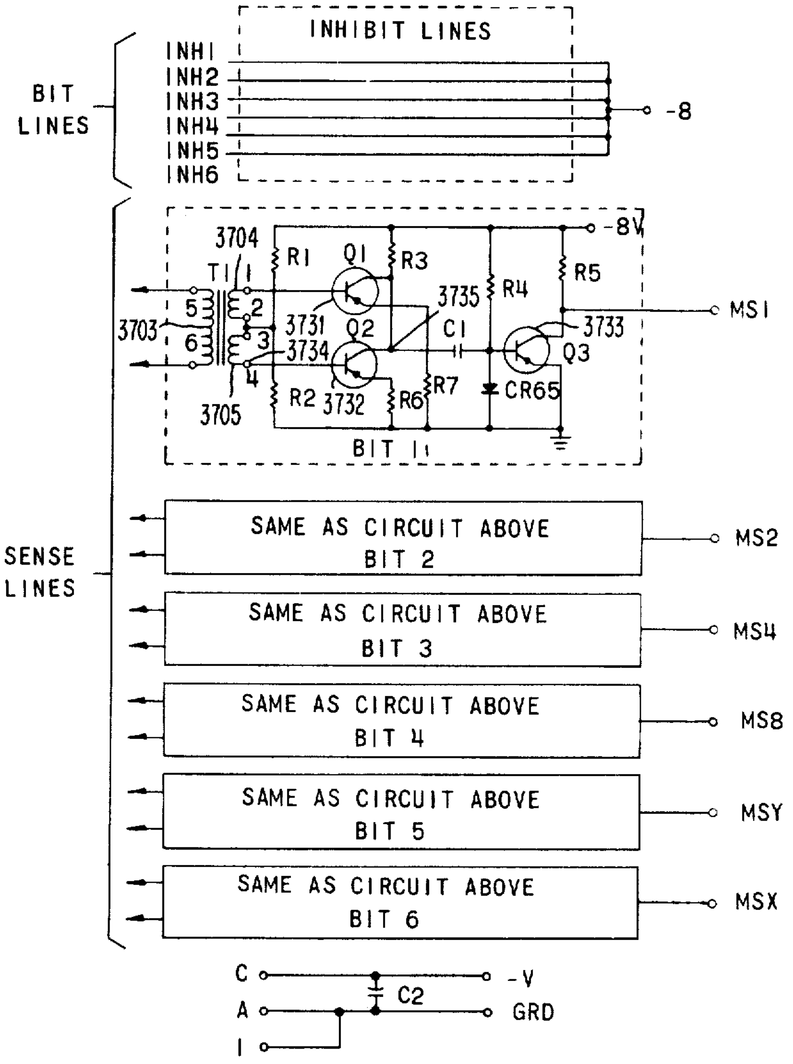

FIGS. 37*a* and 37*b* shows a lay-out of the memory with circuits to be connected to the drive circuits of FIGS. 35 and 36, as well as the detail circuitry for the sensing line means.

Figure 38:
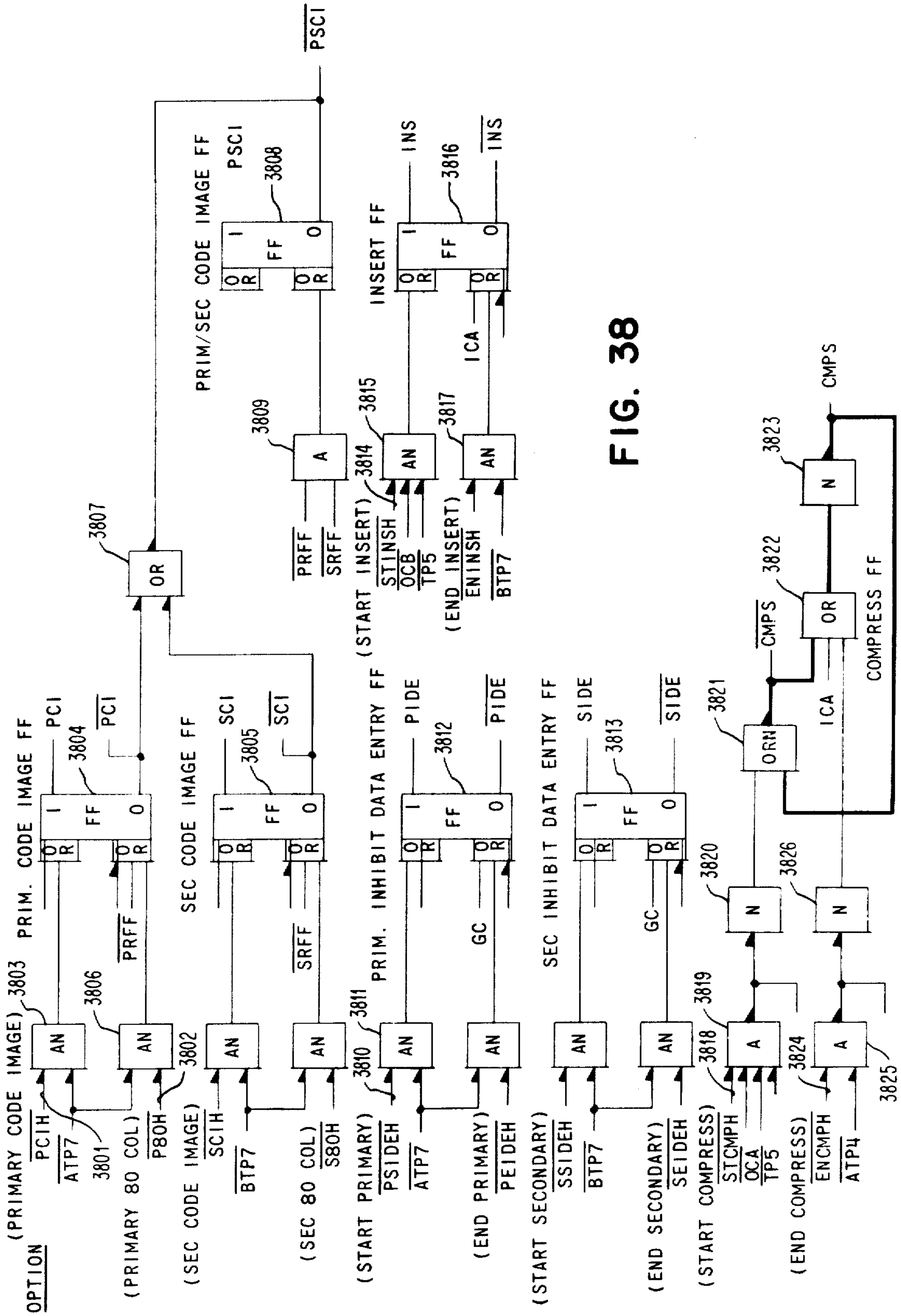

FIG. 38 shows logic circuits for the edit control signals.

Figure 39A:
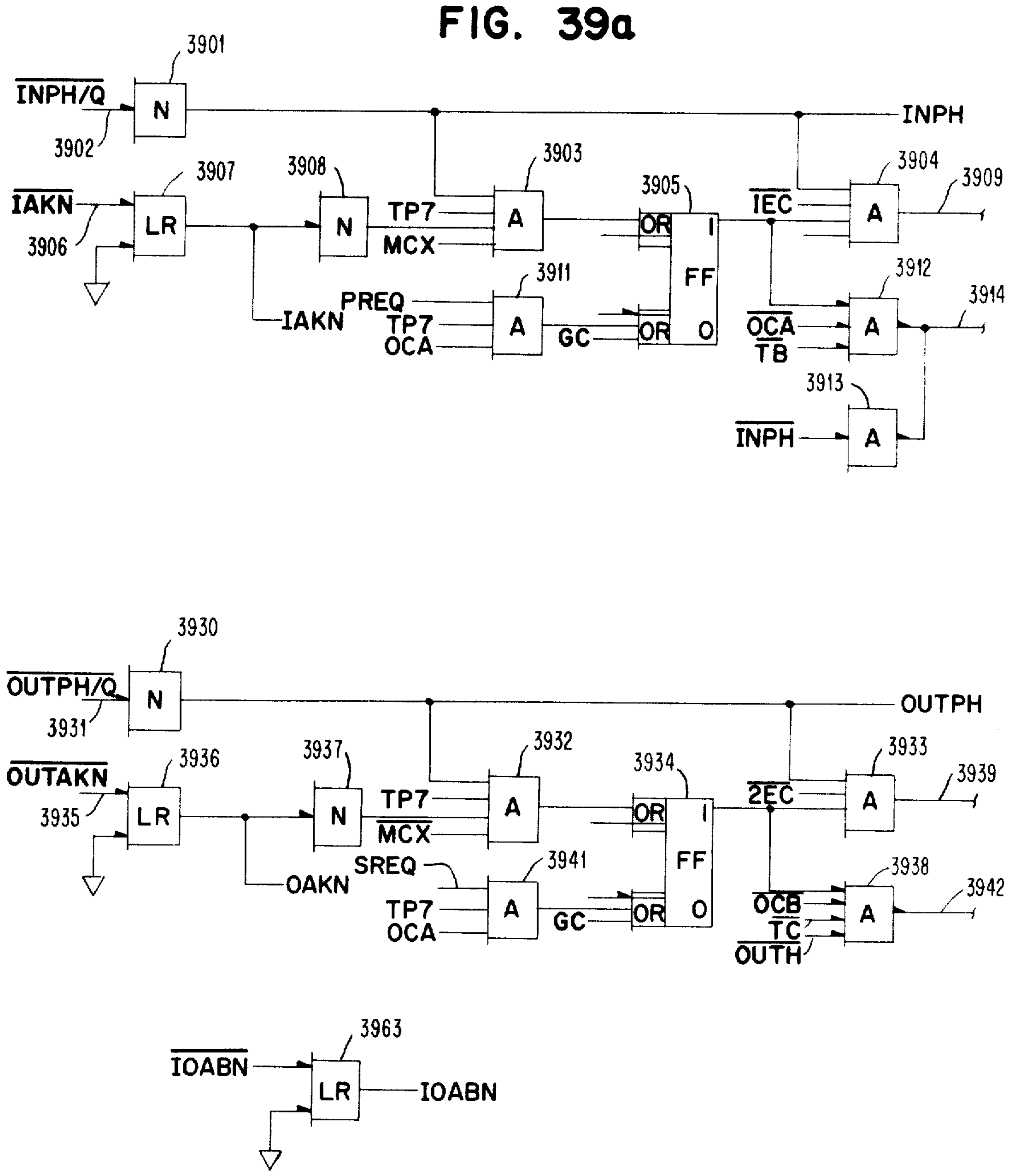
Figure 39B:
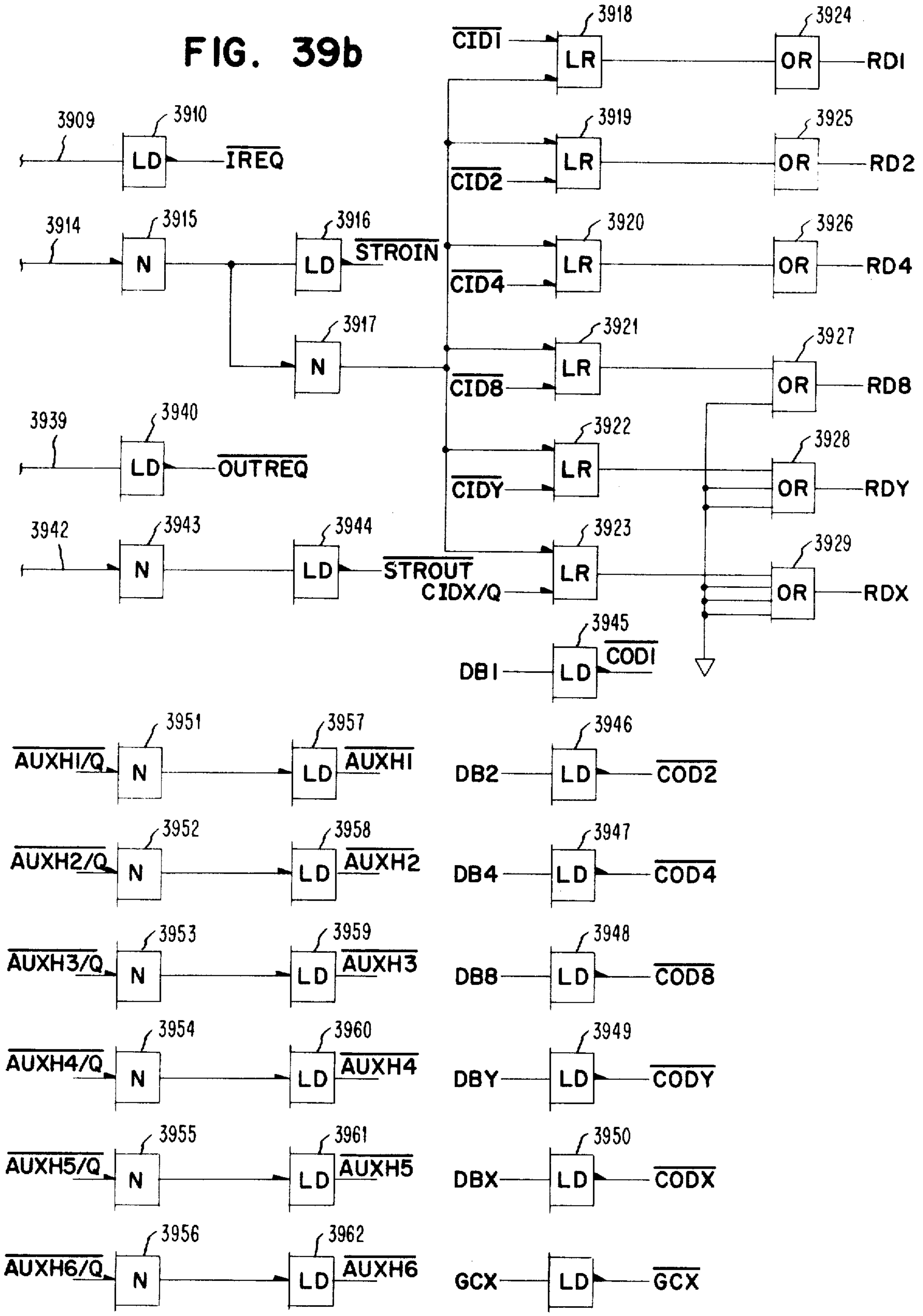

FIGS. 39*a* and 39*b* shows the logic circuits for the input-output channel control as well as the overlap control.

Figure 40A:
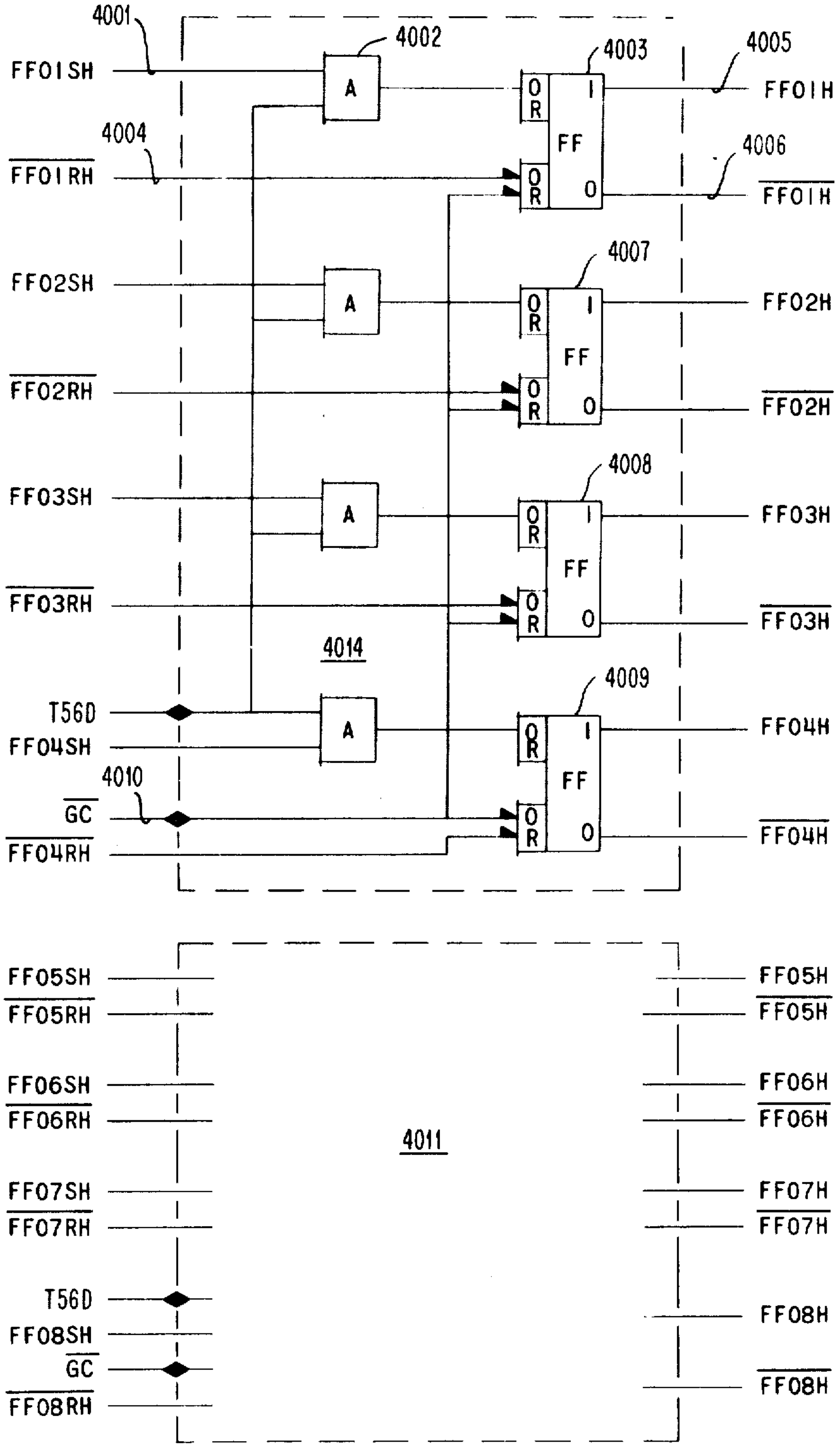
Figure 40B:
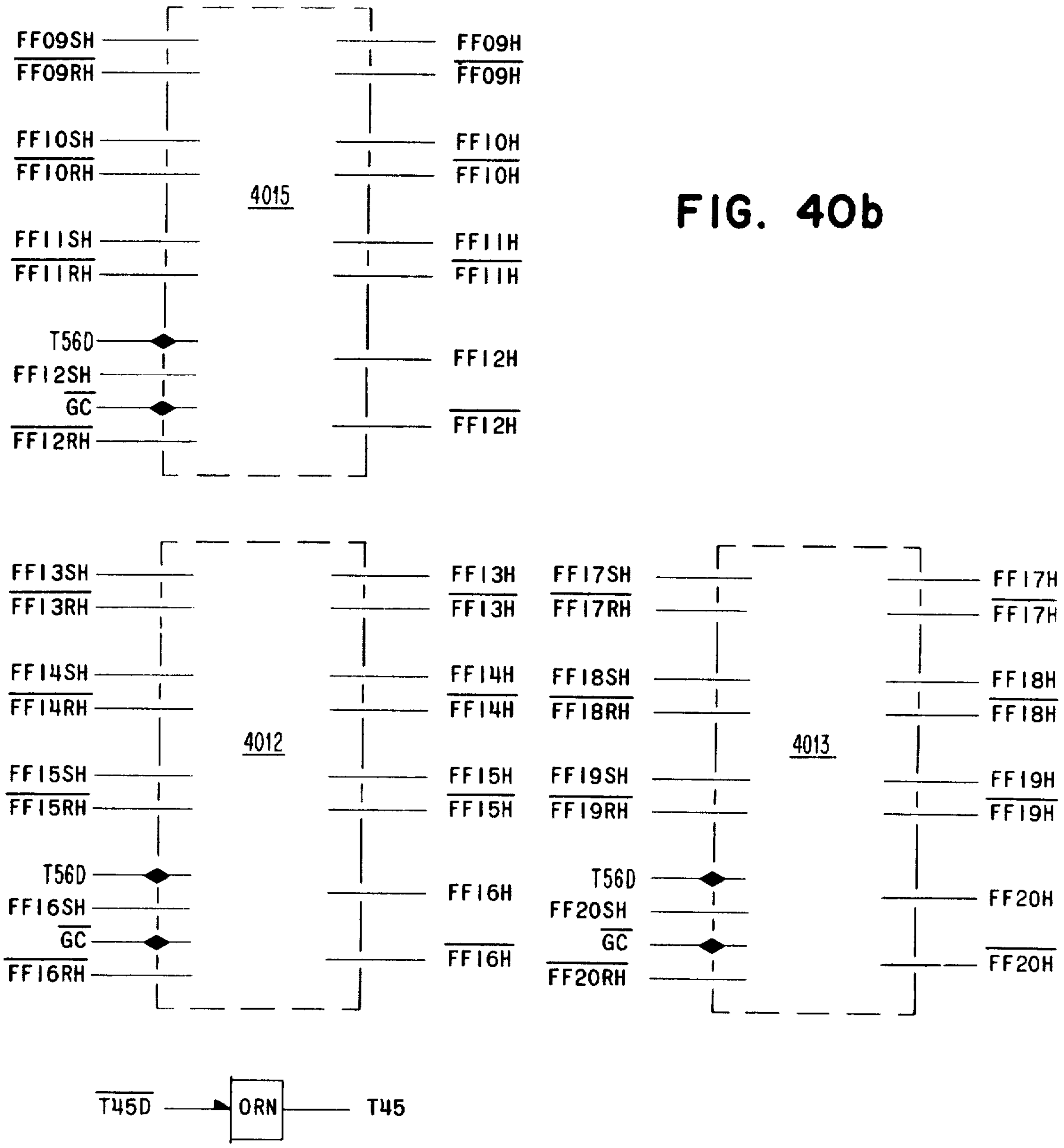

FIGS. 40*a* and 40*b* shows the logic circuits for the plug board flip-flops.

Figure 41A:
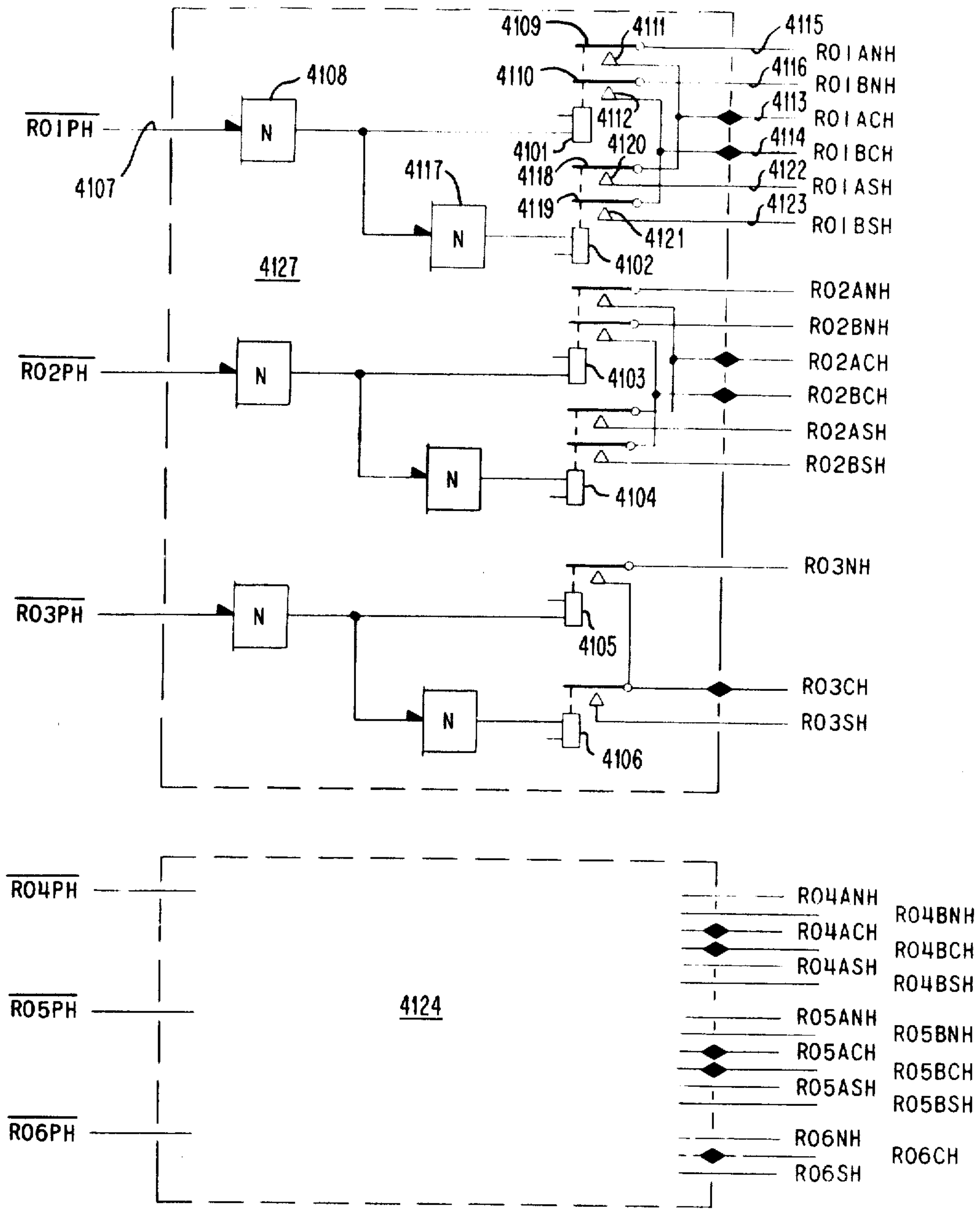
Figure 41B:
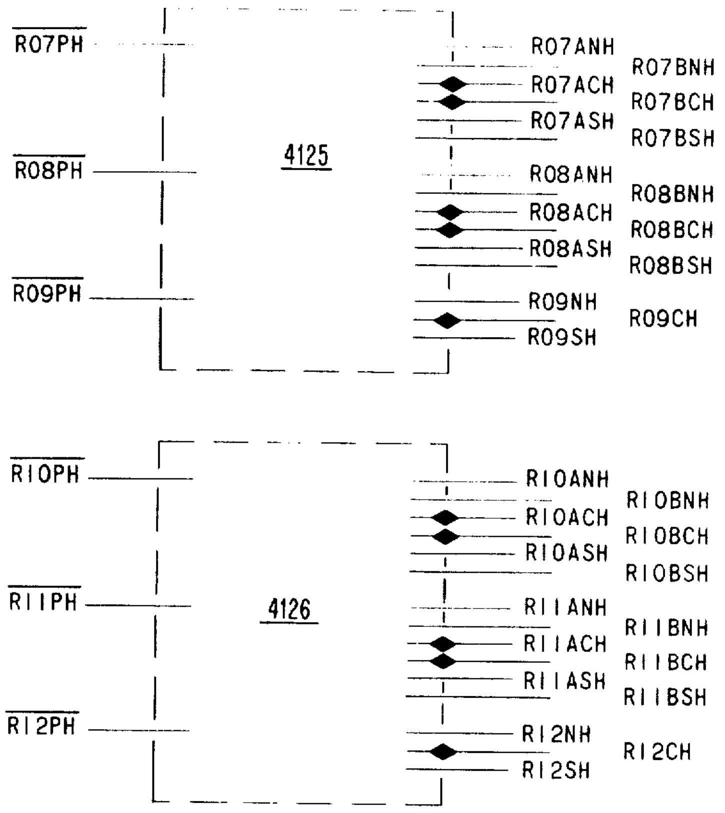

FIGS. 41*l* and 41*b* shows the logic circuits for the selectors.

Figure 42A:
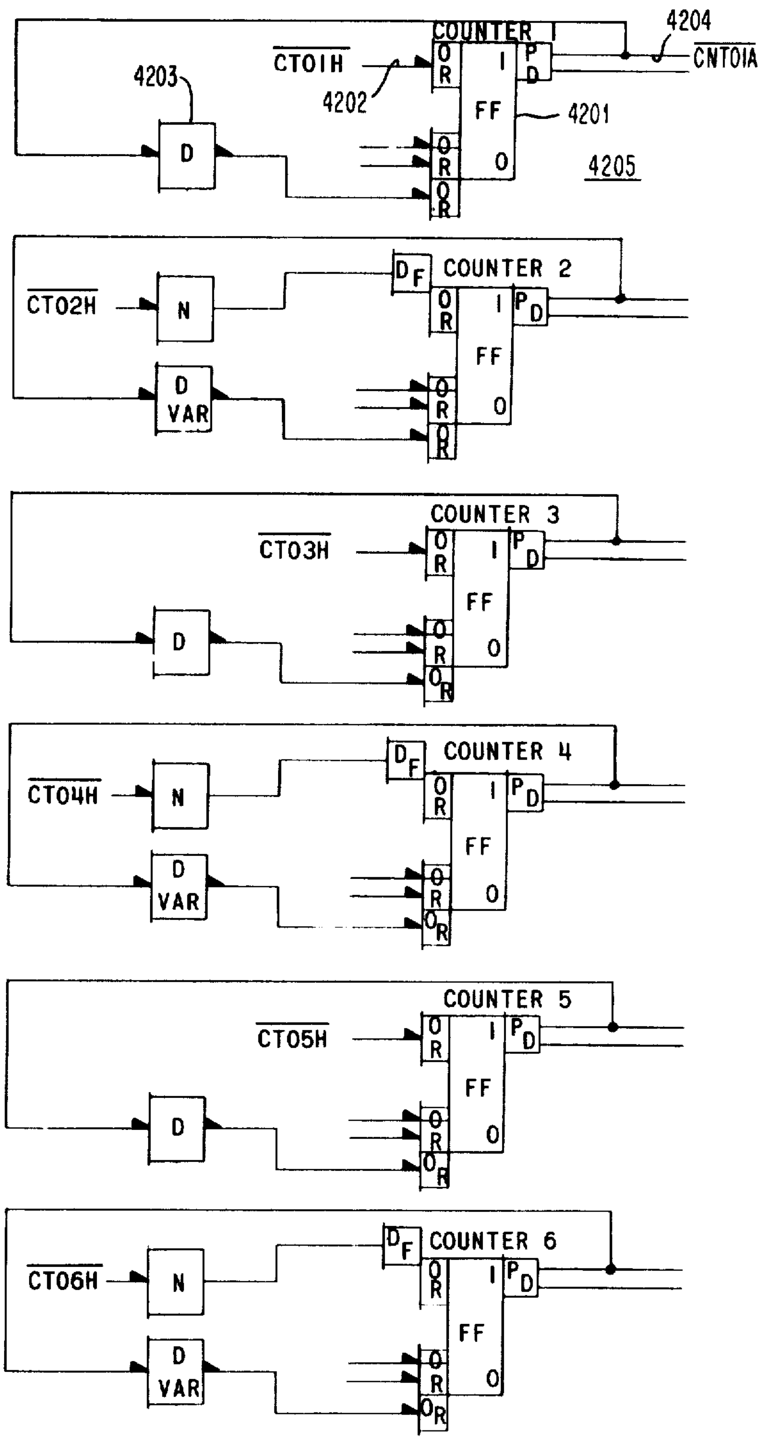
Figure 42B:
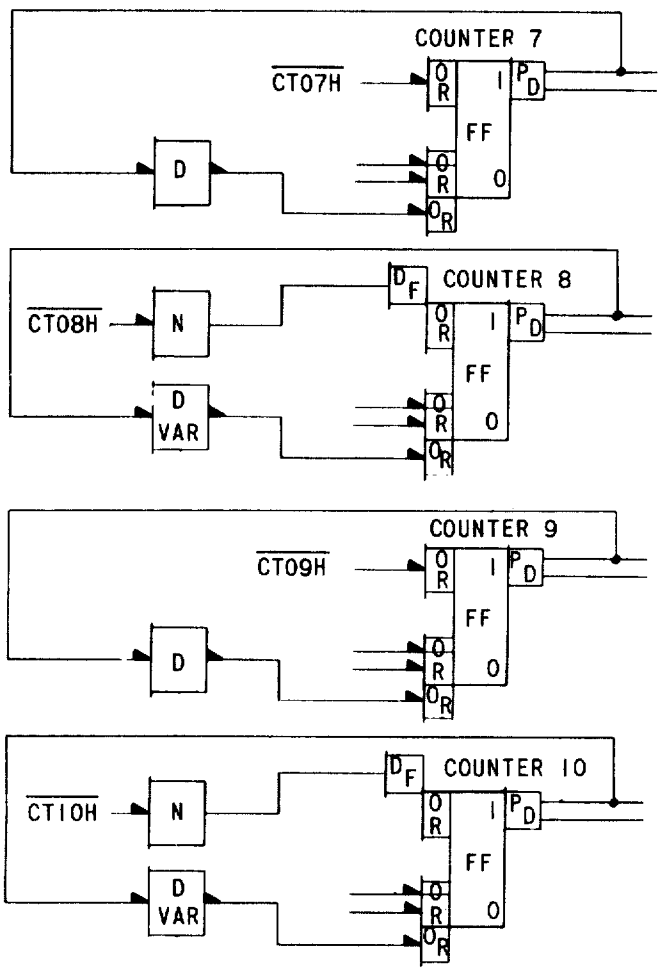

FIGS. 42*a* and 42*b* shows the logic circuits for the counters.

Figure 43A:
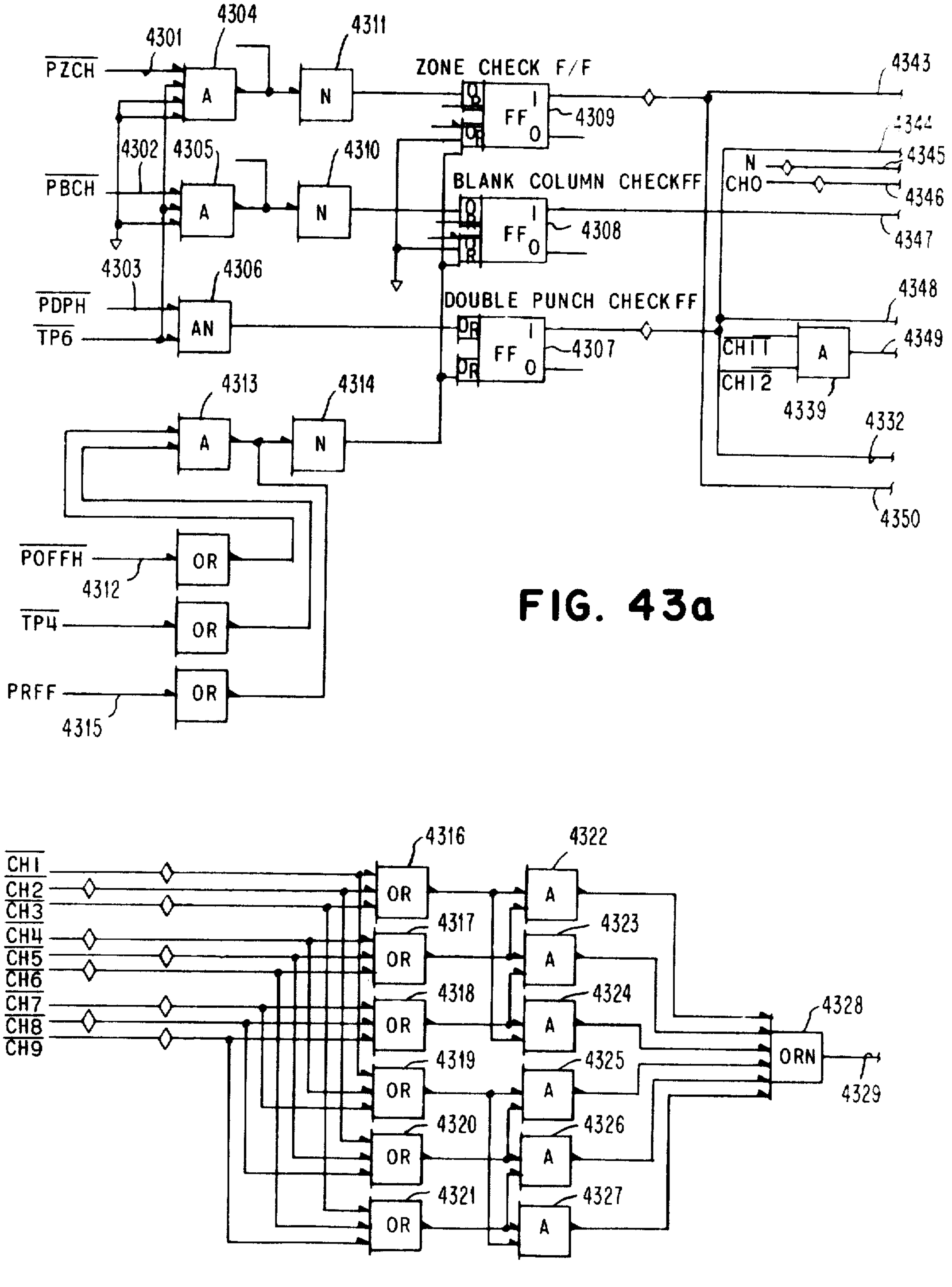
Figures 1, 43, 43B:
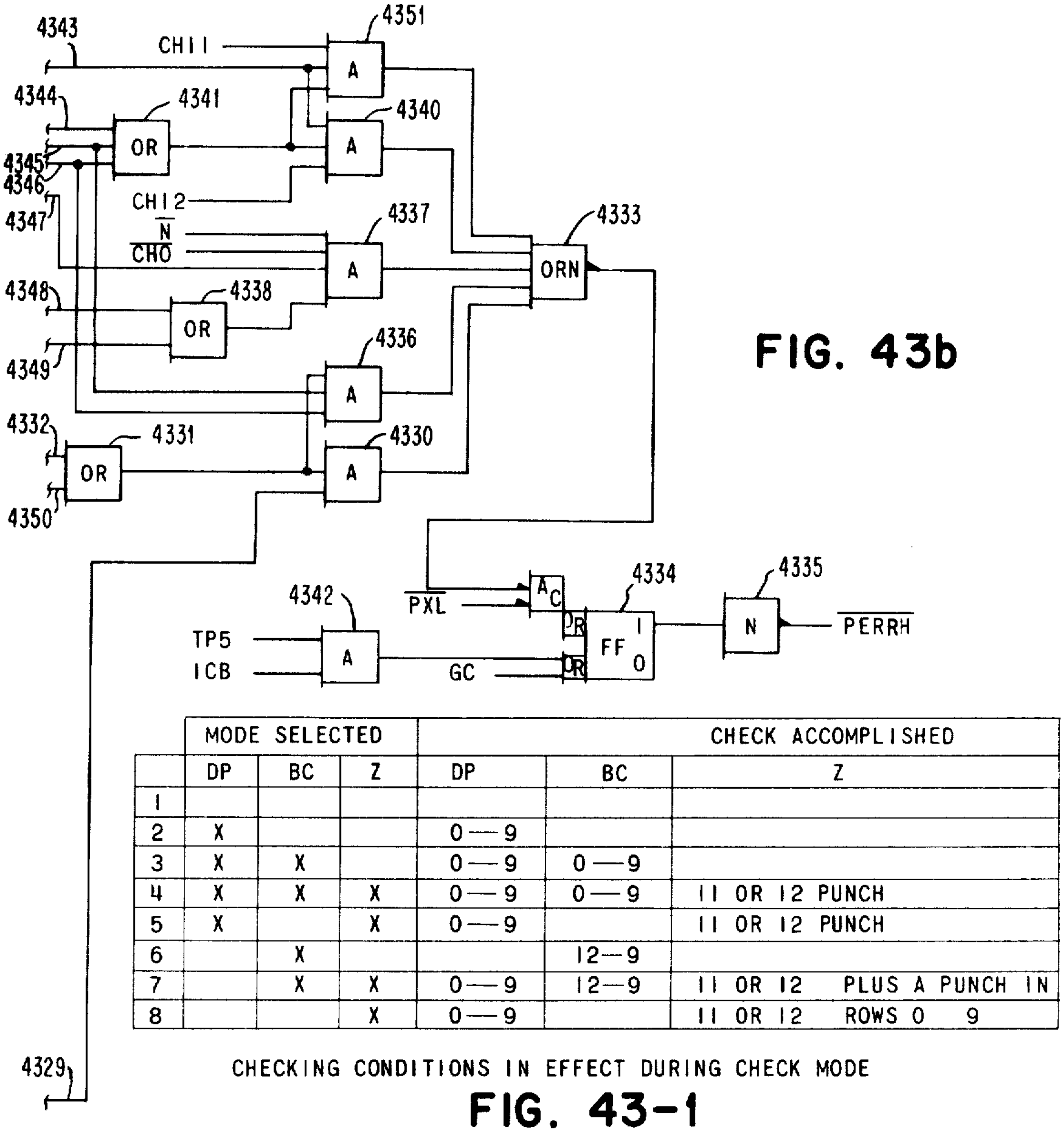

FIGS. 43*a* and 43*b* shows the logic circuits used in the blank column-double punch check circuits of the primary transport.

FIG. 43-1 shows the checking conditions in effect during the checking mode.

Figure 44A:
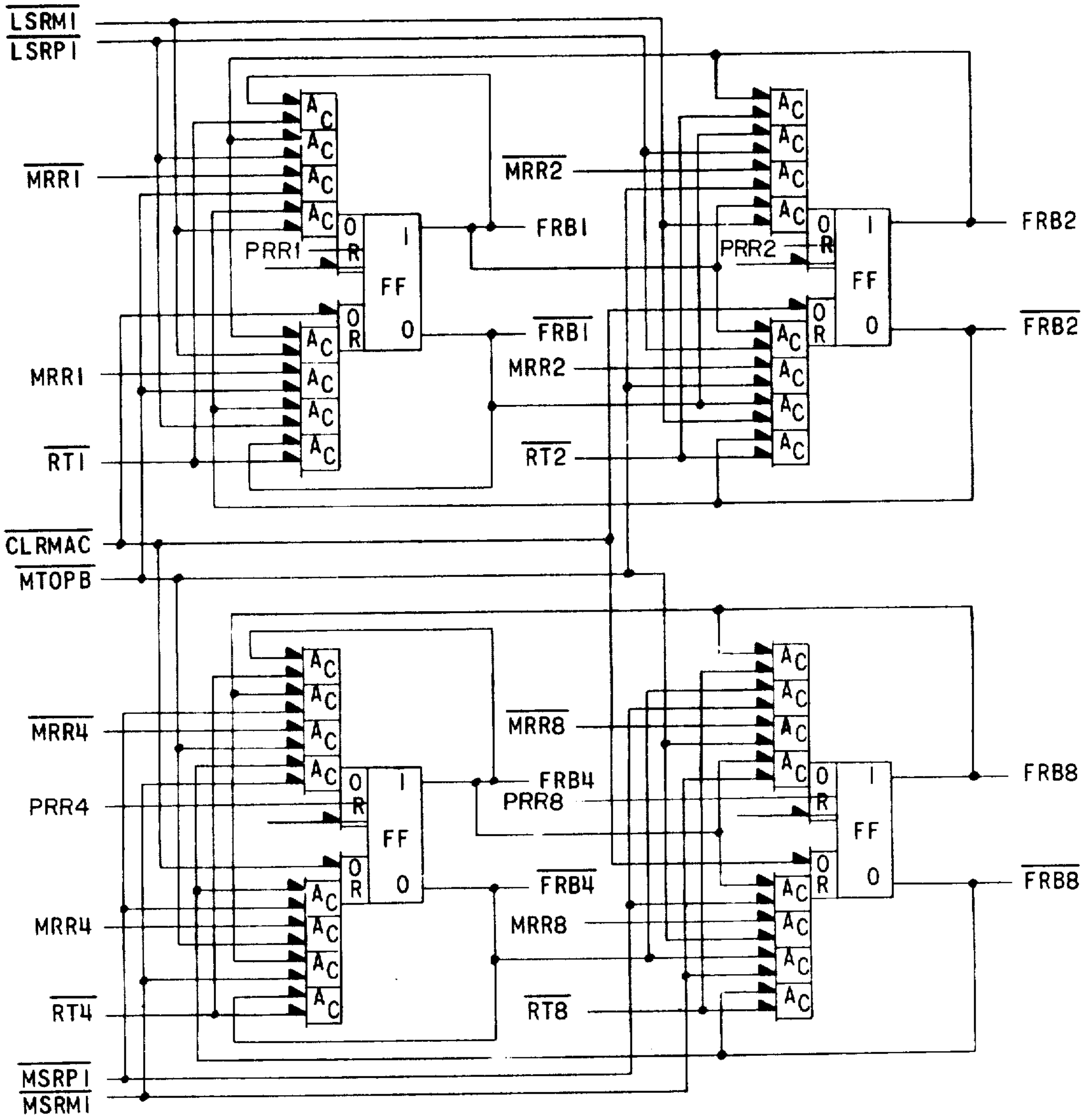
Figure 44B:
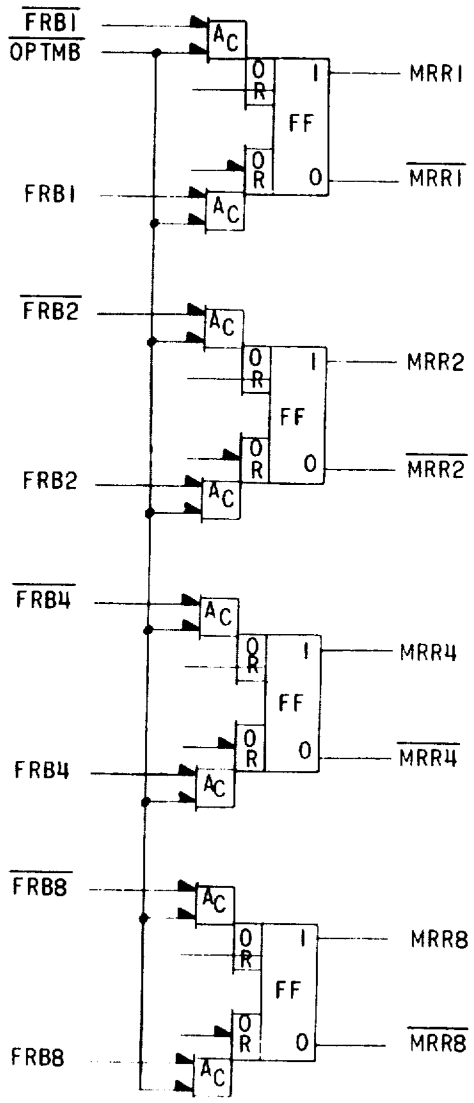

FIGS. 44*a* and 44*b* shows the logic circuits for the row field counter and address register.

Figure 45A:
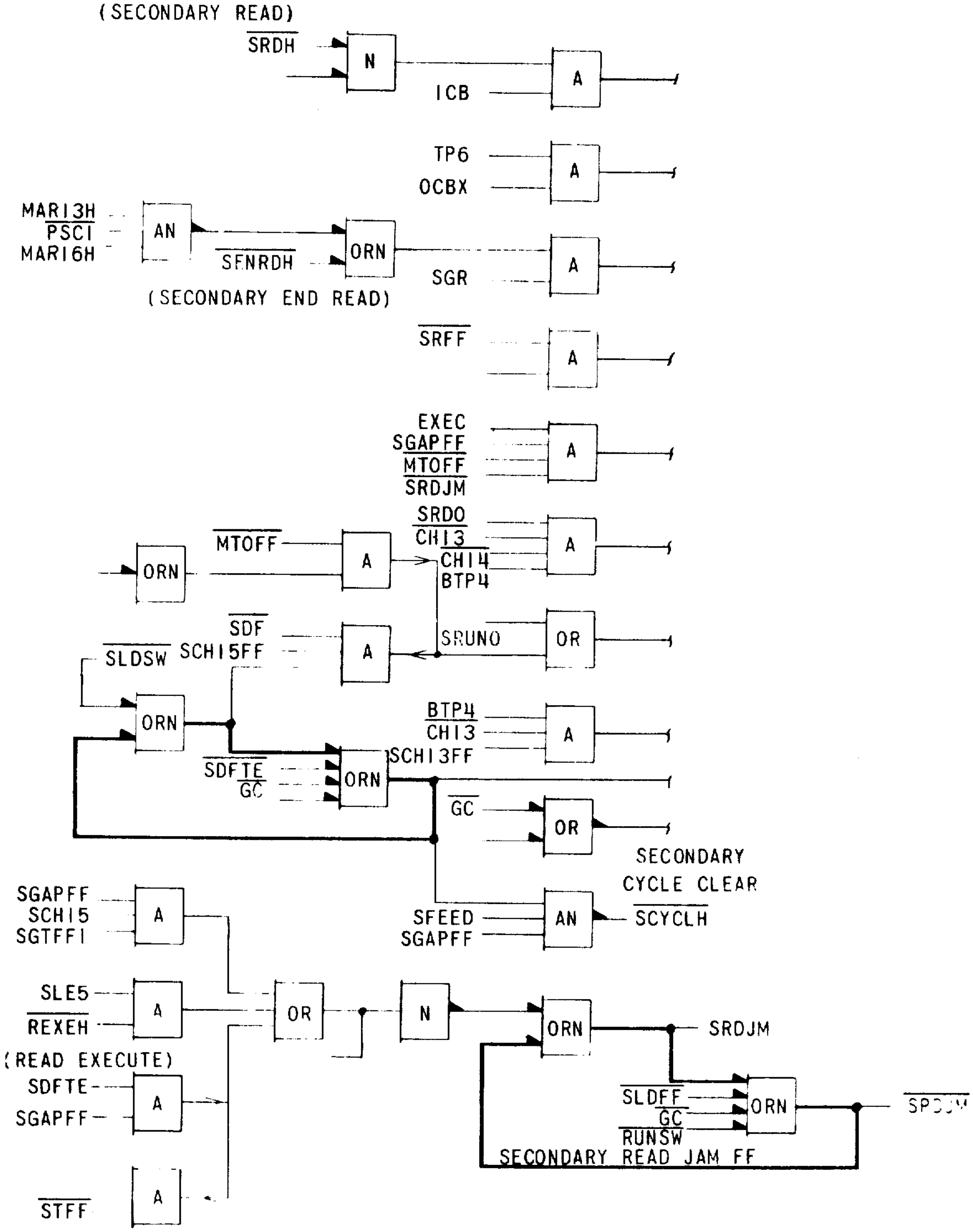
Figure 45B:
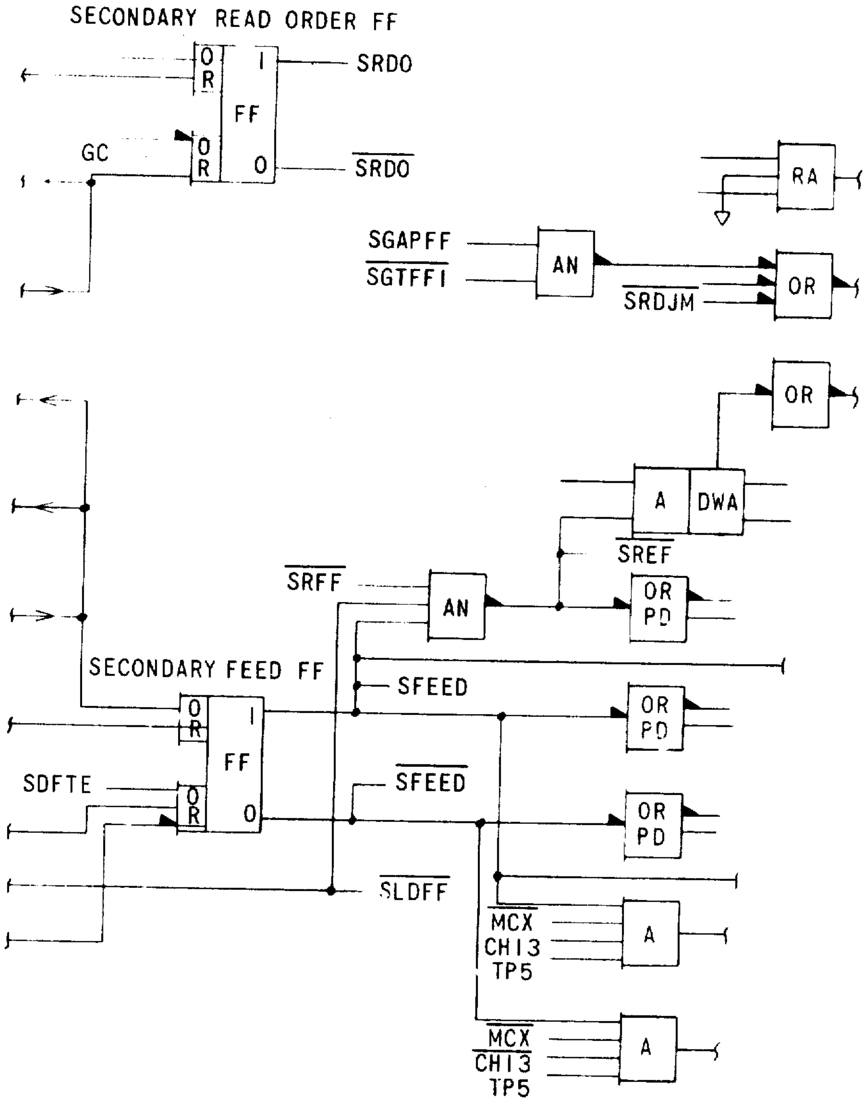
Figure 45C:
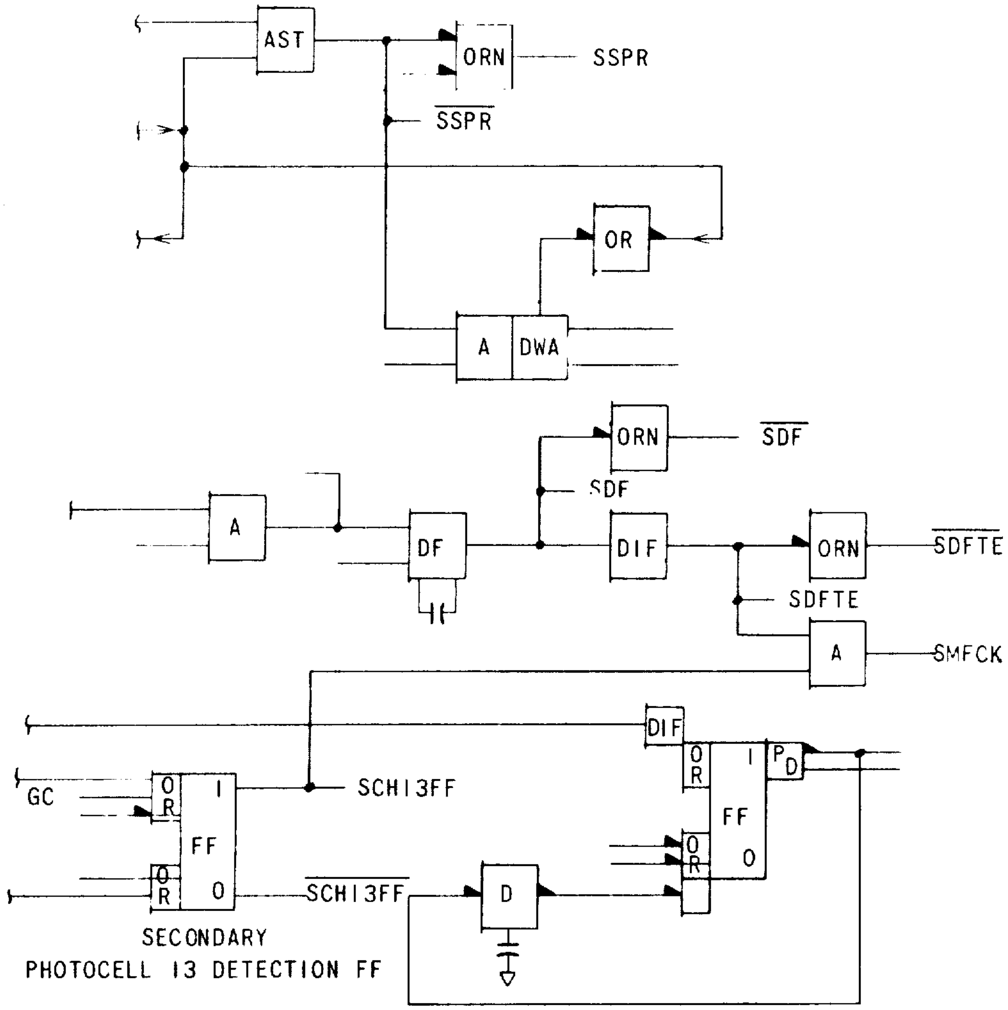

FIGS. 45*a*-45*c* shows the logic circuits that are used with the secondary reader control signals.

Figure 46A:
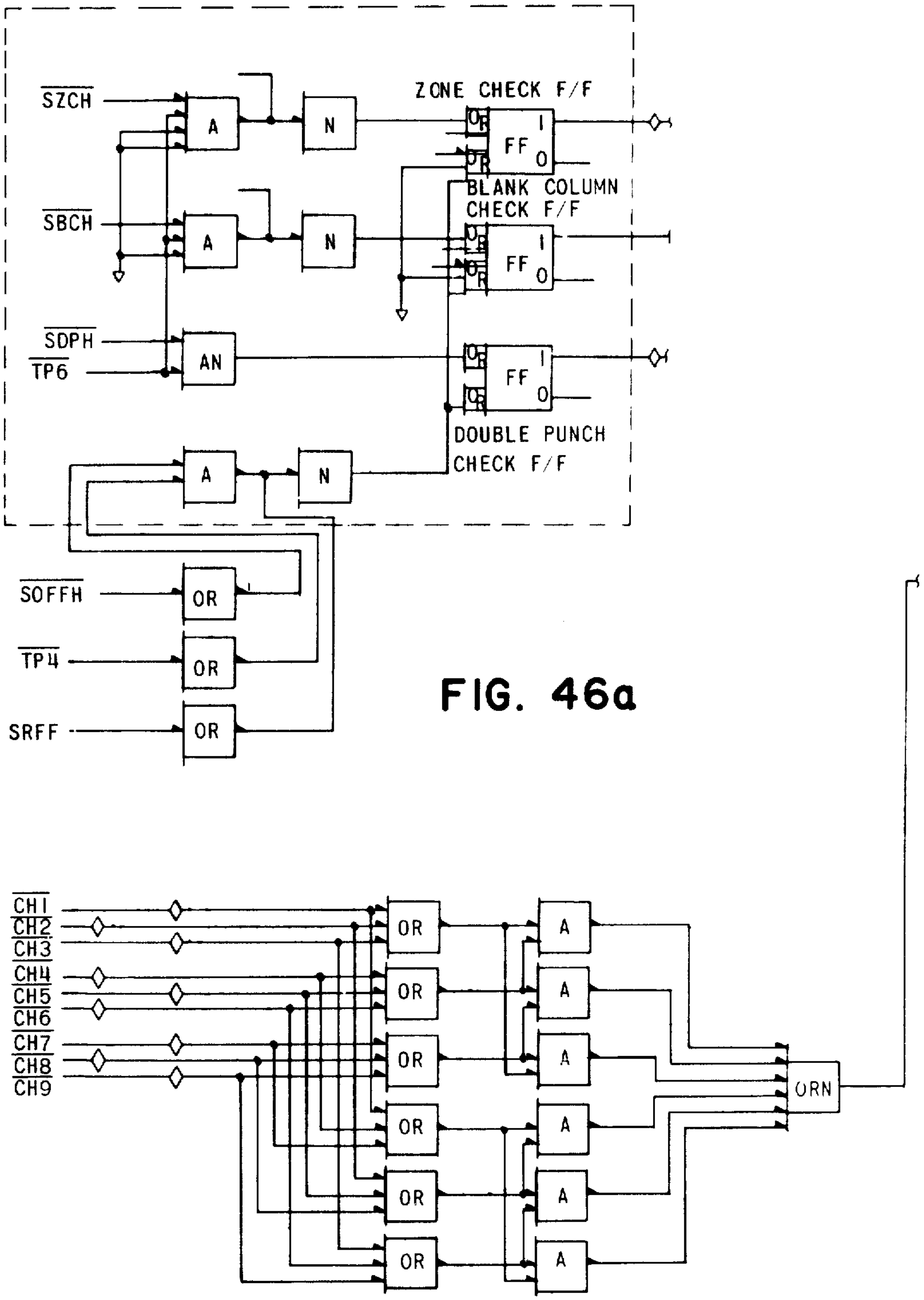
Figure 46B:
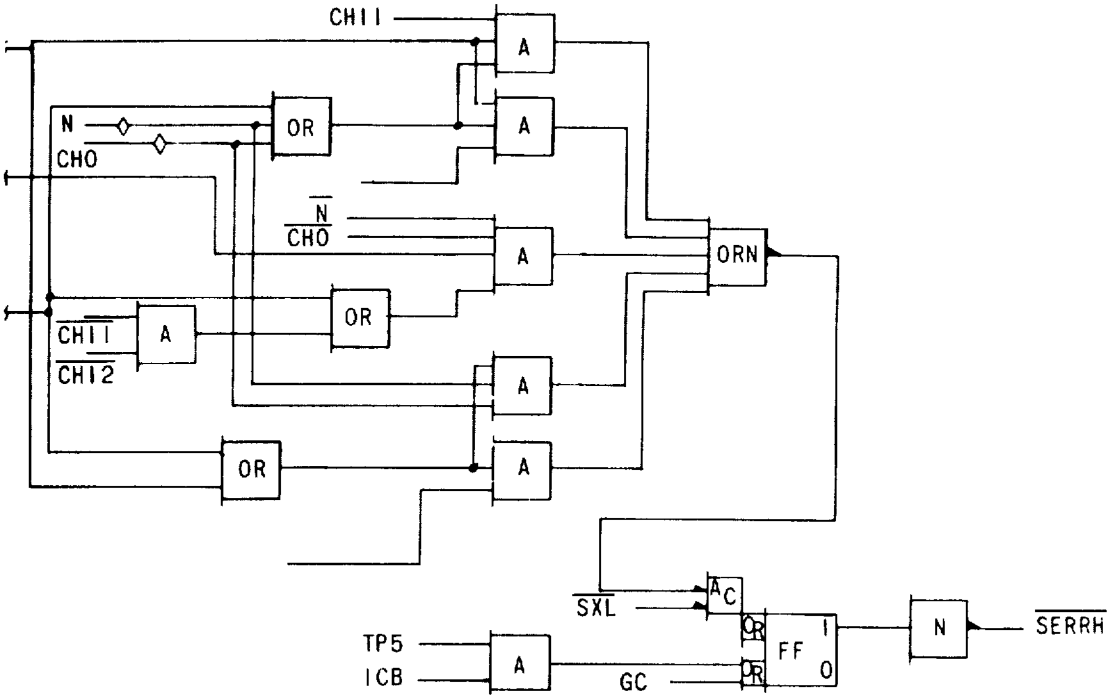

FIGS. 46*a* and 46*b* shows the logic circuits for the blank column double punch signals of the secondary transport.

Figure 47:
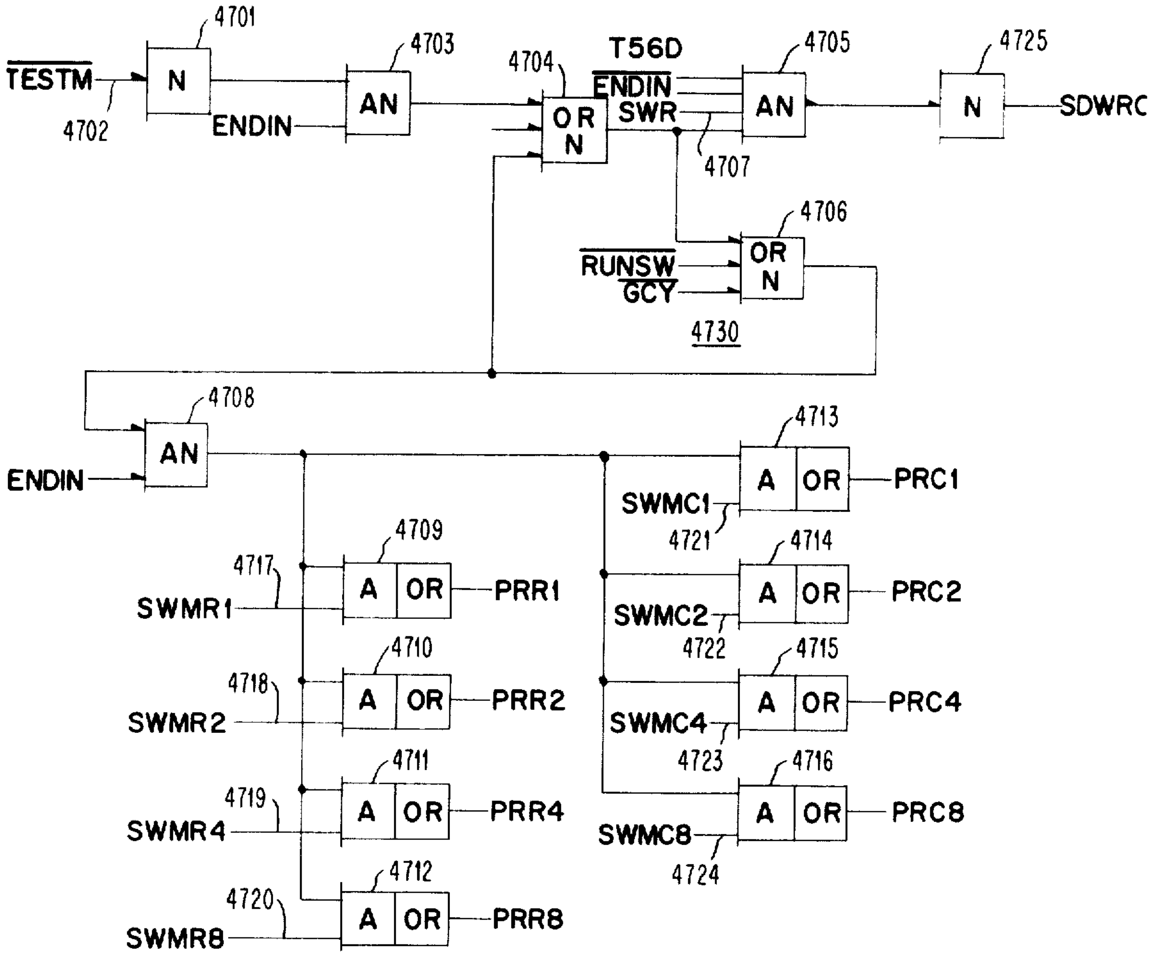

FIG. 47 shows the logic circuits necessary to provide the test signals.

FIGS. 48 through 51 shows various circuits in detail, which circuits are used throughout the system.

GENERAL OPERATION

The card controller of the present invention is capable of handling standard punch cards, that is, the normal 80 column, 12 row punch cards, as well as 51 column, 66 column, and 90 column cards. It should be understood that the present system could be readily adjusted to accommodate other length cards which are not the vogue at the present time, but which may be in use at a future time. The present card controller is the dual feed machine. There is a card transport means including a read station located at the right side of the machine, as well as a card transport means including a read station located at the left hand side of the machine. Cards are moved through the system by either card transport means or by both transport means simultaneously under control of a plugboard program. In accordance with the present description, as viewed from the front of the machine (see FIG. 1) the right hand side will be considered the primary feed, and the left hand side will be considered the secondary feed.

The present card controller has several card receiving pockets or stacker pockets. However, it should be understood that different number of stacking positions is possible. The middle stacker pocket is a common pocket which receives cards from both the primary and secondary feeds, and is used for all interfiling of the cards from both the primary and secondary feeds. The primary pockets, that is, the pockets to the right of the common pocket, are used for card selection of cards being fed from the primary feed hopper, while the stacker pockets to the left of the common pocket are used for card selection of cards coming from the secondary feed hopper.

Depending upon the operation to be accomplished, cards can be placed in both the primary and secondary magazines, and carried through the transport paths into the stacking positions. As the cards pass a reading station, the information on the cards can be read in response to a plugboard control means into the memory device of the card controller. In a preferred embodiment, the reading is accomplished optically, i.e., with a light system, one light position being available for each row position since the cards are read, at the reading stations, column by column. However, it should be understood that the other reading systems can be used, such as brush system, and still be within the spirit of the invention.

As the cards leave the reading station, they are transmitted to a waiting station. The waiting station holds two cards, each of which has been read and each of which is waiting to be transported to the stacker pockets. The information read from these two cards has been placed in the card controller memory. When the third card passes through the reading station the card which was first placed in the waiting station is removed. As will be more fully explained hereinafter, the consideration of information from three cards and the control of these three cards at one time enables the present card controller to accomplish a sequence check which has not been accomplished heretofore.

The cards are transported from the waiting station towards the common pocket; and if a decision has been made that the cards should be stacked into one of the other three pockets, which are located intermediate between the common pocket and the waiting station, the correct pocket deflector will be moved into the card transport path to route the card into the proper stacker pocket.

The cards are fed into a ready station from the card magazines with the row edge leading. In the ready station the transport system changes the mode of card movement, and moves the cards column edge first through the reading station towards the waiting station. When the cards arrive at the waiting station, they are in a stand-up position, i.e., with the column edge facing the floor upon which the card controller is resting. The cards are moved from the waiting station in this stand-up position, row edge first, towards the stackers.

During a collating operation, the system insures that the cards coming from each of the read stations do not arrive at the common pocket at the same time by providing that the cards in the primary feed waiting station are moved therefrom at a different time than the cards from the waiting station of the secondary feed.

During a sorting operation, (in accordance with a preferred embodiment), the cards are loaded into the primary feed hopper and a "first pass" button is pushed to start the cards through the first pass of the sorting operation. For the general description assume that the cards are being sorted according to information in one column and according to the numerals 0 to 9 along with the "rejects". The cards in the primary feed are transported into four of the stacker pockets, the common pocket and the primary pockets, and are broken down into four groups. The "zeros" are directed into the common pocket, the "ones", "twos", and "threes" are directed together into the first next right-hand-most pocket; the "-fours", "fives", and "sixes" are directed into the second next right-hand-most pocket; and the "sevens", "eights", and "-nines" and "rejects" are directed into the last right-hand-most pocket.

As the cards are being sorted into the primary feed pockets the one, two, and three cards which are being stacked in the first right-hand-most pocket from the common pocket are taken therefrom and placed into the secondary feed hopper from whence they are transported into the secondary feed pockets and respectively separated into three secondary pockets by the denominations, one, two, and three. Hence, after completion of a first pass, the cards will have been separated into three, two, one, and zero as well as into two other groups. The two other groups have, as mentioned before, fours, five, and sixes in one group, and sevens, eights, nines, and "rejects" in the other group. The operator will remove the zeros, ones, twos, and threes from the common pocket and the secondary pockets. Next he will load the secondary feed with the group containing fours, fives, and sixes and load the primary feed with the group having sevens, eights, nines, and "rejects". The "second pass" button is pushed and the cards in both feeds are sorted whereby the cards in the primary feed (which is arranged to feed four stacker pockets) are respectively separated into seven, eight, nine, and "reject"; while the cards in the secondary feed, (which is feeding only three pockets), are respectively separated to four, five, and six. At the end of the second pass, the cards are completely sorted, zero to nine, as well as "rejects". The system is actually able to accomplish field sorts and alphanumeric sorts, the details of which will be appreciated from studying the embodiment of this specification.

As mentioned earlier, this system is controlled by a plugboard program. The system has a plugboard, some of the features of which will be discussed hereinafter. In addition, the system has a memory unit and an arithmetic unit, as well as logic circuitry to accomplish editing.

In accordance with the electrical circuitry of this system, when the machine is in operation the cards passing through the read station have the information read therefrom transmitted to a specific location in the card controller memory. Thereafter, the information in the card controller memory can be designated as Operand 1 or Operand 2 in order to accomplish many data processing steps.

When a collating operation is in effect, Operand 1 can be the information read from cards in the primary feed, while Operand 2 can be information read from the secondary feed, and by proper plugboard wiring the system is able to make a field or individual digit comparison between two bits of information. Closely related to this comparison is the feature which enables the system to insert information. The information insertion enables the system to perform a table look-up or to extract a particular card from a deck of cards, by examining the prescribed information on each card and matching it against some information which has been inserted into a particular memory location. In a very similar manner, the sorting operation compares the information in a card with information stored in the memory to select particular stackers.

In accordance with the operation of other logic circuitry, the present system is able to perform editing routines; that is, actually insert symbols or information into particular memory locations as the operands are transferred from one memory location to another. As part of the general discussion, it should be noted that the present system can perform an arithmetic operation to the extent that it can add or subtract the operands which enables many operations to be performed; for instance, sub totals can be provided to be checked against a tabulation of a data processor which might be taking place in conjunction with the information read in from the card controller. Having gotten some indication of the general operation of the present system, consider now its operation in detail by studying first the mechanical features of the present device. Throughout the discussion to follow, related to the circuitry the first numeral of an identification numeral will signify on what Figure the element can be found. However in the discussion of the mechanical aspects, where the same element appears in more than one Figure the same numeral will be used and the first numeral will relate to the Figure whereat the element is first introduced.

GENERAL MECHANICAL OPERATION

Consider FIG. 1 which shows a pictorial view of the card controller. In FIG. 1 the primary feed hopper 111 can be seen on the right hand side of the machine and the secondary feed hopper 113 can be seen on the left hand side of the machine. In the center of the machine there can be seen seven stackers 115, 117, 119, 121, 123, 125 and 127. The stacker pocket 121 is the common pocket into which cards from the primary feed 111 and the secondary feed 113 are interfiled. The stackers 123, 125 and 127 are the primary stackers and accept cards from the primary feed hopper 111. The stackers 115, 117, and 119 are secondary stackers and accept cards from the secondary feed hopper 113.

Located above the stacker positions is a console device 129. The console device 129 provides a number of mechanical counters, monitor lights and control buttons which enable the operator to perform various operations such as pressing the "-pass one" button for a first sorting operation as described before, and subsequently pushing the "pass two" button for the second half of the sorting operation as also described earlier. In the front portion of the machine, the plugboard cover 131 can be seen. The plugboard is wired to accomplish any of a number of particular programs, and is inserted on the other side of the cover device 131 into a plugboard holder. Plugboard holders and the terminal array into which the plugboard meshes are devices which are well known in the art and therefore no detailed description of either of these devices will be included herewith.

Figure 2:
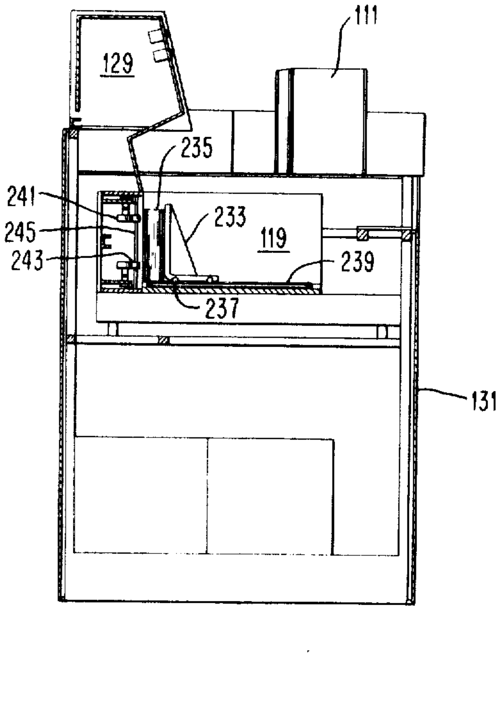
FIG. 2 is a sectional view of the machine cut along the lines 2—2 of FIG. 1.

Consider now FIG. 2 which is a side sectional view of FIG. 1 cut along the lines 2—2. In FIG. 2 we see the console 129, the primary hopper 111, and the stacker pocket 119, all of which have the same identification numbers as in FIG. 1. In addition the front cover 131 is depicted which is also shown in in FIG. 1.

In the stacker pocket 119 there is depicted a stacker detent device 233 and the cards 235 are shown pushing the detent device rearwardly as they are stacked in the stacker position. The detent device 233 is held on wheels 237 and is further mounted to span nylon belt 239 which keeps cards from coming in heavy frictional contact with the bed to whence they are directed. As the cards are directed into the stacker pocket 119, the detent 233 is of such frictionless nature that the cards are able to move the detent back and slide along the Nylon belt themselves in response to the kinetic energy of the card being transported into the stacker.

Also shown in FIG. 2 are a pair of idler wheels 241 which are spring loaded and which are frictionally driven by the drive wheels 243. The drive wheels 243 are mounted on the shaft 245 which is belt driven when the transport mechanism is in operation.

Figure 3:
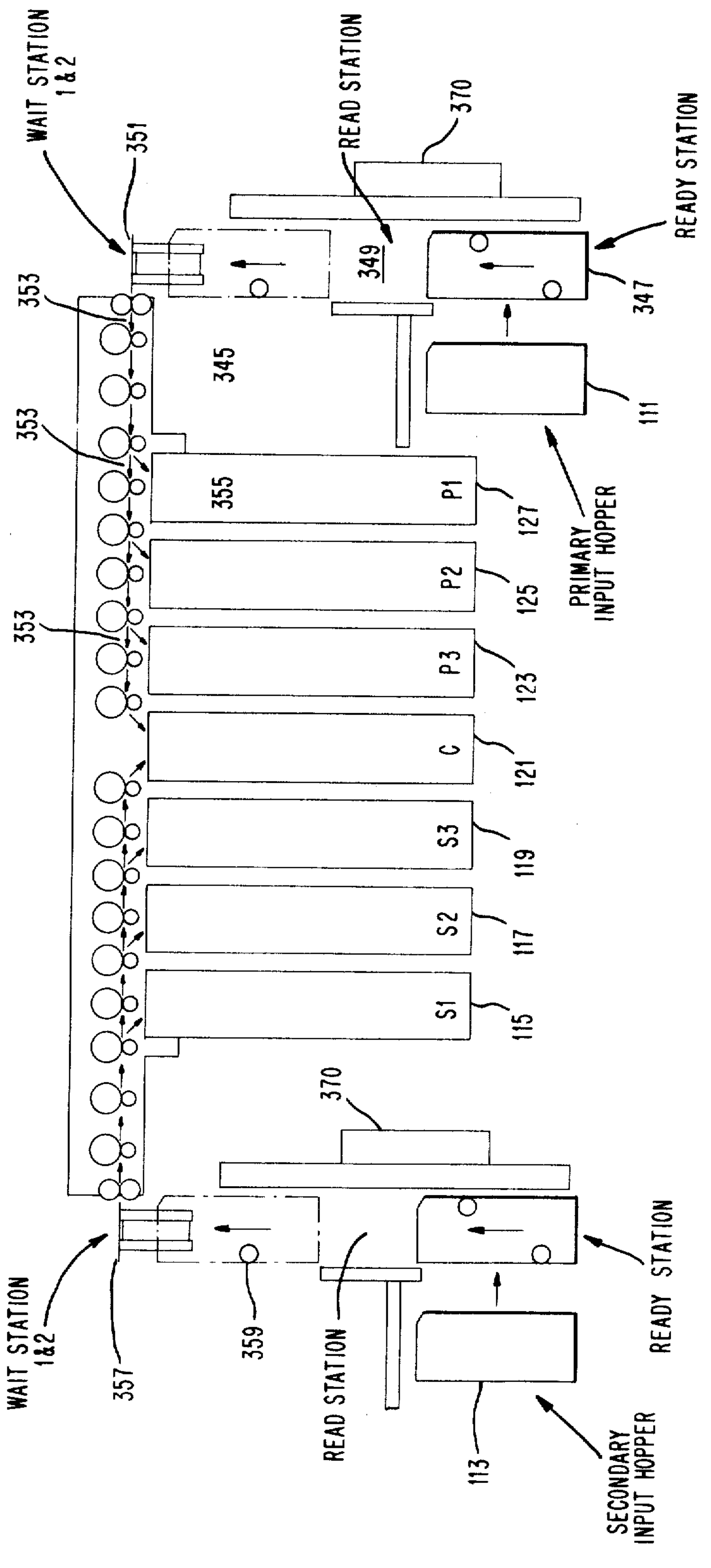
FIG. 3 is a schematic of the machine as viewed from the top to show the card transport operation.

Consider now FIG. 3 which is a schematic top view of the card controller. In FIG. 3 there can be seen the primary hopper position 111 and the secondary hopper position 113. When cards in the primary hopper are to be read, they are transported from the primary hopper into the ready station 347. The cards are transported from the primary hopper with the row edge first, and are held at the ready station prior to their being transported past the read station with the column edge leading.

After the card is located in the ready station 347, it is transported past the read station 349 into the wait station 351. As will be explained in more detail hereinafter the wait station 351 has two positions which alternately accept cards from the read station. When the wait station is holding two cards and a third card passes the read station, the information is in the three cards, i.e., both of the cards in the wait station and the card passing the read station may be compared. The card which has been first delivered to the wait station is then moved into the transport path 353 and depending upon the decision made after such a comparison, the card is directed into the proper stacker. The card is moved along the transport path 353 toward the common pocket 121. If the decision of the comparison is such that the card should be intercepted by the first pocket 127, a gate at location 355 will be opened to intercept the card as it travels along the transport path 353 to direct it into the stacker position 127. A similar interception operation takes place in order to direct a card into the pockets 125 and 123.

The mechanism on the secondary side of the machine operates in an identical fashion to the mechanism on the primary side of the machine, excepting that the signal to move the card out of the wait station 357 on the secondary side is generated in response to a signal at the jam detector 359 whereas the signal to move the card out of the wait station 351 on the primary side is generated at the read station 349. This differential in time enables the card from the primary to arrive at the common pocket 121 prior to a card arriving from the secondary, and therefore preventing a jamming situation at the common pocket 121. The insertion of the cards into the stacker pockets 115, 117, and 119 is identical to that described with respect to the stackers 123, 125, and 127.

Figure 4:
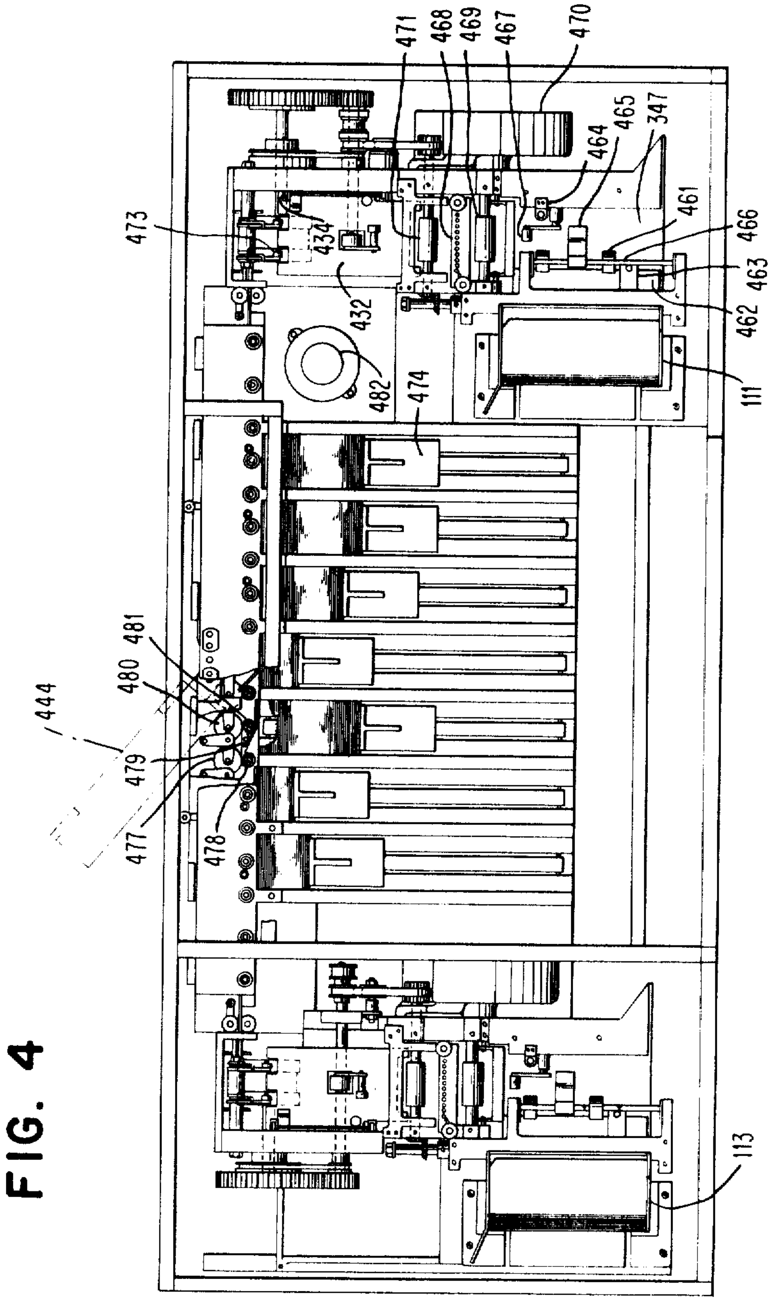
FIG. 4 is a pictorial sectional of FIG. 1 cut along the lines 4—4.

Consider now FIG. 4 which is a sectional view of FIG. 1 cut along the lines 4—4 and shows in some detail the mechanism depicted by the schematic of FIG. 3. In FIG. 4 there are shown the primary hopper 111 and the secondary hopper 113. When a card is moved from the primary hopper 111 into the ready station 347 it is initially pushed by a picker knife which is not shown in the drawing of FIG. 4, but which is so well known that its description need not be set forth herewith.

The picker knife moves the card in sufficiently far that the rollers 461 engage the card and move it into the ready station 347. Before the card is engaged by the rollers 461 it is transported up a ramp 462 which has a flat edge as shown and which enables the card to be snapped up into a horizontal position thereby allowing a second card from the hopper to start up the ramp before the first card has been completely removed therefrom.

In the ready station 347 as can be seen from FIG. 4 there are two photocell arrangements, the light receiving device of each being depicted in FIG. 4. The first photocell 463, which also is identified as Channel 13 and which will have more significance when we discuss the logic circuits, is located somewhat near the rearward end of the ready station. The second photocell device 464, which is also identified as Channel 14, is located in the forward portion of the ready station and as will be understood or better appreciated hereinafter. These two photocell positions are responsible for controlling the generation of certain timing signals.

Also shown in FIG. 4 is a spring device 465 which is connected to an upper shaft 466 to hold the card in position as it is transported into the ready station 347. On the secondary side the upper shaft has been broken to show the roller which lies underneath.

When there is a read operation underway, the pinch roller assembly 467 will be activated to close down on the drive roller underneath and move the card out of the ready station toward the read station 468. In between the pinch roller 467 and the read station 468 is an additional drive roller 469 which moves the card through the read station. As can be seen, in the read station 468 there are photocells located. There are 12 such photocells although only 11 photocells are shown in the drawing, because the twelfth is located under the end holding piece. The photocells read the card as it is transported through the read station and further detect the leading edge of the card which provides the initial pulse to generate certain timing signals. Parallel to the transport and housed in close proximity thereto is a magnetic drum 470. The magnetic drum 470 has a read head and two write heads, an initial write head and a regular write head. When the leading edge of the card is detected the initial write head writes a sprocketing signal on the drum and subsequently the read head reads that sprocketing signal and causes the write head to write a sprocketing signal, etc., to provide a sprocketing signal for each time that a column of the card passes under the reading station. The timing signals and a further consideration of the sprocketing signals will be discussed hereinafter.

The cards are transported from the read station by the roller 471 and are engaged further by a pinch roller 472 and finally are picked up by the idler rollers 473 in conjunction with the turnaround rollers (FIG. 6) at the waiting station. Pinch roller 472 is included to take care of a shortened card, for instance, a 56-column card. The gear chain arrangement which is employed to drive the various rollers, just mentioned, is shown on the right-hand side of the transport path and is coupled through to the left-hand side beyond the read station. The belts which are connected to this gear chain to drive the gear chain are well known and the showing thereof and the description thereof would only serve to further complicate the drawing. In view of the fact that such a belt drive is well known it is not described in the present specification.

The card is engaged by the turnaround rollers and the idlers 473 which move the card to a stand-up position that is, with its column edge being parallel to the floor on which the machine is resting and its row edge standing perpendicular to the floor. The card is eventually "kicked out" of the waiting station into a series of roller mechanisms which move the card into any of the stackers 127 and 121.

In the stacker devices the detents, for instance, detent 474 are mounted over a Nylon belt, such as Nylon belt 475. In addition, as was seen in FIG. 2, the detents travel on small wheels which ride on the track locations, such as the tracks 476.

In FIG. 4 there is a drawing breakaway around the rearward end of pocket 119 which enables us to examine the structure thereat to gain some insight into the mechanical operation. If a card were traveling along the secondary path toward the pocket 121 it would travel between the idler roller 477 and the drive roller 478. The idler roller 477 is spring-loaded to be held against the drive roller 478. If the card were to be deflected into the stacker pocket 119 the deflector device 479 would be partially rotated in a clockwise fashion by a solenoid not shown to move in front of the card, and thereby route the card into the stacker position 119, as it leaves the rollers 477 and 478. If the card were to go beyond the stacker 119 the deflector device 479 would be held straight as shown and the card would pass on the rearward side of the deflector device being engaged eventually by the rollers 480 and 481. The center stacker device has a fixed deflector mechanism which is shaped somewhat like a V and one arm of which is shown in FIG. 4. Hence, the cards from either the secondary or the primary may be routed into the stacker pocket 121.

On the primary side the motor 482 is shown and it is the motor which is belt-connected to drive each of the driver rollers on the back path such as rollers 478 or 481. The belt arrangement is not shown because such an arrangement is very well known and the further description and depiction thereof would only serve to unnecessarily complicate the specification and the drawing.

Let us now look at FIGS. 5 and 6 which represent a rearward view of the machine whose top view is shown in FIG. 4. A card passing through the turnaround station is further guided and moved along by the turnaround idler rollers 583 which are held by the springs 584 against the master turnaround rollers 585. The master turnaround rollers 585 are rollers which are formed from a wheel-like member having a large groove in the center, as will be better seen in FIG. 6.

The card passes behind the bar 587 and between the backplate 588 and the guides **589*a*. The springs 590 and 590*a* hold the cards in place. The column edge of the card is driven to the kinetic energy absorber 591 whereat its kinetic energy is absorbed by a foam rubber cushion which will be better seen in FIGS. 6 and 7. The kinetic energy absorber assembly 591 as shown in FIG. 5 is set for an 80-column card and if a card of a shorter number of columns is used the kinetic energy absorber is raised by moving the shaft 592 upwardly which cams the detent 593 out of the groove 594 and when the groove 695 (FIG. 6) is at a position where the detent 593 can drop into this second groove, the shock absorber will be located to receive a shorter card. Also shown in FIG. 5 is the solenoid 596 which when energized rotates the shaft 597. The shaft 597 has picker arms 722 secured thereto which are not seen in FIG. 5, but which can be seen in FIG. 7, and these picker arms move the card out of the waiting station to be transported by the roller device 598 and all of the rollers such as 599 and their associated drive rollers (not seen in FIG. 5 but seen in FIG. 4) toward the stacker pockets. The spring loading of the idler rollers such as 599 can be readily seen in FIG. 5**.

FIG. 6 is a side sectional of FIG. 5 cut along the lines 6—6. In FIG. 6 the upper turnaround idler 673 and the lower turnaround idler wheel 583 are shown in frictional contact with the master turnaround wheels 585. The groove between the master turnaround wheels is shown by the edge 610 to give some indication of the depth of the groove. The back plate 588 which was discussed in FIG. 5 is shown separating the two positions in the wait station. It will be noted that there is the detent spring 590 on the front side and **590*a*** on the rear side.

When a card is transported over the turnaround wheels the deflector 612 is moved to the right or to the left to guide a card respectively into the left-hand wait station pocket 614 or into the right-hand wait station pocket 616. The deflector as will become more apparent in the electrical portion of the discussion is continually moved right and left so that every other card is respectively moved into the pocket 616 and the pocket 614.

As the card travels to a wait station pocket, it is held against the plate 588 behind the guide 589 and by the springs 590 and **590*a*. The card travels down until it hits the kinetic energy cushion 618 which is a cushion of foam rubber to absorb the energy of the card without allowing the card to be damaged. The springs 590 and 590*a*** keep the card from bouncing back up into the upper edges of the pocket and hold it secure at its base position.

The kinetic energy absorber can be raised or lowered by the leverage of the handle 620. When the handle 620 is pushed in a downward direction the shaft 592 is raised upward to cause the detent 593 (FIG. 5) to be cammed out of position and to allow the notch 695 to be held in position when it comes into a location opposite the detent 593. Although there are two notches shown for two positions of the cards obviously many notches could be cut into the shaft to allow the shock absorber to be located in a number of positions depending upon the particular size of the card which is being used.

FIG. 7 shows a sectional view of FIG. 5 cut along the lines 7—7 and in particular shows the arrangement of the picker fingers. The picker fingers 722 are secured to the shafts 597 and **597*a*. When the shaft 597 is rotated by its solenoid 596, the picker fingers move inwardly as shown (away from the reader) and cause the card to move out of the waiting station to a position where the rollers of the transport path can grip the card and carry it forward. In a similar manner when the solenoid 596*a* is energized the shaft 597*a* rotates to move its associated picker fingers into the paper to move the card in the inner pocket 614 into the roller mechanisms of the stacker transport. The kinetic energy absorber 618 is also shown in FIG. 7. FIG. 7*a* shows the top view of picker-knives 722 as they are mounted on the shaft 597A**.

FIG. 8 shows an additional sectional view of FIG. 5 cut along the lines 8—8, and in particular shows the operation of the flipper device 612 which is shown in phantom in FIG. 8. It will be noted in FIG. 8, that when the magnet 824 is energized the armature 826 moves in a clock-wise rotation toward the relay armature and because of its connection to the shaft 827 upon which shaft the flipper device is also connected the flipper device 612 moves to the right. When the relay device 824 is deenergized the spring 830 holds the armature 826 back against its screw detent 822 and hence relocates the flipper device 612 into a position which is slightly below the edge of the master roller 585 so that when a card is transported over the master roller it is moved into the counter pocket 616 (FIG. 6).

As mentioned earlier in the general description a system of this type which handles the cards at very high speeds must take into consideration the possibilities of card jams. In this particular device, as depicted in FIG. 4, the rollers 471 and 469 are both spring-loaded and are easily lifted from their normal positions to allow a card to be extracted therefrom if a card should happen to be in a jam position in these locations. The plate 432 is hinged at the hinge location 434 so that in the event there is a jam in the card transport beyond the read station and beyond the roller 471 the plate 432 can simply be lifted to the right side allowing the operator to remove the card jam readily. It becomes apparent from FIG. 5 a card jam in the wait station can be readily removed because there is nothing between the card and the plate 588, excepting the guides 589 and the guides do not cover a very large surface of the card. Once the card has been transported into the stacker rollers such as 599 and jam should occur a jam is removed by pulling the handle 536 outwardly from the rear of the machine (outwardly toward the read) which in turn allows the locking bar 538 to be spring driven out of its holder 540. There is a similar locking bar on the lower side identified as 538*a*. As the handle 536 is rotated counterclockwise, a sliding bar with a plurality of ears 546 thereon is cammed to the left to move the idler wheels out of engagement with the drive wheels. The entire mechanism then on the right-hand side of the machine as viewed from the back will pull out and swing around the hinge position 542.

FIG. 5*a* shows in detail the locking mechanism for detenting the idler rollers when the transport mechanism is opened to remove a jam. As can be seen in FIG. 5*a*, when the handle 536 is opened, (i.e., pulled upward in the view of FIG. 5a), the cam 539 is rotated in a clockwise direction so that the locking pin 538 moves to the left, thereby unlocking the frame which holds the idler rollers. At the same time the stud 541 is moved to the left and since the stud 541 is integral with the slide member 543, (which has the cam 546 thereon), the slide member 543 moved to the left. The ears 546 of course are moved to the left as part of the slide member and the movement of the ears cams the idler rollers out of position to remove the spring tension thereby enabling the roller assembly to be returned to its running position with ease.

This operation can be seen somewhat in FIG. 4 where in phantom there is shown the movement of the idler wheel assembly 444 from its normal position. The movement of the idler wheel assembly out of its normal position allows the operator to have all of the drive wheels exposed and of course the path through which the cards travel is exposed to remove any jams. Ordinarily to replace the idler wheel mechanisms into place would means that each of the idler wheels would have to be cammed out by the drive wheels against their spring load and therefore force would have to be exerted by the operator in order to replace this idler wheel assembly. However, in the present mechanism, when the handle 536 is moved in a counter-clockwise direction originally the idler wheels are cammed outwardly from their normal position thereby increasing the spring loading but removing the force which would be necessary to put them back into position. When the handle 536 is moved in a clockwise direction or into the paper as viewed in FIG. 5 the idler wheels are relieved of this extraordinary spring loading situation and are allowed to return to their normal position. In this manner the effort which the operator would normally have to put forth is eliminated.

ELECTRONIC OPERATION

The electronic operation of the present invention is governed by a number of fundamental time period signals. The mnemonic abbreviations and purposes of these fundamental time period signals should be reviewed before the logic circuitry, which generates these signals and with which these signals are used, is discussed.

The present system has a clock pulse generator which generates eight fundamental timing T pulses identified as T0 through T7. Each T timing signal, T0, T1, . . . T7 lasts for 1.5 microseconds, in the preferred embodiment. The second half of each of the fundamental T timing signals is designated as a TP signal, i.e., TP0, TP1, TP2, etc. Accordingly, a TP signal has a duration of 0.75 seconds. A graphic display of these signals is shown in FIG. 9-1.

The T timing signals are generated (as will be seen) from a combination of gate signals which are produced by a four stage flip-flop chain. The four stage flip-flop chain is driven by a free running oscillator. The pulses which are produced directly by the free running oscillator are the $\overline{\text{TOG}}$, TOG, and $\overline{\text{TOGD}}$ pulses which designate, respectively, the not toggle signal, toggle signal, and not toggle signal delayed. Each of these toggle signals has a 0.75 microsecond duration.

The $\overline{\text{TOGD}}$ signal which occurs every other 0.75 microsecond period is connected to advance the four stage flip-flop chain. The output signals from the four stage flip-flop chain are designated as TA, TB, TC, and TD, each of these last-mentioned signals has a duration of 6 microseconds, and when properly combined together with one another, in some predetermined fashion, serve to provide a basis for generating fundamental timing signals of 1.5 microseconds. As was stated earlier, these 1.5 microsecond T timing pulses are considered the fundamental timing pulses of the system.

In addition the system generates and uses four timing period signals identified as OCA, OCB, ICA, ICB. OCA signifies the operand cycle during period A, and OCB signifies the operand cycle during period B. OCA and OCB signals each last for a period of 12 microseconds, that is, from T0 through T7. OCA is considered as generated first and is followed by an OCB signal. The manipulation of the various operands in the system is handled during OCA and OCB times. These two time periods will be regenerated in series as often as is necessary to accomplish any particular operation.

ICA and ICB, respectively, identify instruction cycle during period A and instruction cycle during period B. The IC time periods also each last for 12 microseconds, i.e., for the period T0 through T7. ICB follows ICA and normally only two instruction cycles are generated to start the system operating in a particular instruction.

The separation of the OC signals and the IC signals into A and B designations, i.e., OC<u>A</u> and OC<u>B</u>, is determined by two other fundamental time period signals, namely, MC and $\overline{\text{MC}}$. MC and $\overline{\text{MC}}$, respectively, represent memory cycle A and a memory cycle B. The MC signal duration is for 12 microseconds and it is a control signal in the generation of OCA and ICA signals whereas the $\overline{\text{MC}}$ signal, which also lasts for 12 microseconds, is a control signal in the generation of the OCB and ICB signals.

From the combination of the foregoing signals various other timing signals are produced and the various logic circuits are controlled. The utility and important significance of the foregoing timing signals will be better understood from the following discussion of the logic circuits of the system. In the discussion of the logic system and in reference to the logic diagrams it should be noted that a flagged line is considered as identifying a high signal and an unflagged line is considered as a low signal. The terms "high" and "low" are used because the voltage values of the signals are relatively high and low as opposed to positive and negative (above and below ground reference). The specifics of representative circuitry for the logic blocks will be included in the appendix. As in the description of any large system there appears to be no ideal place to start the description, hence very often the reader will have to accept that certain signals or conditions exist before they have been fully explained.

Consider now FIGS. 9*a* and 9*b* which are schematic block diagrams of the generating circuits for some of the clock or timing pulses. Since some circuits lie in both FIGS. 9 *a* and 9*b* we shall refer to both Figures as FIG. 9.

In the upper left-hand portion of FIG. 9 there is depicted in oscillator 911, which in the preferred embodiment, is a free running oscillator generating a 667 k. c. signal. Obviously, other types of oscillators with other frequency generation values could be used. The signals are fed from oscillator 911 into an inverter OR gate 912 which provides a high output signal in response to a low input signal. A high output signal from the OR inverter 912 is transmitted to a second OR inverter 913. Connected to the line between the OR inverter 912 and the OR inverter 913 is an output lead which provides a driver pulse signal $\overline{\text{TOG}}$.

The output from the OR inverter 913 is a negative signal which is transmitted to a third OR inverter 914 and connected on the line between the OR inverters 913 and 914. It is an output lead which provides the second driver signal TOG. The OR inverter 914 provides a high output signal in response to a low input signal and this high output signal provides the driver signal $\overline{\text{TOGD}}$. As previously mentioned, $\overline{\text{TOGD}}$ drives a four stage flip-flop chain. Connected to the $\overline{\text{TOGD}}$ line is an output line which is coupled to each stage of a train of four flip-flops, respectively, labeled A, B, C, and D.

As will be seen, and as previously discussed, the output from the flip-flops A, B, C, and D provide gating signals which are combined together to provide individual timing pulses. Each of the flip-flops in the chain A, B, C, and D is considered an a. c. flip-flop, i.e., having an AND gate input *a* and being capacitance coupled *c*. As can be seen in FIG. 9, both the reset side and the set side have two inputs thereto which are indicated by their flags (closed arrowheads) as being high inputs. Each of the flip-flops operates such that it is transferred to the side which has two high input signals applied thereto. Consider for the moment that the signal on line 915 is high, i.e., assume there is no high signal to the inverter 916. Further, accept that each of the flip-flops A, B, C and D has been transferred to its ONE side by an operation which will be explained more in detail hereinafter.

Under the conditions just set forth as a high signal appears on line 915 along with a high $\overline{\text{TOGD}}$ signal, the flip-flop 917 will be transferred to its ZERO side, thereby providing a low signal on line 918 and a high signal on line 919. The high signal on line 919 conditions the flip-flop 920 to be transferred to its ZERO side in response to the next high $\overline{\text{TOGD}}$ signal.

In a similar manner, the transferring of the flip-flop 920 to its ZERO side provides a high signal on line 921, and a low signal on line 922. The high signal on line 921 conditions the flip-flop 923 to be transferred to its ZERO side in response to the third high $\overline{\text{TOGD}}$ signal. Finally, the flip-flop 924 is transferred to its ZERO side in response to the fourth high $\overline{\text{TOGD}}$ signal. It will be noted that output lines are connected from these various flip-flops, which provide signals TA, $\overline{\text{TA}}$, TB, $\overline{\text{TB}}$, TC, $\overline{\text{TC}}$, TD, and $\overline{\text{TD}}$. These last-mentioned signals are gate signals which are combined to provide the T signals and TP signals as will be subsequently described.

For the moment, consider FIG. 9-1, which shows the timing arrangement of the signals TA, $\overline{\text{TA}}$, TB, $\overline{\text{TB}}$, TC, $\overline{\text{TC}}$, TD and $\overline{\text{TD}}$. It will be appreciated from FIG. 9-1 that each time a signal $\overline{\text{TOGD}}$ appears, one of the gate signals TA, TB, TC, or TD begins, and continues in effect for four full cycles. A full cycle is considered to include both TOG and $\overline{\text{TOG}}$.

Using FIG. 9-1 as an aid, examine the left-hand side of FIG. 9 whereat there are shown the circuits which generate the timing pulses by combining the gate signals TA, TB, TC, TD and TOG, as well as their barred signals.

Since the generation of the TP signals are all identical excepting for the time at which they are generated, the details of the generation of the signal TPO will be described and the circuitry configuration related to generating the remainder of the TP signals will simply be shown. Connected to the AND gate 925 are three inputs, one of which comes from the TA terminal 940, one of which comes from the $\overline{\text{TB}}$ terminal 941, and one of which comes from the $\overline{\text{TOG}}$ terminal 942. The AND gate 925 is a low AND gate which provides a high output signal in response to the presence of three low signals. The output signal from the AND gate 925 provides the $\overline{\text{TPO}}$ signal and is further connected to the OR inverter 926. The output from the OR inverter 926 provides the low signal TPO. If we consider for the moment the timing chart of FIG. 9-1, it can be seen that the only time period in which a TA signal, a $\overline{\text{TB}}$ signal, and a $\overline{\text{TOG}}$ signal are low simultaneously is in Column 3. At the head of Column 3, it can be seen that the designation is TPO. As mentioned above, the generation of the remainder of the TP signals is identical, and such generation will not be described. It will be noted in the chart of FIG. 9-1 that the TP signal constitutes the second half of each T signal, TPO is the second half of TO.

Also, on the left-hand portion of FIG. 9 there is circuitry shown to generate the timing signals T0, $\overline{\text{T3}}$, T5, $\overline{\text{T5}}$, T6, and $\overline{\text{T6}}$, and the generation of these signals can be easily understood by considering the inputs and at the same time considering the timing chart of FIG. 9-1. Therefore, no description of the generation of these last-mentioned signals will be given.

The output of the OR inverter 927 which becomes TP7 (line 945) is connected to two AND gates 928 and 929. The other inputs to these respective AND gates 928 and 929 include OCA, and OCB, and the output of these respective AND gates are $\overline{\text{ATP7}}$ and $\overline{\text{BTP7}}$. As was mentioned earlier, in connection with the control function of the MC and $\overline{\text{MC}}$ signals, when a signal is found in the description to be labeled TP followed by a number and preceded by the letters A or B, it should be understood that this means that it is simply a TP signal which occurs during either the A or B time. Therefore, ATP7 means that it is a TP7 signal which occurs during MC time (for instance, during an OCA time). The generation of the ATP4 and BTP4 signals, respectively, from the OR inverter 930 and 931 is identical (with the exception of time) to the generation of the ATP7 signal, and BTP7 signal just described.

However, the signal BTP4 is transmitted further to an OR gate 932, and the operation of the circuitry associated with OR gate 932 warrants further discussion. The combination of the OR gate 932, the inverter 933, the OR gate 934 and the AND gate 935, connected as shown by the heavy line, represents a flip-flop. A low signal input on any of the leads into the OR gate 932 provides a low output to the inverter 933, which in turn provides a high signal output into the OR inverter 934. A high signal input to the OR inverter 934 in turn provides a low signal output back to the AND gate 935. For all times, excepting $\overline{\text{TP6}}$ time the signal on lead 936 will be low, and therefore (excepting at $\overline{\text{TP6}}$ time) a low signal transmitted from the OR inverter 934 will provide a low output on the line 937. It follows then that the OR gate 932 is properly conditioned to provide a turn-on signal around the loop back to the AND gate 935 at TP4 time, and the output signal from line 937 will continue at a d.c. level until TP6 time. Hence, there is an output signal provided at the line 938, which output signal is labeled $\overline{\text{T45D}}$. $\overline{\text{T45D}}$ means the signal which commences at TP4 time and ends at TP5 time, thus lasting for 2¼ microseconds. At the same time there is offered a data test signal on the line 939.

Two similar flip-flop circuits are shown in FIG. 9 to generate the signals T56D and $\overline{\text{T56D}}$, as well as T1D and $\overline{\text{T1D}}$. Since these flip-flops operate in the same fashion as the flip-flop described in connection with the generation of this signal $\overline{\text{T45D}}$ there appears to be no further explanation necessary.

The remaining clock signals ATP2, $\overline{\text{ATP2}}$, $\overline{\text{AT2}}$, $\overline{\text{BTP6}}$, $\overline{\text{BT6}}$, and BT56D are signals which are generated in response to the application of OCA and OCB signals. It will be recalled that the OCA and OCB signals refer to operand cycle A and operand cycle B and their generation and role in this logic will be more fully appreciated hereinafter.

Consider now FIGS. 10*a*, 10*b* and 10*c* which are logical diagrams of the circuits which generate additional timing control signals. FIGS. 10*a*, 10*b* and 10*c* should be considered together and will be referred to as FIG. 10. When an operator runs the machine clear button is depressed first, the load button is depressed second, the start button is depressed third and the run button last. In the lower section of FIG. 10, there is shown the start flip-flop. On the left-hand side of this start flip-flop there is shown a start button line 1001 which is connected to an OR inverter 1002. The output of the OR inverter 1002 is a low signal which is transmitted as an input to the OR inverter 1003. Since the OR gate 1003 is a high OR gate and is a low AND gate all of the input signals must be low to provide a high out-put signal on line 1004. The high output signal is transmitted via line 1004 as an input to the OR gate 1002. Hence, once the start switch has been depressed a high signal will be transmitted to the OR gate 1002 and there will be provided a high signal on the $\overline{\text{STARTH}}$ line 1005 (start hub) since the general clear button has earlier been depressed thereby permitting $\overline{\text{CG}}$ to be low (as will be explained shortly), and since there is provided a low signal on the $\overline{\text{ICB}}$ line 1006. As will become apparent in the discussion to follow, the start signal from the start hub line 1005 is used to effect a number of logic conditions.

As has just been mentioned the first switch to be depressed by the operator would be the general clear switch (GC switch which is found in the middle section of FIG. 10c). The depression of the general clear switch will provide a high signal on the $\overline{CLRSW}$ line 1007a, and a low signal on the CLRSW line 1007b. The high signal on the $\overline{CLRSW}$ line 1007a serves as an input to the high OR inverter 1008, which in turn provides a low output signal and hence a low input signal to the high OR inverter 1009. The two low input signals to the high OR inverter 1009 provides a high output signal therefrom which is returned via the line 1010 to the high OR inverter 1008, thereby keeping the general clear signal flip-flop turned on and providing a low output signal on the GC line 1011, and a high $\overline{GC}$ signal on the output line 1012. When the operator releases the clear switch line 1007a becomes low and the clear switch line 1007b will provide a high signal to the high OR inverter 1009, thereby providing a low signal to the OR inverter 1008. Since both input signals to OR inverter 1008 are low the output becomes high thereby turning off the general clear (GC) signal on line 1011. A normal depression of the general clear switch provides the GC and $\overline{GC}$ signals for a long enough period of time to reset the components throughout the system.

As indicated above the fourth switch to be pushed will be the run switch whose input line 1013a can be found on the left hand side of FIG. 10a. When the run switch (RUNSW) is depressed there will be high signal on the $\overline{RUNSW}$ line 1013, which will transfer the flip-flop 1014 to its ZERO side. The output from the ZERO side of flip-flop 1014 is a low signal which is transmitted to the differentiator 1015. While the run switch is depressed, there is no output from the differentiator 1015 since this differentiation circuit responds to a positive signal shift. However, when the run switch is released the flip-flop 1014 will be transferred to its ONE side, and the output from the ZERO side provides a positive change of voltage level. The positive voltage shift causes the differentiation circuit 1015 to provide a high output pulse therefrom which is transmitted to the inverter 1016. The high pulse to the inverter 1016 provides a low output pulse (line 1091) to transfer the asynchronous stop flip-flop 1017 to its ZERO side.

The flip-flop 1017 is labeled, asynchronous stop flip-flop and its utility will become more apparent hereinafter; but, for the moment, consider only that it has been transferred to its ZERO side, and is providing a first low signal to the AND gate 1018 in FIG. 10b. Now further assume for the moment that there are no program delay instructions ($\overline{PDEXEH}$ and $\overline{PDSETH}$ are both low) present, and therefore as will become apparent hereinafter the output from the low AND inverter circuit 1019 in FIG. 10b will be a low signal to provide a second low input signal to the AND gate 1018. At TP2 time of the A period (MCX) the third and fourth low signals are applied to the AND gate 1018 to fully condition this AND gate, thereby providing a low output signal to transfer the flip-flop 1020 to its ZERO side. It will be recalled that the TP2 signal is repeatedly generated and is therefore continually, although intermittently, present when the machine is turned on.

The flip-flop 1020 is the stop flip-flop and provides both a STFF signal and a $\overline{STFF}$ signal. With the stop flip-flop 1020 transferred to its ZERO side, there is provided therefrom a low signal at the $\overline{STFF}$ terminal 1021. The utility of the stop flip-flop signals STFF and $\overline{STFF}$ will become apparent hereinafter.

Let us examine now the logic for generating the MC and MC signals which is found in the upper left-hand portion of FIG. 10a. It will be recalled that the MC and $\overline{MC}$ signals determine the A and B periods for signals such as OCA and OCB. When the general clear signal is generated (general clear button depressed), it will be recalled that there is a high signal on the $\overline{GC}$ line 1012. The high $\overline{GC}$ signal is applied on line 1023 to transfer the memory cycle flip-flop 1024 to its ONE side. The output signal from the ONE side of the memory cycle flip-flop 1024 is a low signal which is fed back to the upper AND gate input 1025 of the flip-flop 1024. The output signal from the ZERO side of the flip-flop 1024 is a high signal which is fed back to the lower AND gate input 1026. During the first timing pulse cycle, after the stop flip-flop 1020 has been transferred to its ZERO side, (thereby providing a low $\overline{STFF}$ signal), there is applied to the AND gate 1027 three low signals, TAD, $\overline{TB}$, and $\overline{STFF}$. The last-mentioned low signals render the AND gate 1027 fully conditioned to provide a high output signal therefrom which is transmitted to the AND gate inputs 1025 and 1026 of flip-flop 1024. The presence of the two high signals at the lower AND gate input 1026 transfers the memory cycle flip-flop 1024 to its ZERO side, and with this transfer the other AND gate input 1025 becomes partially conditioned to be responsive to the next high signal from the AND gate 1027. Hence, with the presence of a TAD pulse, a $\overline{STFF}$ pulse and $\overline{TB}$ pulse, which occurs repeatedly at T0 time, the memory cycle flip-flop will be transferred, or toggled, back and forth providing alternately MC and $\overline{MC}$ signals from the terminals as shown.

The MC signal is applied to, (among other components), the AND gate 1028, along with an instruction signal (INST) whose generation will be described immediately hereinafter. Assume for the moment that there is an instruction present and hence an INST signal being generated. The presence of a low INST (instruction) signal and a low MC signal fully conditions the AND inverter 1028 to provide a high signal therefrom. The high signal from the AND inverter 1028 is used directly as $\overline{ICA}$ (instruction cycle during A time). The high signal is further transmitted to the OR inverter 1029 whose output is the ICA (instruction cycle A) gate signal. In a similar manner, an MCX signal, which when high, in combination with a high STFF signal fully conditions the AND gate 1030 to produce a low input signal to the AND gate 10105. The AND gate 10106 has the inputs TA, $\overline{TB}$ and TOG, (which from FIG. 9-1 can be seen to define the first half of a T0 pulse), and these signals when low generate a high signal to inhibit the AND gate 10105. When the AND GATE 10105 is not inhibited (i.e., after the first half of a T0 pulse and at $\overline{MCX}$ time) and an INST signal is applied thereto, a high signal is generated therefrom which is applied to the OR inverter 1031. The output signal from the OR inverter 1031 is the gating signal ICB, or instruction cycle during B time.

The low MC signal in combination with a low $\overline{INST}$ signal when applied to the AND inverter 1032 provides a high output signal which is transmitted to the inverter 1033, and to the OR inverter 1034. The inverter 1033 provides a low output signal labeled OCA which identifies Operand Cycle A. While the OR inverter 1034 provides an identical output signal OCAX, which stands for Operand Cycle A also. The reason that the two OCA signals are generated is simply for power or drive considerations. The timing is obviously the same.

Finally, the low $\overline{MC}$ signal in combination with the low $\overline{INST}$ signal when applied to the AND inverter 1035 provides a high output signal therefrom which is transmitted to the OR inverter 1036 and to the inverter 1037. The OR inverter 1036 and the inverter 1037 respectively generate an OCB signal and an OCBX signal which stand for Operand Cycle B, and as discussed earlier, there are two signals, OCB and OCBX, generated for power considerations.

As was mentioned above, the generation of the INST and $\overline{INST}$ signals will be considered. The instruction flip-flop 1039 can be found in the upper section of FIG. 10c. The inputs to the instruction flip-flop 1039 for the most part come from the end instruction flip-flop 1040, and therefore let us examine the operation of the circuits connected from this last-mentioned flip flop to the instruction flip-flop 1039. When the general clear signal (GC) is generated, and the low GC signal is applied on the line 1041 the end instruction flip-flop 1040 is transferred to its ONE side. It should be noted that the GC signal also transfers the instruction flip-flop 1039 to its ONE side. The output from the ONE side of the end instruction flip-flop 1040 is low, and this signal is transmitted to the AND inverter 1042. The first TAD signal (TA signal delayed) after the general clear signal will provide a second low signal to the AND inverter 1042, thereby fully conditioning this AND gate to provide a high output signal therefrom. The high output signal from the AND inverter 1042 is applied to the output terminal of the ZERO side of the instruction flip-flop 1039. Considering for the moment that the instruction flip-flop 1039 is similar to the general clear flip-flop (previously described) it can be readily understood that a high signal applied to line 1061 would cause the instruction flip flop to be turned on or transferred to its ONE side, thereby providing a low output signal on INST line 1044. It should also be pointed out at this time that when the end instruction flip-flop has been transferred to its ONE side, there is an ENDIN (end instruction) signal at the line 1045 as shown. Now, before considering how the end instruction flip-flop 1040 is transferred from its ONE side to its ZERO side, let us consider some of the other inputs (in addition to the GC signal) to the end instruction flip-flop 1040 which will cause this flip-flop to be transferred to its ONE side.

In the upper portion of FIG. 10b it will be seen that there are three input lines labeled PRDO, REXE, and SRDO. PRDO and SRDO, respectively, represent primary read order and secondary read order. The line REXE represents read execute. As will be appreciated by the discussion of the operation of the plugboard, when the present card controller reads information from a card it is instructed by a primary read order or a secondary read order, but it will not actually commence to execute the read orders until a read execute signal is also generated. When a primary read order signal and a read execute signal are present, the AND gate 1046 is fully conditioned to provide a high signal therefrom to the AND inverter 1047, and in a similar manner, when a secondary read order and a read execute order are both present a high signal from the AND inverter 1048 also is transmitted to the AND gate 1047. However, it becomes apparent that the AND gate 1047 responds to low signals, and therefore in order to transmit an output signal from the AND gate 1047 to the end instruction flip-flop 1040, neither of the AND inverters 1046 nor 1048 should be fully conditioned. It will follow then that if there is a primary read order and a secondary read order in combination with a read execute being performed we will not have a signal to transfer the end instruction flip-flop 1040 to its ONE side. When a reading operation has stopped, so that there will be no read orders and so that the primary read flip-flop and the secondary read flip-flop both provide low signals ($\overline{PRFF}$ and $\overline{SRFF}$) to the AND gate 1047, there will be transmitted therefrom a low signal to transfer the end instruction flip-flop 1040 to its ONE side. It should be recalled that when the end instruction flip-flop is transferred to its ONE side, the low signal therefrom (with a TAD signal present) transfers the instruction flip-flop to its ONE side and thus produces an INST signal. Hence, when there is no read order in effect, there can be an INST signal generated.

Consider for the moment the role that the AND gates 1050, 1051, and 1052 play in the generation of an INST signal. The inputs to these gates will become more meaningful as the discussion progresses, but, for the moment, accept the premise that EC signals are generated low when a comparison of the operands give some predetermined result. In other words, EC signals are low until either the Operand 1 address or the Operand 2 address is equal to the address register with which it is being compared. The operand addresses are compared during an operand cycle (OCA or OCB) and when the proper comparison is found, the system will want to go through an instruction cycle for a new instruction. Hence, when either $\overline{1EC}$ or $\overline{2EC}$ goes high thereby indicating that a valid comparison has been made, it is desirable to generate an instruction signal. As long as the Operand 1 address or Operand 2 address is not equal with the address register, the AND gates 1050, 1051, or 1052 could (depending upon other conditions) generate a low output signal. The other condition would be whether or not a combined operand address plug hub was wired. If the operator should want to end the operation only when both 1EC and 2EC are generated, then $\overline{COTH}$ plug hub would be wired. If, on the other hand, the operation were to terminate when either 1EC or 2EC was generated, then $\overline{COTH}$ plug hub would not be wired.

Consider how the INST signal is kept from being generated in response to the lack of an EC signal being generated. A low output signal (meaning that there is no EC signal generated) from any of these last-mentioned AND gates would be transmitted to the AND gate 1053, and through the inverter 1054 to provide a high input signal to inhibit the AND gate 1055. As long as there is a high signal applied on line 1056 to the AND gate 1055, the presence of the low signals on the OCB line and the TP5 line will not render the AND gate 1055 fully conditioned. If the AND gate 1055 is not fully conditioned there will be no output signal therefrom to transfer the end instruction flip-flop 1040 to its ONE side. Since normally the system would be functioning in an operand cycle (OCA or OCB) while the operands were being manipulated, and before the time that they would become equal, it follows that the system would not want to produce an instruction signal. When the operand addresses do provide an equal condition, i.e., 1EC or 2EC is generated, the AND gates 1050, 1051, and 1052 all produce high signals which produce a high signal from AND gate 1053. A high signal input to the inverter 1054 produces a low signal therefrom which is transmitted to the AND gate 1055. At the next TP5 time and OCB time thereafter, a low output signal from the AND gate 1055 and from the AND gate 1047 transfers the end instruction flip-flop 1040 to its ONE side which at TO time, as explained before, transfers the INST flip-flop 1039 to its ONE side to produce an INST signal.

We have examined above how the instruction cycle is commenced, consider now how it is terminated. As will become apparent later on, this system normally goes through two instruction cycles, i.e., ICA and ICB, and then proceeds through an indefinite or variable number of operand cycles OCA and OCB depending upon the problem which is being undertaken. We have previously discussed the fact that the second half of the instruction time (ICB) is generated in response to a high MC signal so that at $\overline{MC}$ time, ($\overline{MC}$ being low) during an instruction the present system is experiencing the last half of the instruction period. As can be seen in FIG. 10b, the AND gate 1057 generates an output signal to transfer the flip-flop 1040 to its ZERO side, when there is applied thereto an instruction signal, a $\overline{MC}$ signal and a TP5 signal. The philosophy behind the application of these input signals is that when the instruction is in the ICB portion thereof, that is the last portion of the instruction period, the TP5 signal during that time will cause the AND gate 1057 to be fully conditioned to transfer the end instruction flip-flop to its ZERO side thereby providing a low output signal on the $\overline{ENDIN}$ line 1059. The low output signal from the ZERO side of the end instruction flip-flop 1040 is transmitted to the AND gate 1060 to be transmitted therefrom to transfer the instruction flip-flop 1039 to its ZERO side at TO time. The output from the ZERO side of the instruction flip-flop 1039 is a low signal at the terminal 1061, indicating a "no instruction condition".

Before leaving the logic circuitry which is related to the instruction flip-flop 1039, let us study the input to the inverter 1062. The input to the inverter 1062 is from the AND gates 1047 and 1055 whose output signals were low when there was no reading operation taking place and the operand ending address was detected. The inverter 1062 will have a high output signal ($\overline{SETC}$) in response to a low input signal from the AND gate 1047. The output signal $\overline{SETC}$ when high will set the change timing pulse flip-flop and its utility will become apparent hereinafter.

On the extreme right-hand side of the instruction flip-flop outputs there can be found an initial character flip-flop 1063. The initial character signal is used to inhibit the address register from being incremented, until after the initial character has been processed. During the first OCA time it becomes necessary to inhibit the increment pulse for the initial character until after that information has been transmitted into or out of the initial memory location.

When the instruction flip-flop 1039 has been transferred to its ONE side, a low signal is transmitted to the initial character flip-flop 1063 to transfer it to its ONE side and provide an initial character signal on output signal line 1064. The initial character flipcflop 1063 is transferred to its ZERO side, in response to an output signal from the AND gate 1065. The input signals to the AND gate 1065 include a TPO signal, and an OCB signal. The philosophy for this gate is that during Operand Cycle B (OCB), at TPO time the AND gate 1065 will be fully conditioned to provide a low signal to transfer the initial character flip-flop to its ZERO side. As was mentioned above, the initial character flip-flop provides the two signals shown (INICH and $\overline{\text{INICH}}$) in order for the address register to be inhibited, i.e., prevented incrementing an address during the first OCA time but at the next OCA time the address register should be free to be incremented.

It seems fitting to examine at this point how the system can be stopped, which can be either by a manual switch or by a program signal. The input signals to stop the machine by either programming or by a manually operated switch can be found as inputs to either OR gate 1067 or OR gate 1073 in FIG. 10*a*. The program signal ($\overline{\text{HALTH}}$), which stops the machine, is transmitted on line 1068 while the step signal to step the machine is transmitted on line 1069. These input signals are high in their operative mode, and provide a high output signal from the OR gate 1067 to be transmitted to the inverter 1070. In a similar manner, the line 1072 from the manually-operated stop switch provides a high signal to the OR gate 1073 to provide a high input signal to the inverter 1070. The output signal from the inverter 1070 is a low signal which is transmitted to the AND gate 1074, which in conjunction with the low $\overline{\text{STFF}}$ signal (whose generation was described earlier) provides a low output signal to the OR gate 1075. The output signal from the OR gate 1075 is transmitted to transfer the asynchronous stop flip-flop 1017 from its ZERO side to its ONE side. It should be borne in mind that the input signals, either the program halt on line 1068, or the step mode on line 1069, or the stop switch on line 1072, are all generated for the purpose of halting the machine. When the asynchronous stop flip-flop 1017 is transferred from its ZERO side to its ONE side, there is a high signal transmitted from the ZERO side of the flip-flop which is transmitted to the AND gate 1018. At the same time, there is a high signal transmitted on line 1076 to the inverter 1077 to provide a low signal to the AND gate 1078. At the first TP1 time during an instruction cycle A, after any one of the halt signals has been transmitted, the AND gate 1078 will become fully conditioned to provide a low output signal therefrom to transfer the stop flip-flop 1020 to its ONE side. When the stop flip-flop 1020 transfers to its ONE side, there is generated a low STFF signal which indicates that the machine operation is to be stopped.

PRIMARY READER CONTROL

Consider now FIG. 11 which comprises FIGS. 11*a*, 11*b* and 11*c*, in order to appreciate the operation of the logical circuits which generate control signals associated with the primary reader.

In the left-hand section of FIG. 11*a*, there are depicted the lines from a two terminal switch, labeled PLDSW and $\overline{\text{PLDSW}}$ which is an abbreviation for primary load switch. When the cards have been loaded in the primary hopper, (primary feed 111 in FIG. 1), the operator depresses the primary load switch which provides a high signal on line 1101 to the OR inverter 1102. The output of the OR inverter 1102 is a low signal which is transmitted to the OR inverter 1103. If all input signals to the OR inverter 1103 are low (and we will assume that they are) a high output signal will be generated on line 1104 which is sent back to the OR inverter 1102. Hence, the OR inverter 1102 in combination with the OR inverter 1103 and connected as shown acts as a flip-flop, i.e., once it has been turned on it continues to operate as just described providing a low signal on line 1105 to the AND gate 1106, a high signal on line 1107 labeled $\overline{\text{PLDFF}}$ and a high signal to the AND gate 1108. We will deal with the operation of gate 1108 presently.

First consider the operation of the AND gate 1106 to which the primary load flip-flop is transmitting a low signal in response to the depression of a primary load switch. The other input signals to AND gate 1106 are $\overline{\text{PDF}}$ which is a primary delay flop signal and PCH13FF which is primary channel 13 signal. The primary channel 13 signal (PCH13FF) represents a photocell signal from the photocell 13 shown in FIG. 1. When the photocell 13 is not covered there will be a low signal transmitted on the line 1109 and while its operation will be better appreciated subsequently, accept for the moment that there is a low signal $\overline{\text{PDF}}$. Hence, the gate 1106 is fully conditioned when the operator depresses the primary load switch, but the AND gate 1106 is incapable of effectively passing its signal beyond the OR gate 1110 unless the AND gate 1111 is also fully conditioned.

The input signals of the AND gate 1111 include the $\overline{\text{MTOFF}}$ signal which is "not motor off", and in the operation of inserting cards into the reader, obviously the motor is turned on so that this particular signal is low. When the operator releases his finger so that the primary load switch returns to normal, there is a high signal transmitted on the other switch line 1112, PLDSW, which is transmitted to the OR inverter 1113. The low output signal from the OR inverter 1113 is transmitted to the AND gate 1111 to fully condition the AND gate 1111, and thus the fully conditioned AND gates 1111 and 1106 transmit a low signal through the OR gate 1110.

By way of complete explanation, it should be noted that the release of the primary load switch effects line 1101 but does not effect the primary load flip-flop. The low signal on line 1101 is ineffective and the primary load flip-flop still provides the signals as originally discussed.

Consider now OR gate 1110, which has been conditioned to provide a low output signal therefrom to the ONE side of the primary feed flip-flop 1114. The primary feed flip-flop 1114 was transferred to its ZERO side in response to a high barred general clear signal ($\overline{\text{GC}}$) applied to the OR gate 1115 whose high output was transmitted to the reset side of the flip-flop 1114 on line 1116. As just stated, the primary feed flip-flop is transferred to its ONE side in response to the low output signal from the OR gate 1110, and in turn provides a low output signal to six different components. In partial summary then, the depression of the primary load switch sets the primary feed flip-flop 1114.

The low output signal from the ONE side of the primary feed flip-flop 1114 is transmitted to the AND gate 1108 but has no effect on this AND gate because it will be recalled that there is applied thereto a high signal on line 1141 in response to the primary load flip-flop being turned on. The primary feed flip-flop 1114 also transmits a low signal to the AND gate 1117 (FIG. 11*c*) to fully condition this AND gate and transmits a low signal therefrom to the delay flop device 1118. A low output signal from the delay flop 1118 occurs some forty-nine milliseconds after the input thereto and is transmitted to both the differentiator device 1119 and the inverter 1120. On line 1121 there is provided a PDF signal which means primary delay flop pulse, while on the line 1122, there is a $\overline{\text{PDF}}$ signal.

When the output of the delay flop goes negative (after 49 ms) the output signal from the differentiator 1119 is a 750 nanosecond negative pulse which is transmitted to both the inverter 1123 and the AND gate 1124. The high output signal from the inverter 1123 is a signal labeled $\overline{\text{PDFTE}}$ which stands for "barred Primary Delay Flop Trailing Edge", and when this signal is high the signal at terminal 1125 which is labeled PDFTE is low. The spiked negative signal is also transmitted to the AND gate 1124. If at this time the channel 13 photocell is not covered by the card in the ready station, the output from the primary photocell detection flip-flop 1126 will be low, thus fully conditioning the AND gate 1124 to provide an output therefrom identified as PMFCK, which identifies a primary mis-feed check. The operation of the flip-flop 1126 will be more fully discussed hereinafter.

Thus far, we have seen that when the primary load switch is depressed and released the proper signals are generated to transfer the primary feed flip-flop 1114 to its ONE condition and the output therefrom we have traced to produce the delay flop signals (PDF, $\overline{PDF}$, PDFTE, $\overline{PDFTE}$) which insure that the primary reader control circuits have sufficient time to properly detect the conditions with which they are to operate.

The output signal from the ONE side of primary feed flip-flop 1114 is also transmitted on line 1127 to provide a P feed signal, which stands for primary feed, and at the same time the output signal is transmitted to the OR gate 1128. The output from the OR gate 1128 is a primary brake signal which prevents the primary hopper from feeding cards. As can be seen by its flag designation the OR gate 1128 is designed to be responsive to a high input signal and therefore the low input signal from the primary flip-flop has no effect at this time. In addition, the low signal from the ONE side of the primary feed flip-flop 1114 is transmitted to the primary clutch flip-flop 1129 (FIG. 11c). This last-mentioned low signal transfers the primary clutch flip-flop 1129 to its ONE side thereby providing the barred primary clutch signal $\overline{PCLPA}$ at line 1130.

The primary clutch signal on line 1130 picks a clutch relay which causes the picker knives in the primary hopper 111 to move back and forth and thus a card is removed from the pack of cards in the primary hopper and inserted into the ready station. The primary clutch signal is fed back via line 1131 to the signal delay device 1132 whereat it is delayed for 20 milliseconds and therefrom to the primary clutch flip-flop 1129 to reset the primary clutch flip-flop and thus cause the primary clutch signal to be terminated.

However, the removal of the primary clutch pick signal does not cause the primary clutch to drop out because at the time that the primary clutch signal was generated there was also generated a primary clutch hold signal, through OR gate 1133, from the ZERO side of the primary flip-flop 1114. The output of the OR gate 1133 is transmitted to the primary clutch hold terminal to provide a hold signal which keeps the primary clutch signal relay energized, and thus keeps the picker knives and the feed rollers that transport the card into the ready station in operation. The primary clutch flip-flop 1129 is held on its ONE side for approximately 20 milliseconds. Since the feed is asynchronous there is no certainty where the one tooth ratchet has stopped from the last feed, therefore the hold circuit takes over through the OR gate 1133, to insure that the punch clutch relay will be energized until the clutch tooth drops into the clutch ratchet.

When the card is transported from the hopper, into the ready station, it covers the channel 13 photocell and causes the $\overline{CH13}$ signal to go low. Since the $\overline{CH13}$ signal is low along with the ATP4 signal, the two input signals tend to partially condition AND gate 1134. Assume for the moment that the PCH13FF signal is also low, hence causing the AND gate 1134 to become fully conditioned to provide a low output signal. The low output signal resets the primary feed flip-flop 1114 and therefore provides a low signal to the OR gate 1133. A low signal to the OR gate 1133 provides a low output signal therefrom which terminates the primary clutch hold signal and de-energizes the primary clutch relay. It should be noted at this point that if for some reason a card has not been fed from the hopper to cover photocell 13 which thereby fails to cause $\overline{CH13}$ to go low, the PDFTE signal (whose generation was described earlier) will be transmitted to cause the primary flip-flop 1114 to be reset, and therefore to drop out the primary clutch hold circuit. The foregoing operation insures that if there has been a misfeed, that is, no card has been fed into the ready station, the primary clutch hold circuit will be dropped out and a second card will not be fed.

We have assumed that PCH13FF was low in our study of the punch clutch hold circuit. Now consider the generation of the PCH13FF and $\overline{PCH13FF}$ signals. The Channel 13 flip-flop 1126 is transferred to its ONE side in response to a general clear signal (GC) on line 1136. During the transportation of a card into the ready station the channel 13 photocell is covered causing $\overline{CH13}$ to go low.

However, since flip-flop 1126 was reset to its ONE side the signal PCH13FF is also low and the signals through AND gate 1189 reset the primary feed flip-flop 1114. When the primary feed flip-flop 1114 is reset there is a low signal transmitted to gate 1138 which, along with the low $\overline{CH13}$ signal, the TP5 signal and the MCX signal, fully condition the AND gate 1138 to reset the photocell detection flip-flop 1126. Hence, in response to a card covering the Channel 13 photocell the flip-flop 1126 generates a $\overline{PCH13FF}$ signal.

It will be recalled that the operator first loads the cards in the primary hopper, depresses the primary load switch which causes a card to be fed from the hopper into the ready station, and then pushes the run button. At this stage of the operation the machine is ready to accept some direction with respect to further transportation of the card from the ready station as well as the extraction and manipulation of data therefrom. For the purpose of further discussing FIG. 11, assume that the operator has wired the primary read order hub on the plugboard (not shown). A signal directed to the primary read order hub does not cause the machine to move the card through the read station unless the early feed control is in operation which will be discussed later on. Instead the machine stores such a primary read order signal, thereby conditioning the primary read circuits to operate at the time that the read execute hub is energized. In other words, normally, both the primary read order and the read execute or early feed control, hubs must be energized in order for the card to be transmitted from the ready station through the read station. The logic to perform this operation is found in the upper left-hand section of FIG. 11a.

A signal from a plugboard pulse source would be transmitted to the plugboard read hub wire 1150 ($\overline{PRDH}$) to produce a low output signal from the inverter 1151 which is in turn transmitted to the AND gate 1152. The primary read order flip-flop 1153 had been initially transferred to its ZERO side in response to the general clear signal ($\overline{GC}$) on line 1154, which produced a high output signal from the OR gate 1155. However, the low output signal from the AND gate 1152 is transmitted to set the primary read order flip-flop 1153 to its ONE side. With the primary read order flip-flop 1153 conducting on its ONE side, there is produced a low PRDO signal (Primary Read Order Signal). As will become apparent, the PRDO signal conditions various components such as will be discussed hereinafter with regard to the system operation.

Now it will be recalled that the read order signal is ineffective until a read execute signal or an early feed control signal is generated. When the plugboard wire transmits a HIGH read execute signal to the plugboard line 1156, this signal is transmitted through the inverter 1157 to produce the REXE signal which stands for "read execute". The signal ($\overline{REXEH}$) from the read execute hub line 1156 is also transmitted to the OR gate 1158 to provide a low signal therefrom to the AND gate 1159. It will be noted that an execute signal, EXEC, is tapped from the line between the OR inverter 1158 and the AND gate 1159.

Continuing with an examination of gate 1159, let us assume that the three input signals (PGAPFF, $\overline{PRDJM}$ and $\overline{MTOFF}$) to the AND gate 1159 are all low. Since the AND gates 1197, 1159 and 1198 operate together as one AND gate, it is obvious that all these AND gates must be low to transfer flip-flop 1114 with a low signal on line 1194. However let us consider at the moment the input signals to AND gate 1159. In particular, the first of these signals PGAPFF represents a primary gap signal, which is low when there is no card in the read station between the trailing edge of one card and the leading edge of a second card. The signal $\overline{PRDJM}$ is a primary read jam signal, and this is low unless in fact there is a jam. Finally, the signal $\overline{MTOFF}$ is motor off and obviously this signal is low if the motor is on as is the case when there has been a primary feed operation undertaken. Hence all of the input signals to the AND gate 1159 are low, and a low signal is transmitted therefrom to transfer the primary feed flip-flop 1114 to its ONE side (as mentioned earlier, this assumes that gates 1197 and 1198 are both fully conditioned). It will be recalled that the primary feed flip-flop 1114 was transferred to its ZERO side when the photocell 13 was covered by a card being transported into the ready station when the manual load operation took place. Once the primary feed flip-flop 1114 is transferred to its ONE side, a low signal is transmitted to the AND gate 1108. At this time, the output of the primary load flip-flop is also low to provide a low signal on line 1141. It will be recalled that during the manual load operation, the 49 ms delay flop signal expired to a high $\overline{PDFTE}$ signal which turned the primary load flip-flop off, thereby producing a low signal on the line 1141. Once again, assume for the immediate discussion that the signal $\overline{PRFF}$ is low (the generation of this signal will be discussed in connection with FIG. 12) and hence the AND gate 1108 is fully conditioned.

The output from the AND gate 1108 is high, and this high signal is transmitted to the OR gate 1142 to produce a high signal PPRA (Primary Pinch Roller) therefrom to actuate the primary pinch roler via line 1143. The high signal on the pinch roller line 1143 energizes a solenoid to move the pinch roller down on the card in the ready station, and thereby cause the card to be moved from the ready station to the read station. As the card is transported from the ready station through the read station a leading edge signal is generated when the leading edge of the card reaches the read station. The generation of the leading edge signal is found in FIG. 12 and it will be discussed hereinafter, but for the purposes of this immediate discussion, let us assume that when the leading edge of the card goes through the reading station a leading edge signal is generated. Now the timing of the generation of the PRFF signal becomes important, so let us consider FIG. 18, and in particular the primary read flip-flop 1819. We have already considered the generation of the signal REXE which is transmitted on line 1820 to the AND gate 1818. If we accept, for this immediate discussion, that the leading edge signal PLES is also generated at this time, we find that the AND gate 1818 is fully conditioned to provide a low signal to transfer the primary read flip-flop 1819 to its ONE side. With the primary read flip-flop 1819 conducting on its ONE side the output signal PRFF is low and the signal $\overline{PRFF}$ is high.

Returning now to FIG. 11, we find that if $\overline{PRFF}$ goes high when the leading edge is detected, the AND gate 1108 produces a low output pulse which is transmitted to the amplifier 1145, and to the drum write amplifier 1146. However, if a run-out condition is present the AND gate 1145 is inhibited. The drum write amplifier 1146 provides both a low output signal and a high output signal. The low-going output signal is transmitted to the primary initial write amplifier (PIWRA) line 1147, from whence it is used to write a signal on the magnetic drum 370 of FIG. 3. It will be recalled in the discussion of FIG. 3 that the magnetic drum 370 is a means for generating sprocketing signals. The initial write signal is written on the drum in conjunction with the leading edge of the card, and since the distance between the leading edge of the card, and the first column of positions to be read is greater than the distance between the succeeding columns, there is both an initial write signal generated as well as uniform write signals generated. As each of the signals which are written on the drum comes under the read head, there results a generation of a sprocket signal which indicates to the system that it is timed to accept the information from the read station. In addition, the sprocket signals which are read are circulated back through the logic to write another sprocket signal and thereby continue the generation of the sprocket signals.

The high output signal from the drum write amplifier 1146 is transmitted to the OR gate 1160 to provide a high signal therefrom to the AND gate input of the Schmitt Trigger device 1161. This high signal acts as an inhibit. The fact that the write and read heads are located physically close to one another by virtue of how they are mounted on the magnetic drum 370, the system must be concerned with the noise that is generated by the write head and prevent that noise from generating spurious signals. Hence, when an initial write signal is generated, the generation thereof causes an inhibit signal to be sent to block the Schmitt Trigger device 1161 to prevent a false sprocket signal. The signal that was sent to the amplifier 1145 and the drum write amplifier 1106, it will be recalled, was the signal coming from the AND gate 1108 and it was changed from a high signal to a low signal. Hence, there is simply a pulse type signal transmitted both on the initial write amplifier line 1147 and to the OR gate 1160. Once the high signal input to the OR gate 1160 subsides the output therefrom is low, and hence the AND-Schmitt Trigger device 1161 has one low input thereto conditioning it for reception of a second low signal.

When the signal which was initially written on the drum has been transported to the read head of the drum, the read head reads this sprocket signal (PSPRA). The output from the sprocket read amplifier (PSPRA) is a low signal which is transmitted to the read amplifier 1162. The output from the read amplifier 1162 is transmitted to the AND-Schmitt Trigger device 1161 to produce a high signal therefrom which is transmitted to the OR inverter 1164. The OR inverter 1164 in turn produces a low pulse, PSPR, which stands for "primary sprocket signal". When the Schmitt Trigger output goes low, the low going pulse is transmitted to the amplifier 1165, and to the drum write amplifier 1166. In response to this last-mentioned low-going pulse, there is a low pulse and a high pulse produced, the low pulse is transmitted as a write amplifier signal PWRA on line 1167 from whence it is used to energize a write head to write a signal on the magnetic drum. PWRA is different from the initial drum write signal in that the latter occurs with the leading edge to read the first column and the former occurs at each column line thereafter to read the succeeding columns. The positive pulse from the drum write amplifier 1166 is transmitted through the OR gate 1168 to the AND-Schmitt Trigger device 1161. Once again, this inhibits the AND-Schmitt Trigger device 1161 from being operative in response to any noise which may be present when the write operation is taking place.

It follows from the immediate foregoing discussion that a sprocket pulse is generated every time the read head on the magnetic drum 370 reads a pulse which has been written by the write head, and hence the sprocket signals are continually generated once the leading edge of the card has been detected. When a card leaves the read station, or when there is a jam, the sprocket signal must be inhibited so that the system is not in a position to receive spurious information signals. In order to accomplish this last inhibition, consider the inputs to the AND gate 1169 (FIG. 11*b*).

The AND gate 1169 has the inputs PGAPFF, and $\overline{PGTFF1}$. Although the role played by these two signals will be better appreciated hereinafter, accept for the moment that these signals are generated when the trailing edge of the card has been detected. The two log signals to the AND gate 1169 produce a high signal which is transmitted to the OR gate 1170. The OR gate 1170 produces a high output signal to inhibit the AND Schmitt Trigger when the trailing edge of the card has been detected. Likewise, if there has been a jam, the $\overline{PRDJM}$ signal is generated high and is transmitted to the OR gate 1170 to produce an output signal therefrom to inhibit AND Schmitt Trigger device 1161. When the AND Schmitt Trigger device 1161 is inhibited, the sprocket pulses are not generated.

Consider now the generation of the jam signals found on the lower section of FIG. 11a. The inputs to the AND gate 1171 are the two signals PDFTE which is "primary delay flop trailing edge" and PGAPFF which is "primary gap flip-flop". It will be recalled that the PDFTE signal occurs 49 milliseconds after the primary feed flip-flop has been transferred to its ONE side and that the pinch roller is actuated immediately when the primary feed flip-flop is transferred to its ONE side to advance the card to the read station. Although it has not been discussed in detail, accept for the moment that the PGAPFF signal occurs between the trailing edge of one card and the leading edge of a following card. If there is a card in the ready station and the primary feed flip-flop is transferred to its ONE side, it follows that the card in the ready station should be transported therefrom. Before the 49 milliseconds period has elapsed (at which time PDFTE would go low), the card which was in the ready station should be covering the Channel 3 and/or Channel 4 photocells and as will become apparent the PGAPFF signal will go high. Hence the only time that the two signals (PGAPFF and PDFTE) which are inputs to the AND gate 1171 should occur together as low signals is when somehow a card has not left the ready station indicating some sort of a jam condition. Obviously, when both low signals are present (and $\overline{\text{STFF}}$ is low) the AND gate 1171 is fully conditioned to transmit a low signal to the OR gate 1172 which provides a high output signal to the OR gate 1173 and turns the primary read jam flip-flop on in accordance with the operation of a flip-flop of this type which has been previously discussed.

The inputs to the AND gate 1174 are the primary leading edge (PLE5) and the barred read execute hub ($\overline{\text{REXEH}}$) signals. When a plugboard wire transmits a read execute hub signal it goes high, and ordinarily the leading edge signal is high until a leading edge is detected at which time it goes low. Ordinarily a leading edge will be detected during the read execute signal time. Hence, both of these input signals should not be low at the same time which is the condition necessary to cause the AND gate 1174 to produce a low output signal unless there is a leading edge detected sometime after the read execute hub signal is not present. If a card has been moved out of the ready station because of early feed control, gate 1174 insures the system that the read execute signal is generated before the leading edge of that card is detected so that the system can be ready to accept data from the card. If read execute is not present as described, a jam signal will be generated. When the AND gate 1174 is fully conditioned it sends a low signal to the OR gate 1172 whose positive output turns on the primary read jam flip-flop. Finally, the AND gate 1175 has four input signals thereto and operates in combination with AND gate 11101. The first input signal to AND gate 1175 is the PGAPFF signal which occurs during the time between the trailing edge of one card and the leading edge of the following card, the TP6 signal which is a timing signal, the CH15 signal which indicates that the monitoring station beyond the read station has no cards covering it, and the PGTFF1 signal which is generated in response (among other signals) to a sprocket signal. If the situation should occur that the trailing edge of a card is detected and simultaneously at TP6 the Channel 15 photocell is not covered then there is an indication that the card has been torn, or jammed and a jam detection signal is generated. However, the $\overline{\text{PRUNOFF}}$ signal to AND gate 11101 indicates that if there is a runout condition present the jam signal will not be generated even though the above condition at gate 1175 is present. Once again, the positive output from the OR gate 1172 is transmitted through the OR gate 1173 to turn on the primary read jam flip-flop.

When the system is performing a read operation it can be terminated either at a selected column or when the card has read eighty columns. The AND inverter 11102 has inputs thereto which are labeled MAR05H and MAC16H. These input lines come from the plugboard and stand for "memory address row 5 hub" and "memory address column 16 hub". When information is read from the card in the primary read side, the first column information is automatically transferred into row 1, column 1 of memory, the second row into row 1, column 2 of memory until we reach row 5, column 16 of memory which accounts for 80 columns of information. Therefore if the memory address register reaches row 5, column 16 the 80 columns will have been read and the gate 11102 will have two low signals thereto. If we are not doing a card image operation at this time the signal $\overline{\text{PSCI}}$ will be low to fully condition AND gate 11102. A high signal from AND gate 11102 will be transmitted to the OR inverter 11103 which will transmit a low signal to the AND gate 11104. The AND gate 11104 operates in conjunction with AND gate 11105 to produce a low signal (at TP6 of the OCA period) to reset flip-flop 1153 and thus terminate the read order.

If the system is to perform an end-read at some column other than column eight, the address in memory for that column will be wired from the address emitter through a collector/combine to the end read hub. A signal to the end read hub produces a high signal on line 11106 to provide a low signal from the OR inverter 11103 and the operation is identical from that point as the operation described, for the eight columns read, above.

CARD TRAILING EDGE DETECTION

Consider now the significance of the logic shown on FIG. 12 (FIGS. 12*a* and 12*b*) which is concerned with the detection of the trailing edge and the generation of the primary and secondary gap signals. As has been mentioned earlier, the primary gap is the period of time between the trailing edge of one card and the leading edge of the following card as detected at the read station. While the discussion thus far has introduced the concept of the primary gap time, it should be pointed out that the secondary gap time is similar thereto, i.e., it is the time between the trailing edge of a first card and the leading edge of the following card which is being transported through the secondary read path as detected at the secondary read station.

It will be recalled that the system reads information from the cards as the columns of information (holes in the cards) pass over the read station photocells. It will also be recalled that the system must be alerted to read the columns of operation as they appear over the photocells. The system is so alerted by the generation of sprocket pulses. In order to properly generate sprocket pulses they must be initiated at the correct time. Therefore, it is imperative that the system detect the leading edge of a card as it is transported from the ready station toward the read station and it is imperative that the system recognize when there is no card over the photocell in order to abstain from processing spurious signals.

As was discussed earlier, when the system is first put into operation, the general clear signal (GC) is generated, and with respect to the logic of FIG. 12, it can be seen that the general clear signal (GC) transfers the primary gap flip-flop 1201 to its ONE side and transfers the primary gap test flip-flop two, 1202 to its ONE side. The primary gap flip-flop 1201 conducting on its ONE side provides a low signal on line 1203 to AND gate 1204 and hence at TP3 time the AND gate 1204 is fully conditioned. The output signal from the AND gate 1204 is transmitted to transfer flip-flop 1205 to its ZERO side and hence the flip-flops 1205, 1202 and 1201 are ready to detect the leading and trailing edges and generate a trailing edge signal.

The output from the ZERO side of the flip-flop 1205 is a low signal which is transmitted to the AND gate 1206. Now the read photocells of Channels 3 and 4 have been chosen to detect the leading edge of the card by virtue of their becoming dark either independently or together. In the lower portion of FIG. 12 it will be noted that there is an OR gate 1207. When either (or both) Channel 3 or Channel 4, that is photocell 3 or photocell 4, is covered the respective lines 1208 and 1209 go high to produce a low signal $\overline{\text{CH304}}$.

Returning now to the inputs of the AND gate 1206 it can be seen that when either (or both) Channel 3 or 4 is covered there is a low signal produced on line 1210 so that at ATP4 time this AND gate becomes fully conditioned. The output from the AND gate 1206 is a low signal which is transmitted to the flip-flop 1202 to transfer that flip-flop to is ZERO side. When the flip-flop 1202 has been transferred to its ZERO side, the output signal therefrom is a low signal which is transmitted to the AND inverter 1211. It will be recalled that the primary gap flip-flop 1201 is conducting on its ONE side, and hence the signals to the AND gate 1211 at TP5 time during the OCA period are all low to provide a high signal therefrom. The high signal $\overline{\text{PLE5}}$ from the AND gate 1211 is transmitted to the inverter 1212 to provide a low leading edge signal PLE5. It is obvious that when the AND gate 1211 is not fully conditioned, there is a low $\overline{\text{PLE5}}$ signal as shown. In summary, then, when the card is transported from the ready station and causes either Channel 3 or Channel 4 to go dark there is generated a low PLE5 signal which is the primary leading edge signal.

It will be recalled that the generation of the sprocket pulses were described in connection with FIG. 11, and that while a card is being transported through the read station the sprocket signals are continually generated to enable the information to be accepted at the proper time. It will also be recalled that a sprocket signal is inhibited from being further produced when PGAPFF and $\overline{PGTFF1}$ signals are simultaneously generated. Therefore let us examine the generation of these signals.

The AND gate 1213 has three input signals thereto. The input signal on line 1214 is identified as the ALL signal and in essence is a signal which detects the trailing edge of the card. The generation of the ALL signal is found in the lower portion of FIG. 12a. It can be seen thereat that if each of the photocells of the channel are subjected to light, each of the inputs to the AND gates 1215, 1216, and 1217 is low, and therefore these three AND gates are fully conditioned to each provide an output signal to the inverter 1218. The inverter 1218 provides a high output signal which is transmitted to an OR inverter 1219 which provides a low ALL signal. Hence, when there is no card over the read station photocells, or when a card has holes punched in every position, an ALL signal will be generated and this ALL signal will be present on line 1214 (with respect to gate 1213).

Assume that a card has left the read station and since the following card has not been transported out of the ready station (the PGAPFF signal must be low in order to move the card out of the ready station as was shown above), all the channel photocells will be uncovered. Assume further that the $\overline{PRFF}$ signal to AND gate 1245 is low. At such a time as just described, the ALL signal would be generated, the sprocket signal which was written at the 80th column would now be detected and there also would be generated a TP4 signal. Hence, the AND gates 1213 and 1245 would be fully conditioned to provide an output signal to set the primary gap test flip-flop one 1205. The output from the ONE side of the primary gap test flip-flop one, 1205 is a low signal which is transmitted to the AND gate 1220, and when the sprocket signal no longer exists there will be a low signal on line 1221. The low $\overline{PSPR}$ signal on line 1221 fully conditions the AND gate 1220 to provide a low signal to set primary gap test flip-flop 2, 1202. The output from the one side of the primary gap test flip-flop 2, 1202, is transmitted to the AND gate 1222 which in conjunction with the ALL signal and an ATP4 signal as well as the 82nd sprocket signal, that is, the second sprocket pulse generated after the card has left the read station, fully conditions the AND gate 1222. The output from the AND gate 1222 is transmitted to set the primary gap flip-flop 1201 to its ONE side. When the primary gap flip-flop 1201 is set to its ONE side, the low signal therefrom on line 1203 is transmitted back to the AND gate 1204 to reset the primary gap test flip-flop 1. Hence, the condition is met for inhibiting the sprocket signal, i.e., the primary gap flip-flop 1201 is in a ONE condition, while the primary gap test flip-flop 1 is in a ZERO condition. The two signals from the last two mentioned flip-flops, namely, PGAPFF and $\overline{PGTFF1}$, both of which are low at this time when transmitted to the gate 1169 in FIG. 11, fully conditioned that AND gate to inhibit any further sprocket signals.

The PGAPFF signal can be considered to be trailing edge signal although it actually is generated two sprocket signals after the trailing edge has left the read station. The philosophy behind generating the PGAPFF signal two sprocket signals after the card has left the read station is to insure the system that there is not an erroneous trailing edge signal being generated by having all of the holes in one particular column punched therefrom. By testing the situation two sprocket signals after the card has left the read station the system can be certain that this last-mentioned erroneous condition will not be generated.

It will be recalled that the primary gap flip-flop 1201 and the primary gap test flip-flop two 1202 are set to their respective ONE sides and the primary test gap flip-flop 1205 is reset to its ZERO side when the general clear signal (GC) sets the flip-flops to their initial conditions. However, as soon as a card covers Channels 3 or 4 the primary gap test flip-flop 2 1202 is transferred to its ZERO side which in turn transfers the primary gap flip-flop 1201 to its ZERO side. This insures that there is no inhibition of any sprocket signals which might be generated thereafter. In short summary then, the sprocket signal is terminated in approximately two sprocket signal times after the trailing edge has been detected or at the time that the first ALL signal is generated, i.e., two sprocket signals after the card has left the read station. The generation of the PGAPFF signal at this time is considered the trailing edge signal.

When a card has a hole punched in every row along a single column the AND gate 1213 may be fully conditioned and as mentioned this would create an erroneous situation. Hence, the AND gate 1223 is introduced. As soon as the webbing between the columns with all the holes punched therein moves over the photocells the $\overline{ALL}$ signal is generated on line 1224, which in conjunction with a ATP4 signal and the output signal from the ZERO side of the primary gap flip-flop 1201 provides a low output signal to reset the primary gap test flip-flop 1, 1205 to its ZERO side. By resetting the primary gap test flip-flop 1, 1205 to its ZERO side (because of the webbing between the columns), the AND gate 1206 will reset the primary gap test flip-flop two, 1202 to its ZERO side and the logic circuitry is in a proper condition to continue to generate the sprocket signals necessary for the correct operation of the machine.

Finally, the signal PRUNO is the program run-out signal. The program run-out signal is a signal which enables the programmer to allow the last two cards which are processed to be removed from the system when a program has been finished. The PRUNO signal is transmitted to the OR gate 1225 from which a low signal is transmitted to reset the primary gap test flip-flop two, 1202 to its ZERO side. It will be recalled that after a card leaves the read station, the flip-flop 1202 is transferred to its ONE side, which eventually causes the termination of sprocket signals from being generated. By holding the flip-flop 1202 on its ZERO side by virtue of the PRUNO signal, the flip-flop 1201 is held on its ZERO side through the AND gate 1226. As long as the primary gap flip-flop 1201 is held on its ZERO side, the signals necessary to fully condition the AND gate 1169 are not met and the sprocket signals will continue to be generated, thereby allowing the last two cards in the system to be transported and stacked.

The lower portion of FIG. 12 shows identical circuitry to generate the same signals for the secondary read, with the exception of two signals SPRE4 and SPRE8.

In the preferred embodiment of the present invention, there are some seventeen milliseconds that elapse between the time that a card is fed from the ready station and the leading edge is detected. The programmer may make use of this time for other operations, but the system must insure that when the leading edge is detected, the address register must have the proper address to handle the information being read from the primary and secondary read. With respect to the primary read, the information is entered into the memory at column 1 and row 1 positions which address is simply all zeros, and hence the address register is cleared. However, the information from the secondary is fed into the column 1, row 9 position, and hence the address register must have a "9" inserted therein. The signals SPRE4 and SPRE8 jam, or insert, a 1-bit into the fourth and eighth positions of the row address which will specify row 9 to insure that the information read from the secondary reader will be inserted in column 1 row 9. The operation of these signals will be better appreciated when we discuss FIG. 27, which relates to the memory address register.

WAIT STATION CONTROL

Thus far we have considered the logic circuits and the generation of the signals which are necessary to move a card from the hopper into the ready station and from the ready station to the read station. We have also considered the logic and the generation of the sprocket signals as well as the detection of the trailing edge of a card leaving the reading station and the leading edge of a card entering the reading station. When a card has been transported through the read station, it continues on its way until it arrives at the wait station as was indicated in the description of FIG. 3. The wait station is a two-position station which inserts the first card into the inner slot, that is the slot which is closer to the front of the machine, and inserts the second card into the outer slot, that is the slot which is away from the front of the machine. It will be recalled that it is because these two cards are held in the wait station that there can be a simultaneous consideration of three cards in transport to effect a better sequence check than has been heretofore known.

Figure 13C:
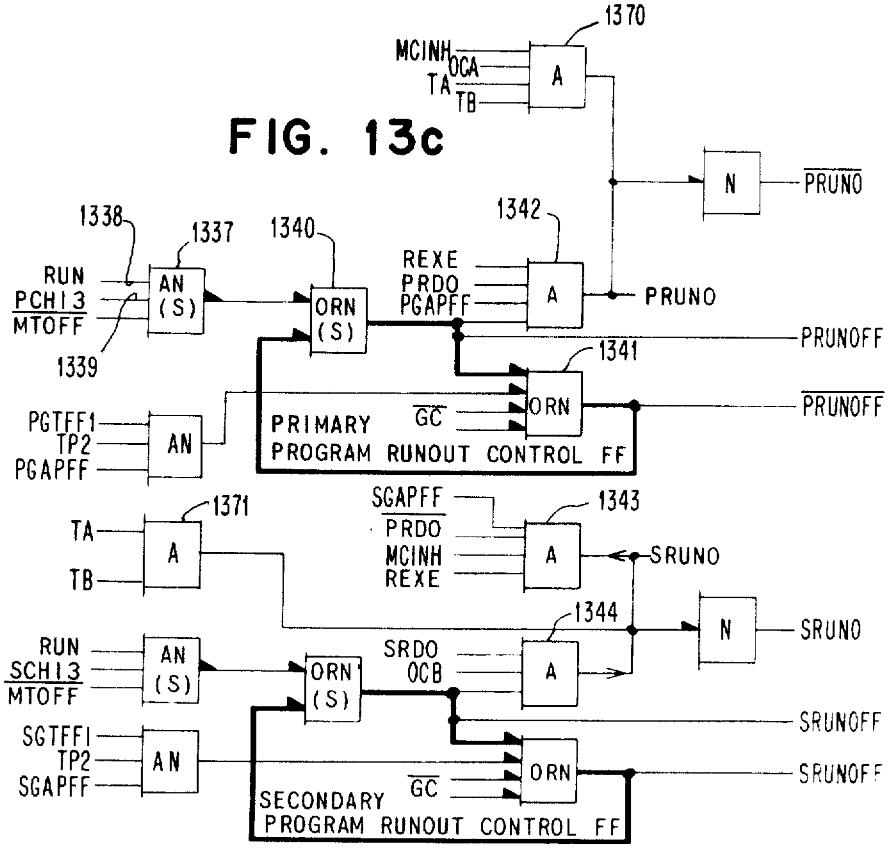

Examine now FIG. 13 (FIGS. 13*a*, 13*b*, and 13*c*) which shows the logic and the means for generating the signals which are necessary to direct the card into a proper slot in the waiting station, and to remove the card from the waiting station at the proper time.

On the left-hand side of FIG. 13*a*, there is shown a primary unload flip-flop 1301. The purpose of the primary unload flip-flop 1301 will be more fully appreciated as the discussion proceeds, but for the moment accept the fact that the lines 1302 and 1303 are part of the primary unload switch. Assume that the primary unload switch has not been depressed, and unless the primary unload switch is depressed, the signal on line 1303 is high, which provides a low output from the AND inverter 1304 to hold the primary unload flip-flop 1301 in its ZERO or turned-off condition. The low signal from the AND inverter 1304 is transmitted to partially condition the AND gate 1305.

It will be recalled that the PGAPFF signal which is the primary gap flip-flop signal was generated two sprocket signals after the card has left reading station, i.e., between the trailing edge of one card and the leading edge of the following card. When a card has left the read station, it becomes obvious from FIG. 1, that such a card will be transported, without stopping, toward the wait station and hence a decision must be made as to whether this card will be directed into the outer slot or the inner slot of the wait station. The second input to the AND gate 1305 is a PGAPFF signal which fully conditions the AND gate 1305 to produce a positive output which is transmitted to the flip-flop 1306.

To digress for the moment, it should be recognized that when the general clear signal is generated the $\overline{GC}$ signal on the line 1308 is high, thereby causing the flip-flop 1306 to be transferred to its ZERO condition. Hence, the output from the ONE side of the flip-flop 1306 is high, thereby providing the proper condition on one leg of the AND gate 1307.

When the positive output from the AND gate 1305 is transmitted to the AND input 1307, this last-mentioned AND input is fully conditioned to transfer the flip-flop 1306 to its ONE side, thereby transmitting a LOW signal to the OR gate 1309. The output from the OR gate 1309 is a low signal which releases the selector mechanism so that the card which is on its way to the waiting station is directed into the inner pocket. At the same time, the low signal from flip-flop 1306 is transmitted to the AND gate 1310. The second input signal to the AND gate 1310 is from the OR inverter 1312, hence let us examine the inputs to this OR inverter.

Since the primary unload flip-flop 1301 is turned off at this time, there is a low signal on line 1311 to the OR inverter 1312 which has no effect thereon. However, it will be recalled that the PRFF signal is generated at the same time as the leading edge signal and therefore when the leading edge of card two is detected, the $\overline{PRFF}$ signal goes high to transmit a low signal to AND gate 1310. The low output signal from the OR inverter 1312 fully conditions the AND gate 1310. The high output from the AND gate 1310 is transmitted to transfer the flip-flop 1315 to its ONE side to produce a high drive signal from power drive 1323 on line 1316. The high ejector signal on line 1316 causes the trigger device, or the card ejector, to move and if there were a card in the outer slot at the waiting station it would be moved out to the stacker transport mechanism to be transported into the stacker devices. However, as the leading edge of card two is detected, there is no card in the outer station, and the ejector device simply goes through the ejector movement without moving any card into the stacker rollers.

Now when the second card leaves the read station, the second PGAPFF is detected and the flip-flop 1306 has been conditioned to be transferred to its ZERO side. The foregoing is true because the high signal for the ZERO side is fed back to condition the AND input 1317. Hence, the high signal from the AND gate 1305 (in response to the second PGAPFF signal) resets the flip-flop 1306. In response to resetting the flip-flop 1306 there is a high signal produced from the ONE side of this last-mentioned flip-flop which is transmitted to the OR gate 1309. The high output signal from the OR gate 1309 to the terminal 1318 selects the wait station deflector so that the second card coming into the wait station is directed into the outer position. At the same time, the low signal from the ZERO side of flip-flop 1306 is transmitted to the AND gate 1319 and the low signal from the OR gate 1312, when the leading edge of card 3 is detected, is also transmitted to the AND gate 1319 to fully condition this AND gate. The high signal from the AND gate 1319 is transmitted to set the flip-flop 1321 to its ONE side. The output from the ONE side of the flip-flop 1321 is transmitted to the line 1322 to cause the inner slot ejector mechanism of the waiting station to move a card out of the inner slot of the waiting station. Hence, card 1 will be ejected into the train of stacker rollers. It becomes apparent that as the operation continues each time the wait station selector line 1318 is low, a card will be directed into the inner slot of the waiting station, and prior to its arrival the ejector mechanism will "kick" the card out of the inner position of the wait station into the stacker transport path. In a similar manner, each time the line 1318 is high, the deflector mechanism will be energized and the card coming through will be directed into the outer position of the waiting station, while prior to its arrival the card sitting therein will be "kicked out" into the path of the stacker rollers.

When the cards have run out of the hopper and out of the ready station there will be two cards remaining in the waiting station. At this time the operator can depress the primary unload switch which provides a high signal on line 1302 to the OR inverter 1320 which in turn provides a low signal. The low signal from the OR inverter 1320 is transmitted to the AND gate 1304 and since 1303 is low provides a high signal. The high signal is transmitted to the OR inverter 1312 which in turn provides a low signal to AND gates 1310 and 1319. Depending on which of these AND gates is conditioned the inner or outer ejector mechanism will be toggled. The operator then releases the unload button and a low signal is transmitted to gate 1305. This signal (as it appears at the AND gate 1305) is similar to a PGAPFF signal insofar as this particular logic goes in that depending upon whether the flip-flop 1306 is conducting on its ZERO or ONE side, the flip-flop will be toggled to the other side. Next the operator depresses the unload switch a second time and the high signal from AND gate 1304 through OR gate 1312 cause the ejector mechanism which didn't operate to operate at this time. In this manner, cards can be cleared from the machine.

The signal from the flip-flops 1321 and 1315 must be present for a specific period of time, and then these flip-flops are reset to be available at the next time that their services are demanded. This last operation is effected by a feedback circuit and the consideration of the circuit associated with the flip-flop 1315 will be illustrative.

It will be recalled that when the flip-flop 1321 is conducting in the ONE state, it provides a high output signal from the power driver 1323 which high signal is sent back to the delay device 1324. The positive output signal from the delay device 1324 is some fifteen milliseconds after the input is transmitted to transfer the flip-flop 1315 to its ZERO side. A similar operation is apparent with respect to the flip-flop 1321.

The operation of the secondary feed wait station control is quite similar to the operation of the primary feed wait station control with two exceptions which will be discussed at this point. It is obvious from FIG. 13 that the secondary gap flip-flop signal (SGAPFF) transmitted to the gate 1325 toggles the flip-flop 1326 as occurred in connection with the primary gap flip-flop previously described. In this manner the deflector device is selected every other time to direct the cards in the secondary feed; first, into the inner position of the secondary wait station and then into the outer position of the secondary wait station.

However, there is an ejector timing control difference between the primary and secondary feeds. It will be recalled that the signal which controlled the timing for ejecting the cards from the wait station in the primary operation was the $\overline{\text{PRFF}}$ signal. In the secondary feed operation, it is the Channel 15 photocell device which provides the timing signal. It will be recalled from the description of FIG. 3 that Channel 15 photocell was located some distance along the transport path between the read station and the wait station. This photocell position primarily acts as a jam detector means and in the secondary feed doubles in its role to provide a signal to cause the ejector device to be operated. The reason for having the arrangement different in the primary and in the secondary feeds is that when cards are being fed from both feeds simultaneously and are being directed into the common pocket, it is necessary that the cards arrive at the common pocket from one feed, for instance, the primary feed, at a different time from the cards arriving from the secondary feed in order to prevent collisions and therefore jams. The leading edge signal of course is generated at the time that the card arrives at the read station which is prior to the time that the card arrives at the Channel 15 photocell. Hence, the cards in the primary feed wait station are ejected therefrom (at leading edge time) before the cards that are being transported from the wait station of the secondary feed.

The manner in which the difference in the ejection time is effected can be seen from a study of the logic starting with the AND gates 1327 and 1328. When the photocell Channel 15 sees light there is a low signal on line 1329 and when the photocell Channel 15 does not see light there is a low signal on line 1331. It will be recalled from the description of FIG. 3 that when a card has left the ready station, it is transported all the way to the waiting station and hence Channel 15 sees light between the trailing edge of one card and the leading edge of the next card.

At some time prior to a card being transported from the read station Channel 15 will see light which will provide a low signal on line 1329. The low signal on line 1329 in conjunction with a BTP4 signal fully conditions the AND gate 1327. A low signal from the AND gate 1327 sets the flip-flop 1330 to its ONE side. The low signal from the ONE side is ineffective. Now when a card is transported to cover the photocell Channel 15 there is a low signal provided on line 1331, which in conjunction with BTP4 signal fully conditions the AND gate 1328. The low output signal from the AND gate 1328 is transmitted to reset the flip-flop 1330, and thus produce a low signal from the ZERO side of this flip-flop. The low signal from the ZERO side of the flip-flop 1330 is transmitted to the AND inverter 1332 and to the differentiator 1333. The low signal from the differentiator 1333 in conjunction with the low signal from flip-flop 1330 fully conditions AND inverter 1332 to provide a high signal to the OR inverter 1334. The low signal from the OR inverter 1334 is transmitted to the AND gate 1335 and 1336. The AND gates 1335 and 1336 are then partially conditioned to receive a signal from the flip-flop 1326 which will be discussed immediately hereinafter.

In a manner similar to the operation of the primary feed circuitry, the AND gates 1335 and 1336 are partially conditioned and depend upon a signal from the toggle flip-flop 1326 which is either set (ONE side) or reset (ZERO side), and accordingly the respective AND gates 1335 and 1336 will receive signals to energize the inner or outer ejector mechanisms. As the card passes beyond the Channel 15 photocell the AND gate 1327 is once again fully conditioned to set the flip-flop 1330 to be operative in conjunction with the next card. The operation of the secondary load flip-flop is identical to that of the primary load flip-flop which was previously described, and hence no further description of this logic appears to be necessary.

The operator can remove the cards from the primary and secondary waiting stations by depressing the primary unload flip-flop and the secondary unload switches as just described, but when the cards are removed therefrom by this operation they are all transported into the common pocket. If the operator wants to remove the cards from the machine after the hopper has been emptied and have these cards be transported into the proper stackers according to the program that has been set up, the operator will depress the run signal which will generate a primary run out and a secondary run out signal. Let us examine now the logic which provides for the generation of the primary run out signal and the secondary run out signal.

Examine first the inputs to the AND gate 1337 (FIG. 13c). When the run button is depressed there is a low signal transmitted on line 1338 to the AND gate 1337. As was mentioned earlier, when the cards run out of the hopper, they continue to move from the ready station, and when the machine comes to a halt after a run out, the cards are held in the waiting station. Hence, the photocell Channel 13 sees light, and sets the photocell detection flip-flop 1126 which was discussed in connection with FIG. 11. With photocell detection flip-flop 1124 being set there is provided a low signal on line 1339. Obviously, the motor is on at this time, and therefore the $\overline{\text{MTOFF}}$ signal (whose generation will be discussed next) is also low to fully condition the AND gate 1337. The AND inverter 1337 provides a high signal which is transmitted to the OR inverter 1340 which in turn produces a low signal to the OR inverter 1341. Since all other input signals to OR inverter 1341 are low, the OR inverter 1341 in turn produces a high signal which is fed back to the OR inverter 1340 to turn on the primary program run-out control flip-flop.

The output of the OR inverter 1340 is also transmitted to the AND gate 1342. This low signal from the OR inverter 1340 along with the ATP4 signal, the PGAPFF signal, the primary read out signal, as well as the read execute signal, all of which are low at this time, fully condition the AND gate 1342. The AND gate 1342 operates in conjunction with AND gate 1370 whose timing signals OCA, TA and TB will be low. The signal MCINH, which is a machine cycle inhibit will be discussed in connection with the data control circuits, FIG. 25. In this circuit the MCINH signal serves to inhibit the run out if a transfer operation is taking place. With the AND gates 1342 and 1370 both fully conditioned, a low PRUNO signal and a high $\overline{\text{PRUNO}}$ signal will be generated. It will be recalled that in the discussion of FIG. 12 the primary run out signal was used to reset the primary gap test flip-flop and in turn the primary gap flip-flop in order that the sprocketing signals would continue to be generated during the transport of the cards remaining in the machine.

The logic for generating the secondary run out signal is also shown in FIG. 13, and is almost identical to the logic for the primary run out signal generation, with the exception that there is an additional input signal to the gates, namely, the signal $\overline{\text{PRDO}}$. The signal $\overline{\text{PRDO}}$ to AND gate 1343 provides that the primary read out signals must have been terminated to provide the necessary low signal to this AND gate which in conjunction with a fully conditioned AND gates 1344 and 1371 can generate a low signal SRUNO and a high $\overline{\text{SRUNO}}$ signal, the secondary run out signal. The purpose of the input signal, $\overline{\text{PRDO}}$ to the AND gate 1343 is that the system wants to insure that the primary read has been emptied first in order that there will be no collisions of cards at the common pocket. This is necessary because the secondary feed with the cards in the waiting station is no longer controlled by Channel 15 photocell.

Finally, consider in FIG. 13*a*, the generation of the motor on signals. Examining the OR gate 1345, we find that if the run switch or the primary load switch or the secondary load switch is depressed there is a high signal to the OR gate 1345 which generates a high output signal to be transmitted to the OR delay flop 1346. The positive output signal from the OR delay flop which occurs 1.2 seconds after the arrival input signal is transmitted to the output of the ONE side of the flip-flop 1347. This operation is a standard operation in this system, and causes the flip-flop 1347 to be transferred to its ZERO, or reset, side. At the same time the high signal is transmitted to the OR gate 1348. This high signal from the OR gate 1348 is transmitted to the OR power driver 1349 to provide an output signal to the line $\overline{\text{MTONA}}$, which is the motor on signal and turns the motor on.

The generation of the various jam signals shown as inputs to the OR gates 1350 and 1351 will be appreciated as the description goes forth, but for the moment accept that if any of these jam signals are produced there is a positive signal transmitted to the inverter 1352 which produces a negative signal to the flip-flop 1347 and accordingly sets the flip-flop. When the flip-flop 1347 is set, the negative output of the ONE side causes the motor solenoid which is energized by the positive signal on the line 1353 to become de-energized and then the motor is cut off. Thus the motor is automatically cut off when there is a jam condition detected.

STACKER SELECTION

Thus far we have studied these logic circuits and the generation of the signals which are necessary to transport a card from the hopper to the ready station, through the read station, and into the waiting station. We have also considered the operation of the eject mechanism which moves the cards from the wait station into the stacker roller transport path in order that the cards may be started toward the stacker positions. Consider now the logic circuits and the generation of the proper signals which are necessary to direct cards into the correct stacker position.

Before examining FIG. 14 which shows the logic circuitry and the proper signals to direct a card into the stacker positions let us consider in a general way what is wired on the program plugboard to enable the system to make a proper decision.

Examining the plugboard which is shown in FIG. 15, we find that there is a double row of plug hubs labeled "step". Each of the step plug hubs represents a level of programming and will provide a pulse to initiate the function and to step the system to the next program step. For the purpose of the present discussion assume that on Step 4 we read information from a card in the primary reader as it is transported through the read station. At Step 4 time the information from this card would be automatically read into pre-assigned memory positions. At Step 5 time the information in the pre-assigned memory positions is transferred from these pre-assigned memory positions into other memory locations which we shall designate as first memory locations. At Step 6 time the second card in the primary would be read and the information therefrom would once again be stored in the pre-assigned memory locations. At Step 7 time the information in the pre-assigned memory locations would be transferred therefrom to second memory locations. At Step 9 time the third card would be read. Also at Step 9 time the card which was read at Step 4 time would be in the waiting station and would be the next card to be ejected therefrom. Therefore at Step 8 time a decision must be made as to where the card in the waiting station, which is next to be ejected, is to go. If a comparison is required to make such a decision, the programmer would wire the system to do a comparison (COMP Hub) during Step 8. Thereafter, Operand 1 which is the information from the first card would be compared with Operand 2 which is the information from the second card, and this would be accomplished by wiring the operand addresses of the information into OP1 and OP2 through a collector which is operated during Step 8. The comparison is made internally and the "result signals" appear at the CP RESULTS hubs 1501 and also at the COMPARATOR hubs 1502 on the plugboard. If the value of the information from the first card were larger than the value of the information from the second card and under such conditions the first card should go into a particular pocket, a plug hub wire from the "greater than" hub 1504 of the CP RESULTS section 1501 of the plugboard would be wired to the STACKER SELECT hubs 1503 to direct this first card into whatever pocket would be desirable. On the other hand, if the comparison showed that the value of the information from the first card were less than the value of the information from the second card and if accordingly the first card were to go into another pocket, a plug wire would be wired from the "less than" hub 1505 of the CP RESULTS section 1501 of the plugboard to some other stacker select position. The philosophy that is being set forth here is that the card which is directed into the stacker transport is the card which was read two card positions before the card which is activating the stacker operation.

Now examine FIG. 14, which shows in the primary stacker logic four plug hub terminals $\overline{\text{PS1H}}$, $\overline{\text{PS2H}}$, $\overline{\text{PS3H}}$, and $\overline{\text{PSCH}}$. These designations stand for, respectively, "primary stacker 1 hub", "primary stacker 2 hub", "primary stacker 3 hub", and "primary stacker common hub". Assume that our plugboard has been wired in a fashion similar to that described above, and we are attempting to direct a card which has a value greater than the card following it into the primary stacker 1. A plugboard wire would be wired from the greater than hub of the CP RESULTS hub into the primary stacker 1 hub 1506, which signal would be transmitted to the $\overline{\text{PS1H}}$ line 1401. This plugboard signal would be a high signal and would be transmitted from the terminal 1401 to the OR inverter 1402 and to the OR inverter 1403. The operation of the flip-flops 1408 and 1409 are familiar by now and it is readily recognized that the high signal to both the OR inverter 1401 and 1403 renders the flip-flops 1408 and 1409 in a reset state.

The high signals from the OR inverters 1414 and 1413 are respectively transmitted to the AND gates 1415 and 1416 to partially condition each of these last-mentioned AND gates. When the leading edge of the card that is being read at the ninth step in our previous example, passes through the read station, the high leading edge signal ($\overline{\text{PLE5}}$) on line 1410 is generated to provide a high signal to fully condition both the AND gates 1415 and 1416. The output from the AND gate 1415 resets the flip-flop 1406, while the output from the AND gate 1416 resets the flip-flop 1407. It will be noted that the output signal from the reset side of the flip-flop 1406 is $\overline{\text{PSA}}$, while the output from the reset side of the flip-flop 1407 is $\overline{\text{PSB}}$. A similar operation takes place with respect to the secondary feed, and hence the table, FIG. 14-1, shows that if the resultant signals are at the flip-flops are $\overline{\text{A}}$ and $\overline{\text{B}}$, there will be a selection of stacker 1, and this could be either the primary stacker 1 or the secondary stacker 1, or both, depending upon how the plugboard is wired.

The selection of the primary stacker 2 initiates with a plugboard signal being directed to the terminal 1412, which high signal is transmitted to the OR inverters 1413 and 1414. The high signal to the OR inverter 1413 and 1414 set the flip-flops 1409 and 1408. With the flip-flops 1408 and 1409 being set, there are high signals transmitted to partially condition the AND gates 1404 and 1405. Once again, when the leading edge of the card being read on the ninth step is detected, the high leading edge signal generated is transmitted to the AND gates 1404 and 1405 to fully condition these AND gates. The output from the AND gate 1404 sets the flip-flop 1406 to its ONE side while the output from the AND gate 1405 sets the flip-flop 1407 to its ONE side. It will be noted that the output from the set side of flip-flop 1406 is PSA, while the output from the set side of the flip-flop 1407 is PSB. Once again, examining the Table I of FIG. 14 we find that an A and B condition tells us that we will select stacker 2, and this is true of both the primary selection and the secondary selection.

The selection of primary stacker 3 is initiated with a plug hub signal being transmitted to the terminal 1417. The high signal to the plug hub 1417 is transmitted to the OR inverter 1413, and to the OR inverter 1402. This last-mentioned plug hub signal serves to reset the flip-flop 1408 and set the flip-flop 1409. The high signal from the OR inverter 1414 is transmitted to the AND gate 1415, while the high signal from the OR inverter 1403 is transmitted to the AND gate 1405. The output from the AND gate 1415 resets the flip-flop 1406, while the output from the AND gate 1405 sets the flip-flop 1407, when the high leading edge signal $\overline{\text{PLE5}}$ is generated. The reset condition of flip-flop 1406 and the set condition of flip-flop 1407 cause the generation of a $\overline{\text{PSA}}$ signal and a PSB signal. Once again examining the table in FIG. 14-1 we find that $\overline{\text{A}}$ and B results in the selection of stacker 3.

Finally, the selection of the common stacker commences with the transmission of a high plugboard signal on line 1418. The high signal on line 1418 is transmitted to the OR inverter 1403 and to the OR inverter 1414. This last-mentioned high signal serves to set flip-flop 1408 and reset the flip-flop 1409. The high signal from the OR inverter 1402 is transmitted to the AND gate 1404 while the high signal from the OR inverter 1413 is transmitted to the AND gate 1416. The AND gates 1404 and 1416 become fully conditioned in response to the detection of the leading edge of a card. The output from the AND gate 1404 sets the flip-flop 1406 while the output from the AND gate 1416 resets the flip-flop 1407. The foregoing condition of the flip-flops 1406 and 1407 results in the generation of a PSA signal and a $\overline{\text{PSB}}$ signal. Once again, examining the table of FIG. 14-1, we find that A and $\overline{\text{B}}$ serves to select the common pocket.

Since the logic and designations of the circuitry related to the secondary selection are similar to that of the primary selection, it is not necessary to describe the operation of the secondary stacker selection.

In certain applications it is advantageous to be able to "early select" the stacker pocket to which the card is to be transferred. Assume for the moment that two cards are read during step four and the information therefrom is stored. During step five this information can be compared and the plugboard wire from the compare hubs or some other conditional hub can be plugged to the early select hub, designated W1 select hubs 1507, (FIG. 15). Assume that the conditions for making the early selection have been met. The condition signal ("compare, greater than", etc.) will be generated from the proper hub and transmitted to the primary early select $\overline{\text{PESH}}$ hub line 1420. This signal will be a high signal and it will be transmitted to the OR inverter 1421 from whence a low signal will be transmitted to the OR inverter 1422. Hence, the flip-flop 1423 will be set to store information indicating that the condition for the early select has been met. By prearrangement as described earlier, the card from which this information has been read is now in the "second to be ejected" position of the waiting station and the card following it is in the ready station waiting to be read. At this time the signal PGAPFF is low to partially condition the AND gates 1424 and 1425. When the second card is transported through the read station the signal $\overline{\text{PGTFF2}}$ will go low. The signal $\overline{\text{PGTFF2}}$ goes low at TP4 time, and therefore at TP7 time the AND gate 1425 transmits a high signal to set the flip-flops 1408 and 1409. The set flip-flops 1408 and 1409 in turn set the flip-flops 1406 and 1407 which produce the signals PSA and PSB when the leading edge of the next card is detected at the read station. The chart in FIG. 21 indicates that an A and B condition provides an early select. Thereafter, at TP1 time the AND gate 1424 is fully conditioned to reset the flip-flop 1423.

The operation of the early select for the secondary is identical to that just described from the primary and no further description will be given herewith.

We have just studied in connection with FIG. 14 the logic circuitry for generating the signals which represent a decision as to which stacker will be selected for the cards. Now let us examine FIG. 16 which shows the logic circuitry for generating the signals to actually energize the solenoids that control the gates into the various stacker pockets.

In FIG. 16a we find in the left-hand section a flip-flop 1603 whose inputs are $\overline{\text{PCH16}}$ and PLE5 signals. When a card leaves the waiting station, as was described in connection with FIG. 14 it passes a photocell Channel 16 and therefore as the card leaves the waiting station the signal on line 1602 goes low to set the flip-flop 1603. It will be recalled that the PSA and PSB signals were generated in response to the leading edge of a card for the primary reader and in response to a card passing Channel 15 in the secondary reader. It will also be recalled that in connection with the discussion of FIG. 13 that the ejector mechanism is operated in response to the trailing edge of the card. Hence when a card passes through the reading station its leading edge initiates the decision with respect to where another card in the waiting station is to go and its trailing edge selects the slot in the waiting station to whence the card in transport should go. With respect to FIG. 16 the leading edge of a card (signal PLE5) resets flip-flop 1603 and also causes another card in the waiting station to be ejected from the waiting station. The card from the waiting station causes the $\overline{\text{PCH16}}$ signal to go low and sets the flip-flop 1603.

The output from the set side of flip-flop 1603 is a low signal which is transmitted to the AND gate 1604 and to the OR inverter delay device 1605. Since the output from the OR inverter device 1605 is delayed, its input to the AND gate 1604 will be low when the low signal from flip-flop 1603 arrives. Hence the AND inverter 1604 is fully conditioned to provide a high signal to the OR inverter 1606. The output from the OR inverter 1606 is a low signal to the AND gates 1607, 1608 and 1609. Depending upon which pocket is selected, one of the gates 1607, 1608 or 1609 will be fully conditioned. Assume we are selecting primary stacker pocket one and therefore $\overline{\text{PSA}}$ and $\overline{\text{PSB}}$ are low. The AND inverter 1607 transmits a high signal to the differentiator input 1610 to transfer flip-flop 1611 to its one side and thus select primary stacker one.

Simultaneously the low signal from the OR inverter 1606 is transmitted to the AND gates 1612, 1613 and 1614. Since the AND gates 1608 and 1609 are not fully conditioned at this time, these gates will respectively provide low signals to fully condition the AND gates 1613 and 1614. Thus the flip-flops 1615 and 1616 are reset.

It will be recalled that the foregoing operation took place in response to the signal through the OR inverter 1605 being delayed. After the delay the OR inverter 1605 will produce a high signal to inhibit AND gate 1604 and consequently inhibit AND gates 1607, 1608 and 1609. Therefore no other stacker can be selected until another card passes the channel 16 photocell.

The circuit for the secondary stacker selection which is also shown in FIG. 16 is similar to that just described for the primary stacker selection. The only difference in the operation of the two stacker circuits is that the flip-flop 1617 is reset with the $\overline{\text{SCH15}}$ signal and the SCH15LE signal. The generation of these last two signals is shown in FIG. 13a, respectively, as the output from the zero side of flip-flop 1330 and the output signal from the delay device 1333. As can be seen in FIG. 13a signals $\overline{\text{SCH15}}$ and SCH15LE go low when a card cover the Channel 15 photocell.

Now it will be recalled that in the previous discussion reference was made to the primary unload flip-flop (PUNLFF) which was a circuit arrangement for allowing the operator to run the cards out of the system. When the $\overline{\text{PUNLFF}}$ signal is generated (which was described before) the OR gate 1618 provides a high signal therefrom which is transmitted to set the flip-flop 1611 and therefore energize the stacker 1 solenoid opening its deflector to direct all cards into the first stacker. Hence, when the machine is emptied of its cards by having the operator depress the unload switch all of the cards are transported into the first stacker in the primary and those in the secondary are transported into the first stacker of the secondary.

Very often in an operation there will be cards in both the primary and the secondary readers for the purpose of having these cards read and the information therefrom transmitted to a data processor. In other words the card controller will be acting simply as an input device to a data processor. In this situation the cards in the secondary reader and the cards in the primary reader should not be interleafed or mixed and hence under these conditions there is a primary common inoperative signal ($\overline{\text{PCINPH}}$) which is generated and a secondary common inoperative signal ($\overline{\text{SCINPH}}$) generated. The $\overline{\text{PCINPH}}$ signal is transmitted on line 1619 to provide a high signal from the OR gate 1620 to set the flip-flop 1616 to its ONE side. The output from the ONE side of flip-flop 1616 provides a signal to energize the solenoid of the number 3 stacker and hence if stackers 1 or 2 have not been selected, all of the cards from the primary in such an operation are transmitted into the number 3 stacker, while all of the cards in the secondary under the same conditions are transported into the number 3 stacker of the secondary.

In our discussion up to this point we have considered the logical circuitry and the signals which must be generated in order to transport cards from the hopper, through the ready station, through the read station, into the waiting station, out of the waiting station and into the stacker pockets. Let us now consider the logic circuitry and the signals which must be generated in order to transmit information from the read station into the memory.

In the read station there are 12 photocells over which the card passes with its column end first. If there is a hole in the card, light is transmitted through the hole to energize an associated photocell and to thereby transmit a signal into the memory.

Consider FIG. 17 which shows the logic of the photocells and the signals which are generated in response to light being passed from the light source to the photocell. Each of the photocells works in combination with another photocell in order to provide a normal reading of a hole in the photocell position, as well as a card image reading.

To make this point clearer envision that the positions to be punched in the column are identified as 12, 11, 0, 1, 2, 3, 4, 5, 6, 7, 8, 9. If the card is divided in half along a row direction, then the upper portion will contain the row positions 12, 11, 0, 1, 2, and 3, while the lower portion will contain the positions 4, 5, 6, 7, 8, and 9. When a card is read in the normal sense various combination of the holes respectively represent various digits and hence the holes are read as raw information to be combined later. In other words, if a hole in the third position in combination with a hole in the eighth position represents some particular digit, then when the card passes through the reading station there will be a generation of a CH3 signal (for the hole in the third position) as well as a CH8 signal (for the hole in the eighth position) which signals are later combined and translated into some digit representation. On the other hand, when the card image mode is being read the upper six positions are considered the upper field, while the lower six positions are considered the lower field. In the card image mode, both position 9 and position 3 are considered bit 1, while positions 8 and 2 are considered bit 2 positions, etc. The significance of the two modes of operation will be better appreciated as the discussion goes forth.

The generation of the Channel 3 signal and the Channel 9 signal as well as the read bit 1 signal should be examined. When the card passes from the ready station through the read station and there is a hole punched in the third position of any column this hole will cause a low signal to be produced on line 1701 as the column with this hole therein passes over the number 3 photocell. The low signal on line 1701 is transmitted to the photocell amplifier 1702 which has a coincidence input means. In order to have the AND photocell amplifier 1702 fully conditioned there must be a high signal generated on line 1712.

For the moment, then, consider the generation of the signals $\overline{\text{MCAA}}$ and MCAA. In FIG. 16, there is shown a photocell amplifier driver 1625 and 1626. It will be recalled that the generation of the MC and $\overline{\text{MC}}$ signals was discussed in the description of FIG. 10. The MC signal and the $\overline{\text{MC}}$ signal, are generated every other time in response to the output signal of gate 1027, with the MC signal being responsible for A signal time, such as an OCA period and the $\overline{\text{MC}}$ signal being responsible for the B signal time such as OCB or ICB signals. A low MC signal transmitted to the photocell amplifier 1626 will produce a high $\overline{\text{MCAA}}$ signal, and this will occur during ICA or OCA time. A low $\overline{\text{MC}}$ signal transmitted to the photocell amplifier driver 1625 will produce a high MCAA signal, and this will occur during ICB and OCB time. Due to the circuit design, the AND photocell amplifier is fully condition by a low input from the photocell (e.g. PPC3 signal) and a high control signal (e.g. MCAA signal or $\overline{\text{MCAA}}$ signal).

Returning now to the operation of the AND photocell amplifier 1702, we find that it is fully conditioned during ICA and OCA time by the presence of a high $\overline{\text{MCAA}}$ signal, and transmits a signal therefrom, through the OR inverter 1703 to produce a high signal as an output signal. The high signal from the OR inverter 1703 provides a high $\overline{\text{CH3}}$ signal, and after having been transmitted through the inverter 1705 produces a low CH3 signal.

When the card with a three hole punched therein passes over the secondary read station, the photocell at the third position again generates a low signal which is transmitted on line 1713 to the AND photocell amplifier 1708. The AND photocell amplifier 1708 is similar to the AND photocell amplifier 1702. The MCAA signal on line 1714 is generated high during ICB and OCB times to fully condition the AND gate 1708. The output from the AND photocell amplifier 1708 is transmitted through the OR inverter 1703 to produce directly a high $\overline{\text{CH3}}$ signal. The high $\overline{\text{CH3}}$ signal is transmitted to the inverter 1705 to produce a low CH3 signal.

The $\overline{\text{CH3}}$ and CH3 signals are generated to be used to designate that a hole has been detected in the card in the third hole position during a normal mode operation of this circuit. Since the MCAA and $\overline{\text{MCAA}}$ signals will be generated high alternatively, it follows that the $\overline{\text{CH3}}$ and CH3 signals will alternatively detect the information in the primary and in the secondary by virtue of toggling action, i.e., first the AND gate 1702 will be fully conditioned and then the AND gate 1708 will be fully conditioned.

The output from the inverter 1705 is low, and is transmitted to the AND device 1715. The other input to the AND device 1715 is the upper field signal (UF) whose generation will be discussed in connection with FIG. 18. When there is light seen by a Channel 3 photocell, that is through a hole in the card, and at the same time there is an upper field signal (UF) generated, the AND gate 1715 will produce a read data 1 (RD1) signal, which is used in the card image mode of operation. On the other hand, and in a similar fashion, when there is a low signal from the inverter 1716, it is transmitted to the AND gate 1717. The second input to the AND gate 1717 is a lower field (LF) signal and the output therefrom is also an RD1 signal. The outputs of AND-OR amplifiers, 1715 and 1717 are tied together to produce one output signal, RD1, when either AND-OR amplifier is fully conditioned. Hence, when there is light seen by the Channel 9 photocell which in response generates a low signal on line 1718 (or line 1719 if it is a secondary read operation) there is a "read data" (RD1) signal generated for the card being examined.

In the immediate foregoing discussion, we have considered the toggle generation of the $\overline{\text{CH3}}$ signal and the CH3 signal, as well as the generation of the RD1 signals for both an upper field and a lower field. While we have not discussed in detail the generation of the CH9 and the $\overline{\text{CH9}}$ signals it is apparent that the generation thereof is virtually identical to the generation of the CH3 and $\overline{CH3}$ signals, excepting that the hole in the card is seen in the ninth position. Each of the circuits shown in FIG. 17 which generates the Channel 2 signals, Channel 8 signals, RD2 signals; Channel 1 signals, Channel 7 signals, RD4 signals; Channel 0 signals, Channel 6 signals, RD8 signals; Channel 11 signals, Channel 5 signals, RDY signals; Channel 12 signals, Channel 4 signals, and finally the RDX signals has a similar logical circuit arrangement. Therefore the discussion of the generation of these last-mentioned signals is not considered necessary. It is to be understood that all the last-mentioned signals are generated in exactly the same manner as that described in connection with the generation of the Channel 3 signals and the RD1 signals.

The generation of Channel 13, Channel 14, Channel 15, and Channel 16 signals is directly from a photocell amplifier such as primary photocell 13 signal being transmitted to photocell amplifier 1625 to produce PCH 13.

MEMORY REQUEST

Let us now examine FIG. 18 which shows the logic circuitry and the generation of signals which are necessary to enable the system to request the use of the memory for a primary or a secondary reading operation. In FIG. 18 it will be noted that there is a primary memory request flip-flop 1804 as well as a primary memory grant flip-flop 1806. Initially, in general, this system makes a request for use of the memory and the memory request is then subsequently granted. If, for some reasons, the information which is being read is not to be transmitted to the memory, there will be an inhibit signal generated which will render the memory grant signal ineffective.

Consider now the details of the memory request and the memory grant operation. Note that AND gate 1801 requires two low input signals thereto, one being a sprocket signal (PSPR) applied to line 1802 and the other being a primary read order (PRDO) which is applied to line 1803. It will be recalled that the sprocket signal (PSPR) is continually generated (i.e., one sprocket signal for each column on the card and two control sprocket signals in the trailing edge detection) once a card has started through the read station, while the primary read order (PRDO signal) is generated in response to a signal on the plugboard being directed into the primary read plugboard hub. It will be recalled that the primary read order signal will be present until the card has either read eighty columns or until the end read signal from the plugboard resets the primary read order flip-flop. When a sprocket signal is detected and the primary read order flip-flop is still set the AND gate 1801 is fully conditioned. When the AND gate 1801 is fully conditioned it provides a low signal therefrom to set the primary memory request flip-flop 1804.

The output signal from the ONE side of the primary memory request flip-flop 1804 is transmitted to the AND gate 1805. When the sprocket signal ends so that $\overline{PSPR}$ signal goes low, the AND gate 1805 becomes fully conditioned, at TP1 time during the OCA period (OCAX being low). The output signal from the AND gate 1805 is a low signal which is transmitted to set the flip-flop 1806 to its ONE side. The output signal from the ONE side of the flip-flop 1806 is a low (PGR) primary grant signal, which is transmitted back to the AND gate 1807, whereby, in conjunction with a $\overline{PC1}$ (i.e., no primary card image condition) as well as a TP0 signal, the AND gate 1807 is fully conditioned. The output of the AND gate 1807 is transmitted to reset the flip-flop 1804. The low output from the reset side of the flip-flop 1804 is transmitted to the AND gate 1808, and in conjunction with a TP7 signal and an OCB signal, the AND gate 1808 is fully conditioned. The output signal from the AND gate 1808 is transmitted to reset the flip-flop 1806. In partial summary, then, the flip-flop 1806 is set for one OCA time and one OCB time, to provide a PGR signal. The use of the PGR signal (primary grant signal) is to modify the address into which the information from the card has been read. This operation will be fully appreciated hereinafter.

During the time that flip-flop 1806 is set the output from the flip-flop 1806 reset side is high, and is transmitted to the AND gate 1809.

The AND gate 1809 is fully conditioned by the output from the reset side of flip-flop 1806, in conjunction with an $\overline{OCA}$ signal and a PIDE signal the latter of which stands for a "primary inhibit data entry" signal. While the signal from the reset line of flip-flop 1806 is high for both OCA and OCB times the AND gate 1809 is fully conditioned for only OCA time. Let it be understood at this point that the address is modified during OCB time and the information is accepted from the primary read only during OCA time. The foregoing is apparent since $\overline{OCA}$ is high only during OCA time.

The output from the AND gate 1809 provides a low PMGR signal during OCA time which is "primary memory grant" and this signal is transmitted to partially condition the AND gate 1810. If the system is not functioning in the card image mode of operation the $\overline{PC1}$ signal will be low and therefore at T5 time, the AND gate 1810 will be fully conditioned. The output signal from the AND gate 1810 is a high signal which is designated PXL, which means primary translate. The high signal is transmitted to the OR inverter 1811, the output of which is a low XLATE signal or translate signal. Hence, when there is no card image operation in effect, information is translated from the raw information of the card which has been detected by the photocell amplifiers into a usable machine code and this translation occurs at the initiation of the signal XLATE.

If the machine is operated in the card image mode, then the signal PC1 which is transmitted on line 1812 (FIG. 18*a*) is low, and this signal is transmitted to the AND gate 1813. This last-mentioned signal in cooperation with the OCAX signal and TP0 signal, as well as the output from the set side of primary memory grant flip-flop 1806 fully conditions the AND gate 1813. The output from the AND gate 1813 serves to reset the flip-flop 1804. The purpose for the circuitry and the AND gate 1813 is to enable the PGR signal to be present in its high state for two OCA times in order to complete a card image mode. In other words, when the system is operating in its regular mode, it is only necessary for the system to experience one OCA time and one OCB time to take information from the card and place it into the memory, since one card column contains one character. However, during a card image time, the system must read the upper field as well as the lower field (i.e., one card column contains two characters) and therefore there are two OCA times and two OCB times necessary. By arranging the circuit to pass through the AND gate 1813, which is conditioned with both a PC1 signal and an OCA signal (and inhibiting AND gate 1807 with a high $\overline{PC1}$ signal,) the flip-flop 1804 does not get reset until the second OCA time. Accordingly, the high $\overline{PGR}$ signal has been available for two full OCA times.

Let us study the operation of the system during a card image mode, and accordingly look at the inputs to the AND gate 1810 which include the $\overline{PC1}$ signal. If the operation is in a card image mode the $\overline{PC1}$ signal is high, and hence there is no translation signal generated. The foregoing arrangement is desirable, since we do not want to translate during a card image mode operation.

Examine the inputs to the AND gate 1814. The AND gate 1814 has a PMGR signal applied thereto, as well as a PREQ signal, a PC1 signal, and T5 signal. During the first excursion of the signal from AND gate 1801 around the loop, the primary memory request flip-flop 1804 generates a low signal PREQ to be applied to the AND gate 1814. This last signal in conjunction with the low PC1 signal and T5 signal, as well as the low PMGR signal fully conditions AND gate 1814, to provide a high output signal therefrom to the inverter 1815. The inverter 1815 inverts the high signal thereto to provide a low upper field signal UF. During the second OCA time of the card image operation the primary memory request flip-flop 1804 is reset and hence there is generated a low $\overline{PREQ}$ signal. The low $\overline{PREQ}$ signal is transmitted to the AND gate 1816.

This last signal in conjunction with the low PMGR signal, a PC1 signal, and T5 signal fully condition the AND gate 1816 to provide a high output signal therefrom to the inverter 1817. The inverter 1817 inverts the high signal thereto to provide a low field LF signal.

It can be readily seen then that when the system operates in a card image mode during the first OCA time it reads the upper field and at the next OCA time it reads the lower field to store the information accordingly.

The generation of the primary read flip-flop signals PRFF and $\overline{\text{PRFF}}$ was discussed earlier in connection with the description of FIG. 10. It will be recalled that a leading edge and a read-execute signal when transmitted to the AND gate 1818 sets the primary read flip-flop 1819 to generate low PRFF and high $\overline{\text{PRFF}}$ signals.

It will be noted that the primary read flip-flop 1819 is reset at the general clear time by the $\overline{\text{GC}}$ signal through the OR gate 1821.

Now as soon as the system has terminated its reading operation, in the interest of time, it would be advantageous to have it go to some other step, possibly a processing step even though the card may be at that moment still passing through the read station. For instance, if only the first 30 columns were to be read it would be of interest to have the machine terminate the reading operation after thirty columns have been read and receive a new instruction to do something else, while the last 50 columns were passing through the read station. In order for the machine to receive a new instruction signal, the primary read flip-flop 1819 must first be reset. The inputs to the two AND gates 1822 and 1823 represent a number of conditions which the system must first meet before the primary read flip-flop 1819 can be reset and therefore before the system can accept a new instruction.

With respect to the first of these conditions, it is desirable to know that the system has not had a misfeed because it is preferable to have the system "hung up" in the instruction step in which the misfeed occurred in order that the operation can be continued from that point after the misfeed or jam situation has been rectified. Therefore, the $\overline{\text{PFEED}}$ signal is one of the input signals to the AND gate 1822.

It will be recalled that the $\overline{\text{PFEED}}$ signal goes low as soon as Channel 13 photocell is covered. This means that as long as there is a card in the ready station the $\overline{\text{PFEED}}$ signal would be low and hence there would be an indication that there was no misfeed.

With respect to the inputs to the AND gate 1823 the ATP4 signal is simply a timing signal; however, the barred Channel 15 signal goes low when a card has left the read station and is on its way to the wait station and hence in indicative of the fact that there is no jam in the transport mechanism beyond the read station. In addition, since we do not want the primary read flip-flop to reset until the read order has been completed we provide the $\overline{\text{PRDO}}$ signal which goes low when the read order has terminated. Hence, when the read order has terminated and the leading edge of the card has been detected at Channel 15, at TP4 time, the AND gate 1823 is fully conditioned to be combined with the AND gate 1822 to reset the primary read flip-flop 1819 to its ZERO side.

These last-mentioned signals and conditions would enable the primary read flip-flop 1819 to be transferred to its reset side and hence allow a new instruction to be generated during the time that the reading operation was terminated on the one card.

Finally, the AND gate 1824 also provides a signal to reset the primary read flip-flop 1819. It will be remembered that the PUNLFF signal is a signal which is generated when the system is to be manually operated and represents a primary unload flip-flop signal. When the primary read order has terminated and the primary unload flip-flop is generating a low signal the AND gate 1824 is fully conditioned to also reset the primary read flip-flop.

The circuits and the signals which are necessary for the operation of the secondary read portion of the system are also shown in FIG. 18. Each of the AND gates and each of the flip-flops in the secondary circuits is an equivalent of an AND gate or a flip-flop in the primary read circuit and the inputs thereto have equivalents in the primary description. Hence, it would appear that no further description of the secondary read circuits is necessary. One difference would be pointed out. It should be noted that the inputs to the AND gate 1825 includes an OCB signal, whereas the input to the AND gate 1805 included an OCA input. Similarly, the input to the AND gate 1826 is OCA, while the input to the AND gate 1827 is OCB whereas their counterparts in the primary read circuit are, respectively, OCB, OCA. These signals have been reversed because the secondary operates such that during OCB time information is transferred to the memory while during OCA time the address register is incremented or changed and this it will be recalled is exactly the opposite from the primary read circuit.

TRANSLATOR

In the discussion immediately before, with respect to the extracting of data from the card, we found that the photocells generate CH signals as well as RD signals and we have further found that when there is a primary read operation being ordered by an instruction the circuits provide a means to first request the use of the memory and then grant the use of the memory and thereafter generate either a translate signal so that the information can be translated into a usable code for the machine or generate an upper field or a lower field so that the information can be read directly from the card. It seems fitting at this point to discuss, in general, the manner in which the data is manipulated in the machine for further use. When the information is taken from the card (by the photocells) it is first transmitted through a translator into a data register. The translator takes the raw information and translates it into a machine code. The machine code can be found tables shown in FIG. 19. The information as set up in the data register is in the machine code.

The data registers are made up of two parts, a D register and a C register. The D register acts to accept information from the photocells, the translator, as well as from the memory and to transfer the information into the memory. The C register transfers arithmetic results into the memory. In addition when an arithmetic operation takes place, one operand is stored in the C register while a second operand is stored in the D register and the answer of the arithmetic operation is automatically stored in the C register. Information which is extracted from the memory and transmitted to the D register is under the control of some data control circuits which include circuits to extract this information from a particular address. It follows also that information which is transmitted from the D register or the C register to the memory is also controlled by data control circuits which can pick a specific address in the memory into which this information is to be written. Bearing this general description in mind let us first consider the operation of the translator by reviewing FIGS. 19, 20, 21 and 22. FIG. 19 is a table of the codes to which information is translated while the FIGS. 20,21, and 22 depict a schematic drawing of the 80-column translator device.

Figure 20:
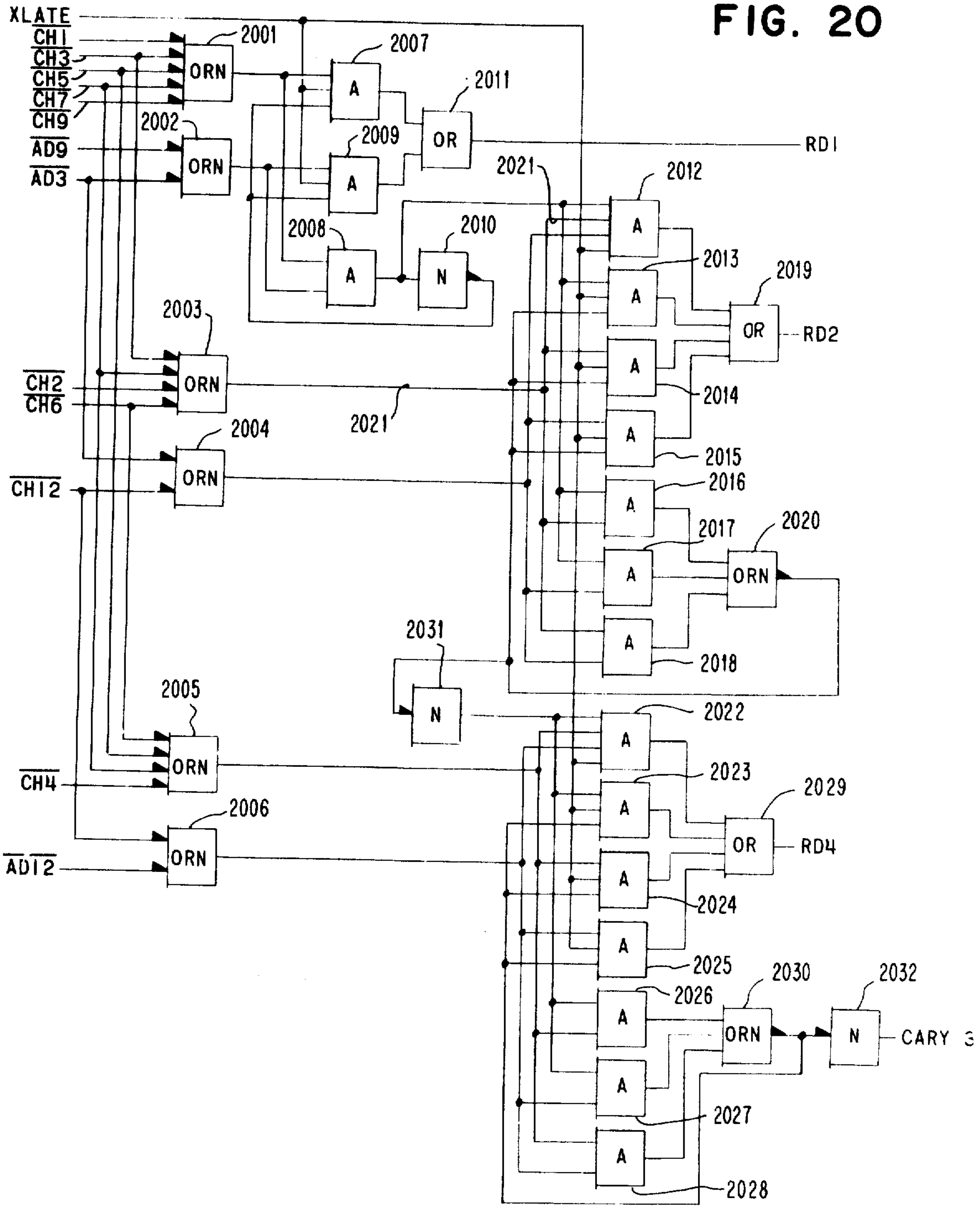
Figure 21:
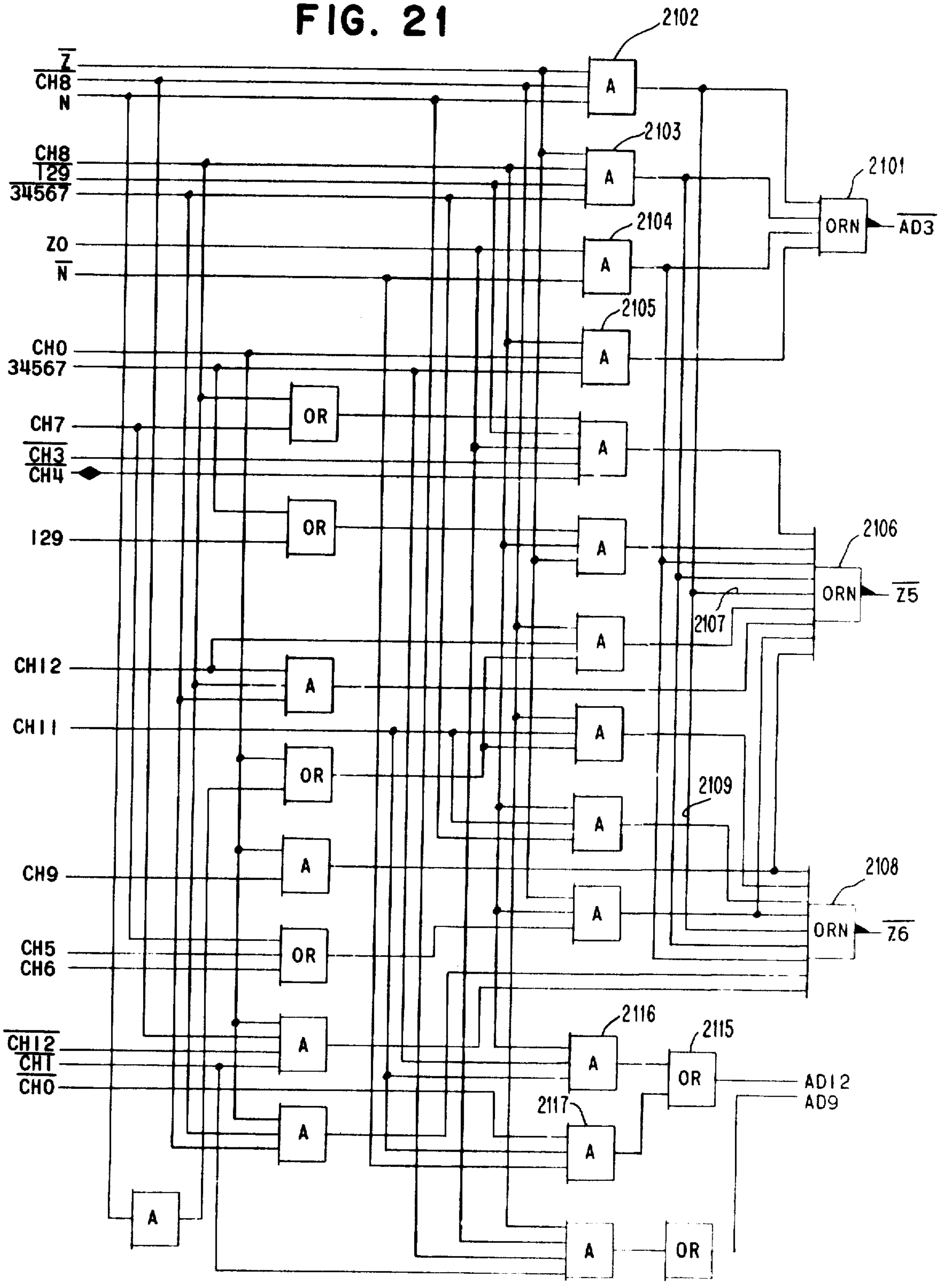
Figure 22A:
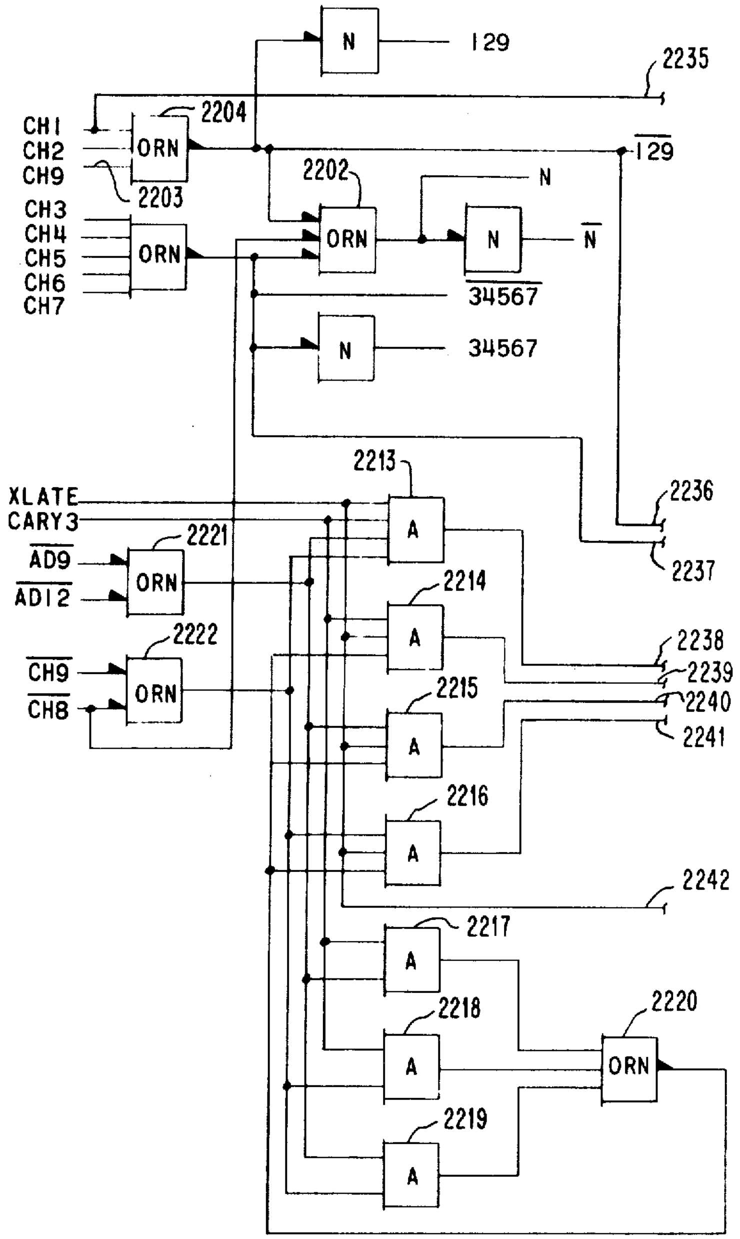
Figure 22B:
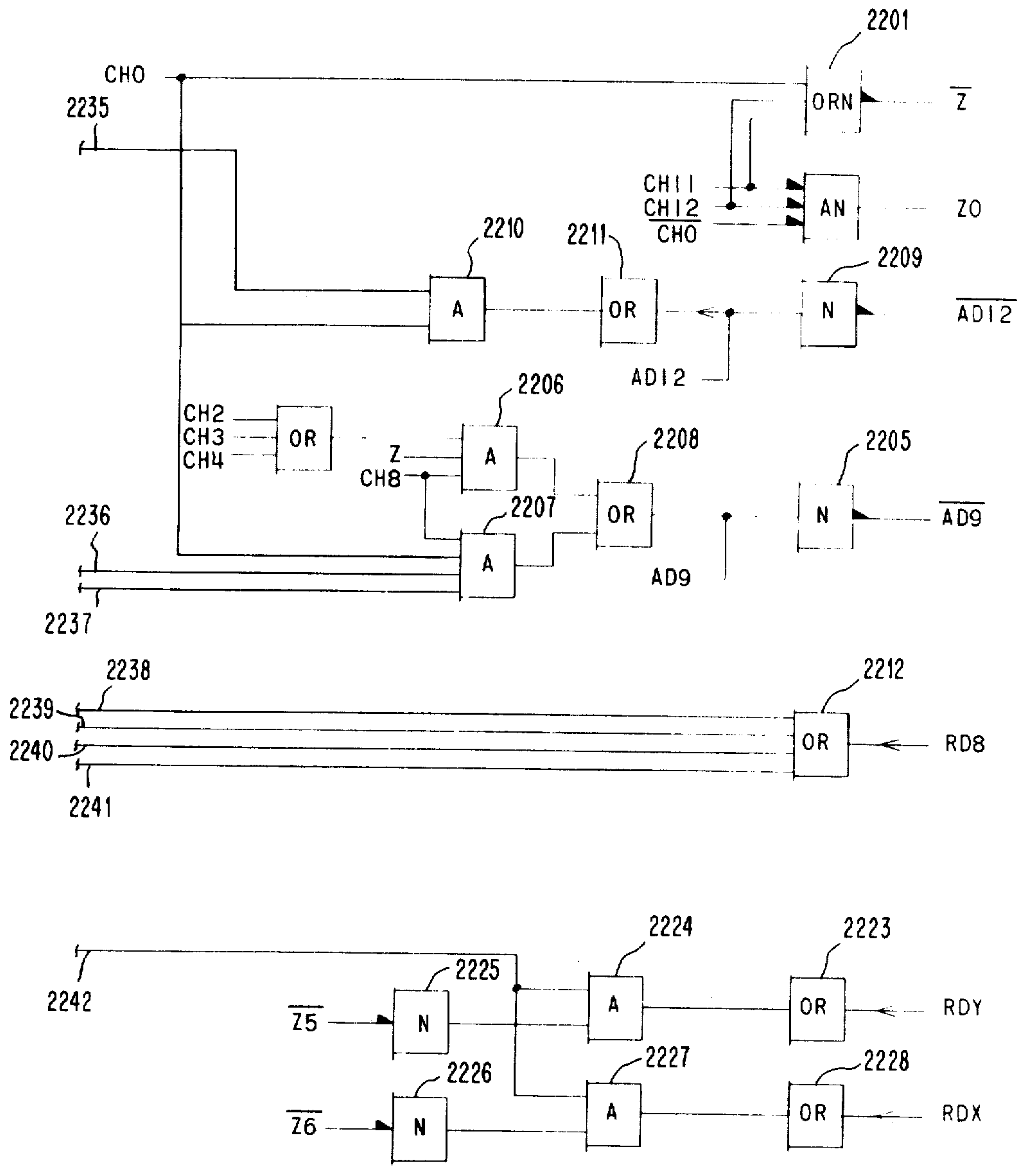

Consider first FIG. 20 which shows part of the schematic from the translator device. In the upper left-hand portion of the figure, there can be seen a translate line labeled "XLATE". It will be recalled that in the discussion of FIG. 18 the translate signal was generated when the system was to perform a translate mode operation. The inputs to the OR gates 2001, 2002,2003, 2004, 2005 and 2006 can be better appreciated by tracing some examples through this translator circuit. Let us assume that we are going to pass a card through the reading station which has a hole punched in the nine position only, and therefore the numeral nine is to be read and translated into the machine code. Examine FIG. 19 in this regard, and we find that the character 9 has a punch in the ninth position only as shown in Column two. The adder input one in Column three is 1001 which is the binary equivalent of a nine, the adder input in Column four is 0011 which is the binary equivalent of three, and when the sum from Column three is added to Column four we get the answer in Column five of 1100 which is the binary equivalent of twelve. It will be recalled that in the preferred embodiment that the machine code is an excess three code, and so the numeral 9 is represented by a 1100 or a binary 12. However, in this particular system, there is also a zone provision and it will be noted that in the seventh column the zone digits are 1,1 so that the 9 is represented as a six bit digit which is 111100. In Columns six and seven it will be noted that the logic gates used to implement the translations are identified by numerals and letters. The numerals and letters appear in FIGS. 21 and 22 alongside the appropriate gates. This particular notation enables the reader to find the particular gate which is significant in generating the signals or conditioning the logic to provide for the translation of the one hole in the card (in the ninth position in our example) translated into a 6-bit digit code 111100.

Now, in the example that we are considering, since there is a nine punched in the card, in FIG. 20 the $\overline{CH9}$ line will be high, thereby conditioning the OR inverter 2001 to transmit a low signal to the AND gate 2007, and a low signal to the AND gate 2008. In considering the inputs to the OR inverter 2002 we need only look at FIG. 21 which shows the generation of the $\overline{AD3}$ signal.

The $\overline{AD3}$ signal was generated from the OR gate 2101 which has four inputs thereto. The first of these inputs comes from the AND gate 2102 and therefore let us examine the inputs to this last-mentioned AND gate. The $\overline{Z}$ signal is found on FIG. 22 and is generated from the OR inverter 2201. The inputs to the OR inverter 2201 are CH0, Ch11, CH12 which will all be high at this time since the only punch in the card is that of Number nine. Hence the signal $\overline{Z}$ will be low at this time, and will provide one low input to the AND gate 2102. Since there is only the nine punched in the particular card with which we are dealing, the signal $\overline{CH8}$ will also be low thereby providing a second low input to the AND gate 2102. The generation of the N signal can be found in FIG. 22 and it is generated as the output from the OR inverter 2202. When CH9 goes low on line 2203 there is a high output from the OR inverter 2204 to provide a high input to the OR inverter 2202. The high input to the inverter 2202 provides a low output and therefore a low N signal. Returning now to FIG. 21 we find that N signal is also low thereby providing a third low input to the AND gate 2102 and hence fully conditioning that AND gate to provide a low signal to the OR inverter 2101. A low input to the OR inverter 2101 provides a high output signal therefrom thereby making it obvious that the $\overline{AD3}$ signal is high irrespective of what the conditions are on AND gates 2103, 2104 and 2105.

Having established that the signal $\overline{AD3}$ is high let us return to FIG. 20 and examine the inputs to the OR inverter 2002. With the signal $\overline{AD3}$ being high, there is a high input to the OR inverter 2002 to provide a low output therefrom which in turn provides a low input to the AND gate 2009 and a second low input to the AND gate 2008. This second input to the AND gate 2008 fully conditions this AND gate and provides a low output signal therefrom which is transmitted to the inverter 2010 to provide a high output signal therefrom which is fed back to inhibit the AND gates 2007 and 2009. With the AND gates 2007 and 2009 inhibited there will be no low output signals to the OR gate 2011 and hence The line RD1 will be high.

Now there was a low signal transmitted from the AND gate 2008 to the inverter 2010 and this same low signal is also transmitted to the AND gate 2012. The output from the AND gates 2012, 2013, 2014, 2015, 2016, 2017, and 2018 are either directly inputs to the OR gate 2019 or indirectly inputs thereto through the OR inverter device 2020. As can be seen in FIG. 20, the output from the OR gate 2019 is the RD2 signal and so let us examine the input signals to the AND gates 2012 through 2018 to determine whether or not RD2 will be high or low.

As just mentioned above, there is a low signal from the AND gate 2008 to the AND gate 2012. The second input to the AND gate 2012 on line 2021 comes from the OR inverter 2003. The inputs to the OR inverter 2003 are $\overline{CH3}$, $\overline{CH7}$, $\overline{CH2}$, and $\overline{CH6}$ and since all of these photocells are covered these particular lines are low, therefore there is a high output from the OR inverter 2003. The high output from the OR inverter 2003 inhibits AND gates 2012, 2014, 2016, and 2018. With these last-mentioned AND gates inhibited we need now only consider AND gates 2013, 2015 and 2017.

The AND gates 2015 and 2017 have as one of their inputs the output from the OR inverter 2004 and the inputs thereto consist of $\overline{AD3}$, and $\overline{CH12}$. It will be recalled that $\overline{AD3}$ is a high signal and therefore there is a low output from the OR inverter 2004 to provide one low signal to the AND gates 2015 and 2017. The second input to the AND gate 2017 comes from the output of the AND gate 2008 which we have already determined to be low and hence the AND gate 2017 is fully conditioned to provide a low signal therefrom. A low signal from the AND gate 2017 is transmitted to the OR inverter device 2020 to provide a high signal therefrom.

The high signal from the OR inverter 2020 is transmitted back to inhibit the AND gate 2015 and the AND gate 2013. Thus, none of the AND gates 2012 through 2014 is fully conditioned to provide a low input signal to the OR gate 2019. Since the OR gate 2019 has all high inputs, when a number 9 is read, as just determined by our study of the signals, the output signal therefrom will also be high. The system thus far has provided RD1 and RD2 as high signals.

Now consider the signals which ultimately determine whether the line RD4 is high or low under the conditions set forth in this example. The AND gates 2022 through 2028 provide either direct inputs to the OR gate 2029 or indirect inputs thereto through the OR inverter 2030.

Let us consider the inputs to these last-mentioned AND gates which are from the OR inverters 2005 and 2006. The inputs to the OR invertor 2005 are respectively $\overline{CH5}$, $\overline{CH7}$, $\overline{CH6}$, and $\overline{CH4}$, and since there are no holes punched in the four, five, six or seven positions each of these lines will be low and hence there is a high output from the OR inverter 2005. The high output from the OR inverter 2005 will act to inhibit the AND gates 2022, 2024, 2026, and 2028 and hence we need only concern ourselves with the inputs to the AND gates 2023, 2025 and 2027.

The OR inverter 2006 has two inputs thereto, namely $\overline{CH12}$ and $\overline{AD12}$. Since there is not a 12 punch in the card we know that the line $\overline{CH12}$ is low, but we must determine the condition of the signal $\overline{AD12}$.

The generation of the signal $\overline{AD12}$ can be found in FIG. 22 whereat it is shown as the output from the inverter 2209. We find in connection with the generation of the signal $\overline{AD12}$ that the inputs to the AND gate 2210 are CH1 and CH0, both of which at this time are high, hence the AND gate 2210 produces a high output signal which becomes a high input signal to the OR gate 2211 which in turn produces a high output signal. The OR gate 2211 operates in conjunction with OR gate 2115 which generates the signal AD12. The input signals to OR gate 2115 are from the AND gates 2116 and 2117. AND gate 2117 is blocked by the $\overline{N}$ signal which has been shown to be high and AND gate 2116 is blocked by CH11 which is high because there is no hole in eleventh position. Hence, the output signal from OR gate 2115 is high. With both OR gates 2211 and 2115 being high there is a high input signal to the inverter 2209 which produces a low output signal which is identified as a low $\overline{AD12}$ signal. Hence under the conditions of our example the signal $\overline{AD12}$ is low, and returning to FIG. *2d* we find that there is a high output from the OR inverter 2006 which serves to inhibit the AND gates 2022, 2025, 2027, and 2028. Therefore, the only AND gate which has not been inhibited is 2023, and let us more closely examine the inputs thereto.

The first input to the AND gate 2023 is from the inverter 2031 whose input we determined earlier was high, and whose output therefore is low. The second input to the AND gate 2023 is the translate signal which is low since we are in the translate mode. The third input to the AND gate 2023 is the output from the OR inverter 2030. Since all of the inputs to the OR inverter 2030 have been shown to be high its output is low, and hence there is a third low signal transmitted to the AND gate 2023. The AND gate 2023 with three low input signals thereto is fully conditioned to provide a low output signal therefrom which is transmitted to the OR gate 2029 which in turn provides a low RD4 signal.

It should also be noted at this time that the low signal from the OR inverter 2030 is transmitted to the inverter 2032 to provide a high signal on the carry 3 line.

Let us examine now FIG. 22 to determine whether RD8 is high or low. As can be seen in FIG. 22, the RD8 signal is the output of the OR gate 2212. The inputs to the OR gate 2212 come either directly from the AND gates 2213 through 2216 or indirectly from the AND gates 2217 through 2219 through the OR inverter 2220.

Examine then the inputs to these last-mentioned AND gates. It will be recalled that the carry 3 signal is high which serves to inhibit the AND gates 2213, 2214, 2217 and 2218. It will also be recalled that the signals $\overline{AD9}$ and $\overline{AD12}$ are both low, and hence the output from the OR inverter 2221 will be high which will serve to inhibit the AND gates 2213, 2215, 2217 and 2219. It follows then that the only gate which is not inhibited is AND gate 2216 and therefore we should study the input signals to that particular AND gate.

The first input to the AND gate 2216 is from the OR inverter 2222. It will be noted that one of the inputs to the OR inverter 2222 is $\overline{CH9}$ which is high at this time since we are reading a nine hole position, and therefore there is a low output from the OR inverter 2222 to the AND gate 2216. The second input to the AND gate 2216 is a translate signal which is also low at this time since we are in a translate mode (and the other conditions necessary to generate this XLATE signal are assumed to be present). And, finally, the third input to the AND gate 2216 is from the OR inverter 2220 which must be low since all of its inputs have been shown to be high. Hence, the AND gate 2216 is fully conditioned to provide a low signal to the OR gate 2212 and therefore a low signal on RD8.

In summary then, thus far we have seen that the RD1 signal is high, the RD2 signal is high, the RD4 signal is low, and the RD8 signal is low and as will be appreciated when we discuss the operation of the data registers the low signals will store one bits and hence we have provided signals thus far to store 1100 which is in accordance with the table shown in FIG. 19. However, according to the table in FIG. 19 we must also provide signals to store two one bits in the zone area and hence let us consider the generation of the signals on RDY and RDX in FIG. 22.

RDY is the output signal from the OR gate 2223 which in turn has its input from the AND gate 2224. The first input to the AND gate 2224 is the translate signal which is low, and hence the AND gate 2224 is partially conditioned. In order to determine what the second input of AND gate 2224 might be, we must consider the generation of the signal $\overline{Z5}$. The generation of the signal $\overline{Z5}$ is shown on FIG. 21 whereat it can be seen that it is the output of the OR inverter 2106. Now the OR inverter device 2106 has many inputs thereto and only one of these inputs need be low in order to produce a high $\overline{Z5}$ signal. It will be recalled that when we considered the generation of the $\overline{AD3}$ signal, the gate 2102 was fully conditioned to provide a low signal therefrom, and this low signal is transmitted on line 2107 to the OR inverter device 2106 to produce a high $\overline{Z5}$ signal. While we are studying FIG. 21 let us consider the generation of the $\overline{Z6}$ signal which is the output of the OR inverter device 2108.

It can be readily seen that the output signal from the AND gate 2102 is also transmitted to the OR inverter 2108 via the line 2109 to produce a high $\overline{Z6}$ signal. Therefore, bearing in mind at this time that the system is reading a number 9 hole and we have high $\overline{Z5}$ and $\overline{Z6}$ signals, let us once again examine FIG. 22.

The $\overline{Z5}$ signal is high and is transmitted to the inverter 2225 to produce a low signal therefrom to fully condition the AND gate 2224. The fully conditioned AND gate 2224 will transmit a low signal to the OR gate 2223 which will in turn produce a low RDY signal.

In a similar manner the high $\overline{Z6}$ signal is transmitted to the inverter 2226 to produce a low signal therefrom which is transmitted to the AND gate 2227. The AND gate 2227 is fully conditioned in response to this last-mentioned signal as well as the translate signal to produce a low output therefrom which is transmitted to the OR gate 2228. A low signal to the OR gate 2228 of course produces a low RDX signal and hence the two zone lines RDY and RDX are both bearing low signals which produce the two 1-bit signals into the data register as will be seen as the description goes forth.

Now while only one example has been shown, that of reading a number 9 hole, many other examples can be worked out by first examining FIG. 19 to find out what holes are punched to represent certain characters in the card and what signals are to be produced from the translator in response to these cards in the hole and what gates are primarily instrumental in effecting the generation of these signals. Therefore, no further description of this translator appears to be necessary.

DATA REGISTER

As was set forth earlier, when the information has been read by the photocells and transmitted through a translator, the translated signals are forwarded to the data register and an understanding of the data register operation can be gleaned by examining FIGS. 23 and 24.

In FIGS. 23 and 24 there are shown two registers the D register and the C register. It should be recalled that the D register handles information coming directly from the card or directly from memory while the C register handles information that is going to be written into the memory after coming from the arithmetic unit or from the D register in anticipation of performing an arithmetic operation. Carrying forth the example of reading the number 9 hole, it will be recalled that we found the signals which were generated were a high RD1 signal, a high RD2 signal, and a low RD4 signal, a low RD8 signal, a low RDY signal, and a low RDX signal.

Before we consider in detail the application of the RD signals to the registers shown in FIGS. 23 and 24, it should be pointed out that the flip-flops 2302, 2303, 2304, 2401, 2402, and 2403 are all initially reset in response to a CLRD signal. The generation of the CLRD signal will be discussed in connection with FIG. 25, but for the moment accept that this signal is generated, and resets these last-mentioned flip-flops. Similarly, accept that the signal $\overline{CLRC}$ initially resets the flip-flops 2305, 2306, 2307, 2404, 2405 and 2406. These last-mentioned flip-flops make up the C register.

The flip-flops of the D register having been reset to their ZERO positions are now subjected to the RD signals. Recall that the translate signal is generated at a T5. Therefore, the RD signals are being considered at T5 time. Hence, the $\overline{T3}$ signal which is an input to the AND gate 2312 is low, making the output of AND gate 2312 high. The high output of AND gate 2312 is an input to OR gates 2313 and 2314. Therefore, the outputs of OR gates 2313 and 2314 are high and do not effect the flip-flops 2302 or 2303 at this time. The high signal RD1 is transmitted to the ONE side of the flip-flop 2302 and as can be seen in FIG. 23 the flip-flop 2302 responds to a low signal. Therefore there is no change in the status of the flip-flop 2302. That is to say the flip-flop 2302 continues to conduct on the ZERO side. The high RD2 signal is transmitted to the flip-flop 2303, and as can be seen in FIG. 23, this flip-flop also responds to a low signal and hence there is no change in the conduction status of this last-mentioned flip-flop. The $RD_4$ signal, which is low, is transmitted to the flip-flop 2304, and since this flip-flop responds to a low signal the flip-flop is transferred from its ZERO side to its ONE side indicating that there is a one bit stored in the bit position 4 of the D register. In a similar fashion the signals RD8, RDY, and RDX each respectively transfer the flip-flops 2401, 2402 and 2403 to the ONE side storing one bits in each of these positions of the D register. In summary, then, the 6-bit coded digit 111100 from the translator is transmitted to the D register and stored in the flip-flops in that particular manner.

Before we concern ourselves with the output signals from the D register and the way in which they are used let us examine the other inputs to the D register. The inputs to the AND gate 2308 are labeled MS1 which represents memory sense line for bit 1 and MTD which stands for "memory to D register". Now, when information is going to be transferred from the memory to the D register, a control signal MTD will be generated (the generation of this signal will be considered later in the specification) and at the same time an address signal is generated for the particular location from whence the information is to be read. The sense line which couples each of the memory positions on the one bit plane is connected to the line 2309 and hence if the address signals cause a one bit signal to be generated it will be transmitted on line 2309 to the AND gate 2308. If the instruction indicates a transfer of information from the memory to the D register, the MTD signal will also be low at memory read time (TIDD) and the AND gate 2308 will be fully conditioned to provide a low signal therefrom. The low signal from the AND gate 2308 is transmitted to the flip-flop 2302 to store the one bit from the memory. In a similar fashion, the inputs to the AND gate 2310 are the memory sense bit 2 line MS2 and the memory to D register line MTD. If there is a memory to D register instruction in effect so that the MTD line is low at memory read time, and at the same time the address signals cause a signal to be generated on the MS2 line, the AND gate 2310 will be fully conditioned to provide a low signal to transfer the flip-flop 2303 to its ONE side, thereby storing a ONE bit in the second position. Without further description it should be readily understood that the role of the AND gates 2311, 2407, 2408 and 2409 is similar to the role of the last two AND gates described. If there is a ONE bit present in the third bit portion of memory, the fourth bit portion of memory or either of the zone bit portions of memory (at the proper address, of course) the corresponding flip-flops will store these one bits.

The AND gate 2312 has two inputs thereto in particular T3 and DEQSFF. Let us digress for the moment and consider the generation of the DEQSFF signal which can be found in FIG. 24.

In FIG. 24 we find that the ZERO side of the flip-flop 2410 generates the signal DEQSFF. We further see that the name of this flip-flop is "D equal space flip-flop". The purpose of this flip-flop is to enable blank spaces to be converted into excess 3 zeros. In other words, it can be seen that a blank space in FIG. 19 is represented by no punches in the card and is represented electrically signal-wise by two zeros in the zone positions, and four zeros in the numeric positions. Now very often it is desirable to convert the numeric portion of a blank space into excess 3 zero condition either for a comparison operation or for an arithmetic manipulation. And, hence, the flip-flop 2410 and its accompanying circuitry is provided. As can be seen in FIG. 19 in order to convert a blank space to excess 3 zero we would have to change the first and second bits of the numeric positions to ones. This conversion of the blanks to excess 3 zeros is accomplished in the following manner.

During an arithmetic operation there will be a high signal on the ARITH line to condition the OR gate 2411 to provide a low signal therefrom. The low signal from the OR inverter 2411 is transmitted to the AND gate 2412 whereat in conjunction with a TP2 signal and in further conjunction with a low DB8 signal, and a low DBX signal, this AND gate 2412 is fully conditioned. The AND gate 2413 operates in conjunction with the AND gate 2412 as one large AND gate and hence there are further conditions, namely, the presence of a low DB4 signal, a low DB2 signal, a low DB1 signal, and a low DBY signal. It should be recognized that the DBX, DBY, DB8, DB4, DB2, and DB1 signals will be low if a blank condition is identified by electrical signals, since all of these particular bit positions would be ZERO. Hence, under an arithmetic condition and with all ZEROS present both AND gates 2412 and 2413 will be fully conditioned to provide a low signal to transfer the flip-flop 2410 to its ONE condition. With the flip-flop 2410 conducting on the ONE side, there will be a high DEQSFF signal. Before we examine the role of the high DEQSFF signal, further note that the programmer may arrange to convert the blank spaces to excess 3 zeros by wiring the plug hub line 2414. The operation of the high signal on line 2414 and the high signal on ARITH line is similar.

Now returning to FIG. 23 we find that when there is a high DEQSFF signal indicating that blank spaces are to be converted to excess 3 binary zeros and at T3 time the AND gate 2312 will be fully conditioned to provide a low signal to the two OR gates 2313 and 2314. In response to the low signal, the last-mentioned OR gates each provide a low signal to set the respective flip-flops 2302 and 2303 to their ONE conditions, thereby storing or "jamming" a binary 3, or 1-1 bit, condition in the first two-bit positions of the D register. In effect, then, the generation of the DEQSFF signal causes the first two positions of the D register to be transferred to their ONE side, and hence converts the numeric portion of the binary blank signal into an excess 3 zero.

As will be appreciated hereinafter when there is an arithmetic manipulation the sum takes on the zone digits of Operand 2. This is for the reason that in an arithmetic operation it is expected that only numerical quantities will be added and the code values for each of the numerical quantities (which can be seen in FIG. 19) each have a zone designation of 11. Therefore, in the case of changing a blank space to an excess 3 zero only the numeric portion is changed because the numeric portion is the only portion that is operated on arithmetically, and the zone portion will automatically be considered as would any other operand; that is, to say that the sum of the arithmetic operation will end up having a zone of Operand 2.

Examine now the inputs to the AND gates which are coupled to the ONE side of the flip-flops of the C register. By way of example, consider the input to the AND gate 2315 which is identified as a DTC signal and stands for "D register transfer to C register". When such an instruction is warranted the DTC signal is generated and this low signal partially conditions the AND gate 2315. If at the time that such a signal is generated there is also a one bit stored in the flip-flop 2302, the AND gate 2315 will be fully conditioned to provide a low signal therefrom to transfer the associated C register flip-flop 2305 to its ONE side. It follows that if there had been a ZERO stored in the flip-flop 2302 there would be no output from the AND/OR device 2315, and hence the flip-flop 2305 would remain in its reset or ZERO condition. The DTC inputs to the corresponding AND/OR devices act in exactly the same role and no further description thereof appears to be warranted.

It will be noticed that there is not an equivalent AND/OR circuit connected to the ONE output of the flip-flops 2402 and 2403 which are the zone bit flip-flops. Now, it will be recalled that when information is transferred from the D register to the C register it is only done so because an arithmetic operation or a compare operation is about to take place, and it will be further recalled that during an ADD operation only the numeric portions are dealt with and the answer takes on the zone bits of Operand 2. Hence, there is no necessity to have circuitry to transfer the zone bits of the D register into the C register.

In FIG. 23 it can be seen that there is an AND/OR device 2316 which is connected to the output of the ZERO side of the flip-flop 2302. There are similar AND/OR devices connected to the flip-flops 2303, 2304 and 2401. The inputs to the AND gate 2316 are the output signals from the ZERO side of the flip-flop 2302, as well as a signal labeled CPDTC, which stands for "complementing the quantity in the D register while transferring it to the C register". During a subtract operation, it is necessary to complement the information in the D register as it is transferred to the C register in order that we might accomplish the well-known addition by adding the complement value in order to effect a subtraction. Hence, when the information in the D register is transferred to the C register if there should be a ZERO in a D register position such as flip-flop 2302 this ZERO in combination with a CPDTC signal fully conditions the AND/OR device 2316 to provide a low signal therefrom. The low signal therefrom would be transmitted to the flip-flop 2305 to transfer this flip-flop to its ONE side. Hence, a ZERO in flip-flop 2302 appears as a ONE in flip-flop 2305. This operation is straightforward and the similar devices and conditions with respect to the other flip-flops will not be discussed further.

Finally, it will be noted with respect to the flip-flop 2302 that the output from the ONE side is a DB1 signal and the output from the ZERO side is a $\overline{\text{DB1}}$ signal. These last two mentioned signals (along with their equivalents from the 2-bit, 4-bit, 8-bit, Y-bit, and X-bit positions) are used to transmit signals to the arithmetic unit, into the bit emitter, etc., as will be appreciated with the further description of the system.

When an ADD operation is in effect the system adds Operand 1 to Operand 2 and returns the sum to the C register. When a SUBTRACT operation is in effect the system subtracts Operand 1 from Operand 2 and returns the difference (answer) to the C register. If Operand 1 is equal to Operand 2 there is no problem because there is a digit in both the D register and C register for every step of the problem. However, if Operand 1 has a fewer number of digits than Operand 2 the DTC and CPDTC signals must be inhibited (as will be explained with FIG. 25) and the Operand 2 digits which extend beyond the length of Operand 1 have excess 3 zeros added thereto, during an ADD operation, and the Operand 2 digits which extend beyond the length of Operand 1 have excess 3 zeros subtracted therefrom. For example, if Operand 1 were made up of four digits and Operand 2 were made up of eight digits, the four digits of Operand 1 would be added to the four least significant digits of Operand 2 (if an ADD operation were in effect) or subtracted from the four least significant digits of Operand 2 (if a subtract operation were in effect). Excess 3 code zeros would be added to or subtracted from the four most significant digits of Operand 2. The programmer must program the system so that Operand 2 is never less than Operand 1, otherwise the answer would be invalid. The foregoing is true because the most significant digit of Operand 2 would be continually added to the digits of Operand 1 which extended beyond the length of Operand 2.

AND gate 2345 will be fully conditioned when the address of Operand 1 has been fully read (IFC) signal), at TP4 time of an OCA period and during an ADD operation (ADD signal). When ADD gate 2345 is fully conditioned the low signal therefrom is transmitted to the OR gates 2348 and 2349 to jam to one bit signals (Excess 3 zero) into the C register. During a subtract operation the AND gate 2350 is fully conditioned by the IEC signal, the TP4 signal, the ADD signal and the SUB signal. The low output from AND gate 2350 acts to jam one bit signals into the third and fourth positions of the C register to provide the complement of an excess-3 code zero.

The inputs to the AND gate 2317 and the circuitry associated therewith are included for the purpose of effecting a conversion of an overpunch code. One of the popular codes used in data processing systems, and which has a priority of symbol letters and numeric values shown in Table 1 of the Appendix is the overpunch code. Now, if information is in a card according to this overpunch code, and such information is to be handled by this particular system there must be a conversion from the overpunch code to the excess-3 code of the present system. It will be noted from Table 1 of the Appendix that the codes are identical excepting where the zone values 01 of the overpunch code and 10 of the overpunch code are in effect. In other words, for the symbols "(" through the letter W the values of the overpunch codes are different from the card controller code.

Now when information has been prepared on the card in this popular overpunch code and such a card is to be processed through the present system this overpunch code must be converted into the card controller code for use in the machine. It is for this purpose that the AND gate 2317 comes into being.

Examine now the input signals to the AND 2317. We find the first two signals of DBY and $\overline{\text{DBX}}$. It will be noted that if DBY is low and $\overline{\text{DBX}}$ is also low that the code bits which are stored in the D register are a 01. If we examine the table of Appendix 1 we find that when the overpunch code has a zoned designation of 01 there must be a 3 added to this overpunch information in order to convert it into the corresponding card controller code. For instance, consider the character A whose overpunch code value is 01-0100 and whose card controller code is 01-0111. In order for the overpunch code to be converted into the card controller code there must be a binary 3 added to the overpunch code and this would of course render the overpunch code as 01-0111 which is also the card controller code. For economy of circuitry reasons the present system adds six to the card overpunch code and when the information is transmitted through the arithmetic circuit there is a 3 subtracted making a total of 3 added to the overpunch code information.

In order to add a six to the overpunch code when the 01 zone digits are recognized and when at the same time there is an overpunch convert signal generated on line 2318 (and of course at ATP2 time on line 2319), the AND gate 2317 would be fully conditioned to provide a low output signal therefrom. The low output signal from the AND gate 2317 would be transmitted to each of the OR gates 2320 and 2321. These last-mentioned OR gates in turn respectively supply low signals to transfer the flip-flop 2306 to its ONE side and the flip-flop 2307 to its ONE side thereby inserting or jamming a value of six into the C register. Thereafter, as will become apparent as we go forth with the description, the six value in the C register is added to the value of the code in the D register and a 3 is subtracted therefrom to render the sum the equivalent of the card controller code. It should also be noted at this time that the way in which the "10" values of the overpunch code are handled will be taken care of in the arithmetic network since the "10" combination in the zone means that three should be subtracted from the character and the description thereof will be set forth when the arithmetic network is described.

The gates 2346 and 2347 are used to jam an excess-3 code zero into the C register when the zones are0-0 or 1-1. From Table 1 of the Appendix it can be seen that if the overpunch code has a 0-0, or a 1-1 zone condition there should be no conversion of the numeric portion. It will be recalled that during an overpunch conversion a correction is jammed into the C register. If there is no conversion required then an excess-3 code zero should be jammed into the C register.

In order to effect the jamming of the excess-3 code zone into the C register the AND gates 2346 and 2347 are used. The input signals to AND gate 2346 are: DBX and DBY, which are both low if the zone bits are both one; the ATP2 signal to provide the timing and the OVPC signal which is energized if there is an overpunch code conversion in effect. The input signals to the AND gate 2347 include the $\overline{\text{DBX}}$ and $\overline{\text{DBY}}$ signal, which are both low if the zones are 0-0, as well as the signals ATP2 and DVPC.

When either AND gates 2346 or 2347 is fully conditioned one bit signals are jammed into the first two positions of the C register.

In the lower portion of FIG. 23 we find a number of OR inverter devices similar to the OR inverter device 2322. It will be noted that when there is a DB1 high signal indicating that there is a ZERO stored in the first bit position of the D register, there will be provided a $\overline{\text{DB1EH}}$ signal on the plugboard which signal can be used by the programmer to accomplish various operations. The remainder of the bit emitters are self-explanatory in view of the explanation given with respect to the OR inverter 2322.

Let us examine now the input signals to the C register flip-flops as found on FIG. 23. It will be noted that the flip flops 2305, 2306, 2307, as well as the flip-flops 2404, 2405 and 2406 are all designated as "AC flip-flops" meaning that the inputs thereto are a coincidence function and are capacitance coupled. When there has been an arithmetic operation and the sum of two operands generates a one-bit signal there will be a high signal generated on line 2323 which will transfer the flip-flop 2305 to its ONE side thereby storing this one bit in the C register. In a similar fashion when there is a ZERO bit generated from the arithmetic network in the one-bit position there will be an $\overline{AS1}$ signal appearing on line 2324 which will reset the flip-flop 2305 to its ZERO side. Of course, it must be recognized that the entry of any of the AS signals to transfer the flip-flops from one side to the other only happens in conjunction with a $\overline{BTP4X}$ signal which appears on line 2339. The role played by the other AS signals with respect to all of the flip-flops in the C register is similar to the role played by the AS1 and $\overline{AS1}$ signals, and hence it would appear that no further discussion thereof is necessary.

The outputs from the C register are the CB signals and by way of example consider the CB1 and $\overline{CB1}$ output signals from flip-flop 2305. The CB1 signal will be generated when there is a ONE stored in the C register in the bit-1 position and the $\overline{CB1}$ signal will be generated low when there is a ZERO stored in the C register in the bit-1 position. The CB signals are used to transfer information into the arithmetic unit and into other logical circuitry as will become apparent hereinafter.

Consider now the transfer of information from the C register into the memory. It will be noted that to each of the ONE output lines of each of the flip-flops in the C register there is connected an AND gate to which also there is connected a CTM signal. For example, examine AND gate 2325. The input to the AND gate 2325 is a low signal from the flip-flop 2305 indicating that a ONE has been stored there at and a CTM signal which is an instruction signal indicating "C register to memory". When these two signals are present the AND gate 2325 is fully conditioned to provide a low signal therefrom which is transmitted to the OR gate 2326. The OR gate 2326 responds to a low signal to provide a low output signal which is in turn transmitted to the inverter 2327. In response to the low signal being applied thereto, the inverter 2327 provides a high output signal which is identified as a $\overline{WR1}$ signal and stands for "write in memory at the one-bit position" signal.

There are other conditions which will cause a ONE to be written into the memory. As was suggested earlier, the output from the D register can be written into the memory and is in fact written into the memory when there is a memory read out into the D register (if the information is to be retained) because this particular system has a destructive read-out. Hence, when a ONE is stored in flip-flop 2302 of the D register the DB1 signal which is an input to the AND gate 2328 is low. If at this time there is an instruction signal DTM indicating that the D register information is to be transferred into the memory, the DTM signal will also be low. If the foregoing is not an occasion when the blank signals are to be converted into excess 3 zeros the signal $\overline{DEQSFF}$ will also be low. Hence, the AND gate 2328 will be fully conditioned to provide a low signal to the OR gate 2326, and the circuitry operation is similar to the one just discussed to provide a high $\overline{WR1}$ signal to write a one-bit into the memory. Returning for the moment to a consideration of the $\overline{DEQSFF}$ signal, this signal is present for the purpose of providing a possible inhibit to the AND gate 2328. When information is read from the memory and this information is a blank which is to be converted into an excess-3 zero, for the purpose of an arithmetic operation, this information should be written back into the memory in its blank form. Now it will be recalled that a blank is converted into an excess-3 zero and therefore there will be a one-bit stored in both the first bit position and the second bit position, in particular, flip-flops 2302 and 2303. If the raw value of the information in the D register at this time were returned to memory, the blank information would be returned to the memory as an excess-3 zero quantity. Instead the system wants to preserve the blank quantity value and hence if the $\overline{DEQSFF}$ signal is generated high indicating that there is a conversion of the blank value into an excess-3 zero the AND gate 2328 will be inhibited and the one-bit which is present in flip- flop 2302 will not be transferred into the memory. A similar operation takes place at the AND gate 2329, with respect to bit 2.

Now there are occasions when the programmer finds it desirable to generate a bit 1 and store that generated signal in the memory. The plug hub line 2330 which is labeled "$\overline{G\text{-}BIT1H}$" which indicates "generate bit 1 hub" provides a high signal from the plugboard line to the OR inverter device 2331. The high signal to the OR inverter 2331 in turn produces a low signal therefrom which is transmitted to the AND gate 2332. During the BT56D time, the AND gate 2332 is fully conditioned under this situation and produces a high signal to write a ONE into the memory. The nature of the operation of the memory device is such that the $\overline{WR1}$ signal should be kept high at all times excepting when there is to be a ZERO written into the memory during the memory write time. In order to effect this condition, the OR gate 2333 is included with its input signal $\overline{T56D}$. The signal $\overline{T56D}$ is low excepting during the time "T56"a delayed by 75 microseconds. Hence, for all times during the cycle, excepting the delay T56 time the signal $\overline{WR1}$ is held high. At T56 delayed time, the $\overline{T56D}$ signal goes high, and hence the output from the OR gate 2333 is no longer effective on the $\overline{WR1}$ signal and the condition of that signal becomes the result of a condition of the output from the OR gate 2326.

As has just been explained if there is a ONE in the first bit position of the C register, the AND gate 2325 will produce a low signal to the OR gate 2326 or if there is a ONE in the first bit of the D register the AND gate 2328 will produce a low signal to the OR gate 2326 to cause the $\overline{WR1}$ signal to go high. On the other hand, if the information is being transferred from the C register and the one bit is a ZERO, the AND gate 2325 will not provide a low signal, and in a similar manner, if there is a ZERO in the one-bit position of the D register, the AND gate 2328 will not produce a low signal. Under either of these last two conditions the signal $\overline{WR1}$ will be low and hence a ZERO will be written into the memory device.

Each of the AND gates and OR gates associated with the remaining flip-flops of the C register are similar to the AND/OR gates described with respect to the operation of the one-bit position and hence it is deemed that no further explanation of the other AND gates or OR gates is necessary.

The only circuitry which has not been described in FIGS. 23 and 24 is AND gate 2415. AND gate 2415 is associated with the zone delete circuitry. The inputs to the AND gate 2415 are the $\overline{ZDH}$ signal which is a zone delete plug hub signal from the plugboard and the $\overline{OCB}$ signal which is high during OCB time. If the programmer has wired the zone delete plug hub, during OCB time AND gate 2415 will be fully conditioned to provide a low signal to the OR inverter device 2416. A low signal input to the OR inverter device 2416 generates a high output signal therefrom which serves to inhibit the AND gates 2417,2418, 2419 and 2420. A cursory examination of these last-mentioned AND gates indicates that these are the AND gates through which the D register to memory transfers and C register to memory transfers take place. Since these particular AND gates will be inhibited the zone bits will not be transferred to the memory, and hence will be deleted.

DATA CONTROLS

Consider now the data control circuitry and the signals which are generated therefrom which are applied to set up various conditions and instructions as are found on FIG. 25. The circuitry shown on the upper portion of FIG. 25 is significant either in a compare operation or in an arithmetic operation.

In FIG. 25 it will be noted there are two flip-flops, the equal flip-flop 2502 and the "greater than" flip-flop 2503. Initially, the system assumes that when there is to be a comparison between two quantities, these quantities will be equal and hence the ICB signal on line 2501 causes the equal flip-flop 2502 to be transferred to its ONE side and the "greater than" flip-flop 2503 to be transferred to its ZERO side. The outputs from the flip-flop 2502 at this time would indicate an equal condition and the output from the flip-flop 2503 would indicate a not-greater-than which is the two original assumptions made.

Now when one quantity is compared with another quantity the quantity in Operand 1 is 9's complemented, or binary complemented, so that when it is added to Operand 2, the answer should be all 1's if in fact the two quantities are equal. On other hand if Operand 1 is less than Operand 2 there will be a carry, or an overflow, and if Operand 2 is less than or equal to Operand 1 there will be no overflow.

Bearing in mind the relationship between Operand 1 and Operand 2 as well as the resultant overflow or lack thereof, examine the inputs to the OR inverter device 2504 which are respectively AS2 and AS8. AS2 is the output for the arithmetic summation of bits 2 and AS8 is the output for the arithmetic summation of bits 8. If either of these two signals is high, indicating that there is a zero present in either of these two positions the output from the OR inverter 2504 is low which provides a low input to the OR gate 2505. The other inputs to the OR gate 2505 are $\overline{AS1}$ and $\overline{AS4}$ and if either of these signals is low, there is an indication that there is a ZERO in bit 1 or bit 4. Hence, if the OR gate 2505 has a low input thereto, it indicates that at least one of the bit positions has a ZERO therein, and hence there is an unequal condition. The low output signal from the OR gate 2505 is transmitted to the inverter 2506 from whence a high signal is transmitted to the AND gate 2507. The other inputs to the AND gate 2507 are the $\overline{OF}$ signal, which represents a carry, or an overflow, as previously explained, the $\overline{OCB}$ signal which indicates that the test takes place during OCB time and the $\overline{T5}$ signal which indicates that the test takes place during T5 time.

Now assume for the moment that an unequal condition is detected and there is no overflow, that is, that Operand 1 is greater than Operand 2. Under these conditions the AND gate 2507 would be fully conditioned to provide a low signal to transfer the flip-flop 2502 to its reset side and flip-flop 2503 to its set side, or ONE side. With flip-flop 2502 on its reset side there is a low $\overline{EQFF}$ signal generated which indicates an unequal condition and with flip-flop 2503 conducting on its ONE side there is generated a low GRFF signal, indicating a greater-than condition which means that Operand 1 is greater than Operand 2 at this time.

If there had been an unequal condition sensed by the OR gate 2505, but at the same time here had been an overflow signal generated indicating that Operand 1 was less than Operand 2 then the AND gate 2507 would not have been fully conditioned and hence the flip-flops 2502 and 2503 would not have been effected by the output from the AND gate 2507. However, under these last conditions the OF signal would be low on line 2508 and during T5 time of the OCB period, if the $\overline{SUBH}$ signal is low (which it will be on a compare instruction) the AND gate 2509 would be fully conditioned to provide a low signal to the OR gate 2590. The low input to OR gate 2590 makes the output of OR gate 2590 low to reset the equal flip-flop 2502 and reset the "greater than" flip-flop 2503 to produce, respectively, a $\overline{EQFF}$ signal and a $\overline{GRFF}$ signal. These last mentioned signals would indicate that there was an unequal situation as well as indicating that Operand 2 is greater than Operand 1.

The outputs from the flip-flops 2502 and 2503 are transmitted to the AND gates 2510, 2511 and 2512. It should be noted that the "equal" flip-flop 2502 and the "greater than" flip-flop 2503 can change every OCB time at TP5 time. The last OCB period of an instruction is the only time when the condition of these flip-flops becomes significant. Therefore, to each of the AND gates there is a further input signal labeled CTPH which is a signal that is generated at the end of an instruction compare and whose generation we will consider at a later time.

If there is an equal condition the EQFF signal in conjunction with the CTPH signal will fully condition the AND gate 2510 to provide a high signal therefrom which is transmitted to the OR inverter device 2513. The OR inverter device 2513 provides a low plug hub signal labeled CPEQH which is a signal indicating that Operand 1 is equal to Operand 2 and which can be used from the plugboard to perform the various functions. A further input to the OR inverter device 2513 is the plug hub line $\overline{CPSEH}$ which is provided to enable the programmer to force a CPEQH signal for various reasons in a programming operation.

If Operand 1 is less than Operand 2 there will be generated as previously described a $\overline{EQFF}$ signal and a $\overline{GRFF}$ signal, both of these signals being inputs to the AND gate 2511. These last mentioned input signals in conjunction with the CTPH signal fully conditions the AND gate 2511 to provide a high output signal therefrom to be transmitted to the OR inverter device 2514. The output from the OR inverter device 2514 is a low plug hub signal CPLEH which indicates that Operand 1 is less than Operand 2.

Finally, if Operand 1 is greater than Operand 2 there will be a GRFF signal generated and transmitted to the AND gate 2512 which in conjunction with the CTPH signal fully conditions this AND gate to provide a high signal therefrom. The high signal from the AND gate 2512 is transmitted to the OR inverter 2515 to provide a low signal therefrom labeled CPGRH which indicates that Operand 1 is greater than Operand 2.

The three plug hub signals CPEQH, CPLEH, and CPGRH are found on the plugboard (FIG. 15) in the compare result section and are designated by the equal sign and the open-ended arrowheads.

When we consider the comparison of the two quantities we merely considered the comparison of the numeric portions of the quantities as were transmitted to the OR gate 2504 and the AND gate 2505. It is possible to compare both the numeric portion and the zone portions by further considering the signals to the AND gates 2516 and 2517.

If there is a zone delete condition generated the $\overline{ZD}$ signal will be high and hence the AND gate 2516 and 2517 will be inhibited and there will be no comparison made through those particular gates. However, if there is not a zone delete generated, the $\overline{ZD}$ signal will be low and if either $\overline{ASX}$ or $\overline{ASY}$ is low indicating that they represent a ZERO, the respective AND gates 2516 and 2517 will be fully conditioned to provide low signals therefrom. A low signal from either gate 2516 or 2517 will be transmitted to the OR gate 2518 which in turn will provide a low signal to the inverter 2506 and the operation thereafter is identical to the one described in connection with the signals from the OR gate 2505. Hence, it follows that the zones can be part of the comparison in the same way that the numeric bits were described.

To inform the system of an overflow condition on an arithmetic operation, the "compare less than" result hub is used. This is done in the following way. On an ADD operation, if there is an overflow condition when the CTPH signal is low (i.e., a carry out of the most significant digits) the equal flip-flop 2502 and the greater than flip-flop 2503 will both be reset by AND gate 2509 which was explained above.

On a SUBTRACT operation AND gate 1 is used. On a SUBTRACT instruction Operand 1 is subtracted from Operand 2. To do this, the 10's complement of Operand 1 is added to Operand 2. If there is an overflow, then the result is in the correct form. However, if there is no overflow, the result is in the complement form.

AND gate 2591 will be fully conditioned at a T5 time of an OCB period on a subtract instruction (i.e., the SUB signal is low) when no overflow is present (i.e., the $\overline{OF}$ signal is low). The low output of AND gate 2591 becomes a low input to OR gate 2590. The low input to OR gate 2590 makes the output of OR gate 2590 low to reset the equal flip-flop 2502.

It will also be noted in FIG. 25 that there is a flip-flop entitled OP1 Equal Flip-Flop 2525 and a second flip-flop entitled OP2 Equal Flip-Flop 2526. These two last-mentioned flip-flops are associated with the circuitry that determines whether or not the ending address of Operand 1 and the ending address of Operand 2 have been detected. In this particular system it is possible to deal with variable length fields and hence there must be some means to indicate whether or not the complete field has been processed. The manner in which this is accomplished is by simply wiring from the operand plug hubs to the most significant location and the least significant location the plugboard for the particular operand that is to be used at some particular time. These plug hub wirings come through a collector so that different operands may be used which might have overlapping or partially the same addresses in different operations. The address register generates signals indicating what address is being read at any particular time and this particular address is then compared against the ending address which has been wired on the plug board. If there is an equal condition determined, i.e., the operand address wired on the plugboard is equal to the operand address generated by the address register (for either operands one or two), then the 1EC signal will be generated for Operand 1 and a 2EC signal will be generated for Operand 2. These signals are used to perform various control functions; are used for the purpose of ending the instruction and getting out of the particular program step which is being considered at that time.

In order to examine the operation of the OP1 Equal Flip-Flop and the OP2 Equal Flip-Flop let us first consider the inputs to the AND gates 2519 and 2520.

The inputs to the AND gates 2519 are $\overline{FCB1}$, $\overline{FCB2}$, $\overline{FCB4}$, , $\overline{FCB8}$ which represent the bit signals from the column address register. The inputs to the AND gates 2520 are the signals $\overline{FRB1}$, $\overline{FRB2}$, $\overline{FRB4}$, and $\overline{FRB8}$. The $\overline{FRB}$ signals are from the row address register. When an operand is extracted from the memory it may be extracted or transferred in an ascending order or a descending order. This operation will become apparent when we discuss the circuitry of the address register itself. However, for the purposes of background in the discussion of data controls, understand that if for instance we are doing a descending order the most significant address position will be preset into the field counter of the address register by the signals from the plugboard. This will occur during ICB time for Operand 1 and the first OCA time for Operand 2. During OCA time two operations will take place. The most significant position of Operand 1 will be transferred from the field counter into the address register itself while the most significant address position of Operand 2 will be preset in the field counter by virtue of the signals on the plugboard. At OCB time the information in the field register will be returned to the field counter while the information in the field counter will be transmitted to the address register. During this OCB time before the address in the field counter is modified there will be a comparison between the lowest order address from the plugboard and the address in the field counter. If these addresses are equal there will be ZERO signals produced which ZERO signals will be $\overline{FCB1}$, $\overline{FCB2}$, $\overline{FCB4}$, $\overline{FCB8}$, for the column address, and with respect to the row address $\overline{FRB1}$, $\overline{FRB2}$, $\overline{FRB4}$, and $\overline{FRB8}$. The generation of these signals will be better appreciated when FIG. 27 is discussed. It becomes apparent then that if the address in the field counter which is the last address that has been used to extract information from the memory is equal to the lowest order or least significant position of the operand address then the signals to the AND gates 2519 and 2520 are all ZERO, and hence both of these AND dates will be fully conditioned.

When both of the AND gates 2519 and 2520 are fully conditioned, there will be a low signal transmitted to the inverter 2521. In turn, the inverter device 2521 provides a high signal which is transmitted to the OR inverter 2522, which in turn transmits a low signal to the AND gates 2523 and 2524. Now, briefly, it should be understood that the field counter output signals can be comparing either the address of an Operand 1 or an Operand 2, and hence the signal from the OR inverter 2522 can be indicative of an equal condition between the least order position of Operand 1 and the address on the plugboard, or the least order of position of Operand 2 and the address of the plugboard. In order to decide which signal we are dealing with when a signal is transmitted from the OR inverter 2522 the AND gate 2523 is operative in response to a TP3 signal, during an OCB time, while the AND gate 2524 is fully conditioned in response to a TP5 signal during OCA time. Hence, if there is an output from the OR inverter 2522 at TP3 time of the OCB portion of the cycle the AND gate 2523 will be fully conditioned to provide a low signal which transfers the flip-flop 2525 to its ONE side, thereby indicating that Operand 1 has been completely read. In a similar fashion when the AND gate 2524 is fully conditioned there is a low signal transmitted therefrom which transfers the flip-flop 2526 to its ONE condition to provide a 2EC signal which indicates that Operand 2 has been completely read.

Flip-flops 2525 and 2526 are reset to their respective ZERO sides at TPO time of every ICB period. These two signals are transmitted to the AND gate 2527 which in turn transmits a low signal to reset the flip-flops 2525 and 2526.

Now for some reason if the programmer wants to set the program up such that he can get out of the program step at some time earlier than an actual determination that both of the operands have been read, the end instruction plug hub is wired providing a signal on line 2528 which high signal will be transmitted to the OR inverter 2529. The OR inverter 2529 provides a low signal therefrom to set both flip-flops 2525 and 2526 to their ONE conditions, thereby providing respectively the 1EC signal and the 2EC signal which will cause an end of the instruction.

Now if there is a transfer instruction which is an instruction that causes Operand 1 to be relocated into the address of Operand 2, the system must be conditioned not to accept Operand 2 in the D register, as would normally happen, when the address of Operand 2 is in the address register. The contents of the Operand 1 location are transferred into the location of Operand 2 address by first reading the contents of the Operand 1 location into the D register. Since there is a destructive readout as indicated earlier, the information in the D register is read back into the memory location of Operand 1 during the same cycle. On a second cycle the information from Operand 2 is read out of the memory thereby destroying the information in the ad-dress location of Operand 2, but this information is not allowed to come into the D register where the Operand 1 information has been stored. Thereafter the information in the D register is transferred to the Operand 2 address.

The present system provides for overlap operations. For instance, the system will accept input signals from a peripheral piece of equipment while performing a reading operation at its secondary read, the system will transmit output signals to peripheral equipment while performing a primary read operation, the system will receive information from perpheral equipment and transmit information to peripheral equipment simultaneously, and the system will perform a transfer operation, or an add operation, or a subtract operation during a read period. Let us consider this last-mentioned overlap operation in connection with FIG. 25.

There are some 17 milliseconds of time which elapse between the instant that a card is gripped in the ready station and the time that it is transported to the read station. When the leading edge of a card is detected the system should be ready to accept the information being read from the card. In order to insure the system that it will be ready to accept information from the card after a transfer operation (or an ADD or SUBTRACT operation) takes place the flip-flop 2592 and its auxiliary circuitry is employed.

It can be seen that the input signals to AND gate 2593 are an REXE signal (which says that a read execute order is to be effected), the IEC and 2EC signals (which say that the contents of Operands 1 and 2 have been dealt with) and the timing signal TP7. Hence, when the system has dealt with the contents of Operand 1 and Operand 2 addresses and their is a read operation about to take place the AND gate 2593 will be fully conditioned to transfer flip-flop 2592 to its ONE side, and generate a low MCINH signal, and a high $\overline{MCINH}$ signal. AS can be recalled the low MCINH and high $\overline{MCINH}$ signals serve to inhibit the circuits which would enable further transfers, add operations, or subtract operations until after the read operation is over and the flip-flop 2592 is reset by the ICB signal.

In order to prevent the Operand 2 information from being read into the D register and thereby destroying the Operand 1 information, the MTD signal (meaning transfer to D register) from inverter 2532 must be generated high. Let us study now the circuitry to effect this particular condition. Input signals to the AND gate 2530 are OCB, $\overline{MCINH}$, and TF. The OCB signal of course is the gate timing signal and TF is a transfer instruction signal whose generation we will deal with subsequently. The TF signal is generated indicating that we are having a transfer instruction in operation. The $\overline{MCINH}$ is low as long as the 1EC and 2EC conditions (explained above) have not been detected on a "read execute" step, and hence the AND gate 2530 is fully conditioned to provide a low signal to the AND gate 2531. If any of the inputs to the AND gate 2531 is low, then the output therefrom is low which transmits a low signal to the inverter 2532. A low signal to the inverter 2532 provides a high signal on the MTD line which is the memory transfer to the D register signal and this high signal as indicated earlier will inhibit the transfer of the Operand 2 information into the D register. Since the transfer of the Operand 2 information into the D register takes place during OCB time, the last described circuitry is properly timed by the occasion of the OCB signal at the AND gate 2530.

Now it will be recalled that when information is read from the card into the memory it goes through the D register, and hence when information is being read from the card into the memory the system wants to insure that at that time there will be no information read from the memory into the D register. It will be recalled (FIG. 18) that the PMGR signal and/or the SMGR signal will be generated when there is data from a card being read into the memory. If either of these signals is low the AND gate 2531 also produces a low signal which causes, as described before, the MTD signal to go high and hence the information read from the memory is inhibited.

The $\overline{TIDD}$ signal is a timing signal which can be found on FIG. 9 and labeled "Read TID" and is also the output of the OR inverter device 940. Hence, when there is not a transfer operation in effect and there is not an occasion to read information from the cards the AND gate 2531 will be fully conditioned and therefore at TIDD time ($\overline{TIDD}$ is high) the MTD signal will be low allowing the information in the memory to be transmitted to the D register.

It will be recalled that earlier we discussed the resetting or clearing of the C register in response to a $\overline{CLRC}$ signal. The $\overline{CLRC}$ signal is generated from the AND gate 2533 and is generated every TP7 time of the cycles other than during the OCA period, provided that Operand 2 ending address has not been detected, to produce a high $\overline{2EC}$ signal. When Operand 2 has been fully read so that the 2EC signal is generated, or there has been a forced 2EC signal, the $\overline{2EC}$ signal goes high to inhibit AND gate 2533 and hence the C register is not cleared. The inhibition is set up for display purposes so that the information in the C register will not be destroyed and the arithmetic result in the C register can be checked by the operator if he so wishes.

Examine now the circuitry which deals with ZERO and blank detection, ZERO suppress, etc. It will be noted in FIG. 25 that there is a flip-flop 2534 which gets reset in response to a non ZERO or non blank condition. When information is read from memory it is first inserted into the D register as we have already discussed. The outputs from the D register it will be recalled are DB signals. If we have a Card Controller Code ZERO which is 110011 stored in the D register each of the AND gates 2535 and 2536 will be fully conditioned to provide a low signal to the OR inverter 2537. On the other hand, if we should have a blank value, i.e., no information, which is 000000 each of the AND gates 2538 and 2539 will be fully conditioned to provide a low signal to the OR inverter 2537. The OR inverter 2537 in response to a low signal input thereto will provide a high signal to inhibit the AND gate 2540, which AND gate would have provided a low signal at TP3 time of the OCB period to transfer the flip-flop 2534 to its ZERO or reset side. It will be noted in passing that the flip-flop 2534 is transferred to its set side every ICB cycle by the signal on line 2586. It follows therefore that as long as there are ZEROS in the D register, The OR inverter device 2537 will inhibit the AND gate 2540 and hence the flip-flop 2534 will remain in its ONE conducting state.

The output from the ONE side of flip-flop 2539 is a low signal which is transmitted to the AND gate 2541. The signal from the ONE side of the flip-flop 2534 partially conditions the AND gate 2541 so that in the event a ZERO suppress condition is warranted and a ZERO suppress plug hub line 2542 receives a high signal to indicate the desirability of the ZERO suppression, the inverter 2543 will provide a low signal therefrom to fully condition the AND gate 2541. In other words, if the flip-flop 2534 is conducting on its ONE side, there is an indication that we do have ZEROS or blanks present in the D register, and therefore in response to a further ZERO suppress signal the AND gate 2541 will provide a low signal on line 2544 which is a ZSINH signal which is the ZERO suppress inhibit signal. At the same time when the flip-flop 2534 is conducting on its ONE side, indicating that ZEROS or blanks are present in the D register, the output from the ZERO side of 2534 will be a high signal which is transmitted to the inverter 2545 to provide a low signal at the plugboard hub BZRH. A low signal at the plugboard hub BZRH indicates that there is either a blank or a ZERO stored in the D register.

On the other hand, if we get something other than a blank or a ZERO condition the OR inverter 2537 will receive high signals which in turn will generate a low signal to the AND gate 2540 which in turn will transfer the flip-flop 2534 to its ZERO side. When the flip-flop 2534 is on its ZERO side, it will produce a low signal to the inverter 2545 and a high signal on the line BZRH indicating that there is not a blank or a ZERO condition.

Further connected to the output of the OR inverter 2537 is the inverter 2546 which receives the high signal from the OR inverter 2537 when there is a ZERO or blank condition present. The inverter 2546 inverts the high signal into a low signal to be transmitted to the AND gate 2547. If the programmer decides to test for a ZERO condition during a transfer operation which involves transferring multiple fields the plug hub wire 2548("start blank zero test" initiated at the beginning of a field) will receive a high signal which is transmitted to the inverter 2549 which in turn provides a low signal to the AND gate 2547. Hence, when there is actually a ZERO or blank in the D register and the system is being tested for a ZERO or blank the AND gate 2547 will be fully conditioned to provide a high signal to the inverter 2545 which in turn provides a low signal at the plug hub output BZRH.

The high signal from the AND gate 2547 in turn sets the flip-flop 2534 to its ONE side in keeping with the description of the flip-flops earlier described.

Finally, examine the inputs to the OR gate 2550 which are $\overline{STINSH}$ and $\overline{INS}$. These two signals respectively stand for "-start insert hub" and "insert". An insert operation is the opposite of a compression operation and enables the system to take an operand which may have the factors A, B, C, and D and change that operand into A, B, X, C , D. If there is an "insert" or a "start insert" a high signal will be produced from the OR gate 2550 which will inhibit the AND gate 2540 because the information being inserted (via bit generators) is not in the D register and the contents of the D register at this time are not valid. If there are no ZEROS present which would condition the OR inverter 2537, the AND gate 2540 will not provide a signal to reset the flip-flop 2534.

Examine now the operation of the AND gate 2551. The output from this AND gate is a CLRD signal which has been discussed before as the signal which clears the D register. The CLRD signal is generated every TP7 time provided there is no transfer taking place, or provided that there is no card read in or information being inserted from an input device. The inputs to the OR gate 2552 make it obvious that if there is no transfer instruction or if there is a leading edge of a card sensed in either the primary read or the secondary read, the OR gate 2552 will produce a high signal to clear the D register at TP7 time through the AND gate 2551. In a similar manner, if there is an input instruction being executed with some peripheral equipment, the high signal $\overline{INPH}$ will be transmitted to the OR gate 2552 to cause the D register to be cleared through the AND inverter 2551.

During a transfer operation the TF signal would be low and since there would be no cards read no information being accepted from peripheral equipment, the OR gate 2552 would provide no high signal and therefore the D register would ostensibly not be cleared. However, at OCB time the signal on line 2554 is high, thereby providing a high signal to the AND gate 2551 to clear the D register during OCB time of a transfer instruction. Also note that if the Operand 1 ending address has been detected the high signal, $\overline{IEC}$ on OR gate 2555 will cause the D register to be cleared every TP7. It will be recalled that on a transfer operation information from the Operand 1 location is read into the D register during OCA time and therefore we do not want to clear the D register until the end of the OCB time.

It will be recalled that the only time we transfer information from the C register to the memory is after there has been an arithmetic operation, that is, after Operand 1 has been added to Operand 2 and the result returned to the C register, or during the conversion of the overpunch code into the card controller code which in effect is also an arithmetic operation. Hence, when the overpunch convert plug hub is wired there will be a high signal on line 2556 which will be inverted to provide a low signal from the OR inverter 2557 to the inverter 2558. The low signal to the inverter 2558 provides a high signal to the OR gate 2559 which in turn provides a high signal to the AND inverter 2560. The other inputs to the AND inverter 2560 are the $\overline{OCB}$ signal which is high during OCB time and the MCINH signal which is high until the ending addresses have been detected at the time of a read execute signal. Hence, the information is transferred from the C register to the memory during OCB time in response to an overpunch convert plug hub signal.

Similarly, if there is an arithmetic operation being executed, the $\overline{ARITH}$ signal will be high, providing a high signal from the OR gate 2559 so that during OCB time of an arithmetic operation with MCINH high there will be a transfer of the information from the C register to memory. In effect, this will be the result of the addition or subtraction of Operand 1 with Operand 2.

The output from the OR gate 2559 is also transmitted to the OR inverter 2561. This high signal to the OR inverter 2561 provides a low signal to the AND gate 2562 so that at OCB time there will be a low signal to the AND gate 2553 if $\overline{OUTH}$ is low (which means that no output operation is being executed) and $\overline{MCINH}$ is low (which has been explained above), which will provide a high signal on the DIM line. Therefore, there will be no transfer of information from the D register to memory. In short, then, when there is a C register to memory transfer the signal which initiates the CTM signal will follow through to inhibit a DTM signal.

The other inputs to the OR inverter 2561 are the $\overline{INS}$ signal and the $\overline{CLR2H}$ signal. If there is an insert operation in effect it is not desirable to transfer information out of the D register into the memory because information will be generated from the bit generators. Therefore, if there is an insert operation $\overline{INS}$ the high signal on line 2562 will provide a low signal from the OR inverter 2561 so that at OCB time with $\overline{BUTH}$ and $\overline{MCINH}$ low the AND gate 2562 will provide a low signal to the AND gate 2553, and hence there will be an inhibition of the information being transferred from the D register to the memory. In a somewhat similar fashion when the clear 2 plug hub ($\overline{CLR2H}$) is wired there will be a high signal to the OR inverter 2561 to also effect an inhibition of the information transferred from the D register to memory. The clear 2 plug hub signal is used to clear an Operand 2 memory location.

The inputs to the AND gate 2563 are the $\overline{OCA}$ signal, the IEC signal, and a $\overline{CLR1H}$ signal. If the clear 1 signal is wired it indicates that Operand 1 memory location is to be cleared. To effect a clearance of Operand 1, at OCA time and the ending address for Operand 1 has not been detected, the AND gate 2563 will be fully conditioned to provide a high signal therefrom as an input to the inverter 2564 which in turn will provide a low signal to the AND gate 2563 and once again the DTM signal is inhibited.

Finally, consider the generation of the signals DTC and CPDTC which represent "register D being transferred to the register C" and "complement the information in the D register being transferred to the C register". If we are performing a subtract operation or a comparison operation (which in effect is a subtract operation) either of the plug hubs $\overline{SUBH}$ or $\overline{COMPH}$ will provide high signals to the OR gate 2565 which will in turn provide a high signal to the AND gate 2566. At ATP4 time and IEC high the AND gate 2566 would be fully conditioned to provide a signal, CPDTC, which would cause the information in the D register to be transferred in complemented form into the C register. If there is an addition operation in effect then the plug hub $\overline{ADDH}$ will be wired and there will be a high signal to the AND gate 2567 which will be fully conditioned at ATP4 time with IEC high to provide the DTC signal which enables the system to transfer information from the D register to the C register.

In summary then, the circuitry shown in FIG. 25 is circuitry for the generation of many signals which are used to control the transfer operations and the manipulation of data.

ADDRESS REGISTER PRESET

Let us consider now the memory address preset circuitry which is found on FIG. 26 (which is composed of FIGS. 26*a*, 26*b*, and FIG. 26-1). It should be recalled that when information is to be extracted from the memory the plugboard is wired from the operand plug hubs through collectors into the most significant and least significant positions of a particular operand to be extracted. The addresses are broken down into two parts, there is the most significant column position and the most significant row position, and likewise there is the least significant column position and the least significant row position. The schematic circuitry shown in FIG. 26 represents the means for handling the selection of the most significant row and column positions as well as the least significant row and column positions. The diode network 2601 represents the diode network which will handle the most significant column position. It will be noted that there are fifteen plug hub positions connected in the diode network which are labeled "MC02H" to "MC16H". The most significant address position in the memory would be Column 1, Row 1, while the least significant position in memory would be Column 16, Row 16. Since the address register is automatically set to Row 1, Column 1 position there is no provision made for selecting either of those positions.

For better understanding, by way of example, consider that the plugboard is wired from some particular step through a collector to the plug hub wire 2602 which is the plug hub wire for the most significant column position 9. The signal on line 2602 would be transmitted through the lines 2603 and 2604 and through the OR gates 2605 and 2606 to the respective AND gates 2607 and 2608. When the most significant position signal (MSP) is generated (and the timing thereof will become more significant hereinafter) the two AND gates 2607 and 2608 will respectively produce high $\overline{CT8}$ and $\overline{CT4}$ signals while there would be low $\overline{CT2}$ and $\overline{CT1}$ signals. The address code for this system is shown in FIG. 26-1. It can be seen that a Number nine is represented by the number twelve in binary decimal code or 1100.

If we examine the circuitry of FIG. 27 we find the significance of generating the $\overline{CT8}$ signal and the $\overline{CT4}$ signals high as well as the generation of the $\overline{CT2}$ signal and $\overline{CT1}$ signal low.

In FIG. 27 we find four flip-flops 2701, 2702, 2703, and 2704 which represent the column field counter of the memory address register. These flip-flops are reset to their respective ZERO conditions by virtue of the signal $\overline{CLRMAC}$ whose generation will be considered hereinafter. When an address is set up by the plugboard wiring to produce the CT signals (FIG. 26) these signals are transmitted to properly condition the flip-flops 2701 and 2704. In particular, in our example, the high $\overline{CT8}$ signal is transmitted on line 2705 to transfer the flip-flop 2704 to its ONE side through the AND input 2706. The AND input 2706 is fully conditioned at this time because when the flip-flops are originally reset to the ZERO side, there will be a high signal from the ONE sides of the flip-flops back to the upper AND inputs, such as input to 2706. In a similar manner, the $\overline{CT4}$ signal will be transmitted on line 2707 to transfer the flip-flop 2703 to its ONE side through the AND input device 2708. Since the signals CT2 and CT1 are both low neither of the flip-flops 2702 nor 2701 will be effected and therefore will remain in their ZERO conducting states. Hence, as a result of the plugboard wiring the field counter has the value 1100 stored therein which is a binary 12 or address code 9, representing the ninth column location as the most significant column position.

As a result of the conditioning of the flip-flops 2701 through 2704 there will result a high $\overline{FCB8}$ signal, a high FCB2 signal, and a high FCB1 signal. The high FCB1 signal is transmitted to the AND input 2713; the high FCB2 signal is transmitted to the AND input 2714; the high $\overline{FCB4}$ signal is transmitted to the AND input 2715; while the high $\overline{FCB8}$ signal is transmitted to the AND input 2716. These last-mentioned AND inputs become fully conditioned in response to an $\overline{OPTMA}$ signal which is generated every TO time. Hence, at the first TO time after the column field counter has been set, the flip-flop 2709 will be transferred to its ZERO side, the flip-flop 2710 will be transferred to its ZERO side, the flip-flop 2711 will be transferred to its ONE side, while the flip-flop 2712 will be transferred to its ONE side.

The output from the flip-flops 2709 through 2712 are memory column signals which condition the memory to have information extracted therefrom and accept information therefrom. The particular significance of the MR signals will become more apparent as the discussion goes forth.

However, immediate significance of the MR signals can be seen by their feedback connections to the field counter which enables the information in the address register to be returned to the field counter. In our particular example, the MRC1 signal would be high and would be returned on line 2717 to be transmitted to the AND input 2718 which is further conditioned by the $\overline{MTOPA}$ signal every T0 time. Hence, at T0 time the information from the address register is returned to the field counter which in our case would transfer the flip-flop 2701 to its ZERO side. The MRC2 signal, the $\overline{MRC4}$ signal, and the $\overline{MRC8}$ signal are all high and would be returned to the field counter to transfer the remaining stages of the field counter respectively to 0,1,1 conditions.

Now the reason for returning the information from the address register to the field counter is twofold. The first purpose is to compare that information with the address of the least significant position (if the system were in a descending mode of operation) and to modify this address to provide a new address for the next least most significant position from the position which was preset into the field counter.

The manner by which the address in the field counter is compared with the address set up on the plugboard is through the $\overline{CT}$ input signals. The $\overline{CT}$ signals would be generated in the same fashion as before only will be generated by the circuitry represented by the schematic block 2609 in FIG. 26. The internal circuitry of the blocks 2609 is identical to that of 2601, and hence there appears to be no reason for further describing this circuitry. However, the CT signals from the circuit 2609 will be initiated in response to an LSP signal on line 2614 rather than by an MSP signal as was produced on line 2615. Hence, the CT signals are set up initially from the address of the most significant position with respect to the column information and during a comparison the LSP signal is generated to cause CT signals representative of the LSP column address to the transferred into the field counter.

Now, in particular, during a comparison the only CT signals which will be accepted from the address preset network of FIG. 26 are the signals which represent ONES. It follows that if there is a ONE sitting in the flip-flop which receives the CT signal this flip-flop will be transferred back to its ZERO side. For instance, consider in our case that there is a ZERO sitting in flip-flop 2701 and a ZERO in flip-flop 2702 while there is a ONE in flip-flops 2703 and 2704. Assume that the least significant column is 9 and assume for the moment that the system is comparing the least significant address with the address in the counter. Signal $\overline{CT4}$ would be a high signal and $\overline{CT8}$ would be a high signal. These last-mentioned signals would be transmitted to the respective AND inputs 2719 and 2720. The AND input 2719 is fully conditioned by the high signal from the ZERO side of flip-flop 2703, while the AND input 2720 is fully conditioned by the high signal from the ZERO side of the flip-flop 2704. Therefore, in response to the high $\overline{CT4}$ signal and the high $\overline{CT8}$ signal the flip-flops 2703 and 2704 would be transferred to their respective ZERO sides. Hence, the whole field counter would read 0000. Now it will be recalled that according in the discussion of FIG. 25 when all the field column outputs were ZERO, that is, when all the $\overline{FCB}$ signals were low the AND gate 2519 was fully conditioned and if at the same time all the FRB signals were low, the AND gate 2520 would be fully conditioned to generate a 1EC signal to indicate that Operand 1 ending address had been detected.

Now ONE bits of the address which had been momentarily destroyed to effect this comparison must be restored so that the field counter can be modified in the event that there was not a determination that Operand 1 had been fully read. In order to effect the restoration of the ONE bits the LSP signal is repeated. Accordingly, the ONE signals $\overline{CT4}$ and $\overline{CT8}$ would be generated and transmitted to the flip-flops 2703 and 2704. However this time the ONE side of the flip-flops 2703 and 2704 would be conducting high to fully condition the AND gate 2708 and 2706, and hence the $\overline{CT4}$ and $\overline{CT8}$ signals transfer the flip-flops 2703 and 2704 back to their ONE conditions. It follows then that information is transferred from the address register (FIG. 27*b*) back into the field counter (FIG. 27*a*) and the LSP signal (or the MSP signal if we are doing an ascending operation) is generated twice to toggle the field counter two times. During the first toggle time if the information in the field counter is the same as the ending address all ZEROS will be detected, and during the second toggle time the information will be restored to this field counter to permit a modification.

Before considering the operation further, let us examine how the field counter counts. FIG. 27-1 shows a lay-out which is significant for the counting of numbers by the field counter. The binary numbers across the top 00, 01, 11, 10 are the conditions of the flip-flops 2701 and 2702, while the numbers vertically 00, 01, 11, 10 are the conditions of the flip-flops 2703 and 2704. When all ZEROS are stored in the flip-flops 2701 through 2704 the number 1 is in the field counter. The first bit thereafter which is added to the field counter will change the flip-flop 2701 to a ONE state and therefore the condition of flip-flops 2701 and 2702 is 01 thereby providing the value of 2 (see FIG. 27-1). The two flip-flops 2701 and 2702 accept three pulses to count up to a 10 condition which represents a value 4. When the fifth bit or fifth pulse is transmitted to the field counter the flip-flops 2701 and 2702 return to the 00 condition and provide a carry which causes a $\overline{\text{MSCP1}}$ signal to be generated which in turn transfers the flip-flop 2703 to its ONE condition and hence there is a 01stored in the flip-flops 2703 and 2704. It can be seen from Table 27-1 that a 01 in the secondary flip-flops accompanied by 00 in the first flop-flops is significant of a value 5. The generation of the MSCP signals and the MSCM signals will be better understood when we examine the address modification circuits in FIG. 28.

It should also be noted at this time that when the field counter is doing a descending order the procedure is to consider the high order value first. In other words, if a card is identified by a number 98765 the digit 9 will be the high order position and the digit 5 would be the low order position. If they were doing a descending order we would read first the number 9 and then the number 8, then the number 7, etc., down to number 5. However, the number 5 would be stored at a memory location which had a higher value than the number 9 so that peculiarly, in this respect, the field counter when it does a descending order actually adds to the field counter address because the address numbers increase as we go the the least significant position of the memory.

To be better clarify this operation let us consider that our digit nine is the address value and is stored in the field counter so that the flip-flop 2701 reads 0, the flip-flop 2702 reads 0, the flip-flop 2703 reads 1, and the flip-flop 2704 reads a 1. Let us further assume that we are doing a descending order and therefore we want to generate signals on $\overline{\text{LSCP1}}$ which stands for "least significant plus 1" which signal is generated in a descending order as we will see when we discuss FIG. 28. With a 00 sitting in the first two flip-flop positions the ONE sides of these flip-flops are producing high signals. If we consider first, flip-flop 2702 we find that the output signal from its ONE side is transmitted back to the AND input 2721 associated with flip-flop 2701, while the other input to the AND device 2721 is the $\overline{\text{LSCP1}}$ signal which is transmitted on line 2722. Hence, the flip-flop 2701 is transferred to its ONE side. Simultaneously, it will be noted that the output from the ONE side of flip-flop 2701 is transmitted to the AND device 2723 whose other input is a $\overline{\text{LSCP1}}$ signal and therefore flip-flop 2702 remains conducting on its ZERO side. As we will find out subsequently the $\overline{\text{LSCP1}}$ signal is generated before the $\overline{\text{MSCP1}}$ signal and only if the flip-flops 2701 and 2702 are transferred into a 00 condition does there result an $\overline{\text{MSCP1}}$ signal in response to a $\overline{\text{LSCP1}}$ signal. Since in our case we went from a 00 condition to a 10 condition, there is no $\overline{\text{MSCP1}}$ signal generated and hence the flip-flops 2703 and 2704 remain in the condition they were, before, with the resultant answer being 1101. If we go to our Table 27-1 we find that the number ten is represented by a 01 condition in the flip-flops 2701 and 2702, as well as a 11 condition in the flip-flops 2703 and 2704 and therefore we find that the field counter has counted correctly in response to the signals which we assume had been generated.

If, on the other hand, we had generated a $\overline{\text{LSCM1}}$ signal which is an ascending signal we would find a different result. Assume a ZERO is stored in flip-flops 2701 and 2702. The high signal from the ONE side of flip-flop 2702 is transmitted back to the AND device 2724 whose other input is $\overline{\text{LSCM1}}$. Therefore, the output from this AND device causes the flip-flop 2701 to remain in its ZERO condition. Simultaneously, the output from the ONE side of the flip-flop 2701 is high and is transmitted to the AND device 2725 whose other input is the $\overline{\text{LSCM1}}$ signal. Therefore the flip-flop 2702 is transferred to its ONE condition. Now, as we will find out subsequently when we discuss FIG. 28 when there is a resultant 10 condition during an ascending operation in the flip-flops 2701 and 2702 there will be an $\overline{\text{MSCM1}}$ signal generated. Therefore we must consider the operation of the flip-flops 2703 and 2704. With a 11 condition being stored in the flip-flops 2703 and 2704, the ZERO sides will be high and therefore the high signal from the ZERO side of 2704 is transmitted back to the AND device 2726 whose other input is the $\overline{\text{MSCM1}}$ signal. Accordingly, the AND device 2726 keeps the flip-flop 2703 conducting on its one side. The output from the ZERO side of the flip-flop 2703 is transmitted on line 2727 to the AND gate 2728 to fully condition that AND gate and transfer the flip-flop 2704 to its ZERO side. Hence, the number 9 has been reduced to the number eight as represented by 0110.

Figure 28A:
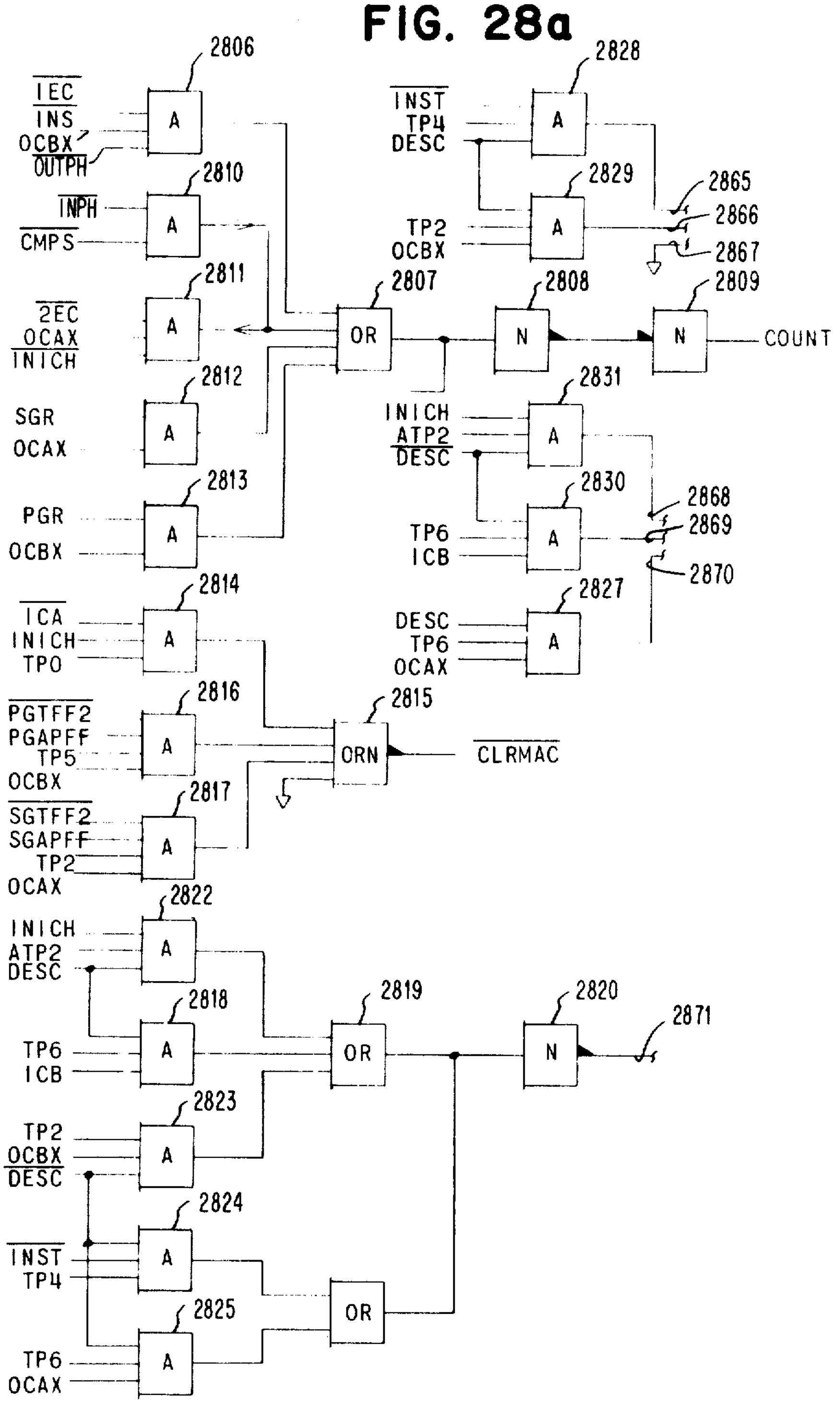
Figure 28B:
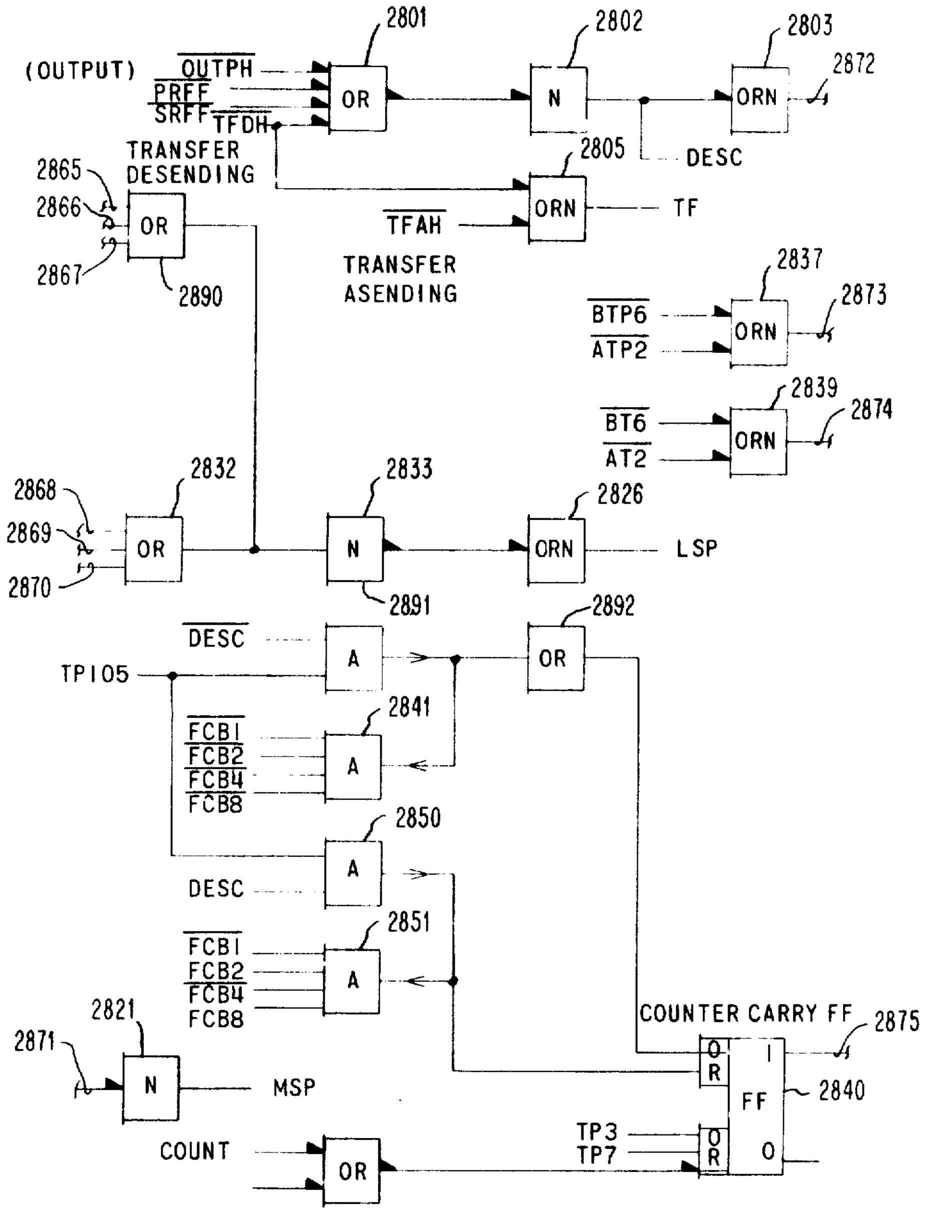
Figure 28C:
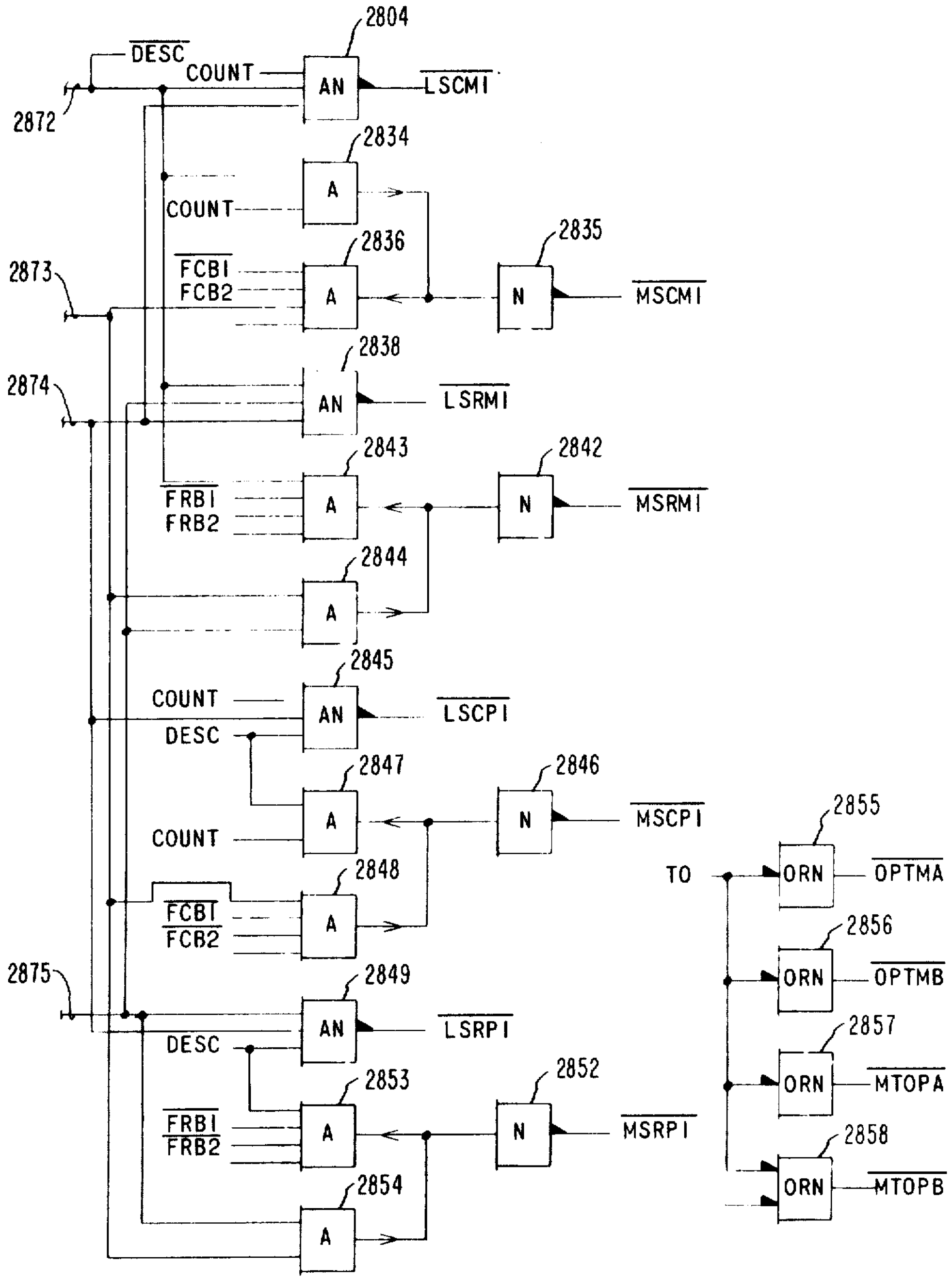

FIG. 28 shows the schematic circuitry for generating the signals which are necessary to modify the address of the data being extracted or inserted into the system. The present system employs an address counter or field counter and an address register which have just been described. As was mentioned in the description of the field counter and address register there is a means for modifying that counter and therefore a means for modifying the address in the register so that the information from the memory address locations is automatically extracted. As was also mentioned in the description of the field counter in this particular system, the operator can call for either a descending or an ascending extraction (or insertion) of information into and out of the memory. Since the memory addresses increase from left to right, while the normal consideration of information is that the most significant digit is on the left-hand side and the least significant is on the right-hand side, the system operates to perform a descending extraction (or insertion) by incrementing the address by one.

Examine now the OR gate 2801 which has five inputs thereto. The first of these inputs is labeled $\overline{\text{OUTPH}}$ and this is a plug hub input which is used when the particular system is connected to some auxiliary data processor, or an output peripheral device to either transfer information thereto or receive information therefrom. The second and third inputs are $\overline{\text{PRFF}}$ and $\overline{\text{SRFF}}$ signals which are the primary read and secondary read flip-flop signals. It will be recalled that these signals are generated in response to the leading edge of a card being transported through either the primary or the secondary read stations of the system. The fourth input is a $\overline{\text{TFDH}}$ signal which is a transfer descending signal. This plug hub is wired to have the system transfer information from one storage location to another, and the information is transferred with its most significant position first. The fifth input is a $\overline{\text{INPN}}$ signal which is a plug hub signal generated when the system is going to receive data from an auxiliary data processor or an input peripheral device.

As can be seen in FIG. 28 when any of the last-mentioned signals is high, the OR gate 2801 provides a high signal which is an input to the inverter 2802. The high input to the inverter 2802 produces a low signal, which is a low descending signal (DESC). This low DESC signal is used to condition a number of gates that we will consider in a moment.

The low signal from the inverter 2802 is transmitted to the OR inverter 2803 to produce a high signal therefrom. The high signal is identified as a $\overline{\text{DESC}}$ signal and is also transmitted to the AND inverter device 2804 to inhibit this device and produce a low $\overline{\text{LSCM1}}$ signal. Hence, when there is an output signal condition, or the leading edge of the card in either the primary or the secondary is detected or the plug hub for a descending transfer is wired, or there is an input operation, the system in turn produces a low DESC signal and a high $\overline{\text{DESC}}$ signal. The high $\overline{\text{DESC}}$ produces a low $\overline{\text{LSCM1}}$ signal which in effect says that we will not generate a signal to subtract numbers from the address in the field counter.

It will be noted that the plug hub signal from the $\overline{\text{TFDH}}$ plug hub is also transmitted to the OR inverter 2805. The output from the OR inverter 2805 is a low TF signal which signal we have dealt with previously and which signal indicates that there is to be a transfer operation. The other input to the OR inverter 2805 is the TFAH signal which is a "transfer ascending" and this signal also causes a TF signal to be generated.

As was suggested earlier when we are extracting information from the memory or inserting information thereto we have the address counter counting in order to step the locations for extraction and insertion from one digit position to another in order to extract the full operand.

Bearing the foregoing in mind examine the AND gate 2806 which has four input signals thereto $\overline{IEC}$, $\overline{INS}$, OCBX, and $\overline{OUTPH}$. This gate is normally conditioned to provide a low output signal unless one of the input signals appears high. For instance, if Operand 1 ending address has not be detected, the $\overline{IEC}$ signal will remain low, and if all the other signals are low, the low signal from the AND gate 2806 will be transmitted to the OR gate 2807. The output from the OR gate 2807 is transmitted to the inverter 2808 from whence a high signal will be transmitted to the inverter 2809. The low signal from the inverter 2809 is the count signal and as will be apparent as the discussion goes forth the count signal is used to condition other gates.

Returning to the AND gate 2806 we find that the second input is a $\overline{INS}$ signal which will remain low unless there is an insertion of characters or blanks. As was described earlier when such a procedure is in operation the system does not want to change the Operand 1 address and hence the count signal is not generated to alter the counter. If there is an insert instruction in effect, the $\overline{INS}$ signal would be high, and the AND gate 2806 would be inhibited. The OCBX signal, which is the third input to the AND gate 2806, indicates that this AND gate should be conditioned only during OCB time and hence it becomes apparent that the count is generated by AND gate, 2806, only during the OCB time. Finally, the OUTPH signal which is an output operation signal indicates that when the system is performing an output operation there is to be no address modification during OCB time and therefore the AND gate 2806 is to be inhibited, when this signal is present.

The AND gate 2810 receives an $\overline{INPH}$ signal thereto and a second input signal, the $\overline{CMPS}$ signal, which is a "compress signal". It will be recalled that the compress operation is an operation for condensing an operand and hence if this instruction is in effect it will be necessary to restrict the field counter from counting beyond the digit positions which are to be eliminated until these digits have been eliminated. The $\overline{INPH}$ signal inhibits generating the count signal during an OCA cycle.

The AND gate 2811 is normally fully conditioned to (eventually) provide a count signal (from inverter 2809) unless the $\overline{2EC}$ signal is generated, which signal says that the system has detected the Operand 2 ending address. The second signal which can condition the gate 2811 is the OCA signal which indicates that with respect to the second operand the field counter is counted during OCA time. Finally, the $\overline{INICH}$ signal (which is the initial character signal) which can inhibit the AND gate 2811 indicates that during the first OCA time there is to be no count since Operand 2 beginning address is preset into the field counter during the first OCA cycle.

The AND gate 2810 receives an INPH signal thereto and a second input signal, the CMPS signal, which is a "compress signal". It will be recalled that the compress operation is an operation for condensing an operand and hence if this instruction is in effect it will be necessary to restrict the field counter from counting beyond the digit positions which are to be eliminated until these digits have been eliminated. The INPH signal inhibits generating the count signal during an OCA cycle.

The AND gate 2811 is normally fully conditioned to (eventually) provide a count signal (from inverter 2809) unless the 2EC signal is generated, which signal says that the system has detected the Operand 2 ending address. The second signal which can condition the gate 2811 is the OCA signal which indicates that with respect to the second operand the field counter is counted during OCA time. Finally, the INICH signal (which is the initial character signal) which can inhibit the AND gate 2811 indicates that during the first OCA time there is to be no count since the Operand 2 beginning address is preset into the field counter during the first OCA cycle.

The AND gate 2813 has two inputs thereto, the PGR input and the OCBX signal. This AND gate will only be conditioned to provide a count signal during a primary memory grant operation.

It will be recalled that the primary grant is a signal which is generated when information is being read from a card into the memory, and since the primary reader transfers data to memory during OCA time with the primary grant signal, the address for the primary reader will be incremented during OCB time with the primary grant signal.

The AND gate 2812 is similar to the AND gate 2813 and has an SGR and OCAX signals as inputs thereto. The SGR signal is a secondary memory grant generated at OCB time and lasts through OCA time, and it will be recalled that information is transferred into the memory from the secondary reader during OCB time. The address for the secondary reader is incremented during OCA time when the secondary granted signal is present.

In summary, then, the "count" signal is generated in response to the PGR or an SGR condition and is inhibited upon the detection of the ending addresses of Operand 1 or Operand 2, or in response to an input/output operation as well as an insert or compress operation.

It will be recalled that when we discussed the field counter of FIG. 27, that the field counter was cleared and reset to its ZERO side in response to a $\overline{CLRMAC}$ signal. The AND gate 2814 has three inputs thereto, the $\overline{ICA}$ signal, the INICH signal, and the TP0 signal, the $\overline{ICA}$ signal will be low at all times, excepting during the first instruction cycle, while the INICH signal is generated when an instruction cycle is generated at TP0 time. Hence, at TPO during ICB and the first OCA the AND gate 2814 is fully conditioned to provide a low signal to the OR inverter 2815. The OR inverter 2815, in turn, generates a high $\overline{CLRMAC}$ signal which serves to reset the field counter shown in FIG. 27.

The AND gate 2816 is an AND gate which is fully conditioned to respond to the leading edge of a card at the read station of the primary card transport during OCB time. It will be recalled that the $\overline{PGTFF2}$ signal the PGAPFF signal are both low only when the leading edge of a card is detected, and hence the AND gate 2816 provides a low signal to the OR inverter 2815 to provide a high "clear memory address counter" signal; that is, a $\overline{CLRMAC}$ signal. The low AND gate 2817 is fully conditioned in response to detecting the leading edge of a card at the read station in the secondary card transport and it in turn also generates a $\overline{CLRMAC}$ signal through the OR inverter 2815. It should be apparent that when we do detect a card passing through a reading station we now want to take information from the card and put it into the memory and hence the field counter should be cleared to set up the address for the primary and/or secondary card reader(s).

The gate 2818 has three inputs thereto, the DESC signal which is a descending operation signal as well as the TP6 signal and an ICB signal. It will be recalled that ICB time occurs before OCA time and hence the gate 2818, during a descending operation, is fully conditioned at TP6 time of the ICB period. The AND gate 2818 provides a low signal therefrom to the OR gate 2819. The output from the OR gate 2819 is a low signal which is transmitted to the inverter 2820 which in turn provides a high signal therefrom to the inverter 2821. The low signal from the inverter 2821 is a low MSP signal and it will be recalled that this is the low "most significant pulse" which energizes the gates from the preset network (FIG. 26) to enable the information to be transmitted from the plugboard into the field counter.

During the first generation of the MSP signal, the Operand 1 address is transmitted from the plugboard to the field counter and subsequently during the first OCA period at TP2 time, the AND gate 2822 becomes fully conditioned, to provide a low signal therefrom to the OR gate 2819. The output signal from the OR gate 2819 is of course transmitted to the inverter 2820 and the signal from inverter 2820 is transmitted to the inverter 2821 to provide an MSP signal.

The remaining three AND gates, in this circuitry set, deal with an ascending condition. This is apparent from the $\overline{DESC}$ signal which is transmitted to the gates 2823, 2824, and 2825. The AND gate 2823 has three inputs thereto, the TP2 signal, the OCB signal, and the $\overline{DESC}$ signal. This AND gate indicates that if there is an ascending operation, during TP2 time of the OCB period there will be an MSP signal generated. The MSP signal during this time will be for the purpose of testing what is in the flip-flop to see if it is equal to the most significant position of the first operand (i.e., if it is equal to the ending address).

AND gate 2824 has two inputs thereto, (in addition to the $\overline{DESC}$ signal), the $\overline{INST}$ signal and the TP4 signal which are set up as such to provide a second MSP signal which will restore the information into the field counter. It will be recalled that the information destroyed in the course of making the test to determine whether or not the Operand 1 ending address has been detected. The output of the gate 2824 plays a second role, in that it causes the MSP signal to be generated to accomplish the test in the case of Operand 2 also, while the output of the AND gate 2825 generates a signal which causes an MSP signal to be generated to restore the information which has been destroyed when the test of Operand 2 ending address is made. The inputs to the AND gate 2825 are as can be seen, the TP6 signal, the OCAX signal and the $\overline{DESC}$ signal which of course provide an MSP signal during the OCA time period.

In summary then the MSP signal is generated for the purpose of transferring information from the plugboard to the field counter during a descending operation. There are two MSP signals generated per OCA and OCB cycles during an ascending operation to test the flip-flop and restore the information into the field counter which has been destroyed during the testing operation.

The LSP signal is the output of the OR inverter 2826. The LSP signal plays the same role as the MSP signal excepting that it is generated to cause an operation which is concerned with the least significant position. The AND gates 2827, 2828, and 2829 are analogous to the AND gates 2823,2824 and 2825. The AND gates 2827 through 2829 are all fully conditioned during a descending operation. It will be recalled that during a descending operation the address in the field counter is continually matched against the least significant position. In a fashion similar to that described with the most significant position signal, when the AND gate 2829 is fully conditioned it transmits a signal through the OR gate 2890 and the inverter 2833 to produce an LSP pulse at TP2 time during an OCB period to test for the least significant position (i.e. the ending address). Similarly, when the AND gate 2828 is fully conditioned it transmits a signal through the OR gate 2890 and the inverter 2833 to produce an LSP signal at TP4 time to restore the information into the field counter which has been destroyed during the testing operation.

The gate 2828 plays a dual role as did AND gate 2824, in that for Operand 2 it provides the testing signal which tests the field counter to find out if the information contained therein is equal to the ending address. The gate 2827 provides a restoring signal at TP6 time to restore the information into the field counter which has been destroyed during the previously mentioned testing operation for the Operand 2 ending address.

The two AND gates 2830 and 2831 become fully conditioned during an ascending operation to produce a signal at TP6 time during an ICB period and at TB2 time, during the first OCA period, respectively. These two gates provide signals to be passed through the OR gate 2832 which produces a low signal to the inverter 2833 which in turn produces a high signal to the OR inverter 2826 to generate the low LSP signal. The two AND gates 2831 and 2830 generate the initial signals which eventually generate the LSP signal. It will be recalled that the LSP signal triggers the signals from the preset address network which signals are transmitted to the field counter.

Consider now the gates which generate signals $\overline{MSCM1}$, $\overline{MSRM1}$, $\overline{MSCP1}$, and $\overline{MSRP1}$. It will be remembered that when there is an ascending operation the field counter must have values subtracted therefrom in order to reduce the address value so that the information is processed beginning with the least significant location and ending with the most significant location.

During an ascending operation the column field counter has its low order position decremented first: If the low order positions read 1-0 after having been decremented this would mean that the column counter had passed from a 5 to 4 or a similar decreasing transition. Accordingly, the high order position of the column counter should be decremented. The foregoing is accomplished by first conditioning the AND gate 2804 with a count signal, a $\overline{DESC}$ signal (means ascending) and either a $\overline{AT2}$ signal (or a $\overline{BT6}$ signal) through OR gate 2839. When these three signals are present the $\overline{LSCM1}$ signal is generated to decrement the low order position of the column field counter. Thereafter if the low order positions of the column field counter read 1-0 (FCB2 and $\overline{FCB1}$ signal present) the AND gate 2836 will be fully conditioned at $\overline{ATP2}$ time (or at $\overline{BTP6}$ time) to generate a high $\overline{MSCM1}$ signal. The foregoing is true because the AND gate 2834 which works in conjunction with AND gate 2836 is fully conditioned at this time with the count signal and the $\overline{DESC}$ signal. Since $\overline{AT2}$ (or $\overline{BT6}$) occurs before $\overline{ATP2}$ (or $\overline{BTP6}$) the low order positions will be changed first and condition AND gate 2836 to change if necessary.

In an ascending operation when the column counter goes from 0000 to 1010 the system must subtract a one bit from the row counter. In order to accomplish this, we sense the 0000 condition at gate 2841 and at TP1 time or TP5 time through AND gate 2891 (we are assuming the $\overline{DESC}$ signal is present since we are doing an ascending operation) and through OR gate 2892 the counter carry flip-flop 2840 is set. The output from the ONE side of flip-flop 2840 partially conditions the AND gate 2838 as does the $\overline{DESC}$ signal. At either $\overline{AT2}$ time (or BT6 time) the OR gate 2839 produces a signal to fully condition AND gate 2838 and thus produce a high $\overline{LSRM1}$ signal. Hence, the least significant row position is reduced by one at either AT2 or BT6 time. If as a result of the reduction in response to the $\overline{LSRM1}$ signal the two low order positions of the row counter are set to 1-0 then the two high order positions of the row counter must be reduced. This condition is sensed at AND gate 2843. The other input to AND gate 2843 is the $\overline{DESC}$ signal and since the AND gate 2844 operates in conjunction with AND gate 2843 we must consider the inputs to AND gate 2844. The AND gate 2844 has the counter carry flip-flop input as well as either an $\overline{ATP2}$ signal or a $\overline{BTD6}$ signal through OR gate 2837. It should be noted that $\overline{ATP2}$ and $\overline{BTP6}$, respectively, occur after $\overline{AT2}$ and $\overline{BT6}$ so that the low order positions are transferred first and the high order positions are transferred accordingly.

If the system is doing a descending operation the field counters values are increased because the low order positions of the operands are at higher address values. In a descending operation the low order positions of the column field counter must be incremented first and when the low order positions read 0-0 indicating that it has passed from 1-0 to 0-0, the high order positions of the column field counter must be increased.

The foregoing operation is accomplished by first fully conditioning AND gate 2845 with a count signal, a DESC signal and a timing signal (either $\overline{AT2}$ or $\overline{BT6}$) from OR inverter 2839, when AND gate 2845 is fully conditioned it produces a high $\overline{LSCP1}$ signal which increases the low positions of the column field counter by one bit. Now if in response to a $\overline{LSCP1}$ signal the low order positions read 0-0 then the high order position of the counter must be incremented (see FIG. 27-1). The incrementing of the high order positions is accomplished by sensing the 0-0 condition at AND gate 2849 (signals $\overline{FCB1}$ and $\overline{FCB2}$ low). Since AND gate 2847, which operates in conjunction with AND gate 2848, is fully conditioned at this time with a count signal and a DESC signal, the AND gate 2848 can be fully conditioned, in response to either a $\overline{ATP2}$ signal or a $\overline{BTP6}$ signal, to transmit a signal to inverter 2846 and produce a high $\overline{MSCP1}$ in response thereto.

The high $\overline{MSCP1}$ signal will increase the high order positions of the column counter. If in response to the $\overline{LSCP1}$ signal and the $\overline{MSCP1}$ signal the column field counter reads 1-0-1-0 it is indicative that at the next incrementing step the row field counter must also be incremented (just as AND gate 2841 alerted the system that at the next decrementing step the row field counter must be decremented). The AND gate 2851 is conditioned by the $\overline{FCB1}$, FCB2, $\overline{FCB4}$ and FCB8 signals (which signals represent a 1-0-1-0 condition). The output from the AND gate 2851 in conjunction with the fully conditioned AND gate 2850 (this gate being conditioned by a TP1 or TP5 signal and a DESC signal) provides a signal to set the counter carry flip-flop 2840.

With the counter carry flip-flop 2840 conducting in its set condition the AND gate 2849 becomes fully conditioned at either $\overline{AT2}$ or $\overline{BT6}$ time through the OR inverter 2839 (the AND gate has a low DESC signal at this time). The output from the AND gate 2849 is a high $\overline{LSRP1}$ signal which serves to increment the low order positions of the row field counter. If after the low order positions of the row field counter have been incremented they read 0-0 indicating that the row counter has passed from 1-0 to 0-0 it becomes necessary to increment the high order positions of the row counter. The AND gate 2853 is fully conditioned by a DESC signal and the signals $\overline{FRB1}$ and $\overline{FRB2}$ which last two signals represent the 0-0 condition of the low order counters. Since the carry flip-flop 2840 has been set to transmit a low signal to AND gate 2854, at $\overline{ATP2}$ or $\overline{BTP6}$ time, the AND gate 2854 will be fully conditioned to provide a low signal to the inverter 2852 to generate a high $\overline{MSRP1}$ signal therefrom. The $\overline{MSRP1}$ signal serves to increment the high order positions of the counter.

ARITHMETIC DEVICE

Initially, examine the OR inverters 3001, 3002, and 3003 (FIG. 30b). The OR inverter 3003 has a plug hub wired thereto identified as a compare or $\overline{COMPH}$ plug hub signal. When this plug hub is wired on the plugboard there is produced from the OR inverter 3003 a low COMP signal. The use of this signal will be appreciated as the description continues.

The input to the OR inverter 3001 is the add plug hub signal. When the system is to perform an ADD operation and the plug wires are plugged into the ADD plug hub, a high signal will be seen at the input to the OR inverter 3001 which in turn will provide a low ADD signal which will be further transmitted to the OR gate 3004. The output from the OR gate 3004 is a low signal which is transmitted to the inverter 3005 which in turn produces a high $\overline{ARITH}$ signal. The $\overline{ARITH}$ signal is indicative of the fact that an arithmetic operation is being performed.

The input to the OR inverter 3002 is the SUBTRACT plug hub signal identified as $\overline{SUBH}$. The high signal on the $\overline{SUBH}$ line provides a low signal from the OR inverter 3002 which in turn is transmitted to the OR gate 3004, and the operation from thereon out is identical to that described for the ADD signal. Hence, if either an ADD or a SUBTRACT is wired in the plugboard then an arithmetic signal, a $\overline{ARITH}$ signal, will be generated.

Consider now the networks 3006 through 3014. Each of these networks is identical to the network of 3006, except for the input and output signals and hence we need only consider in detail the network 3006.

The network 3006 is an arrangement for handling the first two bits from two digits which are being either added or subtracted. It will be recalled that the output from the D register was labeled DB, while the output from the C register was labeled CB, and it can be noted in FIG. 30 that the input signal on line 3015 is DB1, while the input signal on line 3016 is CB1. The DB and CB input signals represent the signals from the D and C registers, (it will be recalled that Operand 1 is transferred into the C register and Operand 2 is in the D register), while the AS output signals stand for "Arithmetic Sum". The carry signals are transmitted on lines from 1 network to the next network, and, in all probability, the understanding of this arithmetic network and correction network can best be understood by following through an example. In order to understand the example more easily it is suggested that the table of FIG. 30-1 be used.

Before setting the network 3006 into operation, consider the AND gate 3017 which has an input of an $\overline{ARITH}$ signal and a $\overline{OF}$ signal. A high $\overline{ARITH}$ signal will be generated when there is an arithmetic operation in effect, and the $\overline{OF}$ signal will be high when there is an overflow, that is, when we carry from one digit into the next or when the initial carry is jammed on a subtract operation. The generation of the $\overline{OF}$ signal will be more fully discussed after we consider how the carry is generated by virtue of the example which we shall examine.

Assume that we are going to add two digits, the first digit being eight and the second digit being two, and that these are the least significant digits of our operation (which implies that the overflow flip-flop is reset). Since the system uses an excess-3 code the eight will appear as 1011 wherein the low order position is on the right-hand side, and will resemble a binary eleven, while the digit two will appear as 0101 and will resemble a binary five. If the number eight is in the D register and the number two is in the C register we find that the lines A, B, C, are high, low, low, in that order. The line A is high because there has been no overflow generated and hence the output for the AND gate 3017 is low to provide a high output on line A from the inverter 3018. The line B is low because the first bit position in register D will be 1 in accordance with having a binary 11 stored therein, and the line C will be low because the first bit in register C will be a 1 in accordance with having the binary five stored in the C register.

If we have a high, low, low condition we find that the sum output is low and the carry output is high (see FIG. 30-1), so that on the D line we assume a low and at the E line we assume a high. The high signal from the E position will be transmitted to the next network 3007 to provide a high signal at the A position thereat.

The inputs to the second network 3007 are $\overline{DB2}$ and $\overline{CB2}$. $\overline{DB2}$ will be high since we have a 1 in the D register in the second bit position and $\overline{CB2}$ will be low since we have a 0 in the C register in the second position. Hence, the inputs to the network 3007 are high, high, low, and if we look at FIG. 30-1 we find that this condition provides a high at the D position or summation position and a low at the E or carry position. The output from the E, or carry, position of network 3007 is transmitted to the network 3008 and provides a low signal at the A input thereof. The input DB4 to the network 3008 is high, since we have a 0 in the D register in the third bit position and the CB4 signal is low since we have a 1 in the C register in the third position. Hence, the inputs to the network 3008 are low, high, low and if we look at FIG. 30-1 we find that low, high, low provides a low at the summation position (D position) and a high at the carry position (position E).

The output from the E, or carry, position of 3008 is transmitted to the network 3009 whereat it provides a high signal at the A position. The signal $\overline{DB8}$ is high since there is a 1 stored in the fourth bit position of the D register and the signal $\overline{CB8}$ is low since there is a ZERO stored in the fourth bit position of the C register. Hence, the inputs to the network 3009 are high, high, low and if we examine FIG. 30-1 we find that the sum line is high and the carry line is low.

A low signal on the carry line of the network 3009 represents a carry and this low signal is transmitted to the OR inverter 3019, the output of which is a high signal to the network 3014 (assume that the barred overpunch convert signal is low since this is not an overpunch convert operation). The high signal from the OR inverter 3019 is also transmitted to the OR inverter 3020 which provides a low signal to the networks 3013 and 3012. The networks 3012, 3013, and 3014 represent the excess 3 correction networks. In other words, when there is an addition of two binary numbers and there is no overflow, i.e., decimal carry (a carry out of bit position 4). In other words, when line 3021 is high, we add 13 to the answer to make the result the proper value in the modified excess-3 code. If there is an overflow, i.e., decimal carry, and line 3021 is low, then we simply add 3 to the answer to transform the answer into the proper excess-3 code.

Consider now the operation of the excess-3 correction network. In our example, the summation output or D signal from the network 3006 was low and having passed through the OR inverter 3022 the A input to the network 3012 is high. The AS2 input can be ascertained from the output of the network 3007, and is found also to be high. As was mentioned earlier, the input on the C line is low and hence we have a high, high, low set of inputs into the network 3012. The high, high, low inputs into the network 3012 provides a high output on the summation line and a low output on the carry line.

The low signal on the carry line of network 3012 was transmitted as an input on the A line to the network 3013 to provide a low signal thereat. The signal $\overline{AS4}$ can be ascertained from the network 3008 and it is found to be low, so hence there is a low signal on the B line. The signal on the C line has already been determined as low and hence the inputs to the network 3012 are low, low, low. If we examine FIG. 30-1, we find that low, low, low provides us with a high signal on the summation line and a high signal on the carry line.

The high signal on the carry line of network 3013 is transmitted to the A line of the network 3014, therefore providing a high signal on the A line. The AS8 line can be determined from the network 3009 and is determined to be high. We have already ascertained that there is a high signal from the OR inverter 3019, and hence the inputs to the network 3014 are high, high, high. Examining FIG. 30-1, we find that a high, high, high condition provides us with a low signal on the summation and a low signal on the carry. If we examine our individual answers now we find that AS1 was low, which means that the least significant position has a 1, that AS2C is low having been inverted by the OR inverter 2023, thereby indicating that the second least significant position is also a 1. We find that the signal $\overline{AS4C}$ is low having been inverted through the inverter 3024, and therefore, the third position or the third least significant position is zero. We also find that the signal AS8C is high which indicates that there is a ZERO in the most significant position or the fourth least significant position of the answer. If we recap the answer we find that it is 0011 with the least significant bit being on the right-hand side. It will be recalled that we were adding the number 8 with the number 2 which should give an answer of 10 which is the same as ZERO with a carry. However, in the excess-3 code a ZERO is equal to binary 3, so the answer is correct. Our answer 0011 is binary 3, and of course we did generate a carry signal on line 3021.

Consider now the further significance of generating a carry from the network 3009. The carry signal which is the low signal is transmitted to the three AND gates 3026, 3027 and 3028. Now, if we were performing an arithmetic operation, we would only be dealing with the numeric portion of the digit and therefore there would be no concern with the zone bits. Either the SUB signal would be low, or the ADD signal would be low, and in either event, if there were a carry, one of the respective AND gates 3026 or 3028 would be fully conditioned to transmit a low signal to the OR inverter 3029. The output form the OR inverter 3029 is a high signal which is transmitted both to the OR inverter 3030 and to the AND gate input 3031 of the flip-flop 3032. The output from the OR inverter 3030 would be a low signal to the AND input 3033, and hence the output signals from the OR inverter 3029 would not, per se, transfer the flip-flop 3032. On the other hand, at $\overline{BTP4}$ time there would be a second high signal transmitted to the input 3031 which would transfer the flip-flop 3032 to its ONE side, indicating that an overflow condition or a carry condition had been sensed. Under these conditions the $\overline{OF}$ signal would be high and it would be transmitted to the AND gate 3017 (as mentioned earlier) so that the digit which follows the digit which had the carry would now have an additional condition on its 1 bit input (gate 3017) which condition may provide a different answer.

In passing it should be noted that when we do a subtraction we must provide a 1 in the least significant position, and this is accomplished by the AND gate 3034. The inputs to the AND gate 3034 are the INICH signal, the $\overline{INST}$ signal, and the SUB signal. These signals mean that if there is an initial character and there is no instruction signal generated; i.e., we are into the operand period and the operation being carried on is a subtract operation, the AND gate 3034 will be fully conditioned to transmit a low signal to the OR gate 3035. The low output from the OR gate 3035 will transfer the flip-flop 3032 to its ONE condition, thereby providing a high $\overline{OF}$ signal which will put a 1 into the least significant bit position of the initial character.

If we are doing a comparison, which as has already been explained, is an arithmetic operation, but we want to do this comparison of the numeric bits only we will provide a zone delete signal. The zone delete signal provides a low signal on the ZD line to the AND gate 3027. Hence, if there is a carry indicating that the two digits being compared are not equal, the AND gate 3027 will be fully conditioned to provide a low signal through the OR inverter 3029 and eventually to transfer the flip-flop 3032 to its ONE condition. The OF signal serves to indicate to the machine that there has not been an equal condition and it will be recalled that it was used to effect a nonequal result.

The two networks 3010 and 3011 deal with the zone bits. The zone bits of Operand 1 are not transferred into register C on an ADD or SUBTRACT operation. Therefore, the fifth and sixth bit position of the C register will contain zeros. In effect, a zero zone is added or subtracted from the Operand 2 zone bits. Thus, the zone of the arithmetic result is the zone of Operand 2. The zone bits can be added and therefore compared in the same manner that the numeric bits were added for comparison purposes. In order to do a comparison between two digits including the zone bits, the network 3009 must be coupled to the network 3010 to transmit a carry therefrom. The coupling is accomplished through the AND gate 3036 and in particular by virtue of the $\overline{AC8}$ signal which can be seen as an output of the OR inverter 3019. When there is a carry condition in effect from the network 3009 the signal $\overline{AC8}$ is high and hence if there is a comparison operation providing a high signal on the $\overline{COMPH}$ line then the AND gate 3036 is fully conditioned. The high output from the AND gate 3036 is transmitted to the inverter 3037 to provide a low signal therefrom and thereafter the operation is identical to the operation described in connection with the networks 3006 to 3009. If there is a comparison being made and the zone bits are included the output signal on line 3038 is considered the final output signal for the entire six bit digit. Obviously, during such an operation there would be no zone delete signal and hence there would be a low signal on line 3039. If there is no zone delete the $\overline{ZD}$ signal is low and if we assume a compare and a carry on line 3038, the overflow flip-flop is set. If there had been a zone delete, i.e., for some reason or other the zone bits were not to be considered, a high signal on $\overline{ZD}$ line would inhibit the AND gate 3040 to prevent that AND gate from providing a signal which is indicative of a carry.

In summary then the arithmetic network generates an $\overline{ARITH}$ signal when an arithmetic operation is in effect, that is, either a subtraction or an addition, and further generates COMP signal when a comparison is to be made. If there is a carry from the numeric portion of the digit during an arithmetic operation the flip-flop 3032 will generate a low OF signal and if there is a carry from the network 3011 during a full digit comparison or a carry from network 3009 with a zone delete condition the lip-flop 3032 will generate a low OF signal.

MEMORY ADDRESS EMITTER

It will be recalled that we examined FIG. 27 which related to the memory address register in the field counter and that the information stored in the memory address register was according to columns and rows and that the column register generated MRC signals. Also in FIG. 27-1 there was a table to show how the field counter operated with respect to the signal generated. Examine now FIG. 31 wherein we find the logic circuitry which is necessary to generate the memory address emitter signals. The memory address emitter signals are found on the right-hand panel of the plugboard (FIG. 15) about one-third of the way down from the top.

In FIG. 31 in the upper left-hand side we find there are two OR inverter devices 3101 and 3102. A ZERO signal in the fourth position, (or the weighted eight position) of the memory address register will provide a low signal on line 3103 which is transmitted to the OR inverter 3101 to provide a high signal to the AND inverter 3104. When there is a ZERO in the first position of the memory address register there will be a low signal on line 3105 which will be transmitted to the OR inverter 3102 to produce a second high signal to the AND inverters 3104 and 3106. When there is a ZERO in the second and third positions of the memory address register the lines MRC2A and MRC4A will have high signals thereon to complete the array of high input signals to AND inverter 3104 and hence the AND inverter 3104 is fully conditioned to provide a low signal MACO1H.

Each of the AND gates 3104, 3106, 3107, and 3108 has input signals which represent a combination of address register signals which is significant of a different column address value. It can be ascertained from FIG. 27-1 that if the first two flip-flops have a 00 contained therein, and the second two flip-flops (the weighted four and weighted eight flip-flops) each have a ZERO therein then the column address is one. We found that AND inverter 3104 is fully conditioned by ZEROS in the four memory address positions, i.e., column address one. Hence, on the plug hub line 3109 we find a designation MAC01H signal which stands for "memory address column 1 hub". This signal will be emitted from the number 1 position of the plugboard address emitter hubs (FIG. 15).

In a like fashion we find that the input signals to AND gate 3106 represents a 0010 condition which from FIG. 27-1 is seen to be the fourth value in the counter, and therefore represents column position 4. Therefore, the signal on line 3110 is labeled MACO4H. The inputs to the gate 3107 represent a 0001 condition and from FIG. 27-1 we find that this represents a value of two. Hence, it is the column 2 position in the address counter emitter. Finally, the inputs to AND gate 3108 represent a 0011 situation and in FIG. 27-1 we find that this represents the value three in the counter, and therefore the third column position.

Although the pulses to the AND gates were not specifically discussed it can be easily seen and easily traced out that the signals do represent the binary notations and hence no further discussion of these signals seem necessary.

The remainder of the logic blocks in FIG. 31 are similar to the circuitry in circuit 3113 and simply provide the signals for the remaining column positions and for the row positions 1 through 16. Since this circuitry is similar to the circuitry discussed with respect to block 3113 no further discussion of this circuitry seems necessary. Consider now the schematic circuitry of FIG. 32 which is related to the step register part 1.

STEP REGISTER

It will be recalled that when we wanted to perform a program step the pulse from the start plug hub in the upper left-hand portion of panel 1 of the plugboard (FIG. 15) was wired to the "step change plug hub" of the step register. A signal into the "step change plug hub" provides a signal from the plug hub labeled "A", from the plug hub labeled "B", from the Operand 1 plug hubs during OCA time, and from the Operand 2 plug hubs during OCB time. The plugboard would be further wired from Operand 1 through a collector to the most significant and least significant memory locations on the plugboard, the operand one to be extracted in order to perform the operation of the particular program step. It will be recalled that we traced these signals into the preset network in order to preset the address of the operand (which we were extracting) in the field counter. It will be further recalled that the address register took this address information from the field counter to extract information from the memory. In a similar manner, the plugboard is wired from Operand 2 through a collector to the most significant and the least significant memory locations on the plugboard. All of the plugboard hubs labeled A, B, OP1 and OP2 are part of the step register. The circuitry in FIG. 32 deals with the generation of the signals from the step register portion of the plugboard.

When we considered FIG. 10 we found that when the machine was not subject to having the stop flip-flop turned on (that is, the machine was running) the reset side of the stop flip-flop generated a high $\overline{STPCL}$ signal at T3 time of the ICA period, while the ONE side of the stop flip-flop generated (through an AND gate and two inverters) a high $\overline{SCP}$ signal at TP4 time of the ICA period.

Consider now in detail the circuitry related to the first position of the step register. At TP3 time of the ICA period, there will be a high signal on the $\overline{STPCL}$ line 3201 which will serve to reset each of the flip-flops 3202, 3203, and 3204. Now, if the machine were going to change to Step 1, the plug hub line 3205 would have a high signal thereon which would be charging the capacitor of the a. c. input 3207. At TP4 time of the ICA period there will be a high signal on the $\overline{SCP}$ line 3206 which will fully condition the AND input 3207 to transfer the flip-flop 3207 to its ONE side. While the flip-flop 3202 is conducting on its ONE side, it provides a low signal on line 3208 which is designated a B signal in the system and is labeled a "B" in the step register section of the plugboard. At the same time, there is a high signal generated on line 3210 which is an A signal in the system and is designated as "A" in the step register section of the plugboard. The AND inverter devices 3211 and 3212 each have the high signal from the ZERO side of flip-flop 3202 transmitted thereto to partially condition these AND gates.

Digressing for the moment, we find that the inverter devices 3213 and 3214 (FIG. 32*b*), respectively, produce a $\overline{MCAP}$ output signal in response to an $\overline{MC}$ input signal and an MCAP output signal in response to an $\overline{MC}$ input signal. It will be recalled that the MC signal is the timing signal used to generate the OCA or ICA times while the $\overline{MC}$ signal is the timing signal used to generate the OCB or ICB times. Hence, the signal $\overline{MCAP}$ is generated during OCA time, or ICA time, and while the signal MCAP is generated during OCB or ICB time. Since the flip-flop 3202 is transferred to its ONE side during the ICA period, (from the $\overline{SCP}$ signal) it follows that at the first ICB time the signal MCAP will be high to fully condition the AND gate 3212 and therefore provide a low output signal on line 3217. The low signal on 3217 is the Operand 1 signal which can be transmitted through a collector to the most significant and/or least significant positions in the preset network to set up the first address in the field counter. During the next OCA time the signal $\overline{MCAP}$ will be high to fully condition the AND gate 3211 and hence provide a low signal on line 3215. The low signal on line 3217 can be transmitted from the Operand 2 plug hubs to the most significant and least significant positions, through a collector, to preset these addresses in the field counter.

Normally, the plug hub line 3210 will be wired through the plug board back to the input line 3218 which is the "stop change two hub" on the plugboard. This plug hub is the second position of the step change plug hubs. It should be noted that all during the operation of Step 1 there was a high signal on line 3218 from the ZERO side of flip-flop 3202, and hence the capacitor of the a. c. input 3219 is charged to a positive potential. At TP3 time of the next ICA signal when the flip-flops have been returned to their ZERO sides, (and even though a low signal now appears on 3218), the charge of the capacitor remains positive so that at TP4 time, when the $\overline{SCP}$ signal is transmitted to the AND input 2319, the flip-flop 3203 will be transferred to its ONE side. The output signals from the flip-flop 3203 are similar to those of the flip-flop 3202, excepting that they are set up for the second step of the step register. In order to go to Step 3, or any other step, a plug wire may be wired from the output 3220 to the appropriate step change plug hub. In other words, if we wanted to go from Step 2 to Step 5 we would simply wire from the line 3220 which is the Step 2 plug hub labeled "A" to the step change plug hub labeled "5", which is line 3221 in FIG. 32. It should be noted that the compare result hubs, comparators, combines, etc. can be wired into the "step change hubs". In view of the foregoing discussion the remainder of FIG. 32 appears obvious and no further explanation appears necessary.

With respect to FIG. 33 there is depicted a continuation of the circuitry to provide the step register signals which is identical to the circuitry of FIG. 32 and hence there will be no further explanation given of the circuitry shown in FIG. 33.

It will be recalled that when we examined FIG. 25 we considered the generation of certain comparison signals, in particular, the comparison signals CPEQH, and CPLEH, and CPGRH which respectively stand for "comparison equal", "-comparison less than", and "comparison greater than". It will further be recalled that these signals are the signals which are utilized at the time that a comparison is being made, and are available from the three plug hubs entitled "comparison results" located in the top portion of the right-hand panel of the plugboard. In the middle section of the right-hand panel of the plugboard, there are fifteen plug hubs which are labeled "-comparators". These hubs are identified as "set", "test", "-greater than", "less than", and "equal". These condition identifications represent the situations that might be present when a comparison is made. If at the time that a comparison is made, the "set" plug hub is wired from the particular program step during which the comparison is made, the comparison result will be stored and at some other program time a plug wire can be wired into the plug hub "test" to test the results of the comparisons.

Now, consider FIG. 34 (FIGS. 34a and 34b) which shows the logic circuitry for the comparators. As depicted in FIG. 34 (when a comparison has been made as described in connection with FIG. 25) one of the signals CPLEH, on line 3401, or CPGRH, on line 3402 or CPEQH on line 3403, will be generated. If there is a plug wire to the plug hub line 3404, there will be a high signal to the OR gate 3405. The low signal from the OR gate 3405 will partially condition each of the AND gates 3406, 3407, 3408, and 3409. Depending upon which of the signals CPLEH, CPGRH, or CPQH is present, one of the AND gates 3406, 3407, or 3409 will be fully conditioned to provide an output signal therefrom. An output signal from the AND gate 3406 would transfer both of the flip-flops 3420 and 3411 to their respective ONE sides. At this point, the comparison result has been stored. If the comparator test hub wire 3415 is energized at some later program step, the inverter 3430 will transmit a signal to AND gates 3413, 3912 and 3914 to partially condition these AND gates. Output signals from the ONE sides of the flip-flops 3410 and 3411 condition the AND gate 3412 to provide a high $\overline{\text{CP1LEH}}$ signal which identifies a "comparator one less than" condition.

If the AND gate 3407 is fully conditioned it transfers the flip-flop 3410 to its ONE side which in conjunction with the ZERO side of the flip-flop 3411 and the high comparator test signal to inverter 3430, fully conditions the AND gate 3413 to provide a high $\overline{\text{CP1GRH}}$ signal which identifies a "comparator one greater than" condition. Finally, if the AND gate 3409 is fully conditioned it transfers the flip-flop 3411 to its ONE side. The output of the ONE side of the flip-flop 3411 in combination with the output from the ZERO side of flip-flop 3410 ( and again assuming that the test signal has been transmitted), will fully condition AND gate 3414 to provide a high $\overline{\text{CP1EQH}}$ signal which identifies a "comparator one-equal condition". In summary then a comparison of operand one with operand two can be made as described in connection with FIG. 25 and at the same time this comparison result can be stored in the two flip-flops 3410 and 3411. At some later program step, a signal can be transmitted on the plug board line 3415 and the results stored in the flip-flops 3410 and 3411 will be read out of one of the plug hubs 3416, 3417 or 3418. Before any comparison is made the flip-flops 3410 and 3411 are reset to their respective zero sides. The reset operation is effective through AND gate 3408. Accordingly when the system operation first starts, $\overline{\text{GC}}$ signals are transmitted through the OR inverter 3405 and through the OR gate 3425 to fully condition the AND gate 3408 to reset the flip-flops 3410 and 3411.

Initially, when a comparison is made, the compare signal on line 3419 is wired which provides a high signal to the OR gate 3420 which in turn provides a high signal to the AND gate 3421. At ICB time the high signal from OR gate 3423 is transmitted to fully condition the AND gate 3421 which in turn transmits a high signal to the inverter 3422. The inverter 3422 provides a low signal to the AND gate 3408. If at this same time there is a "comparator 1 set" plug hub wired, a second low signal will be transmitted to the AND gate 3408 to fully condition that AND gate and reset each of the flip-flops 3410 and 3411 and thus make the comparison circuitry ready for to store a compare result.

As we will learn subsequently a program select is a device which permits a condition to be remembered so that at some later time during a program step the system can be tested to find out whether that condition ever existed. For instance, let us suppose that we were processing a certain number of cards and we wanted to know whether the total was more than one hundred. This condition could be sensed and stored by employing a program select. The program select would not tell us how much total was, but at some later time we could test the program select to see whether it were set and if it were set we would know that the count of the predetermined number of cards was greater than one hundred. The present system provides a scheme for using the comparators as additional program selects in the event that the operator has no desire to use the comparators as comparators. In order to effect using the comparators as a program select device the comparator set clear plug hub line 3424 is wired to receive a signal which is transmitted to the OR gate 3425 which provides a high signal therefrom to the inverter 3422, which in turn provides a low signal to the AND gate 3408. At this time, to whichever one of the comparators is to be used as a program select there will be a plugboard wire. For instance, if we were to use the comparator 1 as a storage device the plugboard wire 3404 would be energized to provide a second low signal to the AND gate 3408, and therefore the flip-flops 3410 and 3411 would be reset. Returning now to FIG. 25 we find a plug hub input to the OR inverter 2513 and a plug hub input to the OR inverter 2515. The plug hub input to the inverter 2513 is $\overline{\text{CPSEH}}$ which is a "forced compare set equal", while the plug hub input to the OR inverter 2515 is $\overline{\text{CPSGH}}$ which is a "forced compare greater than" signal. When the condition (whatever it might be) has been sensed one of these plug hubs can be wired to generate a forced condition signal, for instance, the $\overline{\text{CPSEH}}$ plug hub can be wired to generate a CPEQH signal.

Returning now to FIG. 34 we find that the CPEQH signal would be transmitted on line 3403 to the AND gate 3409 and if at this time the comparator 1 set signal were wired, as just suggested, the AND gate 3409 would be fully conditioned to transfer its flip-flop 3411 to the ONE condition which would ultimately generate a $\overline{\text{CP1EQH}}$ signal, in response to subsequent test signal. In other words, the condition (for which we were looking) having been sensed, the comparator can have a forced flip-flop condition set up and this condition can be tested to determine whether the original condition has transpired in which a program select ordinarily would have been used. It should be understood that the forced conditions do not represent true conditions, i.e. operand one is not equal to operand two if the $\overline{\text{CPSEH}}$ plug hub (FIG. 25) is wired.

The comparator circuitry for the comparator 2 set and the comparator 3 set operation is identical to that for the comparator 1 set, and therefore no further description is deemed necessary.

MEMORY DEVICE

Let us study now the memory device and the circuitry for effecting a read-out of information from the memory device, as well as a write-in of information into the memory device. In this respect let us consider FIGS. 35, 36 and 37.

FIG. 37 shows a schematic lay-out of the memory. The memory of the present system is a character organized memory and instead of having six planes of magnetic cores to accommodate the six bits there is one plane which is divided into six sections as schematically shown in FIG. 37. The inputs 3701 in the upper portion of FIG. 37 are inputs that are generated by the least significant bits as generated by the row and column field counters, transmitted through the address registers and through the circuitry of FIGS. 35 and 36. On the other hand the inputs 3702 are the most significant bits as generated by the row and column field counters, transmitted through the address registers and the circuitry of FIGS. 35 and 36.

An individual core in the memory shown in FIG. 37 has four windings associated therewith. The first is a row winding, the second is a column winding, the third is an inhibit winding, and the fourth is a sense winding. The general operation of the core in the memory of FIG. 37 is such that the inhibit lines are normally low (it will be recalled that the WR lines are normally high) tending to drive each of the cores toward a ZERO condition but not having sufficient current per se to so drive any core. When a row line is energized by a read signal and a column line is generated by a read signal the core at which both of these lines intersect is subjected to the half pulse of the row line and a half pulse from the column line. These half signals in conjunction with the inhibit signal (all of these pulses have the same polarity) drive the core to its ZERO condition. If, of course, a ONE data bit had been sitting in the core the core would be flipped and would induce a signal in the sense line indicating that a ONE had been stored in that particular core. If on the other hand the core had a ZERO data bit stored therein the core would not be flipped and there would be no signal induced on the sense line indicating that there was a ZERO stored in that core. When a writing operation is to be effected the inhibit line serves to unblock or block the writing signal. The writing signal, of course, is of the opposite polarity from the read signal, and there is a half select write signal on the row line, as well as a half select write signal on the column line to effect the core whereat these two lines intersect. If at the time that the writing signals are generated, the inhibit signal is permitted to remain low part of the writing signal will be nullified by the presence of the low inhibit signal and hence the core will not be flipped from its ZERO condition to a ONE condition. This is the situation which is in effect when a ZERO is to be written into a core. In contrast when the system writes a ONE into the core, the inhibit line is energized to go high and therefore the two half select write signals combine to transfer, or flip, the core from its ZERO condition to its ONE condition, thereby storing a ONE data bit in that particular core. Having had a general summary of the operation in the memory, let us consider FIG. 35 which shows in detail and schematic the circuitry for generating both the read and the write signals in response to the least significant bits from the field counter for both the column and the row conditions.

For an example, let us consider that we are going to read out of the Number 1 position in the memory which we have already described as having an address of column zero, row zero. In order for the column address to be 0 it will be recalled that before flip-flops of the memory address register must be conducting on the ZERO side, and hence the signals MRC1 and MRC2 would both be low to render the point 3502 low. With the point 3502 low the transistor 3503 is conducting, thereby providing a ground potential at the center tap 3504 of the primary side transformer. A ground potential at the center tap 3504 of the primary side of the transformer per se would not induce any signals in the secondary winding 3513. However, since the first thing that is effected in dealing with the memory operation is a read out at the T1D time, a T1D signal will be applied to terminal 3506. This low signal will turn on the transistor 3507 thereby causing current to conduct through the primary windings 3529 and 3530. The current through the primary winding 3529 will induce a signal in the secondary winding to provide a negative polarity at terminal 3512 and a positive polarity at terminal 3509. The lower half of the secondary will not cause any current to conduct because any current emanating from this half of the winding will be blocked by the diode 3510. However, current will conduct from the terminal 3504 through the primary winding 3505b, through the diode 3511 to the terminal 3512 in response to the voltage induced in the upper half of the secondary winding.

The current conducting through the primary winding half 3505 will induce a voltage in the secondary 3513 which will in turn produce a read signal at A time on the line 3514. At the same time and for reasons which were set forth with respect to the circuitry 3501, there will be a row read signal H induced on the line 3528, if it is assumed that the MRR1 and MRR2 signals are low.

Considering FIG. 36, we find that if the signals MRR8 and MRR4 are both low, as previously decided for the example at hand, then neither of the diodes 3602 and 3603 will be conducting, and hence the transistors 3604 and 3605 will be conducting. When the transistor 3605 conducts the terminal 3606 will be at ground potential thereby turning on the transistor 3607. When the transistor 3604 conducts the terminal 3608 will be low thereby turning on the transistor 3609. It will be noted that the transistor 3607 is an NPN transistor while the transistor 3609 is a PNP transistor. The transistor 3607 is so arranged to accept current on line 3610, while the transistor 3609 is arranged to transmit current on line 3611.

Before we examine FIG. 37 to see how the signals on the various lines operate in conjunction with the memory let us examine the inhibit circuitry in FIG. 35 to ascertain that the inhibit signal is on, excepting during the period of writing a ONE. It will be recalled that we considered the generation of the WR signals in the discussion of FIG. 23 and that these signals were generated from either the C register or D register output signals. Briefly, examining FIG. 23 it will be noted that a WR1 signal is high at all times excepting at T5 and T6 time unless there is a ONE being written from either the C register or the D register, respectively, through the gates 2325 and 2328. The foregoing is true because, for instance, if there were a ONE stored in the D register then DB1 would be low when it was being transferred and hence the AND gate 2328 would provide a low signal (this of course assumes that DTM and DEQSFF are low) therefrom through the OR gate 2326 to keep the WR1 signal high. On the other hand, if DB1 were high, the AND gate 2328 would be high to the OR gate 2326 to provide a high signal to the inverter 2327, thus making WR1 low.

Now examining FIG. 35 we find that if WR1 is high, the transistor 3526 would be turned off and hence there would be no inhibit signal on line 3527. As indicated earlier, the inhibit signal is turned off for most of a cycle period but is allowed to go high during the time T5 to T6 unless a ONE is being written at which time the WR1 signal will again be made high, thereby turning the inhibit signal off. Having gained some insight into the generation of the inhibit signal let us consider FIG. 37 with regard to the signals that we assumed to be generated on FIGS. 35 and 36.

It will be recalled that when we were considering the reading of information out of the column 1, row 1 position we generated a column signal A on line 3514, and this signal is transmitted to A on FIG. 37. It will also be recalled that in FIG. 35 we generated a row signal H on line 3528 and this signal is transmitted to line H on FIG. 37.

The most significant address bits as found in FIG. 36 generated row signals on the line CC and on the line DD and these signals are transmitted to the line CC and the line DD of FIG. 37. Also in FIG. 37 the most significant column bits generate a signal on the line AA and on the line BB and these signals are transmitted to the line AA and the line BB on FIG. 37.

If it is assumed that the memory is wired in such a fashion that the column wires run north and south on the memory plane of FIG. 37 and these lines are folded once, whereas the row wires run east and west and are folded twice. This will be better understood if we trace out the manner in which the line A connects to the column lines AA and BB. The line A intersects four lead lines at 3710, 3711, 3712 and 3713. The lines AA and BB intersect four paired diodes at 3714, 3715, 3716 and 3717. Now there is only one connection for one pair of diodes and one lead line. The pairs just named can be traced out and it will be found that the pair 3716 connect to a line that leaves the plane at 3718, folds and enters at point 3719 and connects with lead line 3712. Similarly the row line H intersects four lead lines 3720,3721, 3722 and 3723. The row lines DD and CC intersect four pairs of diodes at points 3724, 3725, 3726, 3728. If these lines are traced out it will be found that line H is connected to DD and CC at points 3728 and 3729. The two lines which are connected intersect at location 3730 and hence the core at location 3730 is where bit 1 of information at address row 1, column 1 is stored. The physical locations are arbitrary and the lead connections AA, BB, CC, etc. can be interchanged within the column group and the lead lines DD, CC, etc. can be interchanged within the row group. The lines can be traced out for any address to find the proper locations in the memory plane.

Returning to FIG. 35 let us consider what happens during the write portion of this cycle. The write period of time is at T6 and a low signal is applied to the terminal 3519 which turns on transistor 3520. With the transistor 3520 conducting there is a current transmitted through the primary windings 3531 and 3521. With current being transmitted through the primary windings 3531 and 3521 there will be signals induced in the secondary windings which signals will be of the opposite polarity from the voltages which were induced by the read currents in the windings 3529 and 3530. There will be no signal transmitted from the terminal 3512 which is the positive terminal in the write condition because such a signal will be blocked by the diode 3511. However, there will be a signal from the terminal 3504, through the primary winding 3505a through the diode 3510 to the negative terminal 3509 of the lower half of the secondary winding.

The current passing through the primary path 3505*a* will induce a signal in the secondary winding 3513 which signal will be of the opposite polarity from the signal which was induced in response to the read signal at T1 time described earlier. This new signal will be a write signal and will be transmitted on line 3514. In a similar manner, there will be a write signal generated on line 3528. The write signal on line 3514 will be transmitted from the line 3611 which is the CC signal shown in FIG. 36, while the write signal on line 3528 will be transmitted from the line AA in FIG. 36. It will be recalled that these last lines can be traced through the memory of FIG. 37 to show that the row 1 column 1 position would experience a write signal but would pass through a different diode of the paired diodes 3716, than did the read signal.

In assuming that the row 1 column 1 position would experience a write signal we have assumed that the proper $\overline{WR}$ signals would be high during write time so that the inhibit signals would be held turned off to permit the two negative signals to coincide and provide a half select write operation at the location row 1 column 1.

The sense line circuitry is shown in FIG. 37 and as is apparent therefrom each of the bit positions has its own individual sense line. When the core which is at the junction of the row wire and the column wire which is energized is flipped or transferred to its ZERO side a signal will be transmitted through the primary of a transformer of the sense line circuit. For instance, consider the sense line circuit for bit 1. If the core in row 1, column 1 had had a ONE stored therein during the read portion of our hypothetical cycle a signal would have been transmitted through the primary winding 3703 to induce a signal in both of the secondary halves 3709 and 3705. Depending upon what polarity of signal is developed in the secondary halves, either transistor 3731 or transistor 3732 will be conducting. The transistor 3733 is normally conducting and when for instance the transistor 3732 is turn on, due to a negative potential at point 3734, ground potential will appear at point 3735 which is passed through the capacitor to turn off transistor 3733 and produce a negative pulse at MS1. The two transistors 3731 and 3732 are included for impedance matching purposes and one or the other of these transistors will conduct during the read time while the other will conduct during write time. The system is only interested in the circuit operation of read time and hence only at this time will the MS signals be considered.

EDIT OPERATION

Study now the circuits to perform certain editing operations. The editing capacity of the present system includes the ability to read a card code image from either the primary or the secondary reader. The card code image, as was discussed previously, is the raw information from the card which is not translated into a machine code. It will further be recalled that the card image mode of operation provides a scheme whereby a card is divided in half; that is, the six upper rows of a column representing one character and the lower six rows of a column representing another character. In addition, the editing routines includes the operation of inhibiting information from the card as the card is read, inserting specific information into memory locations within data words already held in the machine and compressing information held in the machine by deleting certain portions thereof. In particular, with respect to the insert, if a field of information were represented by ABCD and the operator wanted to insert some other information, X, between B and C the machine has the ability to transfer the information ABCD from one memory location to another, and during the transfer insert the new information so that the final operand would read ABXCD. On the other hand for the same operand, if the operator wanted to eliminate the X portion of the information, the machine has the ability to transfer ABXCD from one memory location to another and during the transfer to eliminate the X so that the final operand reads ABCD.

Examine now FIG. 38 which shows 1091C circuitry to accomplish these various routines and consider only the primary field circuits in detail since the secondary circuits are similar. Ordinarily, the system is wired to accomplish a translation of an 80-column code into a machine code which in the preferred embodiment of the present system is a modified excess-3 code. When the operator decides that a card image is desirable (primary card image) the plug hub line 3801 is wired from the proper address emitter, so that the reading of a card image routine starts with a particular address. If the entire card or a portion of a card, (after the card image operation has commenced), is not to be read in the card image mode, then the primary 80-column plug hub will be wired at the end of the field which is to be in the card image read mode thus terminating the card image mode of operation. A high $\overline{PCIH}$ signal to the AND gate 3803 in conjunction with an $\overline{ATP7}$ signal will fully condition the AND gate 3803 to transmit a low signal to the flip-flop 3804. In response to the low signal, the flip-flop 3804 will be transferred to its ONE side, and hence the $\overline{PCI}$ signal will become high. It will be recalled that when we considered FIG. 18, a $\overline{PCI}$ signal, or an $\overline{SCI}$ signal, going high would render the AND gates 1810 or 1830 inoperative and hence the translate signal from the gate 1811 would not be generated. If the translate signal from the AND gate 1811 is not generated then the information is accepted into the system in the card image mode.

As just mentioned, the operation of the secondary card image circuitry is very similar, causing an SCI signal and an $\overline{SCI}$ signal to be generated by the flip-flop 3805. When the field, that is to be read in the card image mode, has been read, the signal to the primary 80-column plug hub line 3802 will be transmitted to the AND gate 3806. The output signal from AND gate 2806 is transmitted to the flip-flop 3804 and hence enable the system to go back into the translate mode.

Now it will be recalled that when we read in the card image mode we read both an upper field and a lower field of each column and hence the system cannot be taken off the program step at the end of the 80-column detection time. That is to say that more than 80 columns would be read because there would be two column positions for each column. Accordingly, when either the flip-flop 3804 or 3805 is set to its ONE side, a high signal from the ZERO side will be transmitted through the OR gate 3807 to produce a high $\overline{\text{PSCI}}$ signal and to transfer the flip-flop 3808 to its ONE side. It will be remembered in FIG. 11 that the $\overline{\text{PSCI}}$ signal will render the AND gate 11102 inoperative, and hence the flip-flop 1153 will not be reset in response to an 80-column detection.

When the Primary Read Flip Flop in Fig. 18 is reset in response to the trailing edge of the card (producing a low $\overline{\text{PRFF}}$ signal) and in a like manner when the secondary read flip-flop is transferred to the reset side in response to the trailing edge of a card in the secondary (producing a low $\overline{\text{SRFF}}$ signal), the AND gate 3809 will be fully conditioned to provide a low signal to reset the flip-flop 3808.

As was stated above, there are times when the operator desires that certain information from the card be inhibited from being accepted by the memory. In order to accomplish this, the plug hub wire 3810 is wired from the proper address emitter and at TP7 time the AND gate 3811 becomes fully conditioned to transfer the flip-flop 3812 to its ONE side. It can be seen in FIG. 18 that when the PID signal goes low the AND gate 1809 will be rendered ineffective, and hence the translate and lower field and upper field control signals will not be generated. It will be recalled from the study of FIGS. 20, 21, and 22 that if the translate signal is not generated, information will not be accepted from the photocells to be passed through the 80 column translator. When the upper and lower field signals are not generated, information from the photocells 15 is inhibited from being transferred into the D register. Hence, the flip-flop 3812 when transferred to its ONE side (producing a low PIDE signal) inhibits information from being read into the D register. The operation of the secondary feed circuitry, which transfers the flip-flop 3813 is identical to that of the primary with the exception of the inputs and the outputs, and hence no further discussion thereof is deemed necessary.

Consider now the insert routine, which is commenced by wiring the insert plug hub line 3814 from the proper operand two address emitter to start the insert operation at a particular memory location. Since the operation of the insert routine is usually that of effectively inhibiting a portion of the information in the Operand 1 memory location from being transferred into the Operand 2 memory location, the insert routine takes place during the OCB time which is associated with Operand 2. Hence, at OCB time and TP5 time, the AND gate 3815 is fully conditioned to provide a low signal to the flip-flop 3816 thereby transferring this flip-flop to its ONE condition. With the flip-flop 3816 transferred to its ONE side there is produced a low INS signal and a high $\overline{\text{INS}}$ signal.

In FIG. 25, if we return to it, we find that when the $\overline{\text{INS}}$ signal is high and is transmitted to the OR gate 2561 it provides a low output signal therefrom which in turn provides a low signal from the AND gate 2562 to render the AND gate 2563 inoperative. If the AND gate 2563 is inoperative there is no DTM signal generated and hence information from the D register is not transferred to the memory.

It can be readily understood that if there is no DTM signal generated and the field counter is not incremented, the information to be inserted into the memory can be so inserted and the information from the D register which would normally have gone into the memory locations whereat the insert information is located can be inserted into the memory at the next position with the subsequent generation of a DTM signal and an incrementing of the field counter. In order to accomplish inhibition of the field counter, we find that in FIG. 28 the AND gate 2806 has an input signal, $\overline{\text{INS}}$, and when the $\overline{\text{INS}}$ signal goes high this AND gate is rendered ineffective. If the AND gate 2806 is not generating a low output signal the "-count" signal is not generated during OCB and when the "-count" signal is not being generated the increment signals such as $\overline{\text{LSCM1}}$ are not generated to increment the field counter (i.e. the operand 1 address is not incremented).

When the insertion routine is to be ended, the plug hub $\overline{\text{ENINSH}}$ is wired from an appropriate address emitter and at TP7 time AND gate 2817 is fully conditioned to provide a low signal to transfer the insert flip-flop 3816 to its ZERO side, thereby rendering $\overline{\text{INS}}$ low which enables the "count" signal to be generated.

Let us examine, now, the circuitry which is responsible for the compress routine. It will be recalled that a compress routine directs the system to extract information from information in the memory and in effect compress the remaining information into the positions left vacant by the deleted information. In order to effect a compress routine, the plug hub line 3818 is wired from the plugboard and hence at OCA time (which is the time Operand 1 is transferred to Operand 2) and TP5 time, the AND gate 3819 is fully conditioned to provide a high signal to the inverter 3820. A low signal from the inverter 3820 is transmitted to the OR inverter 3821 which in turn provides a high signal therefrom to the OR gate 3822. A high signal to the OR gate 3822 provides a high signal to the inverter 3823 which in turn provides a low signal back to the OR inverter 3821 and keeps the compress flip-flop turned on. With the compress flip-flop turned on the $\overline{\text{CMPS}}$ signal will be high and the CMPS signal will be low. During a compress operation the system wants to keep the field counter, when handling Operand 2, from advancing. By not advancing the field counter from a predetermined address (address emitter), the proper information will be the last character to be written into this position. Therefore, we find in FIG. 28 that if $\overline{\text{CMPS}}$ signal goes high it renders the AND gate 2810 ineffective and therefore the count signal is not generated. As was true with the description of the insert operation when the count signal is not generated, the increment signals such as $\overline{\text{LSCM1}}$ are not generated, and hence the address counter will not be incremented during the time that the Operand 2 address is being considered.

In order to have the compress operation ended, the ending address (the operand 1 address of the last character to be deleted), will be wired from the address emitter to the plug hub wire 3824 ($\overline{\text{ENCMPH}}$) to fully condition the AND gate 3825. The output from the AND gate 3825 is a high signal which is transmitted to the inverter 3826 which in turn provides a low signal to the OR gate 3822. The low signal to the OR gate 3822 provides a low signal to the inverter 3823 which in turn generates a high signal back to the OR inverter 3821 and hence the compress flip-flop is turned off.

INPUT/OUTPUT CONTROL — OVERLAP

The present system provides a means for transmitting information to auxiliary data processing equipment and for accepting information from auxiliary data processing equipment. The readout of information into auxiliary data processing equipment may be accomplished at the same time that the present card controller is using the primary reading facility to read information into the card controller. In the alternative, the present card controller can accept information from some auxiliary data processing device at the same time that it is processing cards through the secondary reader. In general, the present system sends a request signal to an auxiliary data processor to find out if that processing device is ready to accept information or to transmit information. When an auxiliary data processor acknowledges the request signal, an interlock is effected to prevent any further requests until the information has either been received by the card controller or transferred to auxiliary data processor equipment.

Examine now FIG. 39 which shows a logical diagram for accomplishing the Input/Output operation as well as the Overlap operation. In FIG. 39, there is shown an inverter 3901 which has an input plug hub signal IMPH/Q, applied thereto. When the present system is going to perform an input operation, that is, accept information from an auxiliary data processor, the input plug hub is wired from the step (register) during which this operation will take place, and a high signal is accordingly transmitted to line 3902. The high signal on line 3902 is transmitted to the inverter 3901, and provides a low signal to the AND gate 3903, and also to the AND gate 3904.

Initially, the flip-flop 3905 is reset to its ZERO side and, hence, at the time that the low signal is transmitted from the inverter 3901 to the AND gate 3904, there will be a high signal applied from the flip-flop 3905. Since at the time that the input request is made, there would not be an acknowledgement, as will become apparent subsequently, the signal on line 3906 will be low, and, hence, there will be a high signal applied from the AND inverter 3907 to the inverter 3908. The AND inverter 3907, as are other AND inverters, is identified as LR which identifies a Line Receiver but these devices are high AND inverters with components to accommodate a power driver. It can be seen in FIG. 39 that the inverter 3908 responds to a high signal to provide a low signal to the AND gate 3903. The AND gate 3903 in response to the two low signals previously described, and in further response to the timing signal TP7, as well as the MCX signal, becomes fully conditioned to provide a low signal to set the flip-flop 3905 during the first ICA time and therefore the input request will be made. Therefore, although it was previously mentioned that the AND gate 3904 would not be fully conditioned because the flip-flop 3905 was reset, it becomes apparent that after the signal on line 3902 is received the flip-flop 3905 is set, and hence the AND gate 3904 is fully conditioned (assume that the IEC signal is low at this time). The IEC signal will be low at this time since, of course, the operand terminating address has not as yet been detected.

The output from the AND gate 3904 is transmitted on line 3909 to the inverter 3910 from whence there is supplied an information request signal, IREQ. The inverter 3910 is identified as LD which represents a line driver but it should be understood that these devices are inverted with power driver accommodation. The input request signal IREQ is transmitted to a selected auxiliary data processor unit which receives the signal and acknowledges the receipt thereof at the time that such an auxiliary data processor is ready to transmit information to card controller. The acknowledgement signal from the auxiliary data processor equipment is the IAKN signal which is transmitted on line 3906, and is high to provide a low signal from the inverter 3907 to the inverter 3908. The low signal applied to the inverter 3908 provides a high signal to the AND gate 3903, and in effect, will interlock the system from making any more requests for input information until the IAKN signal is terminated.

Now if we digress for the moment, we find in FIG. 18 that when the acknowledge signal has been generated, it is transmitted to the AND gate 1850. The AND gate 1850 in response to this acknowledge signal, as well as to an OCB signal and a TP6 signal sets the primary request flip-flop to provide PREQ signal which is transmitted in FIG. 39 to the AND gate 3911. The AND gate 3911 becomes fully conditioned in response to this low PREQFF signal (assume the presence of a TP7 signal and an OCA signal) to provide a low signal therefrom which resets the flip-flop 3905. Hence, it should be summarized that after the acknowledge signal has been received from the auxiliary data processor equipment, the flip-flop 3905 is reset.

When the flip-flop 3905 has been reset, there will be a high signal produced from the ONE side thereof which will be transmitted to the AND gate 3912. The AND gate 3912 which is a high AND gate responds to this high signal from the ONE side, in addition to the high OCA signal, and the high TB signal. These last signals fully condition the AND gate 3912 to provide a high signal therefrom. The AND gate 3912 which operates in conjunction with the AND gate 3913 is also transmitting a high signal at this time, since the whole operation is taking place during an input mode of operation and hence the INPH signal is high. Since both the AND gates 3912 and 3913 are providing high signals, there is a high signal transmitted on line 3914 to the inverter 3915. The output from the inverter 3915 is a low signal which is transmitted to the inverter 3916 and to the inverter 3917. The output from the inverter 3916 is a strobe input signal (STRDIN) which is transmitted back to the selected auxiliary data processor equipment indicating that the lines coming into the Card Controller are being strobed to receive the information from the selected auxiliary data processor.

At the same time, the output from the inverter 3917 is transmitted to each of the AND gates 3918 through 3923. The other inputs to each of these AND gates 3918 and 3923 are the CI signals which are signals from the selected auxiliary data processor, and have information bit signals thereon which will be read into the D register of the Card Controller. If, in fact, there is a ONE bit on any of these CI lines, its associated AND gate (gates 3918 through 3923) will be fully conditioned to provide an input to an associated OR gate (gates 3924 through 3929). Hence, the RD signals will be rendered low to read information into the D register as was explained heretofore. The acknowledge signal will be terminated (by the auxiliary data processor equipment upon receiving the STRDIN signal), and the interlock at AND gate 3903 will be released and hence the system will be ready for an additional input request from the plugboard. It will be noted that the system makes an input request and receives an acknowledgement for the transfer of each digit from the auxiliary data processor equipment into the present card controller.

Now, it should be appreciated that insofar as the input request operation is concerned, this is the operation whereby information is transferred from the auxiliary data processor into the present card controller. This operation takes place during OCA time. It will be recalled that the secondary reader of the Card Controller reads information and transfers it into the memory during OCB time. Therefore, the D register and the memory will be available to the secondary reader during OCB time, so that the present system can effect an overlap operation; that is, it can accept information from the auxiliary data processor equipment, as well as read information in the secondary reader at the same time.

The output operation is quite similar to the input operation, and can be understood by first considering the inputs to the inverter 3930. When the card controller is required to perform an output operation, that is, transmit information from the Card Controller to some auxiliary data processor equipment, the output plug hub is wired on the plugboard, and there is a high signal transmitted on line 3931. The high signal on line 3931 is transmitted to the inverter 3930 to provide a low signal to each of the AND gates 3932 and 3933. In a manner similar to the operation described in connection with the input request, the AND gate 3933 will initially not be fully conditioned until the flip-flop 3934 is transferred to its ONE side. Since there will be no acknowledgement signal from the auxiliary data processor equipment at this time, the signal on line 3935 will be low, thereby providing a high signal from the high AND inverter 3936 to the inverter 3937. The high signal to the inverter 3937 provides a low signal to the AND gate 3932 which renders that AND gate fully conditioned at TP7 time of the MCX (i.e., ICB or OCB) period in which the request is initiated. The output from the AND gate 3932 serves to set the flip-flop 3934 to conduct in its ONE condition.

The output from the ONE side of the flip-flop 3934 is, therefore, low and is transmitted to the AND gates 3933, and 3938. The AND gate 3933 will be rendered fully conditioned at time assuming that the 2EC signal is low, and this signal should be low if the terminating address of the Operand 2 has not been detected. Since the output operation takes place during OCB time, the information which is transmitted to the auxiliary data processor equipment is considered as that of Operand 2.

The low output from the AND gate 3933 is transmitted on line 3939 to the inverter 3940 from whence there is transmitted a high output request signal, $\overline{OUTREQ}$. This $\overline{OUTREQ}$ signal is transmitted to a selected auxiliary data processor unit to determine if that data processor unit is ready to receive information from the Card Controller. If the selected auxiliary data processor equipment is ready to receive information from the Card Controller, it transmits back to the Card Controller an acknowledgement signal, $\overline{OUTAKN}$.

This acknowledgement signal, $\overline{OUTAKN}$, is transmitted high on line 3935 to provide a low signal from the inverter 3936. The low signal from the inverter 3936 is transmitted to the inverter 3937 to provide a high signal therefrom, and thereby inhibiting the AND gate 3932 so that the system will be conditioned to drop the output request. At he same time, if we examine FIG. 18, we find that the output acknowledgement signal is transmitted to the AND gate 1851. The acknowledgement signal in conjunction with an OCA signal as well as TP6 signal, fully conditions this last-mentioned AND gate to provide a low signal to the secondary memory request flip-flop. The secondary memory request flip-flop will be transferred to its ONE side in accordance therewith and will provide a low SREQ signal.

If we now examine FIG. 39, we find that the low SREQ signal is transmitted into AND gate 3941. The PREQ signal in conjunction with the signals TP7 and OCA, fully conditions the AND gate 3941 to provide a low signal therefrom. The low signal from the AND gate 2941 resets the flip-flop 3934 to its ZERO side. Accordingly, the high signal from the ONE side of the flip-flop 3934 is transmitted to the AND gate 3938 to fully condition this high AND gate in conjunction with the presence of a high $\overline{OCB}$ signal and high $\overline{TC}$ signal and a high $\overline{OUTH}$ signal. The high output signal from the AND gate 3938 is transmitted on line 3942 to the inverter 3943 to provide a low signal to the inverter 3944. The output from the inverter 3944 is a high strobe output signal $\overline{STROUT}$. This high strobe output signal is transmitted to the auxiliary data processor whereat it is parallel-connected to a plurality of gates. The other inputs to each of these gates would be the $\overline{CO}$ signals which we shall presently consider, and hence when the gates are fully conditioned, there is an input into the selected auxiliary data processor unit.

It becomes evident by examining the inverters 3945 through 3950 that each of these inverters receives a signal from the D register and converts it into a high signal which is sent through a cable to the selected auxiliary data processor unit. The gates in the auxiliary data processor equipment to which the $\overline{CO}$ signals are applied are further conditioned by the $\overline{STROUT}$ signal, and the presence of these two signals at the respective gates provide an input to the selected auxiliary data processor unit.

When the system is going to effect either an output operation or an input operation, the particular auxiliary data processor which is going to be used to either receive the information from the Card Controller or transmit information to the Card Controller must be designated. Hence from the same step that either the $\overline{INPH/Q}$ signal or the $\overline{OUTPH/Q}$ signal is wired, the designation of the particular auxiliary equipment to be used is also wired. This designation is accomplished by generating signals which are transmitted to the input lines of the inverters 3951 through 3956. The output signals from these last-mentioned inverters are further transmitted to a set of inverters 3957 through 3962. The outputs from these last-mentioned inverters which are the high $\overline{AUXH}$ signals are transmitted to the auxiliary data processor unit whereat they are decoded. If the decoding circuitry, (which is present in each if the auxiliary data processor units) of a particular auxiliary data processing unit indicates that it is the particular data processor with which the card controller is interested in operating, then this particular auxiliary data equipment will be prepared to transmit the acknowledge signal, if in fact it is ready to either transmit or receive information. The control of the transmitting or receiving information is, of course, controlled by the $\overline{IREQ}$ and the $\overline{OUTREQ}$ signal.

Finally, in FIG. 39, there is shown inverter 3963 which has a signal, $\overline{IOABN}$, transmitted thereto. If the $\overline{IOABN}$ signal is high indicating that there is an abnormal situation in the selected input/output unit, then a low IOABN signal will be transmitted from the inverter 3963 to inform the operator.

SERVICE CIRCUIT

It becomes necessary at times for the operator to be able to observe what information is in certain locations of the memory or to be able to specifically write information into certain locations of the memory for the purposes of performing a test on the Card Controller system. It will be recalled that there is a step mode provided by which the operator can step the Card Controller through one step of the program at a time. If during this time, the operator decides to observe what is in some particular location of memory, this can be effected by the circuitry shown in FIG. 47.

In FIG. 47, there is shown an inverter 4701 whose input is a test signal, $\overline{TESTM}$. This test signal is generated by a switch on the machine. The switch itself is not shown, because it is a well known single throw switch. The high signal on the line 4702 from the switch is transmitted to the inverter 4701 to provide a low signal to the AND gate 4703. Assume that at this time that the END Instruction signal which is also applied to the AND gate 4703 is low and therefore AND gate 4703 provides a high signal to the OR inverter 4704. The output from the OR inverter 4704 is a low signal which is transmitted to the AND gate 4705, as well as to the OR inverter 4706. The low signal to the OR inverter 4706 in conjunction with the $\overline{RUNSW}$ signal and the $\overline{GCY}$ signal (which are both low) provides a high signal. The high signal from the OR inverter 4706 is fed back to the OR inverter 4704 thereby turning on the test flip flop 4730.

If the operator is concerned with providing simply a readout of information in the memory, then the low signal from the OR inverter 4704 will not render the AND gate 4705 fully conditioned because the write control switch signal on line 4707 will be high. In order to effect a write operation the SWR signal must be low. However, the high signal from the OR inverter 4706 is transmitted to the AND gate 4708 to partially condition this AND gate. When the End Instruction flip-flop is reset, the AND gate 4708 becomes fully conditioned to provide a low signal to each of the AND gates 4709 through 4716. Prior to throwing on the test switch which eventually generated the signal on line 4708, the address switches represented by the signals SWMR1 to SWMC1 are set up in accordance with the address from which the operator wants to readout of the memory. These switches per se are also not shown since they are well known single throw switches. When the "SWM" switches are turned on, low signals are provided on the respective lines 4717 through 4724. Whichever one, (or ones), of these switches is turned on, it, (or they), will provide low signals to these AND gates and hence the associated PR line (or lines), will have a low signal to cause a readout from the memory as described earlier.

Let us digress for the moment and examine FIG. **44*a* and FIG. 27*a* whereat we find the PRR signals and the PRC signals. It becomes evident from examining FIG. 44*a* and FIG. 27*a* that when PRR signals are generated, the row field counter shown in FIG. 44*a* will be set up to generate the proper FRB signals and when the PRC signals are generated, the column field counter shown in FIG. 27*a*** will be properly set up to generate the FCB signals. Hence it becomes evident that when the test mode is in operation the address which is set up by the switches represented by the SWM signals can cause the system to read out of a certain address position. This information can be seen by display equipment which is connected to the D register.

If the operation is desirous of writing information into a particular memory location, the address switches are set up as before and the SWR switch whose signal is shown on line 4707 will be turned on to provide a low signal to the AND gate 4705. The low signal to the AND gate 4705 provides a high signal to the inverter 4725 which in turn provides a low SDWRC signal which serves to inhibit the D to M transfer. If we examine FIG. 25B we find that the SDWRC signal is transmitted to the AND gate 2595 which operates in conjunction with the And gate 2553 and hence when the AND gate 2595 is not fully conditioned the DM signal will be inhibited.

Figure 23A:
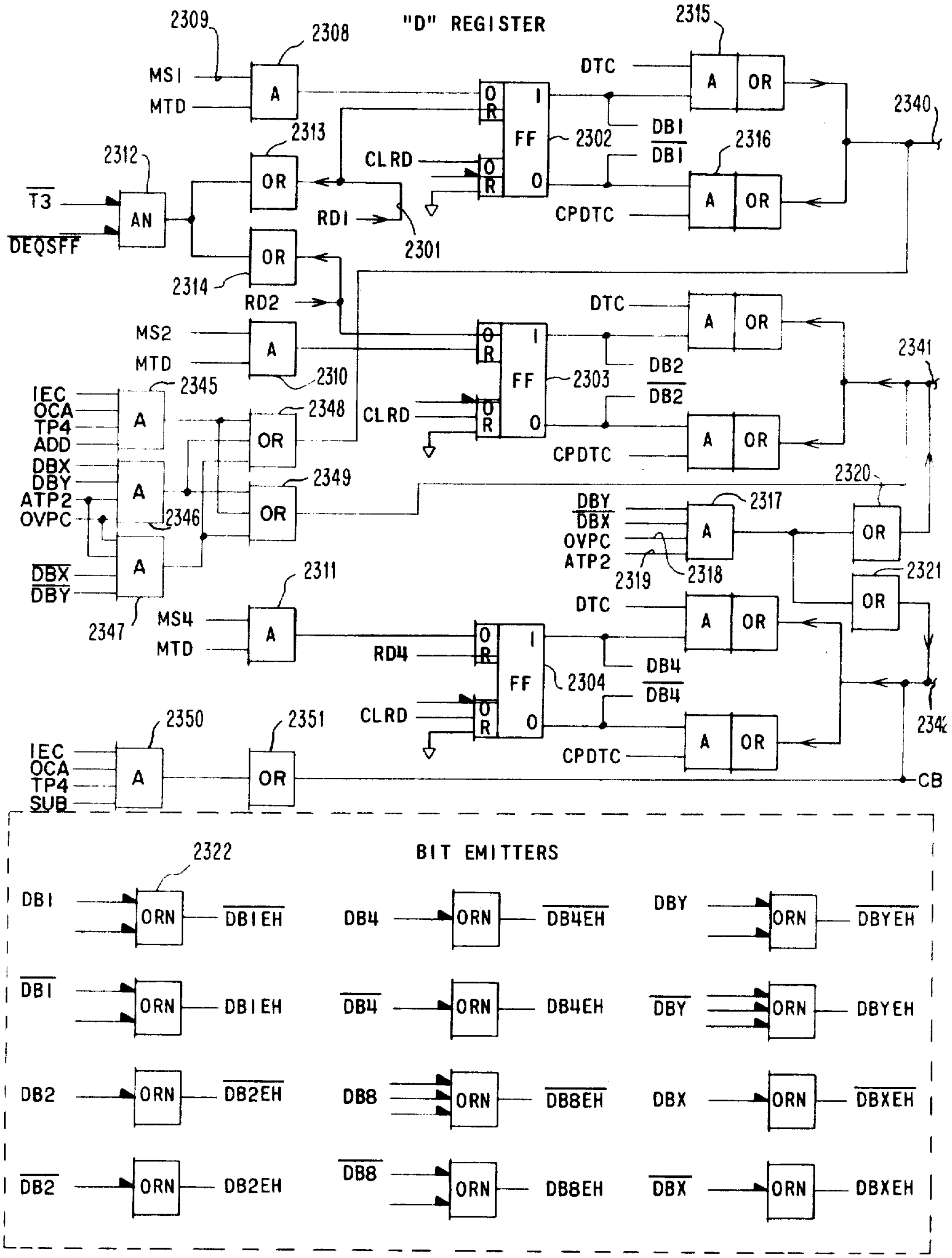
Figure 23B:
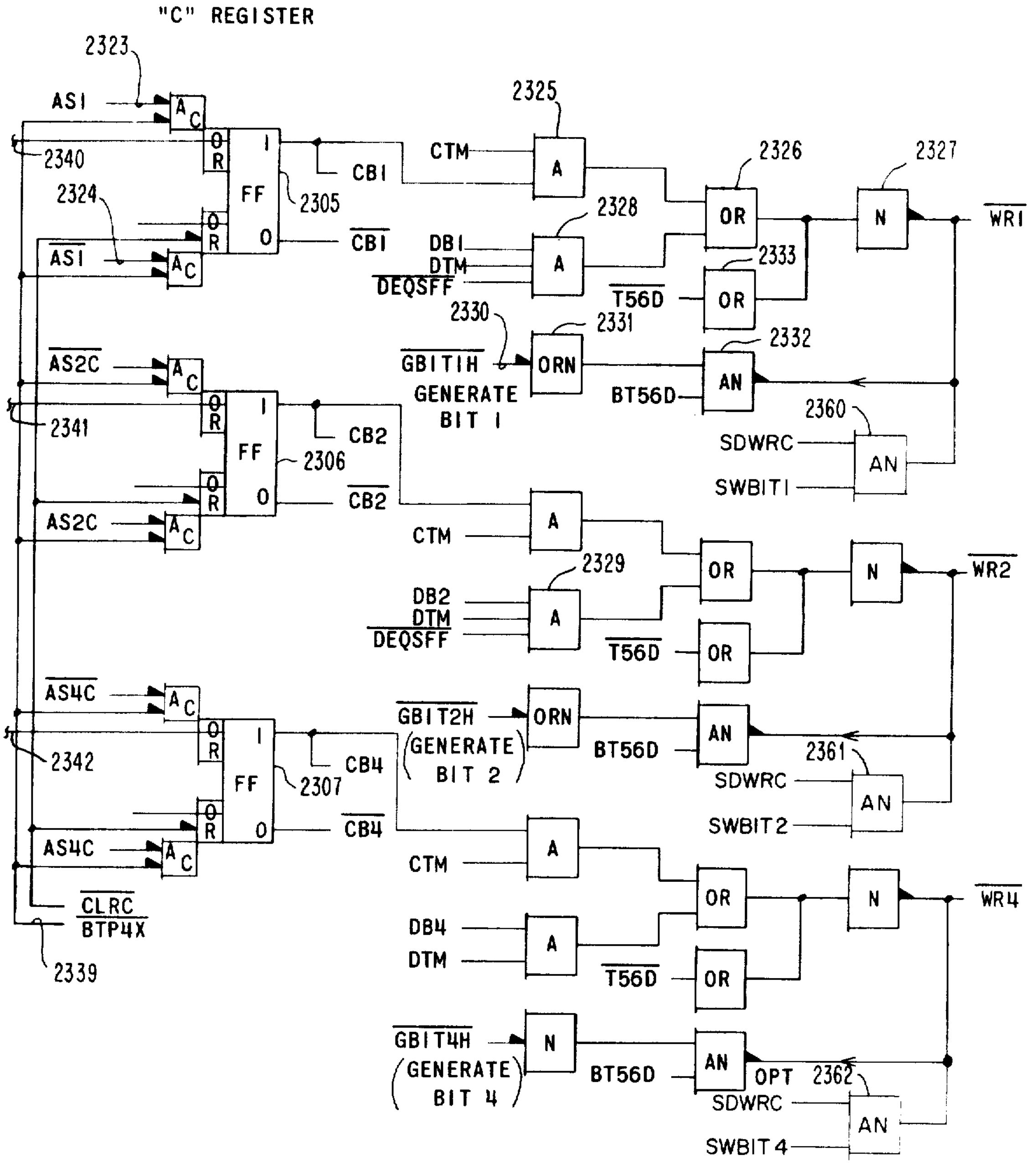
Figure 24A:
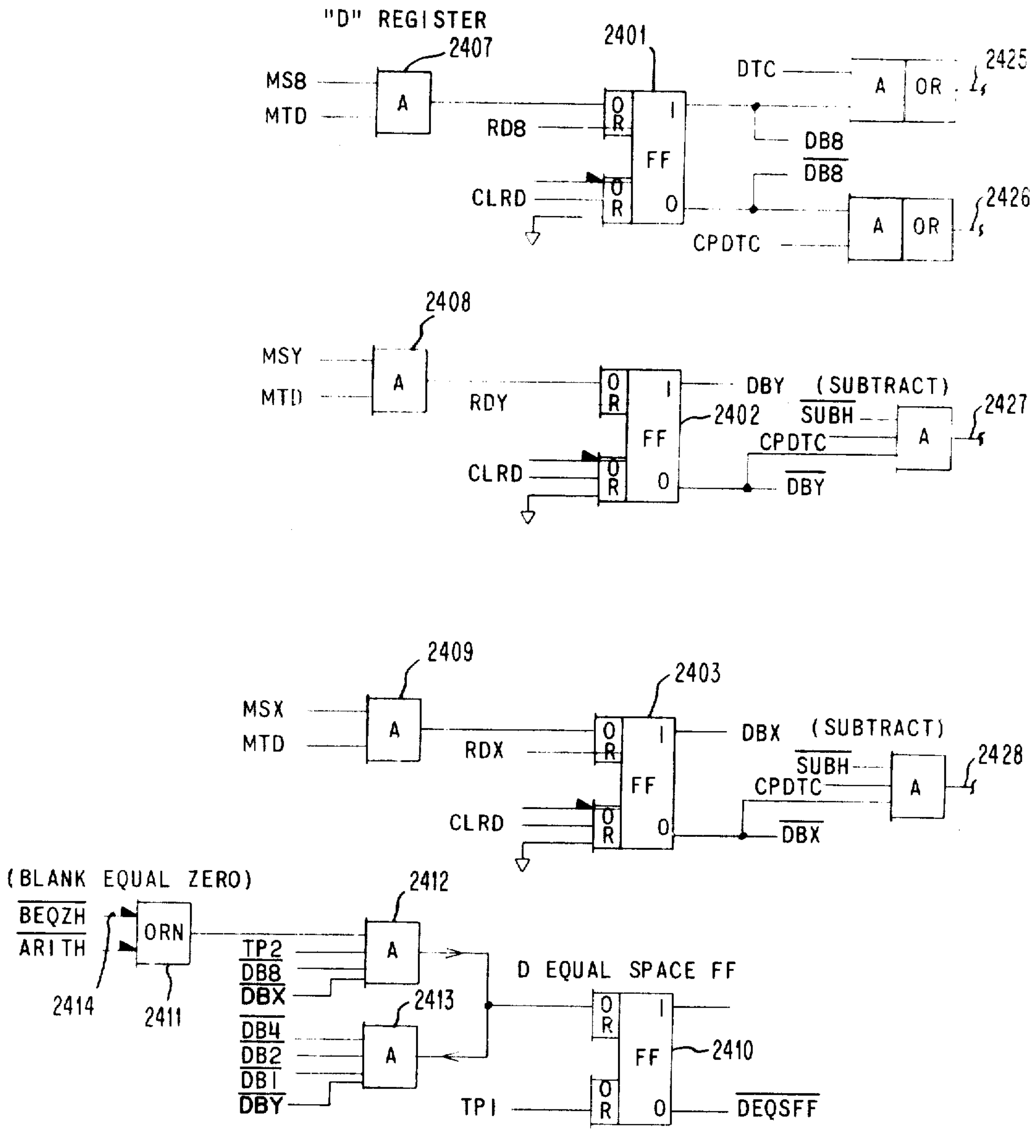
Figure 24B:
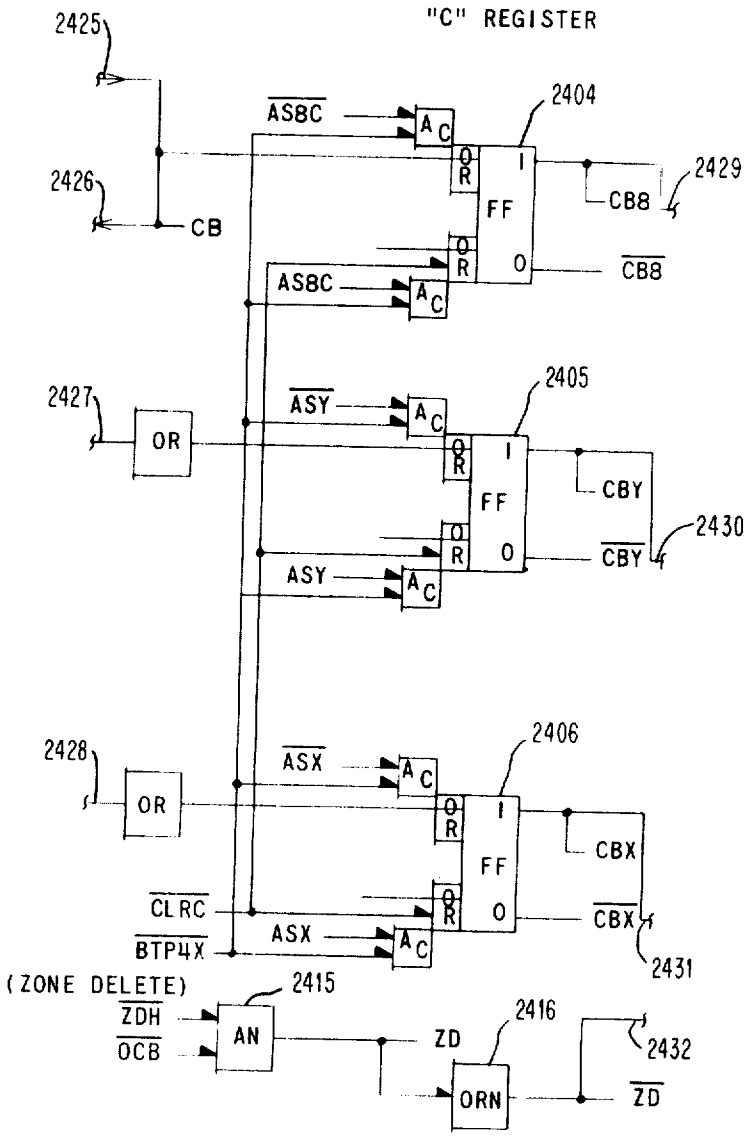
Figure 24C:
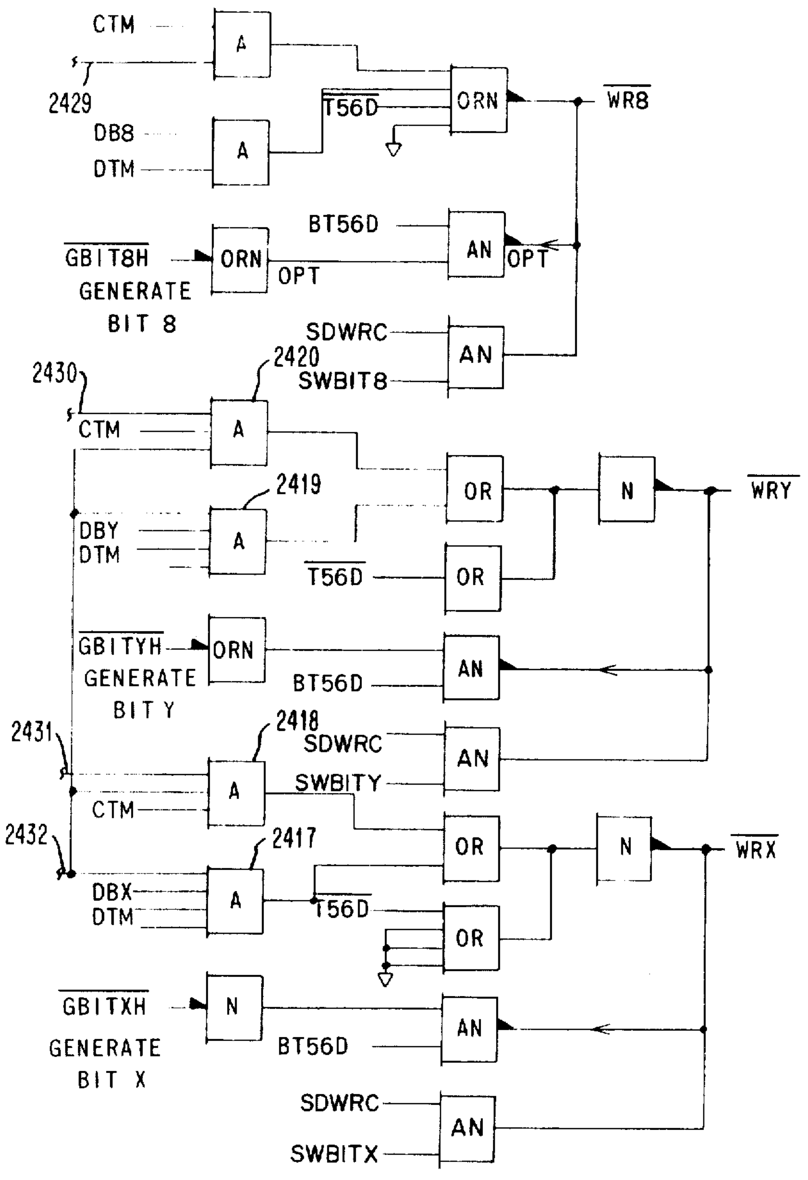

If we review FIGS. **23*b* and 24*c* we first find that in FIG. 23*b* there are three AND gates 2360, 2361 and 2362. To each of these AND gates there is applied an SEWRC signal which will be generated when the test mode is in operation and we generate the switch-write control signal. In addition, the other inputs to the respective AND gates are the SWBIT signals, which stands for the switch bit signals. Once again the switches which are used to set these last mentioned signals up are not shown per se, but are simply single throw switches, and when turned on provide low signals to the respective AND gates 2360 through 2362. If the Card Controller is operating in a test mode and any one of the switch bit signals is turned on, its respective AND gate will be fully conditioned to provide the proper WR signal. Therefore, the information which is set up in the SWBIT switches will be written into the memory at the address selected by the SWMR and SWMC signals of FIG. 47. In FIG. 24*c*, the AND gates 2450 through 2452 are AND gates which are similar to the AND gates 2360 through 2362. Each of these AND gates 2450 through 2452 has an SDWRC signal applied thereto, as well as a switch bit signal. When the SWBIT signals are generated and the SDWRC signal is generated, the respective AND gates may be fully conditioned to provide the proper WR signals, and hence write the WR bits into the memory. This information will also be written in at the address location designated by the row and column switches (SWMR and SWMC) shown in FIG. 47**.

PROGRAM SELECT AND COUNTERS

In using the present system the programmer may want to detect a certain condition which is not related in particular to a compare situation, but simply the presence of some particular data and have the system remember the detection of this condition for further use. For example, let us suppose that at a certain address in the memory the programmer wants to determine that there is a certain bit present. Under these circumstances the address emitter would be wired to two positions of a combine. The bit emitter would be wired from the particular bit for which the operator was looking to a third position of the combine, and the step position could be wired to another combine so that during a certain step, the information at the particular address could be looked at and if the bit is present there will be an output from the second combine indicating that all the conditions are present. In this situation the ON plug hub of the program selector would be wired to remember that all these conditions were present, and during some subsequent step either the A or the B pulse from the program select could be used to generate a signal indicating that the condition had been met.

The circuitry to accomplish this is found in FIG. 40. The plug hub line 4001 is wired to turn the program select flip-flop 4003 ON. A low signal, or a B signal, on the line 4001 is transmitted to the AND gate 4002 whereat in conjunction with a T56D signal, the AND gate 4002 is fully conditioned. The output from the AND gate 4002 is transmitted to set the flip-flop 4003 to its ONE side. The flip-flop 4003 will remember that the condition for which the signal on line 4001 is generated actually existed and this memory will continue in effect until flip-flop 4003 has been reset by a signal on 4004. When the flip-flop 4003 has been set there will be a B signal on line 4005 and an A signal on line 4006.

Each of the flip-flops 4003, 4007, 4008 and 4009 operates in identical fashion and each of these flip-flops is reset by the general clear signal on line 4010.

Since the remainder of the circuits in the blocks 4011, 4012, and 4013 are identical to that of the block 4014 no further discussion is deemed necessary.

Examine now FIG. 41 which shows the circuitry for the selector devices. Normally the selector devices operate such that the "common" plug hubs are connected to the normally closed sides and upon the energization of the selector the common plug hubs are connected to the normally open sides.

In FIG. 41 the relays 4101 and 4102 as well as relays 4103 through 4106 are energized with a high signal. Hence, when there is no input signal on the plug hub line 4107, the output from the inverter 4108 is high, and therefore the relay 4101 is energized closing the straps 4109 and 4110, respectively, with the points 4111 and 4112. With the straps 4109 and 4110 respectively in connection with the points 4111 and 4112, the common plug hubs 4113 and 4114 are connected to the normally closed plug hubs 4115 and 4116.

When the plug hub 4107 receives a high signal there is a low signal from the inverter 4108 de-energizing the relay 4101, and being transmitted through the inverter 4117 to provide a high signal to energize the relay 4102. When the relay 4102 is energized the straps 4118 and 4119 will be respectively connected to the points 4120 and 4121 so that the common plug hubs 4113 and 4114 are connected to the set or normally open plug hubs 4122 and 4123. The remainder of the circuitry is self-explanatory and each of the circuit blocks 4124 and 4125 and 4126 are the same as the block 4127 and hence no further explanation is warranted.

In many data processor devices, as in the present one, a mechanical counter is desirable in order that the operator can check the values of various items such as the total card count or the particular card count in any one or all of the pockets etc. Heretofore the mechanical counter has been limited to counting items whose presence provided a relatively long input signal. However, in accordance with the arrangement of the present invention, the mechanical counter can count any items irrespective of how short a detection pulse is generated in accordance with the presence of the item because of the counter option circuitry shown in FIG. 42.

In FIG. 42 there is shown a flip-flop 4201 which is turned on in response to a signal on the plug hub line 4202. The output from the flip-flop 4201 is fed back to the delay line device 4203 whereat it is delayed for as long a period of time as is necessary to advance a mechanical counter. Thereafter the output from the delay device 4203 is transmitted to reset the flip-flop 4201. By providing the circuitry, just discussed, it makes no difference how short a duration pulse is generated for the mechanical counter because the flip-flop device takes over and provides a sufficiently long pulse until the counter has been advanced and thereafter is reset. The output on line 4204, of course, is transmitted to advance the counter.

As a practical application of the counter let us suppose that we were going to count every time a ONE bit was present in a control position at each card during Step 5. The output from Step 5 would be wired to a combine along with the one bit emitter the output therefrom would be wired to line 4202. In this manner our mechanical counter would keep an account of every time that there was a one bit at the control position in the card which was being read during Step 5, and the operator could observe this value readily.

The remaining counters and their associated circuitry operate the same as the counter represented by the circuitry 4205 in general and hence no further explanation is deemed necessary.

The circuitry shown in detail in FIGS. 48 and 51 through 62 show typical circuits to accomplish the many operations depicted by the block diagrams of the other figures. Every one of the circuits used in the block diagrams is not in particular shown by the circuit details of FIGS. 48 and FIGS. 51 to 62. However, the circuitry of these last mentioned figures are typical of the circuitry which is present in the card controller. The circuits for some of the block diagrams differ from others because of power considerations, and because of economic considerations.

However, the changes between the circuits is minor and to provide a detailed configuration and explanation would unduly burden the description. The system can be built with the circuits shown and other well known standard circuits.

Figure 49:
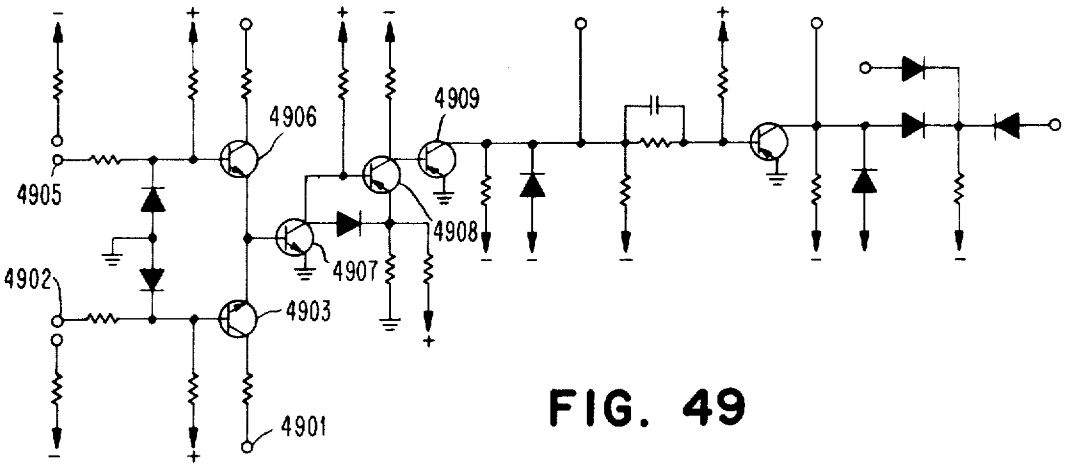

In FIG. 49, there is shown a circuit which is used with the photocells and is a photocell amplifier with an OR inverter output. When the circuit is operating with the secondary feed a memory cycle B signal is applied to terminal 4901 and if the photocell is covered at this time a positive signal is effectively applied (negative signal is removed) to terminal 4902 to render the transistor 4903 conducting. In a similar manner, when the circuit is operating with the primary feed during the memory cycle A time a positive signal is applied to the terminal 4904, and if the photocell is covered at this time a positive signal is applied to terminal 4905. In response to these two last mentioned high signals transistor 4906 will be rendered conducting. When either of the transistor 4903 or 4906 is rendered conducting, the transistor 4907 conducts to provide a ground potential to the base of transistor 4908 thereby turning that transistor off, and turning on transistor 4909.

Figure 50:
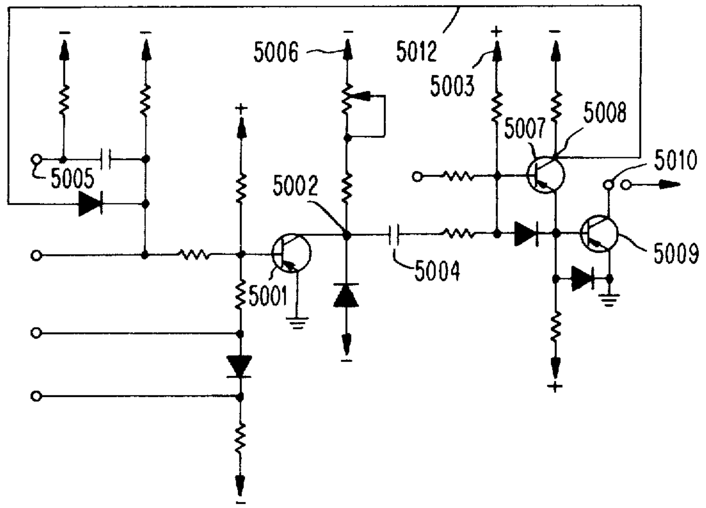

FIG. 50 shows the circuitry for a delay flop. The transistor 5001 is normally conducting thereby providing a ground potential at its collector point 5002. Since the positive potential at source 5003 is higher than ground, there is a slight positive-negative charge developed across the capacitor 5004. This charge is termed "slight" because the right hand side of the capacitor is clamped to ground at point 5013. The charge being ground on the left hand plate and a small positive potential on the right hand plate. When a positive pulse is applied to terminal 5005, it turns off the transistor 5001 and therefore the charge across the capacitor 5004 is now measured from the negative potential at terminal 5006. Accordingly a negative potential is effectively applied to the base of the transistor 5007 and this transistor commences to conduct. When the transistor 5007 conducts positive potential appears at its collector point 5008 which positive potential is feed back to hold the transistor 5001 turned off. However, during this time, the capacitor 5004 commences to charge and when there is a sufficient positive charge developed across the capacitor 5004, the transistor 5007 gets turned off thereby providing a negative potential through the feed back line 5012 back to turn on transistor 5001. The transistor 5009 and the accompanying circuitry merely provides a power driver output and the output of the circuit is provided at terminal 5010.

Figure 51:
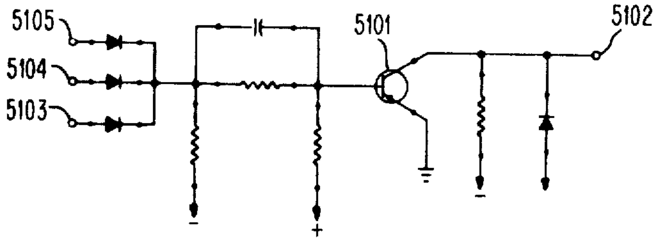

FIG. 51 shows a well known building block which can be used either as a NOR gate or an AND gate and is identified in the description as either an AND inverter or an OR inverter. Normally the transistor 5101 is conducting thereby providing a ground potential, or a high signal at terminal 5102. When a high signal is applied to any one of the terminals 5103, 5104, or 5105, the base of the transistor 5101 goes high thereby turning this transistor off and providing a negative potential or a low signal at terminal 5102. Hence the circuitry of FIG. 51 act as an OR gate to positive signals, and an AND gate to negative signals. By properly choosing the polarities of the voltage divider network, reversing the diodes and the type of transistor, this very circuit could become an AND inverter for positive signals and an OR inverter for negative signals.

Figure 52:
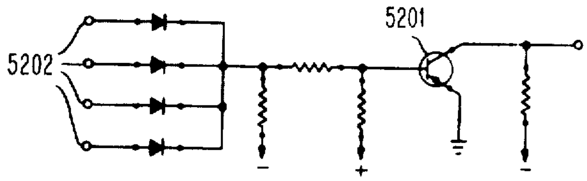

FIG. 52 is a circuit which is quite similar to the circuit of FIG. 51 and shows an OR inverter or an AND inverter depending upon the polarity of the input signals. In FIG. 52 the transistor 5201 is normally conducting and a high signal to any one of the input terminals 5202 would turn this transistor 5201 off thereby changing the polarity of the output signal from a high to a low signal. Thus the circuit of 5052 is an OR inverter for high signals and an AND inverter for low signals.

Figure 53:
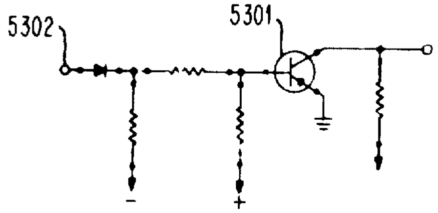

The circuit of FIG. 53 is what is termed many times throughout the description as simply an inverter. The transistor 5301 is normally conducting and a high signal to the terminal 5302 turns the transistor off thereby changing the output signal from a high signal to a low signal.

Figure 54:

The circuit shown in FIG. 54 is a standard diode AND gate which is used throughout the system and referred to as an AND gate or an A circuit.

Figure 55:
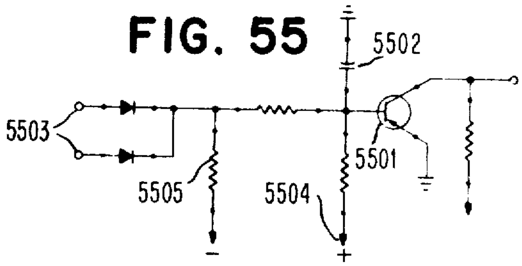

The circuit of FIG. 55 is referred to in the write up as an OR inverter-slow circuit. In the circuit of FIG. 55 the transistor 5501 is normally non-conducting and the base thereof is held at a potential something greater than ground, thereby providing a positive to negative charge across the capacitor 5502 with the positive charge being toward the base of transistor 5501. When a negative signal or low signal is applied to either of the terminals 5503, the current from the positive terminal 5504 as well as the current through resistor 5505 conducts to charge up the capacitor 5502. All during this charge up time the transistor 5501 continues to be non-conducting and when the capacitor 5502 becomes fully charged, the transistor 5501 is turned on thus switching the output signal from a low signal to a high signal. However, the output signal is not switched from a low signal to a high signal until some period of time after the input signal is applied, this period of time depending upon the charging of the capacitor 5502 and hence the circuit is identified as a "slow" circuit.

Figure 56:
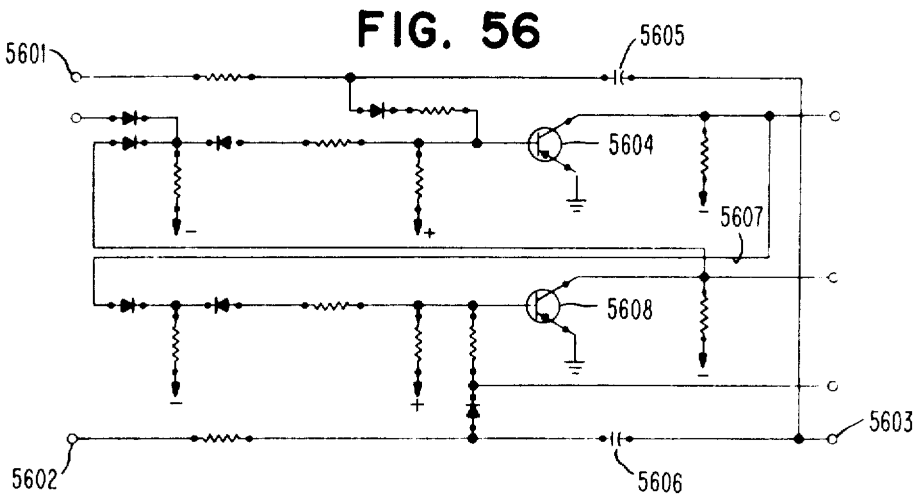

The circuit of FIG. 56 is a flip-flop which has an OR input as well as an AC input. It will be recalled that when this flip-flop was described, in respect to the block diagram circuitry, it was indicated that it was an AND input as well as a capacitor input so that the circuit is sensitive to a positive going step. The input signals are normally applied to the terminals 5601 and 5602. These two terminals usually handle signals of different polarities. For example, if the signal $\overline{\text{FCB1}}$ were applied to the terminal 5601, then, the signal FCB1 would be applied to the terminal 5602. The AND aspect of the input is accomplished with a further consideration of a signal being applied to the terminal 5603. In other words a high signal applied to the terminal 5601 in conjunction with the high signal applied to the terminal 5603 provides the coincidence for the AND aspect of the input and in a similar manner a high signal applied to the terminal 5602 in conjunction with a high signal applied to the terminal 5603 provides the second AND aspect of the input. Consider for the moment that the transistor 5604 is conducting. When the transistor 5604 conducts there is a positive-negative potential developed across the capacitor 5605 with the negative potential being toward the terminal 5603. At the same time there is virtually no difference of potential developed across the capacitor 5606. When a positive potential is applied to the terminal 5601 the positive to negative potential across the capacitor 5605 becomes increased and hence, when a positive potential is also applied to the terminal 5603 the difference of potential across the capacitor 5605 which has been increased is now measured from a positive level thus making the left hand plate quite high when compared with its value prior to the pulse at terminal 5603. The high potential as seen on the left hand plate of the capacitor 5605 serves to turn off the transistor 5604 which in turn provides a negative signal along the feed back line 5607 to turn on the transistor 5608. Now had the positive signal been applied to the terminal 5602 at the same time the positive potential was applied to the terminal 5603 there would have been no effect on the flip-flop because the capacitor 5606 would not have been charged to provide a negative potential of sufficient consequence to turn on the transistor 5608 and thus turn off the transistor 5604. In other words the two high signals have to be applied to the side of the flip-flop which is conducting in order to effect a transfer.

The circuitry of FIG. 57 shows a linear amplifier and a Schmitt trigger. The linear amplifier is composed of transistors 5701, 5702, 5703 and 5704 as well as the accompanying circuitry. The Schmitt trigger is composed of the transistors 5705 and 5706 as well as the accompanying circuitry and the operation of both the amplifier in the Schmitt trigger are so well known that no further explanation is deemed necessary. In the circuitry of FIGS. 57 a signal can be applied to the terminal 5707 to keep the Schmitt trigger turned off or to effect an immediate turn off.

The circuit of FIG. 58 is another version of the AC type flip-flop which is used in the step register. This circuit has a ground signal applied to the terminal 5801 to provide a positive negative charge across the capacitor 5802. When a high signal is applied to terminal 5803 the transistor 5804 which is normally conducting is turned off and the transistor 5805 is turned on. This particular circuit is used with a bank of other such circuits to provide a step register and the bank (as well as the individual circuits), is reset by a reset signal applied to terminal 5806. The two transistors 5807 and 5808 simply provide power drivers.

The circuit of FIG. 59 is another version of the OR inverter-slow output device. The transistor 5901 is normally non-conducting, and if the input signals to all of the terminals 5902 are low the capacitor 5903 will discharge. After the capacitor 5903 is sufficiently discharged the transistor 5901 will be turned on to change the output signal from a low signal to a high signal.

The circuit of FIG. 60 is simply an amplifier with a power driver at its output, but is often referred to throughout the specification as an OR gate with a single input, the OR being so designated because the diode input. It is clear upon the inspection of the circuit that the transistor 6001 is normally turned off. When a high signal is applied to the terminal 6002 the transistor 6001 is turned on to provide a low signal to the base of transistor 6003 and the transistor 6003 acts as a power driver for this output signal.

Figures 61, 62:
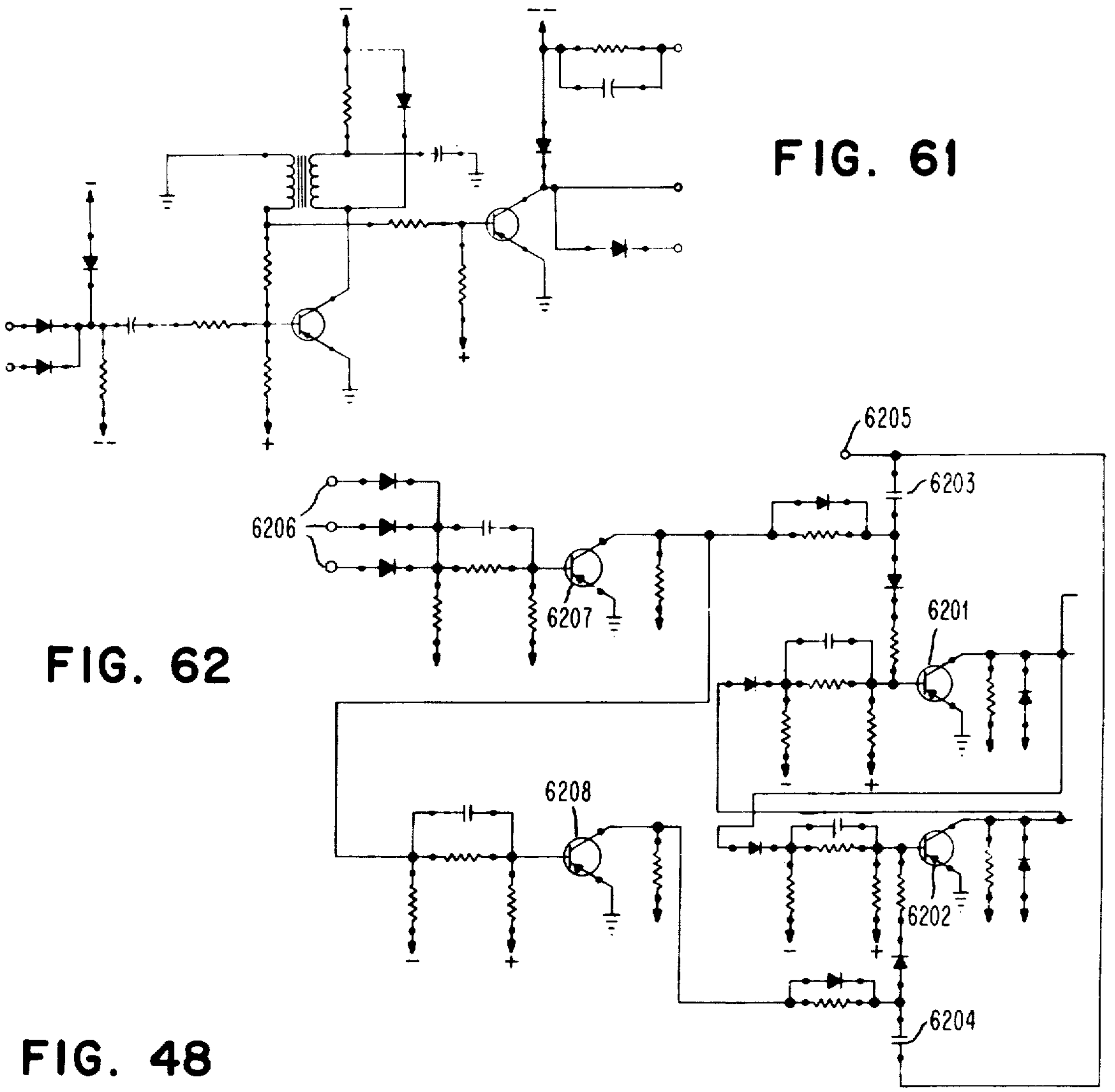

The circuit of FIG. 61 is a blocking oscillator whose operation is well known and which does not need any further description. This blocking oscillator is used as the driver-write amplifier and is sometimes identified as DWA in the block diagrams.

The circuitry of FIG. 62 is another version of an AC input flip-flop. The flip-flop is composed of the transistors 6201 and 6202 and their accompanying circuitry. The capacitors 6203 and 6204 are normally charged by the signals applied to the terminals 6206 through the transistors 6207 and 6208. If there is an input to the terminals 6205, the capacitor 6203, or 6204, whichever is associated with a pair of transistors which are conducting (transistors 6201 with transistor 6207, or transistor 6204 with transistor 6208) will serve to turn the flip-flop transistor off and transfer the flip-flop from one side to the other.

Figure 48:
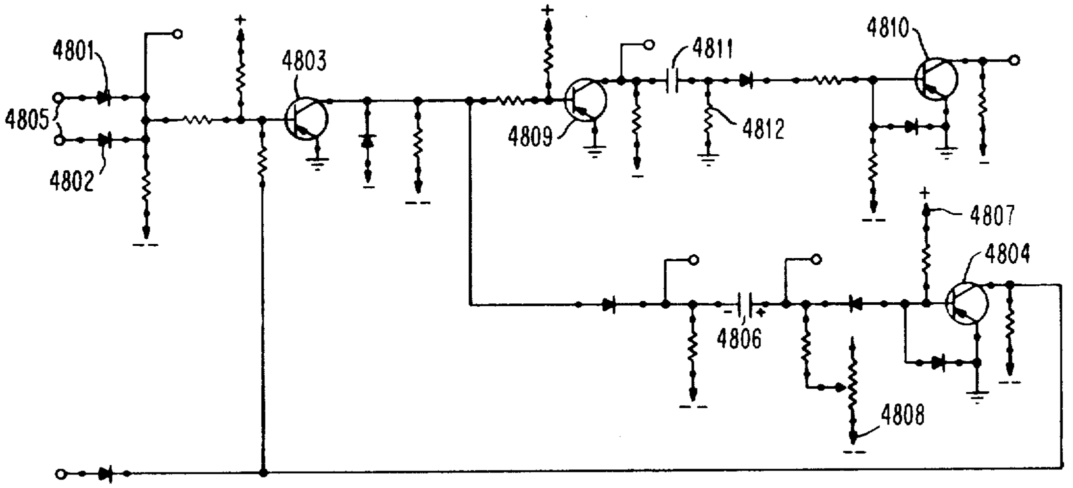

The circuitry of FIG. 48 shows an AND input arrangement composed of the diodes 4801 and 4802 serving as an input means to a delay flop. The delay flop is composed of the transistor 4803 and 4804 and operates in the following manner: The transistor 4803 is normally turned off and hence there is a negative potential at the collector thereof. The capacitor 4806 is charged to provide a relative potential difference there across as shown by the polarity symbols. The resistors in the network between the sources 4807 and 4808 are chosen such that the transistor 4804 is normally conducting which in turn provides a high signal back to the base transistor 4803 to keep that transistor turned off. When two negative signals are applied to the AND gate 4805, the transistor 4803 commences conducting and the positive potential across the capacitor 4806 is now measured from the high signal at the collector of the transistor 4803. Accordingly the transistor 4804 is turned off which in turn provides a negative signal back to the transistor 4803 to keep that transistor conducting. When the capacitor 4806 discharges to a sufficient level, the transistor 4804 will be once again turned on thereby turning off the transistor 4803.

Meantime the operation of the circuitry involving transistor 4809 and 4810 warrants consideration. The transistor 4809 acts as an amplifier to amplify the signals at the collector of the transistor 4803 and the transistor 4810 in cooperation with the capacitor 4811 and the resistor 4812 acts as a differentiation circuit. When the transistor 4803 is non-conducting the transistor 4809 will be conducting as will the transistor 4810. When the transistor 4803 is turned on the transistor 4809 is turned off and the capacitor 4811 commences to charge. When the transistor 4803 is once again turned off the transistor 4809 is turned on and the high signal at its collector is transmitted to turn off the transistor 4810 to provide a low output signal. The low output signal of short duration, to approximate a spike signal, because the capacitor 4811 quickly discharges and once again renders the transistor 4810 conducting. Hence the circuit of FIG. 48 depicts an AND gate which is on input means to the delay flop. Also shows an amplifier connected to the output of the delay flop which is further connected as an input to a differentiator.

BLANK COLUMN-DOUBLE PUNCH-ZONE DETECTION

The present system includes circuitry to effect a blank column, double punch and/or zone check detection. Let us consider FIG. 43 which shows the logic circuits to accomplish these operations. On the left-hand side of FIG. 43*a*, there are shown three lines 4301, 4302, and 4303. These lines are respectively from the plug hubs identified as zone check, blank column, and double punch. When, for instance, the system is desirous of performing a double punch check the plug hub "double punch" would be wired and there would be a high signal on line 4303. It is obvious from an inspection of FIG. 43 that each of the AND gates 4304, 4305, and 4306 has a TP6 signal applied thereto. Hence when one of the last-mentioned AND gates receives a plugboard signal at TP6 time that particular AND gate will be conditioned to provide an output signal therefrom.

By way of example, (continue to consider that we are performing a double punch operation), the AND gate 4306 would be fully conditioned at TP6 time to set the flip-flop 4307 to its ONE condition. Flip-flops 4308 and 4309 can be set to their ONE conditions in a similar manner, at TP6 time, through their respective inverters 4310 and 4311 in response, respectively, to a blank column plugboard signal, and a zone check plugboard signal.

If the system has been performing a double punch check or blank column check or zone check and it is desirable at a certain step that the check operation be terminated, then the punch off hub (POFPH) is wired to provide a high signal on line 4312 which at TP4 time fully conditions the AND gate 4313 (through OR gates shown). The signal from AND gate 4313 to the inverter 4314 resets each of the flip-flops 4307 to 4309 and in a somewhat similar manner the flip-flops 4307 to 4309 can be reset in response to the leading edge of a card being detected, as evidenced by the PRFF signal on line 4315.

If a double punch operation is under way, and in fact, there is a double punch situation then at least two of the six OR gates 4316 through 4321 will be conditioned to render one of the AND gates 4322 through 4327 fully conditioned. The output from the AND gate which is so conditioned is transmitted to the OR inverter 4328. The output from the OR inverter 4328 is transmitted on line 4329 to the AND gate 4330. Under the foregoing conditions the other input to the AND gate 4330 would be from the OR gate 4331 whose input would come from the double punch flip-flop 4307 on line 4332. AND gate 4330, being thus fully conditioned, would apply a low signal to the OR inverter 4333 which would transmit a high signal to the flip-flop 4334. The second input, $\overline{\text{PXL}}$, to the set side AND input of the flip-flop 4334 is a translate mode signal which indicates that the system is the translatemode and this signal is high at this time. Hence, the flip-flop 4334 would be set to its ONE condition which would provide a low signal to the inverter 4335 and hence a high $\overline{\text{PERRH}}$ signal, or a punch error signal, to be used as the operator might be so inclined.

It will be recalled that the N signal was generated low during a translate mode of the 1 to 9 position and that the CHO signal is low when there is a punch in the zero position. Hence, if the system is doing a double punch check and there happens to be a punch in the in the columns 1 to 9 as well as a 0 punch this would represent a double punch condition, and would condition the AND gate 4336 to provide a low signal to the OR inverter 4333, after which the operation is the same as just described. In a somewhat similar fashion, if there were no punches in the 1 to 9 positions during a translate mode operation, and no punches in the 0 position two of the inputs to the AND gate 4337 would be low. If we were doing a blank column check a third input line would have a low signal thereon from the flip-flop 4308. The fourth input line of the AND gate 4337 comes from the OR gate 4338. The OR gate 4338 has one input signal from the double punch check flip-flop and the second input from the AND gate 4339. The AND gate 4339 is fully conditioned when there is no punch in either the 11 or 12 positions. Hence, if there are no punches at all in a column, the AND gate 4339 will be producing a low signal, there will be a low signal on the $\overline{N}$ line, and a low signal on the CHO line to render the ANd gate 4337 fully conditioned (assume that a blank column flip-flop has been set to its ONE side) and hence there will be eventually produced a $\overline{PERRH}$ signal. If, at this time, the double punch check flip-flop is on, the AND gate 4339 can be ignored, and there will be a blank column check for simply the positions 0 through 9.

The AND gate 4340 has as an input thereto, the Channel 12 signal, as well as the output signal from the set side of the zone check flip-flop and the output from the OR gate 4341. If the double punch check flip-flop has been set to its ONE side, and there is a punch in the column for any of the positions 1 through 9 or 0, then the OR gate 4341 will provide a low signal to the AND gate 4340. If at this time the Channel 12 has a punch therein and we are performing a zone check operation, AND gate 4340 will be fully conditioned to provide a low signal to the OR inverter 4333 and hence a $\overline{PERRH}$ signal will accordingly be generated as explained above. This would be true because if there were a zone check and double punch check in effect and the zone punch were present this per se would be an error and at the same time if one of the other punches were present, this also would be indicative of an error. AND gate 4341 is identical to the AND gate 4340 excepting that the other zone position represents the third input, in particular, the Channel 11 signal. Flip-flop 4334 can be reset during instruction cycle B at TP5 time through AND gate 4342, or when there is a general clear signal, as is evident.

The chart in FIG. 43-1 shows the switches which may be turned on, and what is accomplished by turning on these switches.

SORTING ON COLLATING OPERATION

In the introduction of the present specification and throughout the specification there has been a reference to the fact that the present system provides means to effect both a collating operation and a sorting operation. The circuitry for accomplishing both the collating operation and the sorting operation has been described without specific reference to these operations. For instance, the circuitry which is necessary to accomplish the collating operation is the compare circuitry so that Operand 1 can be compared with Operand 2, and the stacker selection circuitry so that the cards can be transported into the proper stackers in accordance with the comparison. The circuitry to accomplish the sort operation is the insert circuitry which enables information to be placed in the memory, the comparison circuitry which enables the information from a card to be compared against this inserted information and of course the stacker control circuitry to place the cards in accordance with the comparison. Included with the present system is a set of alteration switches which are not specifically shown since they are well known double-throw switches. When a sort operation is underway a first comparison is made between the card information and information inserted in memory and accordingly the stacker pockets are loaded. The comparison results are coupled through an alteration switch and collectors to the stacker control plughubs. A second comparison is made between the card information and the inserted information and these comparison results are coupled through other collectors and the other side of the alteration switch. Hence the alteration switch acts as a first pass and a second pass switch in order to enable the machine to perform first and second portions of the sort.

Consider the collating operation. In the collating operation we would wire, for instance, step 1 to the read and execute plug hubs in order to have both the secondary and the primary feeds operative and hence to read cards from both the secondary and the primary feed. At the same time the information from the card would be directed to some particular address through the operand address plug hubs. In the second step we would wire the compare plug hub and also to the plug hubs of the operand addresses wherein the information from the cards is placed. During the third step we would wire out of the comparators (compare results) through collectors, such that if the operands were equal both the primary and secondary common pocket would be activated at the stacker selector hubs and hence the cards would be interfiled. If Operand 1 were less than Operand 2 we might want to put the primary cards in pocket 2 (or one of the other primary pockets). If Operand 1 were greater than Operand 2 we might want to put the primary cards in the third pocket. The same would be true for the secondary cards which did not match. On the other hand, if we were doing an interfiling mode of operation we would wire from the equal condition of the comparators into the secondary and primary common pocket and proceed to further wire the board so that if the Operand 1 is greater than Operand 2 the secondary would be fed whereas if Operand 1 were less than Operand 2 the primary would be fed. This three-step operation continues end to end until the collation is completed.

If the system were to perform a sorting operation we would first clear the memory and insert the numerical values 0, 2, 3 and 6 into particular memory locations. The system would next read cards in the primary feed. The system would compare the information from the cards in the primary against zero. If the comparison indicated an equal on a comparison to 0, these cards would be directed into the primary common pocket. The cards of the primary feed, would also be compared with 3, and if the cards were equal to or less than 3, but greater than zero, they would be transported to the primary 3 pocket, or pocket 123 in FIG. 1. The cards of the primary feed would also be compared with 6, and if they were equal to or less than 6, but greater than 3, they would be transported to the primary second pocket or pocket 125 in FIG. 1. If the cards were greater than 6, these cards would be transported to the primary 1 pocket, or pocket 127 in FIG. 1.

As the cards are being transported into the primary pockets, the cards which are being stacked in the primary 3 pocket, or pocket 123 in FIG. 1, are removed. These are the cards which have 1's, 2's, and 3's therein. These cards are next inserted into the secondary read, and the secondary cards are compared against value 2 (which it will be remembered was inserted into the memory). If the cards are equal to 2, they are inserted in the secondary 2 pocket, or pocket 117 in FIG. 1. If the secondary cards are greater than 2, they are inserted in the secondary 3 pocket, or pocket 119 in FIG. 1, or if the cards are less than 2 they are inserted in the secondary 1 pocket, or pocket 115 in FIG. 1. The cards in both the primary and the secondary feeds are run out according to this operation. At the end of the operation, the cards are stacked (refer to FIG. 1) with the 1's in pocket 115, the 2's in pocket 117, the 3's in pocket 119, the 0's in pocket 121, no cards in pocket 123, the 4's, 5's, and 6's in pocket 125, and finally the 7's, 8's, 9's and rejects in pocket 127.

Thereafter, the cards are removed from pockets 115 through 121 because these cards have been properly sorted. At this point, the alteration switch is pushed and effects the "-second pass". The cards from pocket 125 which contains the 4's, 5's, and 6's are placed in the primary feed, while the cards from pocket 127 which contains the 7's, 8's, 9's, and rejects are placed in the secondary. During the second pass the cards in the primary are compared to 5, and if the cards are equal to 5 they are transported into the primary 2 pocket, or pocket 125; if they are greater than 5, they are transported into the primary 1 pocket, or pocket 127 in FIG. 1; and if the cards are less than 5, they are transported into the primary 3 pocket, or pocket 123 in FIG. 1. Simultaneously, the secondary cards are compared with 8 and 9 and if they are equal to 8, they are transported into the secondary pocket, or pocket 117, in FIG. 1; if they are less than 8, they are transported into the secondary 1 pocket or pocket 115 in FIG. 1. If the cards of the secondary are equal to 9, they are transported into the secondary 1 pocket or pocket 119 of FIG. 1, and if they are greater than 9 or rejects they are transported into the secondary common pocket.

Hence, at the end of the second pass, i.e., when the alteration switch has been pushed to the second pass position, the cards in the stackers (refer to FIG. 1) are as follows: in stacker 115, the 7's are found; in stacker 117, the 8's are found; in stacker 119, the 9's are found; in stacker 121 the rejects are found; in stacker 123, the 4's are found; in stacker 125, the 5's are found, and in stacker 127 the 6's are found. The cards are then removed and joined with the cards that were sorted on the first pass, and it follows that in two passes a complete sort has been made of the deck.

Throughout the drawings occasionally there are found some light lined arrowheads in the reverse or forward direction from any particular logic circuitry. These arrowheads represent connectors, or Yoxley plug connections and are included for wiring purposes, but are not related in particular to the direction of any signals.

The embodiments of the invention in which an exclusive property or privilege is claimed are defined as follows:

1. A card controller device for reading information from information bearing cards and for selectively transporting said cards in accordance with at least a portion of the information borne by said cards comprising in combination:

a. card feeding means which includes a transport means to transport said cards;
b. read means to read information from said cards, said read means disposed along said transport means of said card feeding means;
c. memory means adapted to receive information from said read means and store said information;
d. comparison means adapted to receive information from said memory means to effect a comparison between different groups of information from said cards and accordingly generate command signals;
e. wait station means disposed to receive cards from said card reading means, said wait station means formed to separately hold first and second cards which have passed through said read station and which have been read, said wait station means coupled to be activated in response to a card being read by said read station;
f. stacker means coupled to said wait station means to receive cards therefrom and to stack said cards in accordance with information comparisons made by said comparison means; and
g. control means including stepping means connected to said read means and to said memory means and to said stacker means and to said comparison means whereby said control means (1) cause said read means to read a first card and store information from said first card in said memory on a first step; (2) cause said read means to read a second card and store information from said second card in said memory on a second step; (3) cause a first comparison between the information from said first card and the information from said second card on a third step, said comparison resulting in a determination of greater than, less than, or equal to; (44) causing said second step to be repeated thus reading a third card if said comparison results were either greater than or equal to; (5) causing a second comparison between said information from said first card and the information from said third card when the result of said first comparison resulted in a less than result; and (6) causing said stacker means to select said second card as an error card if said second comparison resulted in an equal to or greater than result.

2. A card controller device according to claim 1 wherein said control means includes a plugboard means through which the command signals from said comparison means are directed to said stacker means and by which the said card feeding means are controlled.

3. A card controller device according to claim 1 wherein said transport means has spring loaded idler gears along one portion thereof and wherein there is further included a jam release means which biases the spring loaded idler gears to get a no load condition when said jam release means is opened and which restores its spring loaded idler gears to a load condition when the jam release means is closed.

4. A card controller device according to claim 2 wherein there is further included in said card feeding means a card adjustment means to be adjusted to accommodate various lengths of cards, thereby enabling said card controller to handle various lengths of cards.

5. A card controller device according to claim 4 wherein said card adjustment means is located at said wait station and wherein each of said card adjustment means includes resilient kinetic energy absorbing means to absorb the kinetic energy of said card as it is positioned into said wait station means.

6. A card controller device according to claim 1 wherein there is further included a plurality of jam detector means located respectively along both said card feeding means and wherein there is also further included jam removal means to enable jams to be readily removed from said card feeding means.

7. A card controller device for reading information from information bearing cards and for selectively transporting said cards in accordance with at least a portion of the information borne by said cards comprising in combination:

a. first and second card feeding means each of which includes transport means to transport said cards;
b. first and second read means to read information from said cards, said first read means being disposed along the transport means of said first card feeding means, said second read means disposed along the transport means of said second card feeding means;
c. data processing means connected to said first and second read means to accept information and provide command signals in accordance therewith;
d. transfer register means including first and second registers, said second register coupled to said first register to receive information signals therefrom, said transfer register means connected to said first and second read means and coupled to said data processing means to transfer information into said data processing means and receive information from said data processing means;
e. read-out means connected to said transfer register means and adapted to be connected to auxiliary data processing equipment for reading information from said data processing means to said auxiliary data processing equipment;
f. read-in means coupled to said transfer register means and adapted to be coupled to auxiliary data processing equipment for reading information from said auxiliary data processing equipment into said card controller through said transfer register; and
g. overlap means connected to said read-in means and said read-out means to enable said card controller to read information from said first read means into said data processing means and accordingly to control said first card feeding means while overlapping said last-mentioned operation with reading out information to said data processing equipment, said overlap means further enabling said card controller device to read information from said second read means and accordingly to control said second card feeding means while overlapping with the operation of having information read from said data processing equipment into said card controller means.

8. A card controller device for reading information from information bearing cards and for selectively transporting said cards in accordance with at least a portion of the information borne by said cards comprising in combination:

a. first and second card transport means;

b. first and second read means to read information from said cards, said first read means disposed along said first transport means, said second read means disposed along said second transport means;

c. transfer register means including first and second registers, said second register coupled to said first register to receive information signals therefrom, said first register coupled to said first and second read means to receive information signals therefrom;

d. memory means coupled to said transfer register means to receive information therefrom and to transmit information thereto, said memory means receiving information from said cards through said transfer means to store said information;

e. data processing means coupled to said transfer register means to generate command signals in response to the addition or subtraction of information read into and out of said memory means;

f. control means coupled to said data processing means and coupled to said first and second transport means to selectively operate said first and second transport means in response to said command signals.

9. A card controller device according to claim 8 wherein there is further included read-out means connected to said transfer register means and adapted to be connected to auxiliary data processor equipment in order to transfer information read by said card controller into said auxiliary data processor equipment.

10. A card controller device according to claim 8 wherein there is further included read-in means coupled to said transfer register means and adapted to be connected to auxiliary data processor equipment whereby information can be read from said auxiliary data processor equipment into said card controller through said transfer register means.

11. A card controller means according to claim 8 wherein there is further included a read-out means connected to said transfer register means and adapted to be connected to auxiliary data processing equipment whereby information can be read from said card controller into said auxiliary data processing equipment and wherein there is further included read-in means coupled to said transfer register means and adapted to be connected to auxiliary data processing equipment whereby information can be read from said auxiliary data processing equipment into said card controller device through said transfer register means.

12. A card controller device for reading information from information bearing cards and for selectively transporting said cards in accordance with at least a portion of the information borne by said cards comprising in combination:

a. first and second card feeding means each of which includes transport means to transport said cards;

b. first and second read means to read information from said cards, said first read means disposed along said transport means of said first card-feeding means, said second read means disposed along said transport means of said second card feeding means;

c. transfer register means coupled to said first and second read means to receive information therefrom;

d. memory means coupled to said transfer register means to receive information therefrom and to transmit information thereto; and e. transfer register means including first and second registers, said second register coupled to said first register to receive information signals therefrom, said first register means coupled to said first and second read means to receive information signals therefrom.

13. A card controller device for reading information from information bearing cards comprising in combination:

a. first and second card feeding means each of which includes transport means to transport said cards;

b. first and second read means to read information from said cards, said first read means disposed along said transport means of said first card feeding means, said second read means disposed along said transport means of said second card feeding means;

c. transfer register means including first and second registers, said second register coupled to said first register to receive information signals therefrom, said first register coupled to said first and second read means to receive information signals therefrom;

d. memory means coupled to said transfer register means to receive information therefrom and to transmit information thereto, said memory means arranged in information storage segments each of which segments has an address; and e. control means including addressing means for designating the beginning and ending address in said memory means of information words read therefrom thereby enabling said card controller device to handle information words of variable length.

14. A card controller device for reading information from information bearing cards comprising in combination:

a. first and second card feeding means each of which includes a transport means to transport said cards;

b. first and second read means to read information from said cards, said first read means disposed along said transport means of said first card feeding means, said second read means disposed along said transport means of said second card feeding means;

c. transfer register means including first and second registers, said second register coupled to said first register to receive information signals therefrom, said first register coupled to said first and second read means to receive information signals therefrom;

d. memory means coupled to said transfer register means to receive information therefrom and transfer information thereto;

e. control means including addressing means to signify the starting and ending address of information words being transferred into or transferred out of said memory means thereby enabling said information words to be of variable and different lengths from one another;

f. clock signal generating means coupled to said control means and generating a two period repetitive cycle thereby enabling information words to be read from said first card reading means and alternatively from said second card feeding means.

15. A card controller device for reading information from information bearing cards comprising in combination:

a. first and second card feeding means each of which includes transport means to transport said cards;

b. first and second read means to read information from said cards, said first read means disposed along said transport means of said first card feeding means, said second read means disposed along said transport means of said second card feeding means;

c. transfer register means including first and second registers, said second register coupled to said first register to receive information signals therefrom, said first register coupled to said first and second read means to receive information signals therefrom;

d. memory means coupled to said transfer register means to receive information therefrom and transfer information thereto, said memory means having each storage position therein addressable; and e. control means coupled to said transfer register means and said memory means to generate signals to read out information from said memory means according to a pattern wherein said low order address is read out first and said high order address is read out last and alternatively according to a pattern wherein said high order address is read out first and said low order address is read out last.

16. A card controller device for reading information from information bearing cards comprising in combination:

a. first and second card feeding means, each of which includes transport means to transport said cards;
b. first and second read means to read information from said cards, said first read means disposed along said transport means of said first card feeding means, said second read means disposed along said transport means of said second card feeding means;
c. transfer register means including first and second registers, said second register coupled to said first register to receive information signals therefrom, said first register coupled to said first and second read means to receive information signals therefrom;
d. memory means coupled to said transfer register means to receive information therefrom and transfer information thereto, said memory means having each of its storage positions addressable;
e. switching means adapted to provide signals representative of each of the addresses for each of the memory positions; f. circuit means connecting said switching means to said transfer register means to enable information to be read out of memory locations in response to patterns set in said switching means and alternatively to enable information to be read into said memory in accordance with the pattern set in said switching means.

17. A card controller device for reading information from information bearing cards and for selectively transporting said cards in accordance with at least a portion of the information borne by said cards comprising in combination:
a. first and second card feeding means each of which includes transport means to transport said cards;
b. first and second read means to read information from said cards, said first read means disposed along said transport means of said first card feeding means, said second read means disposed along said transport means of said second card reading means;
c. translate means connected to said first and second read means to read information therefrom and translate said information into code signals used internally in said card controller;
d. memory means having a plurality of storage positions and having each of its storage positions addressable;
e. arithmetic means to receive data and arithmetically process said data;
f. comparison means coupled to said arithmetic means to effect comparisons between two different quantities of data from said cards;
g. transfer register means including first and second registers, said second register coupled to said first register to receive information signals therefrom, said transfer register means further coupled to said translate means, to said memory means, and to said arithmetic means to transfer information from said translate means to said memory means and receive information therefrom and further adapted to transfer information to and from said arithmetic means.

18. A card controller device according to claim 17 wherein there is further included stacking means coupled to said first and second card feeding means and to said comparison means to stack said cards in accordance with said comparisons.

19. A card controller device for reading information from information bearing cards and for selectively transporting said cards in accordance with at least a portion of the information borne by said cards comprising in combination:
a. first and second card feeding means each of which includes transport means to transport said cards;
b. first and second read means to read information from said cards, said first read means disposed along said transport means of said first card feeding means, said second read means disposed along said transport means of said second card feeding means;
c. translate means connected to said first and second read means to read information therefrom and translate said information into code signals used internally in said card controller;
d. memory means having a plurality of storage positions and having each of its storage positions addressable;
e. arithmetic means adapted to receive information from said cards and to arithmetically process said information;
f. comparison means coupled to said arithmetic means to effect comparisons between two different quantities of information from said cards;
g. transfer register means coupled to said translate means, and to said memory means, and to said arithmetic means to transfer information from said translate means to said memory means and receive information therefrom as well as to transfer information to and from said arithmetic means;
h. first and second wait station means respectively connected to said first and second card feeding means and respectively associated with said first and second read means, each of said wait station means being capable of temporarily holding two cards which have been read, thereby enabling said comparison means to make a comparison between a card passing through one of said read stations with two cards being temporarily held by its associated wait station, said first and second wait station means acting to respectively forward each of said temporarily held cards into an associated one of said first and second card feeding means;
i. stacker means coupled to said first and second card feeding means and coupled to said comparison means to stack said cards in accordance with information comparisons made by said comparison means.

20. A card controller according to claim 19 wherein there is further included read-out means connected to said transfer register means and adapted to be connected to auxiliary data processing equipment for reading information from said data processing means to said auxiliary data processing equipment; and read-in means coupled to said transfer register means and adapted to be coupled to auxiliary data processing equipment for reading information from said auxiliary data processing equipment into said card controller through said transfer register.

21 A card controller device according to claim 20 wherein there is further included overlap means connected to said read-in means and said read-out means to enable said card controller to read information from said first read means into said transfer register means and accordingly into said arithmetic means and said memory means while overlapping said last mentioned operations with reading out information to said auxiliary data processing equipment, said overlap means further enabling said card controller device to read information at said second read means and accordingly to control said second card feeding means while overlapping with the operation of having information read from said auxiliary data processing equipment into said card controller means.

22 A card controller device according to claim 21 wherein there is further included editing means coupled to said transfer register means to edit information which is transferred into and out of said memory means.

23. A card controller device according to claim 22 wherein there is further included in said first and second card feeding means respectively first and second card adjustment means to be adjusted to accommodate various lengths of cards, thereby enabling said card controller to handle various length cards.

24. A card controller device according to claim 23 wherein each of said card adjustment means is respectively located at a different one of said first and second wait stations and wherein each of said card adjustment means includes kinetic energy absorbing means to absorb the kinetic energy of said card as it is positioned in its associated one of said first and second wait station means.

25. A card controller device for reading information from information bearing cards for selectively transporting said cards in accordance with at least a portion of the information borne by said cards comprising in combination:
a. first and second card feeding means each of which includes transport means to transport said cards;

b. first and second read means to read information from said cards, said first read means disposed along said transport means of said first card feeding means, said second read means disposed along said transport means of said second card feeding means;

c. translate means coupled to said first and second read means to receive information therefrom and translate said information from at least one of two codes into code signals which are usable within said card controller device;

d. memory means having a plurality of storage positions and having each of its storage positions addressable;

e. transfer register means including first and second registers, said second register coupled to said first register to receive information signals therefrom, said transfer register means further coupled to said translate means to receive information signals therefrom and further coupled to said memory means to transmit information signals thereto and receive information signals therefrom;

f. editing means coupled to said transfer register means to edit information which is transferred into and out of said memory means.

26. A card controller device for reading information from information bearing cards and for selectively transporting said cards in accordance with at least a portion of the information borne by said cards comprising in combination:

a. first and second card feeding means each of which includes transport means to transport said cards, said transport means of said card feeding means arranged to transport said cards towards said transport means of said second card feeding means, said transport means of said second card feeding means arranged to transport said cards towards said transport means of said first card feeding means;

b. first and second read means to read information from said cards, said first read means disposed along the transport means of said first card feeding means, said second read means disposed along transport means of said second card feeding means;

c. memory means having a plurality of storage positions therein and having each of its storage positions addressable;

d. transfer register means including first and second registers, said second register coupled to said first register to receive information signals therefrom, said first register means further coupled to said first and second read means to receive information signals therefrom, and said second register further coupled to said memory means to transfer information signals thereto and receive information signals therefrom;

e. edit means coupled to said transfer register means to edit information which is transferred into and out of said memory means; and f. stacking means coupled to said first and second card feeding means to stack the cards handled by said first and second card feeding means in accordance with the information read therefrom.

27. A card controller device for reading information from information bearing cards for selectively transporting said cards in accordance with at least a portion of the information borne by said cards comprising in combination:

a. first and second card feeding means each of which includes transport means to transport said cards, said transport means of said card feeding means arranged to transport said cards toward said transport means of said second card feeding means, said transport means of said second card feeding means arranged to transport said cards towards said transport means of said first card feeding means;

b. first and second read means to read information from said cards, said first read means disposed along the transport means of said first card feeding means, said second read means disposed along the transport means of said second card feeding means;

c. memory means having a plurality of storage positions and having each of its storage positions addressable;

d. arithmetic means adapted to receive information from said first and second read means and to arithmetically process said information;

e. comparison means coupled to said arithmetic means to effect a comparison between two different quantities of information from said cards;

f. transfer register means including first and second registers, said second register coupled to said first register to receive information signals therefrom, said first register coupled to said first and second read means to receive information signals therefrom and said transfer register means further coupled to said arithmetic means and to said memory means to transfer information signals thereto and receive information signals therefrom;

g. editing means coupled to said transfer register means to edit information which is transferred into and out of said memory means; and h. stacking means coupled to said first and second card feeding means and to said comparison means to stack said cards in accordance with comparisons made by said comparison means.

28. A card controller device for reading information from information bearing cards and for selectively transporting said cards in accordance with at least a portion of the information borne by said cards comprising in combination:

a. first and second card feeding means each of which includes transport means to transport said cards;

b. first and second read means to read information from said cards, said first read means disposed along said transport means of said first card feeding means, said second read means disposed along said transport means of said second card feeding means;

c. translate means connected to said first and second read means to read information therefrom and translate said information into code signals used internally in said card controller;

d. memory means having a plurality of storage positions and having each of its storage positions addressable;

e. arithmetic means adapted to receive information from said cards and to arithmetically process said information;

f. comparison means coupled to said arithmetic means to effect a comparison between two different quantities of the information from said cards;

g. transfer means coupled to said translate means and to said memory means and to said arithmetic means to transfer information from said translate means to said memory means and receive information therefrom as well as to transfer information to and from said arithmetic means;

h. first and second wait station means respectively connected to said first and second card feeding means and respectively associated with said first and second card read means, each of said wait station means being capable of temporarily holding two cards which have been read, thereby enabling said comparison means to make a comparison between a card passing through one of said read stations with two cards being temporarily held by its associated wait station, said first and second wait station means acting to forward each of said temporarily held cards into said associated one of said first and second card feeding means;

i. stacker means coupled to said first and second card feeding means and coupled to said comparison means to stack said cards in accordance with information comparisons made by said comparison means;

j. read-out means connected to said transfer register means and adapted to be connected to auxiliary data processing equipment for reading information from said card controller device to said auxiliary data processing equipment;

k. and read-in means coupled to said transfer register means and adapted to be coupled to auxiliary data processing equipment for reading information from said auxiliary data processing equipment into said card controller device through said transfer register;

l. editing means coupled to said transfer register means to edit information which is transferred into and out of said memory means.

29. A card controller device according to claim 28 wherein there is further included a plurality of jam detector means located respectively along both said first and second card feeding means wherein there is also further included jam removal means to enable jams to be readily removed from said first and second card feeding means.

30. A card controller device according to claim 29 wherein there is further included in said first and second wait station means respectively first and second card adjustment means to be adjusted to accommodate various lengths of cards, thereby enabling said card controller to handle various length cards.

31. A card controller device according to claim 30 wherein there is further included overlap means connected to said read-in means and said read-out means to enable said card controller to read information from said first read-in means into said data processing means while overlapping said last-mentioned operation with reading-out information to auxiliary data processing equip-ment, said overlap means further enabling said card controller device to read information from said second read means and accordingly to control said second card feeding means while overlapping with the operation of having information read from said auxiliary data processing equipment into said card controller means.

32. A card controller device according to claim 31 wherein there is further included in said wait station means a kinetic energy absorbing means to absorb the energy of a moving card arriving at said wait station.

33. A card controller device according to Claim 32 wherein there is further included a plugboard means externally fitted to said card controller device and circuitry connected to said memory means to direct information being transferred into and out of said memory means.

* * * * *